US007490957B2

(12) United States Patent
Leong et al.

(10) Patent No.: US 7,490,957 B2
(45) Date of Patent: Feb. 17, 2009

(54) POWER CONTROLS WITH PHOTOSENSOR FOR TUBE MOUNTED LEDS WITH BALLAST

(75) Inventors: Susan J. Leong, New York, NY (US); John Kit, Brooklyn, NY (US)

(73) Assignee: DeNovo Lighting, L.L.C., Brooklyn, NY (US)

( * ) Notice: Subject to any disclaimer, the term of this patent is extended or adjusted under 35 U.S.C. 154(b) by 105 days.

(21) Appl. No.: 11/198,633

(22) Filed: Aug. 5, 2005

(65) Prior Publication Data

US 2005/0281030 A1 Dec. 22, 2005

Related U.S. Application Data

(63) Continuation of application No. 11/052,328, filed on Feb. 7, 2005, now Pat. No. 7,067,992, which is a continuation-in-part of application No. 10/822,579, filed on Apr. 12, 2004, now Pat. No. 6,853,151, which is a continuation-in-part of application No. 10/299,870, filed on Nov. 19, 2002, now Pat. No. 6,762,562.

(51) Int. Cl.
*F21S 31/14* (2006.01)

(52) U.S. Cl. .......................... 362/252; 315/51; 362/800

(58) Field of Classification Search ................. 362/217, 362/219, 221, 227, 240, 249, 251, 252, 800; 315/51, 250, 291, 307, 308, 312, 246
See application file for complete search history.

(56) References Cited

U.S. PATENT DOCUMENTS 5,151,679 A * 9/1992 Dimmick .................... 340/326
5,463,280 A * 10/1995 Johnson ...................... 315/187
5,655,830 A * 8/1997 Ruskouski .................. 362/240
5,726,535 A * 3/1998 Yan ........................ 315/185 R
5,782,552 A 7/1998 Green et al.
6,224,237 B1 * 5/2001 Wilson ....................... 362/223
6,305,821 B1 * 10/2001 Hsieh et al. ................. 362/246
6,448,550 B1 9/2002 Nishimura
6,555,966 B2 4/2003 Pitigoi-Aron
6,608,453 B2 * 8/2003 Morgan et al. ............. 315/312

(Continued)

*Primary Examiner*—John A Ward

(57) ABSTRACT

A power saving device for a light emitting diode (LED) lamp mounted to an existing fixture for a fluorescent lamp having a ballast assembly and LEDs positioned within a tube and electrical power delivered from the ballast assembly to the LEDs. The LED lamp includes means for controlling the delivery of the electrical power from the ballast assembly to the LEDs wherein the use of electrical power can be reduced or eliminated automatically during periods of non-use. Such means for controlling include means for detecting the level of daylight in the illumination area of said least one LED in particular a light level photosensor and means for transmitting to the means for controlling a control signal relating to the detected level of daylight from the photosensor. The photosensor can be used in operative association with an on-off switch in power connection to the LEDs, or with a computer or logic gate array in operative association with a dimmer that controls the power to the LEDs. An occupancy sensor that detects motion or a person in the illumination area of the LEDs can be optionally used in association with the photosensor and the computer and dimmer. Two or more such LED lamps with one or more computers or logic gate arrays can be in network communication with the photosensors and the occupancy sensors to control the power to the LEDs.

43 Claims, 115 Drawing Sheets

U.S. PATENT DOCUMENTS

| | | | | |
|---|---|---|---|---|
| 6,614,013 | B2 | 9/2003 | Pitigoi-Aron et al. | |
| 6,617,560 | B2 | 9/2003 | Forke | |
| 6,626,557 | B1 * | 9/2003 | Taylor | 362/249 |
| 6,860,628 | B2 * | 3/2005 | Robertson et al. | 362/555 |
| 6,885,300 | B1 | 4/2005 | Johnston et al. | |
| 6,888,323 | B1 | 5/2005 | Null et al. | |
| 6,906,302 | B2 | 6/2005 | Drowley | |
| 2001/0035848 | A1 | 11/2001 | Johnson et al. | |

* cited by examiner

POWER CONTROLS WITH PHOTOSENSOR FOR TUBE MOUNTED LEDS WITH BALLAST

HISTORY OF THE INVENTION

This application is a continuation of patent application Ser. No. 11/052,328 filed on Feb. 7, 2005, now U.S. Pat. No. 7,067,992 entitled "Power Controls for Tube Mounted LEDs with Ballast", which is a continuation-in-part of Ser. No. 10/822,579 filed Apr. 12, 2004 now U.S. Pat. No. 6,853,151, entitled "LED Retrofit Lamp" issued Feb. 8, 2005, which is a continuation-in-part of Ser. No. 10/299,870 filed Nov. 19, 2002 now U.S. Pat. No. 6,762,562, entitled "Tubular Housing with Light Emitting Diodes" issued Jul. 13, 2004.

FIELD OF THE INVENTION

The present invention relates to tubular lamps having LED arrays with ballasts.

BACKGROUND OF THE INVENTION

U.S. Pat. No. 6,762,562 and U.S. Pat. No. 6,853,151 both set forth LED arrays positioned in tubes that are powered by reduced voltage from a ballast. This reduced voltage can be provided with various controls positioned in the tubes so that the illumination from the LED arrays can be varied or switched to an on or off mode in accordance with illumination requirements that are independent of the main AC voltage lines in the area of the LED lamp.

With the present energy crisis, it becomes evident that the need for more energy efficient lamps of all configurations need to be developed and implemented as soon as possible for energy conservation.

The most effective of all trends in energy-efficient lighting is not a product at all, but complex systems that blend the best of new lighting technologies with intelligent design strategies and ties them both to building automation schemes.

One of these systems, known as "Daylight Harvesting," employs light level sensors or photosensors to detect available daylight, and then to adjust the output of electric lights to compensate for light coming into an architectural space from the outside.

Daylight harvesting is beneficial from two standpoints: sunlight is good for people, and electricity is expensive, both financially and environmentally. Yet most lighting systems in schools, offices, and retail spaces operate at full output during all hours of operation regardless of how much sunlight is available. The amount of natural light available to any given building differs by geography and the building's design, but on average, the sunlight available to interiors through windows and skylights can provide sufficient light for most educational and business activities.

The financial costs of not turning off or dimming electric lights include unnecessarily high electric bills for lighting and for the air conditioning required to remove heat created by lights. But the total costs go far beyond economics to include eyestrain, because of excessive brightness and even a lessening of emotional and intellectual well-being. Combining good building design with automation to create the process know as daylight harvesting is the preferable way to deal with these problems because, as any facilities manager will say, counting on occupants to manually turn off or dim lights is highly unreliable.

Daylight harvesting in commercial buildings is experiencing renewed interest in the United States, particularly in light of the environmental consequences of power generation, the desire for sustainable design, and current strains on the nation's power grid. The United States Department of Energy estimates that US commercial businesses use one-quarter of their total energy consumption for lighting. Daylight harvesting and its associated systems, therefore, offer the opportunity to reduce energy consumption and costs.

Commercial buildings in the United States house more than 64 billion square feet of lit floor space. Most of these buildings are lit by fluorescent lighting systems. Estimates show between 30% and 50% of the spaces in these buildings have access to daylight either through windows or skylights. The installation of technologies designed to take advantage of available daylight would be an appropriate energy-saving strategy that could potentially turn off millions of light fixtures for some portion of each day.

A building's windows and skylights, or "fenestration," affect both the daylight available and the energy requirements of a building's heating, cooling, and lighting systems. The definition of fenestration as defined by the Merriam Webster's Collegiate Dictionary is the arrangement, proportioning, and design of windows and doors in a building or room. The best way to capitalize on available daylight is to use integrated lighting controls that allow customized light levels and time of day control in use with proper fenestration all help to reduce energy use and lower power demand.

Daylight harvesting is a system, and all the elements of that system must be considered. Whether dealing with an existing building or a new design, system begins with fenestration. Next, light compensation must be achieved with gradations of illumination, produced either through switching, or through dimming or brightening to maintain balanced light levels that illuminate without generating unwanted glare.

Lighting controls that respond to daylight distribution via windows, their orientation, location and glazing materials, will complement the abundant natural light available and greatly reduce lighting costs. Efficient lighting systems will also produce less waste heat, decreasing the cooling load of the entire HVAC system and reducing overall electric usage.

Automatic controls can include the following:

- Centralized, web-based control to provide intuitive control that integrates with building automation systems including HVAC and security.
- Time of Day control to turn off certain lights according to a schedule.
- Timers that automatically switch off lights after a predetermined period.
- Occupancy sensors that detect your presence and provide light or turn it off when you leave a room.
- Light level photosensors that detect available daylight and modulate their output accordingly.

Many current energy codes now require lights to be automatically turned off at the end of the day. Time of Day control provides the capability to schedule lighting based on the day of week and time of day in increments as small as one minute. This type of control ensures that lights are on or off in designated areas at user-specified times.

Another form of scheduling is based on an astronomical clock, which can control outdoor lighting using true on dawn and dusk settings. For example, lights can be turned on thirty minutes before dusk or turned off fifteen minutes after dawn. A building's longitude and latitude settings are used by the lighting control system to calculate dawn and dusk. Typically, an astronomical clock eliminates the need to use outdoor light level sensors.

Maximum energy savings up to 75% can be achieved through control and sensing means where the lighting system is controlled by both daylighting and occupancy sensors. A typical daylight harvesting system using the LED retrofit lamp of the present invention includes at least one light level photosensor paired with dimming controls, and dimming the lights proportionally to the amount of daylight entering the work space. The use of a light level sensor or photosensor will sense the amount of daylight available in a room and adjust the LED retrofit lamp output accordingly. Power control of the LED retrofit lamp can come from at least one occupancy sensor by itself, or from at least one photosensor in use by itself. The use of at least one occupancy sensor in solo or with at least one light level photosensor in an LED retrofit lamp of the present invention will provide for maximum energy savings and conservation.

U.S. Pat. No. 6,762,562 and U.S. Pat. No. 6,853,151 both set forth LED arrays positioned in tubes that are powered by reduced voltage from a ballast. This reduced voltage can be provided with various controls positioned in the tubes so that the illumination from the LED arrays can be varied or switched to an on or off mode in accordance with illumination requirements that are independent of the main AC voltage lines in the area of the LED lamp.

With the present energy crisis, it becomes evident that the need for more energy efficient lamps of all configurations need to be developed and implemented as soon as possible for energy conservation.

Many private, public, commercial and office buildings including transportation vehicles like trains and buses use fluorescent lamps installed in lighting fixtures. Fluorescent lamps are presently much more efficient than incandescent lamps in using energy to create light. Rather than applying current to a wire filament to produce light, fluorescent lamps rely upon an electrical arc passing between two electrodes, one located at either ends of the lamp. The arc is conducted by mixing vaporized mercury with purified gases, mainly Neon and Krypton or Argon gas inside a tube lined with phosphor. The mercury vapor arc generates ultraviolet energy, which causes the phosphor coating to glow or fluoresce and emit light. Standard electrical lamp sockets are positioned inside the lighting fixtures for securing and powering the fluorescent lamps to provide general lighting.

Unlike incandescent lamps, fluorescent lamps cannot be directly connected to alternating current power lines. Unless the flow of current is somehow stabilized, more and more current will flow through the lamp until it overheats and eventually destroys itself. The length and diameter of an incandescent lamp's filament wire limits the amount of electrical current passing through the lamp and therefore regulates its light output. The fluorescent lamp, however using primarily an electrical arc instead of a wire filament, needs an additional device called a ballast to regulate and limit the current to stabilize the fluorescent lamp's light output.

Fluorescent lamps sold in the United States today are available in a wide variety of shapes and sizes. They run from miniature versions rated at 4 watts and 6 inches in length with a diameter of ⅝ inches, up to 215 watts extending eight feet in length with diameters exceeding 2 inches. The voltage required to start the lamp is dependent on the length of the lamp and the lamp diameter. Larger lamps require higher voltages. Ballast must be specifically designed to provide the proper starting and operating voltages required by the particular fluorescent lamp.

In all fluorescent lighting systems today, the ballast performs two basic functions. The first is to provide the proper voltage to establish an arc between the two electrodes, and the second is to provide a controlled amount of electrical energy to heat the lamp electrodes. This is to limit the amount of current to the lamp using a controlled voltage that prevents the lamp from destroying itself.

Fluorescent ballasts are available in magnetic, hybrid, and the more popular electronic ballasts. Of the electronic ballasts available, there are rapid start and instant start versions. A hybrid ballast combines both electronic and magnetic components in the same package.

In rapid start ballasts, the ballast applies a low voltage of about four volts across the two pins at either end of the fluorescent lamp. After this voltage is applied for at least one half of a second, an arc is struck across the lamp by the ballast starting voltage. After the lamp is ignited, the arc voltage is reduced to the proper operating voltage so that the current is limited through the fluorescent lamp.

Instant start ballasts on the other hand, provide light within 1/10 of a second after voltage is applied to the fluorescent lamp. Since there is no filament heating voltage used in instant start ballasts, these ballasts require about two watts less per lamp to operate than do rapid start ballasts. The electronic ballast operates the lamp at a frequency of 20,000 Hz or greater, versus the 60 Hz operation of magnetic and hybrid type ballasts. The higher frequency allows users to take advantage of increased fluorescent lamp efficiencies, resulting in smaller, lighter, and quieter ballast designs over the standard electromagnetic ballast.

Existing fluorescent lamps today use small amounts of mercury in their manufacturing process. The United States Environmental Protection Agency's (EPA) Toxicity Characteristic Leaching Procedure (TCLP) is used by the Federal Government and most states to determine whether or not used fluorescent lamps should be characterized as hazardous waste. It is a test developed by the EPA in 1990 to measure hazardous substances that might dissolve into the ecosystem. Some states use additional tests or criteria and a few have legislated or regulated that all fluorescent lamps are hazardous whether or not they pass the various tests. For those states that use TCLP to determine the status of linear fluorescent lamps, the mercury content is the critical factor. In order to minimize variability in the test, the National Electrical Manufacturers Association (NEMA) developed a standard on how to perform TCLP testing on linear fluorescent lamps (NEMA Standards Publication LL1-1997).

The TCLP attempts to simulate the effect of disposal in a conventional landfill under the complex conditions of acid rain. Briefly, TCLP testing of fluorescent lamps consists of the following steps:

1. All lamp parts are crushed or cut into small pieces to ensure all potential hazardous materials will leach out in the test.
2. The lamp parts are put into a container and an acetic acid buffer with a pH of 5 is added. A slightly acidic extraction fluid is used to represent typical landfill extraction conditions.
3. The closed container is tumbled end-over-end for 18 hours at 30 revolutions per minute.
4. The extraction fluid is then filtered and the mercury that is dissolved in the extraction fluid is measured per liter of liquid.

The average test result must be lower than 0.2 milligrams of mercury per liter of extraction fluid for the lamp to be qualified as non-hazardous waste. Items that pass the TCLP described above are TCLP-compliant, are considered non-hazardous by the EPA, and are exempt from the Universal Waste Ruling (UWR). Four-foot long fluorescent lamps with more than 6 milligrams of mercury, for example, fail the TCLP without an additive. The UWR is the part of the EPA's Resource Conservation and Recovery Act (RCRA), which governs the handling of hazardous waste. The UWR was established in May 1995 to simplify procedures for the handling, disposal, and recycling of batteries, pesticides, and thermostats, all considered widespread sources of low-level toxic waste. The purpose was to reduce the cost of complying with the more stringent hazardous waste regulations while maintaining environmental safeguards. Lamps containing mercury and lead were not included in the UWR. Originally, in most states, users disposing more than 350 lamps a month were required to comply with the more stringent government regulations. In Jul. 6, 1999 the EPA added non-TCLP-compliant lamps like those containing lead and mercury to the UWR. This addition went into effect in Jan. 6, 2000. So lamps that pass the TCLP are exempt from the UWR.

Not all states comply with the UWR after Jan. 6, 2000. Individual states have a choice of adopting the UWR for lamps or keeping the original RCRA full hazardous waste regulation. States can elect to impose stricter requirements than the federal government, which is what California has done with its TTLC or Total Threshold Limit Concentration test. In addition to a leaching test, the state of California has a total threshold limit concentration (TTLC) for mercury for hazardous waste qualification. Other states are considering implementing a total mercury threshold as well. California has a more rigorous testing procedure for non-hazardous waste classification. The Total Threshold Limit Concentration (TTLC) also needs to be passed in order for a fluorescent lamp to be classified as non-hazardous waste. The TTLC requires a total mercury concentration of less than 20 weight ppm (parts per million): for example, a F32 T8 lamp with a typical weight of 180 grams must contain less than 3.6 milligrams of mercury. Philips' ALTO lamps were the first fluorescent lamps to pass the Environmental Protection Agency's (EPA) TCLP (Toxic Characteristic Leaching Procedure) test for non-hazardous waste. Philips offers a linear fluorescent lamp range that complies with TTLC and is not hazardous waste in California with other lamp manufacturers following close behind.

Certain fluorescent lamp manufacturers like General Electric (GE) and Osram-Sylvania (OSI) use additives to legally influence the TCLP test. Different additives can be used. GE puts ascorbic acid and a strong reducing agent into the cement used to fix the lamp caps to the fluorescent lamp ends. OSI mixes copper-carbonate to the cement or applies zinc plated iron lamp end caps. The copper, iron, and zinc ions reduce soluble mercury. These additives are found in fluorescent lamps produced in 1999 and 2000. The use of additives reduces the soluble mercury measured by the TCLP test in laboratories and is a legitimate way to produce TCLP compliant fluorescent lamps.

Unfortunately, the additive approach does not reduce or eliminate the amount of hazardous mercury in the environment. More importantly, the additives may not work as effectively in the real world as they do in the laboratory TCLP test. In real world disposal, the lamp end caps are not cut to pass a 0.95 cm sieve; are not tumbled intensively with all other lamp parts for 18 hours, and so forth. Therefore, the additives that becomes available during the TCLP test to reduce mercury leaching may not or only partly, do their job in real world disposal. As a consequence, lamps that rely on additives pass TCLP, but may still have relatively high amounts of mercury leaching out into the environment.

The TCLP test is a controlled laboratory test meant to represent typical landfill conditions. The EPA developed this test in order to reduce leaching of hazardous materials in the environment. Of course, such a test is a compromise between the practicality of testing a large variety of landfill materials and actual landfill conditions. Not every landfill has a pH of 5 and metal parts are not normally cut into small pieces.

The amount of mercury that leaches out in real life will depend strongly on the type of additive used and the exact disposal conditions. However, the "additive" approach is not a guarantee that only small amounts of mercury will leach into the environment upon disposal.

Several states including New Jersey, Delaware, and Arkansas have addressed the additive issue. They have indicated that if lamps with additives were thrown away as non-hazardous waste and are later found to behave differently in the landfill, then the generators and those who dispose of such lamps could potentially face the possibility of having violated the hazardous waste disposal regulation known as RCRA.

The best fluorescent lamps in production at this time include GE's ECOLUX reduced mercury long-life XL and Philips' ALTO Advantage T8 lamps. They both have a rated lamp life of 24,000 hours, produce 2,950 lumens, and have a Color Rendering Index (CRI) of 85. Rated life for fluorescent lamps is based on a cycle of 3 hours on and 20 minutes off.

Besides the emission of ultra-violet (UV) rays and the described use of mercury in the manufacture of fluorescent lamps, there are other disadvantages to existing conventional fluorescent lamps that include flickering and limited usage in cold weather environments.

In conclusion, a particularly useful approach to a safer environment is to have a new lamp that contains no harmful traces of mercury that can leach out in the environment, no matter what the exact disposal conditions are. No mercury lamps are the best option for the environment and for the end-user that desires non-hazardous lamps. Also, no mercury LED retrofitting lamps will free many users from the regulatory burdens such as required paperwork and record keeping, training, and regulated shipping of otherwise hazardous materials. In addition, numerous industrial and commercial facility managers will no longer be burdened with the costs and hassles of disposing large numbers of spent fluorescent lamps considered as hazardous waste. The need for a safer, energy efficient, reliable, versatile, and less maintenance light source is needed.

Light emitting diode (LED) lamps and organic light emitting diode (OLED) lamps that retrofit fluorescent lighting fixtures using existing ballasts, or other power supplies can help to relieve some of the above power and environmental problems.

An organic light emitting diode or OLED is an electronic device made by placing a series of extremely thin layers of organic film material between two conductors. The conductors can be glass substrate or flexible plastic material. When electrical current is applied, these organic film materials emit bright light. This process is called electro-phosphorescence. Even with the layered configuration, OLEDs are very thin, usually less than 500 nm or 0.5 thousandths of a millimeter. OLED displays offer up to 165 degrees viewing and require only 2-10 volts to operate while OLED panels may also be used as lighting devices. An alternative name for OLED technology is OEL or Organic Electro-Luminescence.

Recent advances made by GE Lighting in the first quarter of 2004 have produced a very bright 24 square inch OLED panel producing well over 1200 lumens of light with an efficacy of 15 lumens per watt and a power consumption of about 80-watts. This latest breakthrough demonstrates that the light quality, output, and efficiency of OLED technology can meet the needs of general illumination on par with today's incandescent and possibly fluorescent lamp technologies.

Because OLED panels are thinner, lighter, and flexible by nature, it serves as a possible light source for the present invention.

In the present CIP application, the use of "LED" covers both conventional high-brightness semiconductor light emitting diodes (LEDs) and organic light emitting diodes (OLEDs); semiconductor dies that produce light in response to current, light emitting polymers, electro-luminescent strips (EL), etc. Furthermore, the use of "LED" may refer to a single light-emitting device having multiple semiconductor dies that are individually controlled. It should also be understood that the use of "LED" does not restrict the package type of an LED. The use of "LED" may refer to packaged LEDs, non-packaged LEDs, surface mount LEDs, chip-on-board (COB) LEDs, and LEDs of all other configurations. The use of "LED" also includes LEDs packaged or associated with phosphor, wherein the phosphor may convert radiant energy emitted from the LED to a different wavelength of light. The use of "LED" will also include high-brightness white LEDs as well as high-brightness color LEDs in different packages. An LED array can consist of at least one LED or a plurality of LEDs, and at least one LED array can also consist of a plurality of LED arrays.

These new LED lamps can be used with magnetic, hybrid, and electronic instant and rapid start ballasts, and will plug directly into the present sockets thereby replacing the fluorescent lamps in existing lighting fixtures or with other AC or DC power supplies. The new LED retrofit lamps are adapted to be inserted into the housing of existing fluorescent lighting fixtures acting as a direct replacement light unit for the fluorescent lamps of the original equipment. The major advantage is that the new LED retrofit lamps with integral electronic circuitry are able to replace existing fluorescent lamps without any need to remove the installed ballasts or make modifications to the internal wiring of the already installed fluorescent lighting fixtures. The new LED retrofit lamps include replacing linear cylindrical tube T8 and T12 lamps, U-shape curved lamps, circular T5 lamps, helical CFL compact type fluorescent and PL lamps, and other tubular shaped fluorescent lamps with two or more electrical contacts that mate with existing sockets.

The use of light emitting diodes and organic light emitting diodes as alternate light sources to replace existing lamp designs is a viable option. Light Emitting Diodes (LEDs) are compound semiconductor devices that convert electricity to light when biased in the forward direction. In 1969, General Electric invented the first LED, SSL1 (Solid State Lamp). The SSL1 was a gallium phosphide device that had transistor-like properties i.e. high shock, vibration resistance and long life. Because of its small size, ruggedness, fast switching, low power and compatibility with integrated circuitry, the SSL1 was developed for many indicator-type applications. It was these unique advantages over existing light sources that made the SSL1 find its way into many future applications.

Today advanced high-brightness LEDs and OLEDs are the next generation of lighting technology that is currently being installed in a variety of lighting applications. As a result of breakthroughs in material efficiencies and optoelectronic packaging design, LEDs are no longer used as just indicator lamps. They are now used as a light source for the illumination of monochromatic applications such as traffic signals, vehicle brake lights, and commercial signs.

In addition, white light LED technology will change the lighting industry, as we know it. Even with further improvements in color quality and performance, white light LED technology has the potential to be a dominant force in the general illumination market. LED benefits include: energy efficiency, compact size, low wattage, low heat, long life, extreme robustness and durability, little or no UV emission, no harmful mercury, and full compatibility with the use of integrated circuits.

To reduce electrical cost and to increase reliability, LED lamps have been developed to replace the conventional incandescent lamps typically used in existing general lighting fixtures. LED lamps consume less energy than conventional lamps and give much longer lamp life.

Unfortunately, the prior art LED lamp designs used thus far still do not provide sufficiently bright and uniform illumination for general lighting applications, nor can they be used strictly as direct and simple LED retrofit lamps for existing fluorescent lighting fixtures and ballast configurations.

U.S. Pat. No. D366,506 issued to Lodhie on Jan. 19, 1999, and U.S. Pat. No. D405,201 issued to Lodhie on Feb. 2, 1999, both disclose an ornamental design for a bulb. One has a bayonet base and the other a medium screw base, but neither was designed exclusively for use as a retrofit lamp for a fluorescent lighting fixture using the existing fluorescent sockets and ballast electronics. Power to the circuit boards and light emitting diodes are provided on one end only. Fluorescent ballasts can provide power on at least one end, but normally power to the lamp is supplied into two ends. Likewise, U.S. Pat. No. 5,463,280 issued to Johnson, U.S. Pat. No. 5,655,830 issued to Ruskouski, and U.S. Pat. No. 5,726,535 issued to Yan, all disclose LED Retrofit lamps exclusively for exit signs and the like. But as mentioned before, none of the disclosed retrofit lamps are designed for use as a retrofit lamp for a fluorescent lighting fixture using the existing fluorescent sockets and ballast electronics. Power to the circuit boards and light emitting diodes are provided on one end only while existing fluorescent ballasts can provide power on two ends of a lamp.

U.S. Pat. No. 5,577,832 issued to Lodhie on Nov. 26, 1996, teaches a multilayer LED assembly that is used as a replacement light for equipment used in manufacturing environments. Although the multiple LEDs, which are mounted perpendicular to a base provides better light distribution, this invention was not exclusively designed for use as a retrofit lamp for fluorescent lighting fixtures using the existing fluorescent sockets and ballast electronics. In addition, this invention was designed with a single base for powering and supporting the LED array with a knob coupled to an axle attached to the base on the opposite end. The LED array of the present invention is not supported by the lamp base, but is supported by the tubular housing itself. The present invention provides power on both ends of the retrofit LED lamp serving as a true replacement lamp for existing fluorescent lighting fixtures.

U.S. Pat. No. 5,688,042 issued to Madadi on Nov. 18, 1997, discloses LED lamps for use in lighted sign assemblies. The invention uses three flat elongated circuit boards arranged in a triangular formation with light emitting diodes mounted and facing outward from the center. This configuration has its limitation, because the light output is not evenly distributed away from the center. This LED lamp projects the light of the LEDs in three general zonal directions. Likewise, power to the LEDs is provided on one end only. In addition, the disclosed configuration of the LEDs limits its use in non-linear and curved housings.

U.S. Pat. No. 5,949,347 issued to Wu on Sep. 7, 1999, also discloses a retrofit lamp for illuminated signs. In this example, the LEDs are arranged on a shaped frame, so that they are aimed in a desired direction to provide bright and uniform illumination. But similar to Madadi et al, this invention does not provide for an omni-directional and even distribution of light as will be disclosed by the present invention.

Again, power to the LEDs is provided on one end of the lamp only and cannot be used in either non-linear or curved housings.

U.S. Pat. No. 5,575,459 issued to Anderson on Nov. 19, 1996, U.S. Pat. No. 6,471,388 B1 issued to Marsh on Oct. 29, 2002, and U.S. Pat. No. 6,520,655 B2 issued to Ohuchi on Feb. 18, 2003 all contain information that relate to replacement LED lamps, but do not disclose the detailed specifics of the original invention.

The following list of US patents and patent applications is made of record and presented for background reference as being related to the present invention disclosure.

U.S. Pat. No. 5,782,552 issued to Green et al on Jul. 21, 1998; U.S. Pat. No. 6,448,550B1 issued to Nishimura on Sep. 10, 2002; U.S. Pat. No. 6,555,966B2 issued to Pitigoi-Aron on Apr. 29, 2003; U.S. Pat. No. 6,614,013B2 issued to Pitigoi-Aron et al.; U.S. Pat. No. 6,617,560B2 issued to Forke on Sep. 9, 2003; U.S. Pat. No. 6,885,300B1 issued to Johnston et al. on Apr. 26, 2005; U.S. Pat. No. 6,888,323B1 issued to Null et al. on May 3, 2005; U.S. Pat. No. 6,906,302B2 issued to Drowley on Jun. 14, 2005 and U.S. Patent Application No. 2001/0035848A1 by Johnson et al. published on Nov. 1, 2001 all relate to the use of photosensors to detect different light levels.

The present invention has been made in order to solve the problems that have arisen in the course of an attempt to develop energy efficient lamps. This invention is designed to replace the existing hazardous fluorescent lamps that contain harmful mercury and emit dangerous ultra-violet rays. They can be used directly in existing sockets and lighting fixtures without the need to change or remove the existing fluorescent lamp ballasts or wiring.

A primary object of the present invention is to provide a LED lamp that will bring about more energy conservation and savings.

SUMMARY OF THE INVENTION

The present continuation-in-part invention includes a power saving device for a light emitting diode (LED) lamp mounted to an existing fixture for a fluorescent lamp having a ballast assembly and LEDs positioned within a tube, and electrical power delivered from the ballast assembly to the LEDs. The LED lamp includes means for controlling the delivery of the electrical power from the ballast assembly to the LEDs, wherein the use of electrical power can be reduced or eliminated automatically during periods of non-use. Such means for controlling can include an on-off switch mounted in the tube, or can also include a current driver dimmer mounted in the tube that regulates the amount of power delivered to the LEDs. A computer or logic gate array controls the dimmer or power switch. A sensor such as a light level photosensor and/or an occupancy sensor mounted external to the tube or internal to the tube can send signals to the computer or logic gate array to trigger a switch or control a dimmer. Two or more such LED lamps with one or more computers or logic gate arrays in network communication with sensors can be controlled, so as to reduce flickering between lamps when illumination areas are being alternately occupied. Preset or manually set timers can control switches or be used in combination with the computer, logic array, and dimmer. A combination of at least one occupancy detection sensor and at least one light level photosensor used together to provide input signals to the computer, logic gate arrays, or switches, will provide the best savings in energy and conservation.

A prior inventive embodiment disclosed a power saving device that includes a fluorescent luminaire having a ballast assembly and LEDs positioned within a tube and electrical power delivered from the ballast assembly to the LEDs. The LED lamp includes means for controlling the delivery of the electrical power from the ballast assembly to the LEDs wherein the use of electrical power can be reduced or eliminated automatically during periods of non-use. Such means for controlling can include an on-off switch mounted in the tube or can also include a dimmer current driver mounted in the tube that regulates the amount of power delivered to the LEDs. A computer or an array of logic gates can control the dimmer or switches to the LED arrays. A sensor such as an occupancy motion detection sensor mounted external to the tube or within the tube can send signals to the computer, logic arrays, or switches. Two or more such LED lamps with one or more computers in network communication with the sensors can be controlled so as to reduce flickering between lamps when illumination areas are being alternately occupied. Preset or manually set timers can control the switch or be used in combination with the computer, logic gate arrays, switch, and dimmer.

The aforementioned problems were met by providing an LED lamp that has a main, generally tubular housing terminating at both ends in a lamp base that inserts directly into the lamp socket of existing fluorescent lighting fixtures used for general lighting in public, private, commercial, industrial, residential buildings, and even in transportation vehicles. The new LED lamps include replacing linear cylindrical tube T8 and T12 lamps, U-shape curved lamps, circular T5 lamps, and CFL compact type fluorescent and PL lamps, etc. The main outer tubular housing of the new LED lamps can be linear, U-shaped, circular, or helical in configuration. It can be manufactured as a single hollow housing or as two halves that can be combined to form a single hollow housing. The two halves can be designed to snap together, or can be held together with glue, or by other means like ultrasonic welding, etc. The main outer tubular housing can be made of a light transmitting material like glass or acrylic plastic for example. The surface of the main outer tubular housing can be diffused or can be coated with a white translucent film to create a more dispersed light output similar to present fluorescent lamps. Power to the LED lamps in the various shapes and configurations is provided at the two ends by existing fluorescent ballasts. Integral electronic circuitry converts the power from the fluorescent ballasts necessary to power the LEDs mounted to the circuit boards that are inserted within the main outer tubular housing. Desirably, the two base end caps of the LED lamp have apertures therein to allow air to pass through into and out from the interior of the main outer tubular housing and integral electronic circuitry.

In one embodiment of the present invention, the discrete or surface mount LEDs are compactly arranged and fixedly mounted with lead-free solder onto a flat rectangular flexible circuit board made of a high-temperature polyimide or equivalent material. There are long slits between each column and row of LEDs. The entire flexible circuit board with the attached LEDs is rolled to form a hollow and generally cylindrical frame, with the LEDs facing radially outward from a central axis. Although this embodiment describes a generally cylindrical frame, it can be appreciated by someone skilled in the art to form the flexible circuit board into shapes other than a cylinder, such as an elongated oval, triangle, rectangle, hexagon, octagon, and so on among many other possible configurations. Accordingly, the shape of the tubular housing holding the individual flexible circuit board can be made in a similar shape to match the shape of the formed flexible circuit board. The entire frame is then inserted inside the main outer tubular housing. It can also be said that the shape of the flexible circuit board can be made into the same shape as the tubular housing. The length of the frame is always within the length of the linear main outer tubular housing. AC power generated by the external fluorescent ballast is converted to DC power by additional integral electronics. Electrical connector means are used to connect the integral electronics to the light emitting diode array and to provide current to the LEDs at one or both ends of the flexible circuit board. Since present linear fluorescent lamps are available in one, two, four, six, and eight feet lengths, the flexible circuit board can be designed in increments of one-foot lengths. Individual flexible circuit boards can be cascaded and connected in series to achieve the desired lengths. Likewise, the main outer tubular housing in linear form will be available in the desired lengths, i.e. one, two, four, six, and eight feet lengths. The main outer tubular housing can also be provided in a U-shape, circular, spiral shape, or other curved configuration. The slits provided on the flat flexible circuit board located between each linear array of LEDs allows for the rolled frame to contour and adapt its shape to fit into the curvature of the main outer tubular housing. Such a design allows for the versatile use in almost any shape that the main outer tubular housing can be manufactured in. There is an optional flexible center support that can isolate the integral electronics from the flexible circuit board containing the compact LED array, which may serve as a heat sink to draw heat away from the circuit board and LEDs to the center of the main outer tubular housing and thereby dissipating the heat at the two lamp base ends. There may be cooling holes or air holes on either lamp base end caps of the LED retrofit lamp, in the isolating flexible center support, and in the flexible circuit board containing the compact LED array to allow for proper cooling and airflow. In addition, the main outer tubular housing may contain small holes or other perforations to provide additional cooling of the power electronics, LEDs, and circuit board components. Each end cap of the LED lamp can terminate in single-pin or bi-pin or quad-pin contacts.

In another embodiment of the present invention, the array of discrete or surface mount LEDs are compactly arranged in a continuously long and thin LED array, and is fixedly mounted with lead-free solder onto a very long and thin flexible circuit board strip made of a high-temperature polyimide or equivalent material. The entire flexible circuit board with the attached LEDs is then spirally wrapped around an optional interior flexible center support. Because the center support is also made of a flexible material like rubber, etc. it can be formed into the shape of a U, a circle, or even into a helical spiral similar to existing CFL or compact fluorescent lamp shapes. The entire generally cylindrical assembly consisting of the compact strip of flexible circuit board spiraling around the center support is then inserted into the main outer tubular housing. Although this embodiment describes a generally cylindrical assembly, it can be appreciated by someone skilled in the art to form the flexible circuit board strip into shapes other than a cylinder, such as an elongated oval, triangle, rectangle, hexagon, octagon, etc. Accordingly, the shape of the tubular housing holding the individual flexible circuit board strip can be made in a similar shape to match the shape of the formed flexible circuit board strip assembly. The length of the entire assembly is always within the length of the main outer tubular housing. AC power generated by the external fluorescent ballasts is converted to DC power by additional integral electronics. Electrical connector means are used to connect the integral electronics to the light emitting diode arrays to provide current to the LEDs at one or both ends of the flexible circuit board. Since present linear fluorescent lamps are available in one, two, four, six, and eight feet lengths, the flexible circuit board can be designed in increments of one-foot lengths. Individual flexible circuit boards can be cascaded and connected in series to achieve the desired lengths. Likewise, the main outer tubular housing in linear form will be available in the desired lengths, i.e. one, two, four, six, and eight feet lengths. Although this embodiment can be used for linear lamps, it can be appreciated by someone skilled in the art for use with curved tubular housings as well. Here, the flexible and hollow center support isolates the integral electronics from the flexible circuit board containing the compact LED array. It can be made of heat conducting material that can also serve as a heat sink to draw heat away from the circuit board and LEDs to the center of the main outer tubular housing and thereby dissipating the heat at the two lamp base ends. There may be cooling holes or air holes on either lamp base end caps of the LED retrofit lamp, in the isolating flexible center support, and in the flexible circuit board containing the compact LED array to allow for proper cooling and airflow. In addition, the main outer tubular housing may contain small holes or other perforations to provide additional cooling of the power electronics, LEDs, and circuit board components. Each end cap of the LED retrofit lamp can terminate in single-pin or bi-pin contacts.

In yet another embodiment of the present invention, the leads of each discrete LED is bent at a right angle and then compactly arranged and fixedly mounted with lead-free solder along the periphery of a generally round, flat, and rigid circuit board disk. Although this embodiment describes a generally round circular circuit board disk, it can be appreciated by someone skilled in the art to use circuit boards or support structures made in shapes other than a circle, such as an oval, triangle, rectangle, hexagon, octagon, etc. Accordingly, the shape of the tubular housing holding the individual circuit boards can be made in a similar shape to match the shape of the circuit boards. The circuit board disks are manufactured out of G10 epoxy material, FR4, or other equivalent rigid material. The LEDs in each rigid circuit board disk can be mounted in a direction perpendicular to the rigid circuit board disk, which results in light emanating in a direction perpendicular to the rigid circuit board disk instead of in a direction parallel to the circuit board as described in the previous embodiments. It can also be appreciated by someone skilled in the art to use one or more side emitting LEDs mounted directly to one side of the rigid circuit board disks with adequate heat sinking applied to the LEDs on the same or opposite sides of the rigid circuit board disks. The side emitting LEDs will be mounted in a direction parallel to the rigid circuit board disk, which also results in light emanating in a direction perpendicular to the rigid circuit board disk instead of in a direction parallel to the circuit board as described in the previous embodiments. Each individual rigid circuit board disk is then arranged one adjacent another at preset spacing by grooves provided on the inside surface of the main outer tubular housing that hold the outer rim of the individual circuit boards. The individual circuit boards are connected by electrical transfer means including headers, connectors, and/or discrete wiring that interconnect all the individual LED arrays to two lamp base caps at both ends of the tubular housing. The entire assembly consisting of the rigid circuit board disks with each LED array is inserted into one half of the main outer tubular housing. The main outer tubular housing here can be linear, U-shaped, or round circular halves. Once all the individual rigid circuit board disks and LED arrays are inserted into the grooves provided on the one half of the main outer tubular housing and are electrically interconnected to each other and to the two lamp base ends, the other mating half of the main outer tubular housing is snapped over the first half to complete the entire LED lamp assembly. The length of the entire assembly is always within the length of the main outer tubular housing. AC power generated by the external fluorescent ballasts is converted to DC power by additional integral electronics. Electrical connector means are used to connect the integral electronics to the light emitting diode arrays to provide current to the LEDs at both ends of the complete arrangement of rigid circuit board disks. Since present linear fluorescent lamps are available in one, two, four, six, and eight feet lengths, the rigid circuit board disks can be stacked to form increments of one-foot lengths. Individual rigid circuit board disks can be cascaded and connected in series to achieve the desired lengths. Likewise, the main outer tubular housing in linear form will be available in the desired lengths, i.e. one, two, four, six, and eight feet lengths. Again, this last described embodiment can be used for linear lamps, but it is also suited for curved tubular housings. There may be cooling holes or air holes on either base end caps of the improved LED lamp, and in the individual rigid circuit board disks containing the compact LED array to allow for proper cooling and airflow. In addition, the main outer tubular housing may contain small holes or other perforations to provide additional cooling of the power electronics, LEDs, and circuit board components. Each end cap of the LED lamp can terminate in single-pin or bi-pin or quad-pin contacts.

It can be appreciated by someone skilled in the art to use a lesser amount of LEDs in the circuit board configurations to project light from an existing fluorescent fixture in the general direction out of the fixture only without any light projected back into the fixture itself. This will allow for lower power consumption, material costs, and will offer greater fixture efficiencies with reduced light losses.

Ballasts are usually connected to an AC (alternating current) power line operating at 50 Hz or 60 Hz (hertz or cycles per second) depending on the local power company. Most ballast are designed for one of these frequencies, but not both. Some electronic ballast, however, can operate on both frequencies. Also, some ballast are designed to operate on DC (direct current) power. These are considered specialty ballasts for applications like transportation vehicle bus lighting.

Electromagnetic and hybrid ballasts operate the lamp at the same low frequency as the power line at 50 Hz or 60 Hz. Electronic ballasts operate the lamp at a higher frequency at or above 20,000 Hz to take advantage of the increased lamp efficiency. The fluorescent lamp provides roughly 10% more light when operating at high frequency versus low frequency for the same amount of input power. The typical application, however involves operating the fluorescent lamp at lower input power and high frequency while matching the light output of the lamp at rated power and low frequency. The result is a substantial savings in energy conservation.

Ballasts can be connected or wired between the input power line and the lamp in a number of configurations. Multiple lamp ballasts for rapid start or instant start lamps can operate lamps connected in series or parallel depending on the ballast design. When lamps are connected in series to a ballast and one lamp fails, or is removed from the fixture, the other lamp(s) connected to that ballast would not light. When the lamps are connected in parallel to a ballast and one lamp fails, or are removed, the other lamp(s) will continue to light.

As discussed earlier, electronic rapid start fluorescent lamp ballasts apply a low voltage of about 4 volts across the two contact pins at each end of the lamp. After this voltage is applied for at least one half of a second, a high voltage arc is struck across the lamp by the ballast starting voltage. After the lamp ignites, the arc voltage is reduced down to a proper operating voltage and the current is limited through the lamp by the ballast. In the case of electronic instant start fluorescent lamp ballasts, an initial high-voltage arc is struck between the two lamp base ends to ignite the lamp. After the lamp ignites, the arc voltage is again reduced down to a proper operating voltage and the current is limited through the lamp by the ballast. For magnetic type lamp ballasts, a constant voltage is applied to the two lamp base ends to energize and maintain the electrical arc within the fluorescent lamp.

For standard fluorescent lamps with a filament voltage of about 3.4 volts to 4.5 volts, the minimum starting voltage to ignite the lamp can range from about 108 volts to about 230 volts. For HO or high output fluorescent lamps, the minimum starting voltage is higher from about 110 volts to about 500 volts.

Given these various voltage considerations, the present invention is designed to work with all existing ballast output configurations. The improved LED lamp does not require the pre-heating of a filament like a fluorescent lamp and does not need the ignition voltage to function. The circuit is designed so that the electrical contact pins of the two lamp base end caps of the LED lamp may be reversed, or the entire lamp assembly can be swapped end for end and still function correctly similar to a fluorescent lamp. In the preferred electrical design, a single LED circuit board array can be powered by two separate power electronics at either end of the improved LED lamp consisting of bridge rectifiers to convert the AC voltage to DC voltage. Voltage surge absorbers are used to limit the high voltage to a workable voltage, and optional resistor(s) may be used to limit the current seen by the LEDs. The current limiting resistor(s) is purely optional, because the existing fluorescent ballast is already a current limiting device. The resistor(s) then serve as a secondary protection device. In a normal fluorescent lamp and ballast configuration, the ignition voltage travels from one end of the lamp to the other end. In the new and improved LED retrofit lamp, the common or lower potential of both circuits are tied together, and the difference in potential between the two ends will serve as the main direct current or DC voltage potential to drive the LED circuit board array. That is the anode will be the positive potential and the cathode will be the negative potential to provide power to the LEDs. The individual LEDs within the LED circuit board array can be electrically connected in series, in parallel, or in a combination of series and/or parallel configurations.

In an alternate electrical design for electronic rapid start ballasts; the LED lamp can be electronically designed to work with the initial filament voltage of four volts present on one end of the LED lamp while leaving the other end untouched. The filament voltage is converted through a rectifier circuit or an ac-to-dc converter circuit to provide a DC or direct current voltage to power the LED array. In-line series resistor(s) and/or transistors can be used to limit the current as seen by the LEDs. In addition, a voltage surge absorber or transient voltage suppresser device can be used on the AC input side of the circuit to limit the AC voltage driving the power converter circuit. This electrical design can be used for other types of ballasts as well.

In yet another alternate electrical design for existing fluorescent ballasts, both ends of the improved LED lamp will have a separate rectifier circuit or ac-to-dc converter circuit as described above. Again, the series resistor(s) and voltage surge absorber(s) can be used. In this arrangement, either end of the improved LED lamp will drive its own independent and separate LED circuit board array. This will allow the improved LED lamp to remain lit if one LED array tends to go out leaving the other on.

LEDs are now available in colors like Red, Blue, Green, Yellow, Amber, Orange, and many other colors including White. Although any type and color of LED can be used in the LED arrays used on the circuit boards of the present invention, an LED with a wide beam angle will provide a better blending of the light beams from each LED thereby producing an overall generally evener distribution of light output omni-directionally and in every position. The use of color LEDs eliminates the need to wrap the fluorescent lamp body in colored gel medium to achieve color dispersions. Color LEDs give the end user more flexibility on output power distribution and color mixing control. The color mixing controls are necessary to achieve the desired warm tone color temperature and output.

As an option, the use of a compact array of LEDs strategically arranged in an alternating hexagonal pattern provides the necessary increased number of LEDs resulting in a more even distribution and a brighter output. The minimum number of LEDs used in the array is determined by the total light output required to be at least equivalent to an existing fluorescent lamp that is to be replaced by the improved LED lamp of the present invention.

Besides using discrete radial mounted 5 mm or 10 mm LEDs, which are readily available from LED manufacturers including Nichia, Lumileds, Gelcore, etc. just to name a few, surface mounted device (SMD) light emitting diodes can be used in some of the embodiments of the present invention mentioned above.

SMD LEDs are semiconductor devices that have pins or leads that are soldered on the same side that the components sit on. As a result there is no need for feed-through hole passages where solder is applied on both sides of the circuit boards. Therefore, SMD LEDs can be used on single sided boards. They are usually smaller in package size than standard discrete component devices. The beam spread of SMD LEDs is somewhat wider than discrete axial LEDs, yet well less than 360-degree beam spread devices.

In particular, the Luxeon brand of white SMD (surface mounted device) LEDs can also be used. Luxeon is a product from Lumileds Lighting, LLC a joint venture between Philips Lighting and Hewlett Packard's Agilent Technologies. Luxeon power light source solutions offer huge advantages over conventional lighting and huge advantages over other LED solutions and providers. Lumileds Luxeon technology offers a 17 lumens 1-Watt white LED in an SMD package that operates at 350 mA and 3.2 volts DC, as well as a high flux 120 lumens 5-Watt white LED in a lambertian or a side emitting radiation pattern SMD package that operates at 700 mA and 6.8 volts. Nichia Corporation offers a similarly packaged white output LED with 23 lumens also operating at 350 mA and 3.2 volts. LEDs will continue to increase in brightness within a relatively short period of time.

In addition, Luxeon now markets a new Luxeon Emitter SMD high-brightness LED that has a special lens in front that bends the light emitted by the LED at right angles and projects the light beam radially perpendicular to the LED center line so as to achieve a light beam having a 360 degree radial coverage. In addition, such a side-emitting radial beam SMD LED has what is designated herein as a high-brightness LED capacity.

In the past, rigid circuit boards consisted of fiberglass composition called G10 epoxy or FR4 type circuit boards. They did not contain a layer of rigid metal until recently and primarily with the invention of the new high brightness LEDs that needed more heat dissipation. The metal substrate circuit boards or metal core printed circuit boards (MCPCB) were developed and are meant to be attached to a heat sink to further extract heat away from the LEDs. They comprise a circuit layer, a dielectric layer, and a metal base layer.

The Berquist Co. of Prescott, Wis. offers metal substrate printed circuit boards known by the trade name of Metal Clad that are made of printed circuit foil having a thickness of 1 oz. to 10 oz. (35-350 m) offering electrical isolation with minimal thermal resistance. These metal substrate circuit boards have a multiple-layer dielectric that bond with the base metal and circuit material. As such, metal substrate circuit boards conduct heat more effectively and efficiently than standard circuit boards. The dielectric layer offers electrical isolation with minimal thermal resistance. As such a heat sink, a cooling fan, or other cooling devices may not be required in certain instances. A multiple-layer dielectric bonds the base metal and circuit metal together. Metal substrate circuit boards are very rigid and can be formed in various shapes such as thin elongated rectangles, circular, and curved configurations.

There are also ceramic substrate circuit boards, and also a ceramic on metal circuit board called LTCC-M. This new MCPCB technology combines ceramic on metal and is pioneered by Lamina Ceramics located in Westampton, N.J. The ceramic on metal technology in combination with compact arrays of LED dies including Chip on Board or COB technology provides for brighter and more superior thermal performance than some standard MCPCB designs.

More recently, Lumileds Lighting, LLC now offers a Luxeon warm white LED with a 90 CRI (Color Rendering Index) and 3200 degrees Kelvin CCT (Correlated Color Temperature). Lumileds Luxeon warm white is the first generally available low CCT and high CRI warm white solid-state light source. This new Luxeon LED opens the door for significantly greater use of solid-state illumination in interior and task lighting applications by replicating the soothing, warm feel typically associated with incandescent and halogen lamps. The additional benefit here being the availability of true LED retrofit lamps for existing and new fluorescent lamp fixtures that offer a softer and warmer light output similar to the output produced by incandescent and halogen lamps. An alternate arrangement to get similar CRI and CCT would be to use existing high CCT white color LEDs with a combination of yellow or amber color LEDs to achieve the desired color tone. This lower CCT break through was never available before to the end user with conventional fluorescent lamps unless they used a color film wrap or similar product to "color" the fluorescent lamp light output.

The described LED retrofit lamp invention can be manufactured in variety of different fluorescent lamp bases, including, but not limited to medium bi-pin base, single-pin base, recessed double contact (DC) base, circline quad-pin base, and PL (bi-pin) base and medium screw base used with compact fluorescents This invention can be summarized as follows: A light emitting diode (LED) lamp for mounting to an existing fixture for a fluorescent lamp having a ballast assembly including ballast opposed electrical contacts, comprising a tubular wall generally circular in cross-section having tubular wall ends, one or more LEDs positioned within the tubular wall between the tubular wall ends. An electrical circuit provides electrical power from the ballast assembly to the LED or LEDs. The electrical circuit includes one or more metal substrate circuit boards and electrically connects the electrical circuit with the ballast assembly. Each supports and holds the LEDs and the LED electrical circuit. The electrical circuit includes an LED electrical circuit including opposed electrical contacts. At least one electrical string is positioned within the tubular wall and generally extends between the tubular wall ends. The one or more LEDs are in electrical connection with the at least one electrical string, and are positioned to emit light through the tubular wall. Means for suppressing ballast voltage is delivered from the ballast assembly to an LED operating voltage within the voltage design capacity of the at least one LED. The metal substrate circuit board includes opposed means for connecting the metal substrate circuit board to the tubular wall ends, which include means for mounting the means for connecting and the one or more metal substrate circuit boards. The opposed means for connecting the one or more metal substrate circuit boards to the tubular wall ends includes each metal substrate circuit board having opposed tenon connecting ends, and the means for mounting includes each of the tubular wall ends defining a mounting slot, the opposed tenon connecting ends being positioned in the mounting slots. Two or more opposed metal substrate boards each mounting LEDs can be mounted in the tubular wall. It should be noted that the opposed tenon connecting ends can be located not just on each end of the metal substrate circuit board, but can be located just on the opposed ends of the metal base layer of each metal substrate circuit board.

With the need for energy conservation and savings, smart lighting controls and sensors are used to turn off or dim lighting when there is no one presently occupying a space lit by the lighting. For this reason, one improvement to the present invention allow for added energy conservation and savings by incorporating the smart lighting control and sensors in the LED lamp of the present invention.

The advantage of each LED lamp having its own sensor ensures each LED lamp operates independent of or together with other LED lamps. For example, there presently exists a problem with occupancy sensors. There is usually only one occupancy sensor used to control a bank of lights. Depending on the location of the occupancy sensor, when someone is in the room, but is not noticed by the occupancy sensor either because he or she is out of range or has not moved for a while will either turn the entire bank of lights off, or to cause the bank of lights to dim down to an unusable light level.

The on board occupancy sensor located in each LED lamp of the present invention will trigger the lamp to remain full on when it senses the presence of someone near the LED lamp of the present invention and will turn off or dim the LED lamp when the person exits the room. A timer can be built-in to the electronics or can be pre-programmed for a delay for false trigger conditions.

Power control modules and other components can be incorporated into the electrical circuits used in the LED lamp of the present invention. The first circuit module may be a dimming module placed in between the DC voltage input to the LED array. This dimming module can take a control input either from a hard-wired sensor like an occupancy sensor, a timer, a computer or from a hand-held or wall mounted remote control box that sends the dimming signal to the dimming module located within the LED lamp. The dimming current driver module will contain the necessary electronics to decipher data input control signals and provide the current driver power to operate the LED arrays. LED current control can be accomplished by time and amplitude domain control or other means well known in the arts. The occupancy sensor can be preset to dim the LED lamp to perhaps 50% brightness to conserve energy when no one is in a room, for example while a light level photosensor can switch on and off the power to the ballast or LED array. The LED retrofit lamp would be programmed to turn the LED arrays on when luminance on the photocell drops below a certain value, and turn the LED arrays off when the luminance due to sunlight reaches a higher cut-off value. This value could be adjustable depending on the user's needs. Instead of turning on and off the LED arrays, the LED arrays can likewise be dimmed.

Electrical compensation of daylight can be controlled either by dimming (varying the light output to provide the desired brightness) or by switching (turning individual lamps or fixtures in different areas of a building or room on or off as necessary). Just as a typical two-lamp fixture containing the LED retrofit lamps of the present invention can be switched to illuminate both LED retrofit lamps, one LED retrofit lamp, or neither LED retrofit lamp, multiple fixtures all containing the LED retrofit lamps of the present invention can be turned on or off individually to illuminate each part of a room in just the needed amount of light. In addition, the internal dimming function located in each LED retrofit lamp of the present invention can adjust the output of the individual LED retrofit lamps to achieve greater control.

The dimming controller can be used to program presets during the day or have a manual adjustment to dim the LED lamp down to full off or anywhere between 0% and 100% brightness. This dimming controller will send the control signal directly to the LED lamp itself and not change the AC voltage to the light fixture like conventional dimmers do. A data control signal to a computer based control system driving the dimming controller can be wireless, including using IR (Infra-Red), RF (Radio-Frequency), WiFi/802.11, FHSS (Frequency Hopping Spread Spectrum, or Bluetooth technology. The data control signal can also be a direct hard-wire connection including DMX512, RS232, Ethernet, DALI, Lonworks, RDM, TCPIP, CEBus Standard EIA-600, X10, and other Power Line Carrier Communication (PLC) protocols.

Note that existing fluorescent lamps cannot be dimmed below 90% or they will simply go out, while LED lamps can be dimmed down to 0%. Dimmable ballasts presently can only dim the fluorescent lamps by 10%. The bottom line is energy and cost saving. The cost savings comes into play, because the cost of dimmable fluorescent ballasts is usually more than twice the cost of a standard non-dimmable fluorescent ballast, and these dimmable ballasts require a special dimming switch at an additional cost. In addition, savings in lower electrical bills can be significant.

Another circuit module can be a color effects module for use with color LEDs instead of white LEDs used in the LED lamps. This module allows the LED lamp to change colors. The controllers used for the dimming modules can be modified to achieve the color changing function required here. There will be a minimum of RGB color LEDs, but Amber or A can also be used. The dimming module described hereinbefore used a single channel to dim the entire array of white LEDs, but this circuit module will require 3 or 4 channels of dimming control to achieve different color combinations. Presently, fluorescent lamps use a plastic color wrap to get a colored light. The color changing LED lamp will give a user the ability to achieve more colors without having to stock and change different color wraps to get different desired color light outputs.

Another circuit module would be a by-pass or feed-thru module that simply bridges the power from the ballast or other power supply straight to the LEDs. The lamp would then function as the LED lamp disclosed in the original parent application and previous CIP application.

It should be noted that each one or all of the circuit modules mentioned above could be permanently or temporarily mounted for versatility. The use of a microprocessor or CPU and related components including memory RAM and ROM, programming, input and output means, and addressing means need not be required to make the various functions work. The same functions can be accomplished with integrated circuits transistors, switches, and logic arrays etc.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention, and what is presently considered and believed to be the best mode of practice in the principles thereof.

DESCRIPTION OF THE DRAWINGS

FIG. 60 is a side view of the alternate retrofitted LED lamp mounted to an existing fluorescent fixture having an electronic rapid start, hybrid, or magnetic ballast having a pair of double contact electrical socket connectors;

FIG. 60A is a detailed end view of the alternate LED retrofit lamp taken through line 60A-60A of FIG. 60 showing a bi-pin electrical connector;

FIG. 61 is an exploded perspective view of the alternate LED retrofit lamp shown in FIG. 60 taken in isolation;

FIG. 62 is a cross-sectional view of the alternate LED retrofit lamp through a single row of LEDs taken through line 62-62 of FIG. 60;

FIG. 62A is a detailed mid-sectional cross-sectional view of a single LED of the LEDs shown in FIG. 62 with portions of the tubular wall and LED circuit board;

FIG. 63 is an overall electrical circuit for the alternate retrofitted LED lamp shown in FIG. 60 wherein the array of LEDs are arranged in an electrical parallel relationship;

FIG. 63A is an alternate arrangement of the array of LEDs arranged in an electrically parallel relationship for the overall electrical circuit shown in FIG. 63 for the alternate LED retrofit lamp;

FIG. 63B is another alternate arrangement of the array of LEDs arranged in an electrically parallel relationship for an overall electrical circuit analogous to the overall electrical circuit shown in FIG. 63 for the alternate LED retrofit lamp;

FIG. 63C is a simplified arrangement of the array of LEDs for the overall electrical circuit shown in FIG. 63 for the alternate LED retrofit lamp;

FIG. 63D is a simplified arrangement of the array of LEDs for the overall electrical circuit shown in FIG. 63A for the alternate LED retrofit lamp;

FIG. 63E is a simplified arrangement of the array of LEDs for the overall electrical circuit shown in FIG. 63B for the alternate LED retrofit lamp;

FIG. 63F shows a single high-brightness LED positioned on a single string in electrical series arrangement for the overall electrical circuit shown in FIG. 63 for the alternate retrofit lamp;

Figure 60:
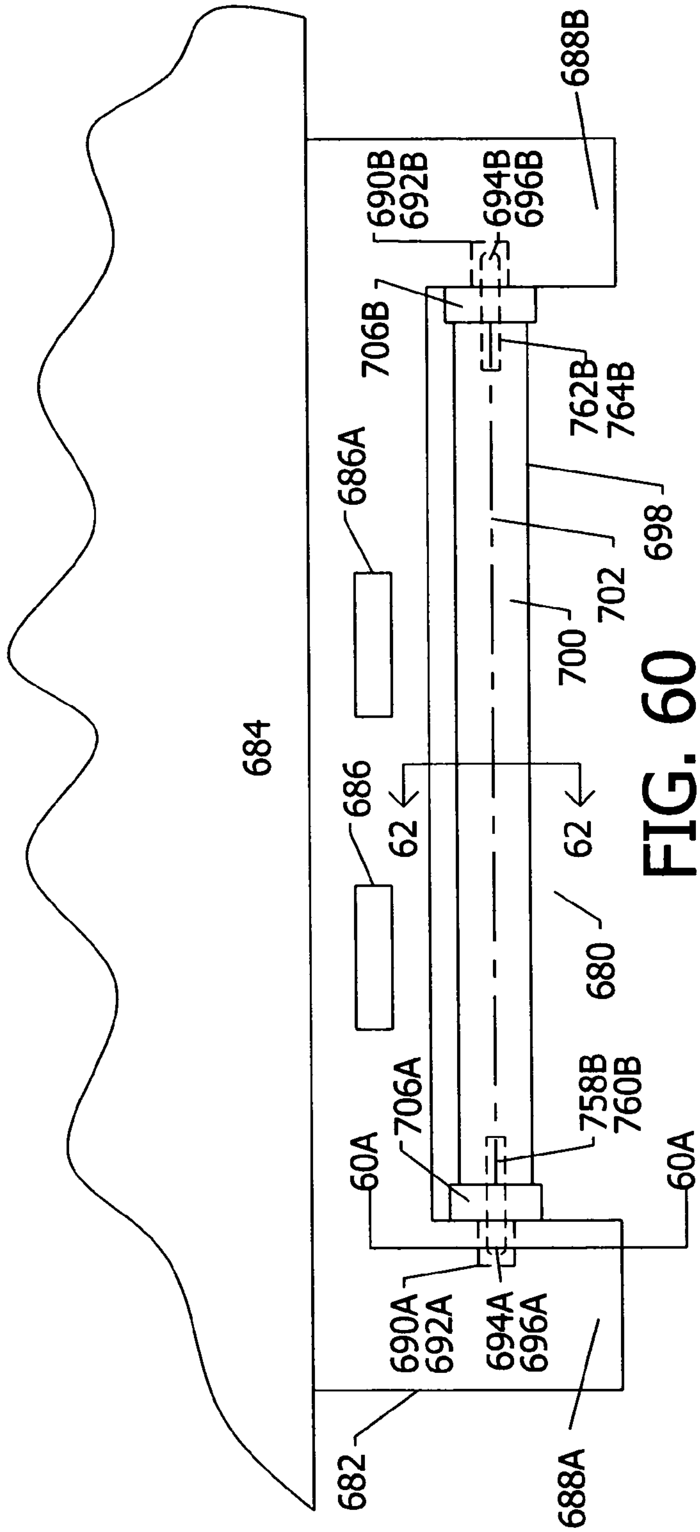
Figure 61:
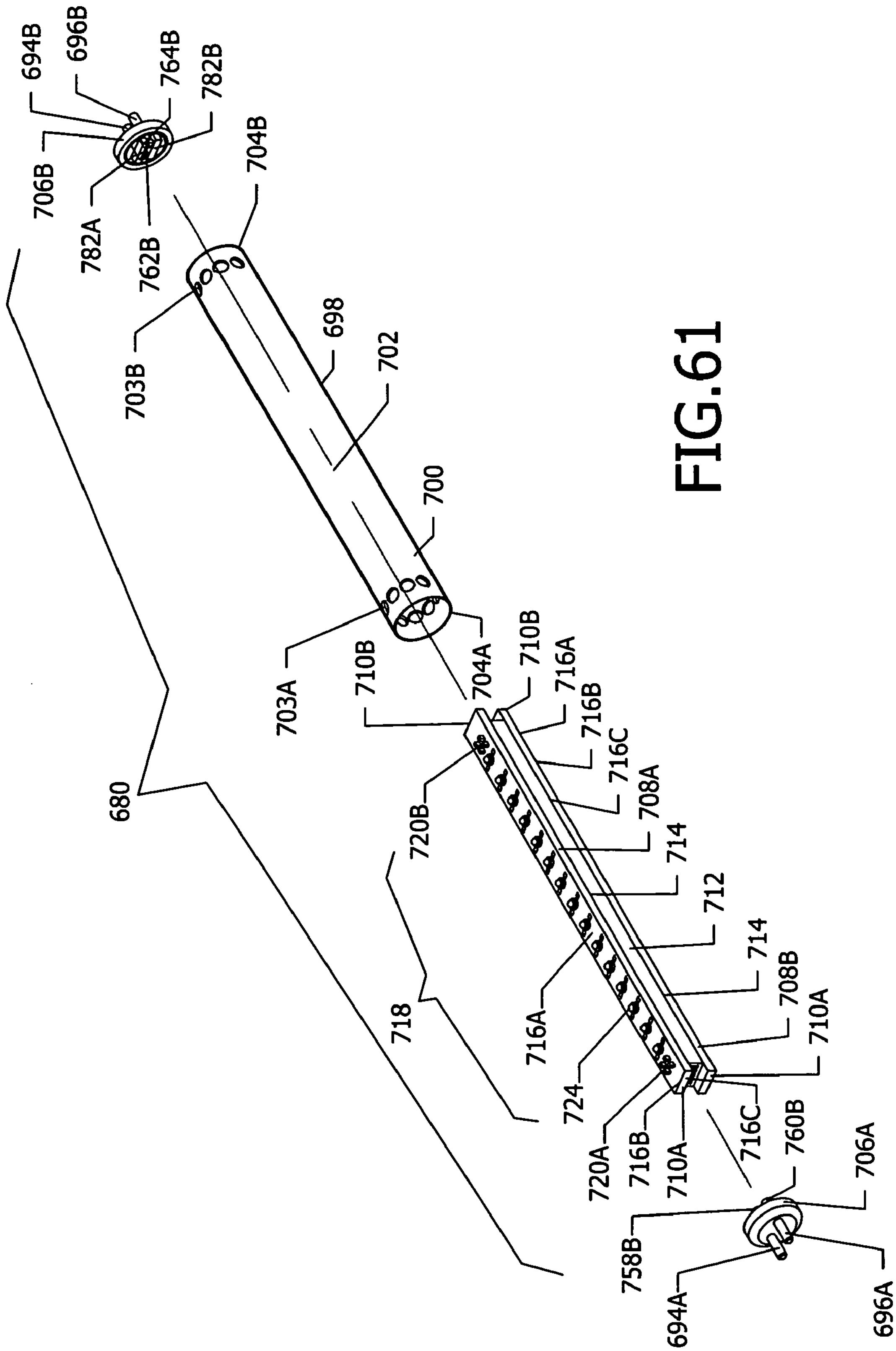
Figure 62:
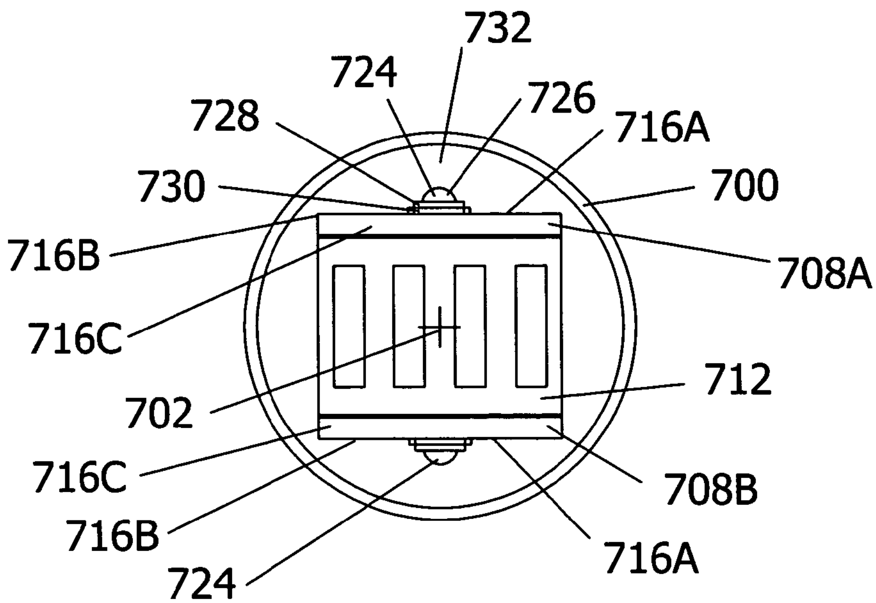
Figure 63:
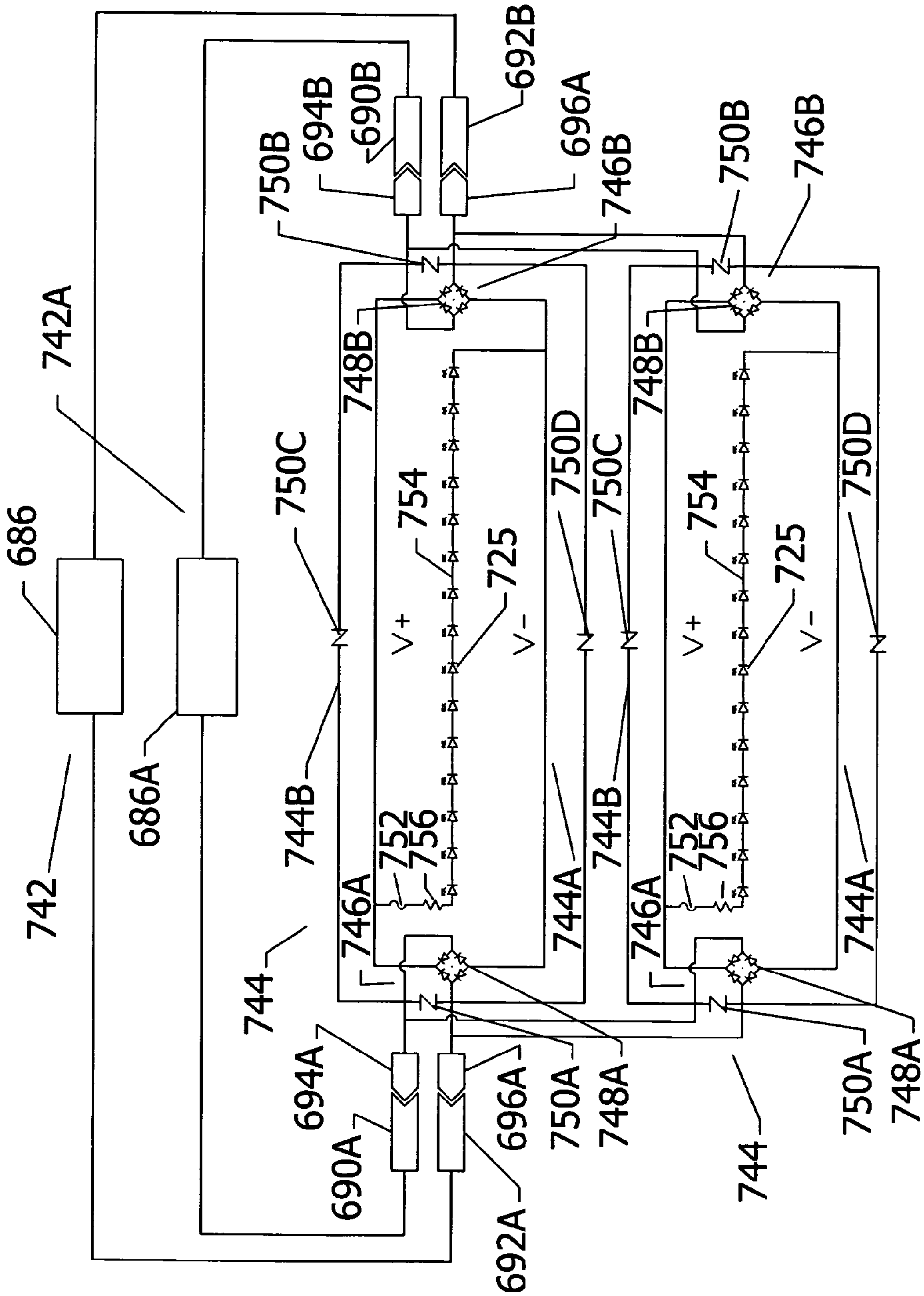
Figure 63A:
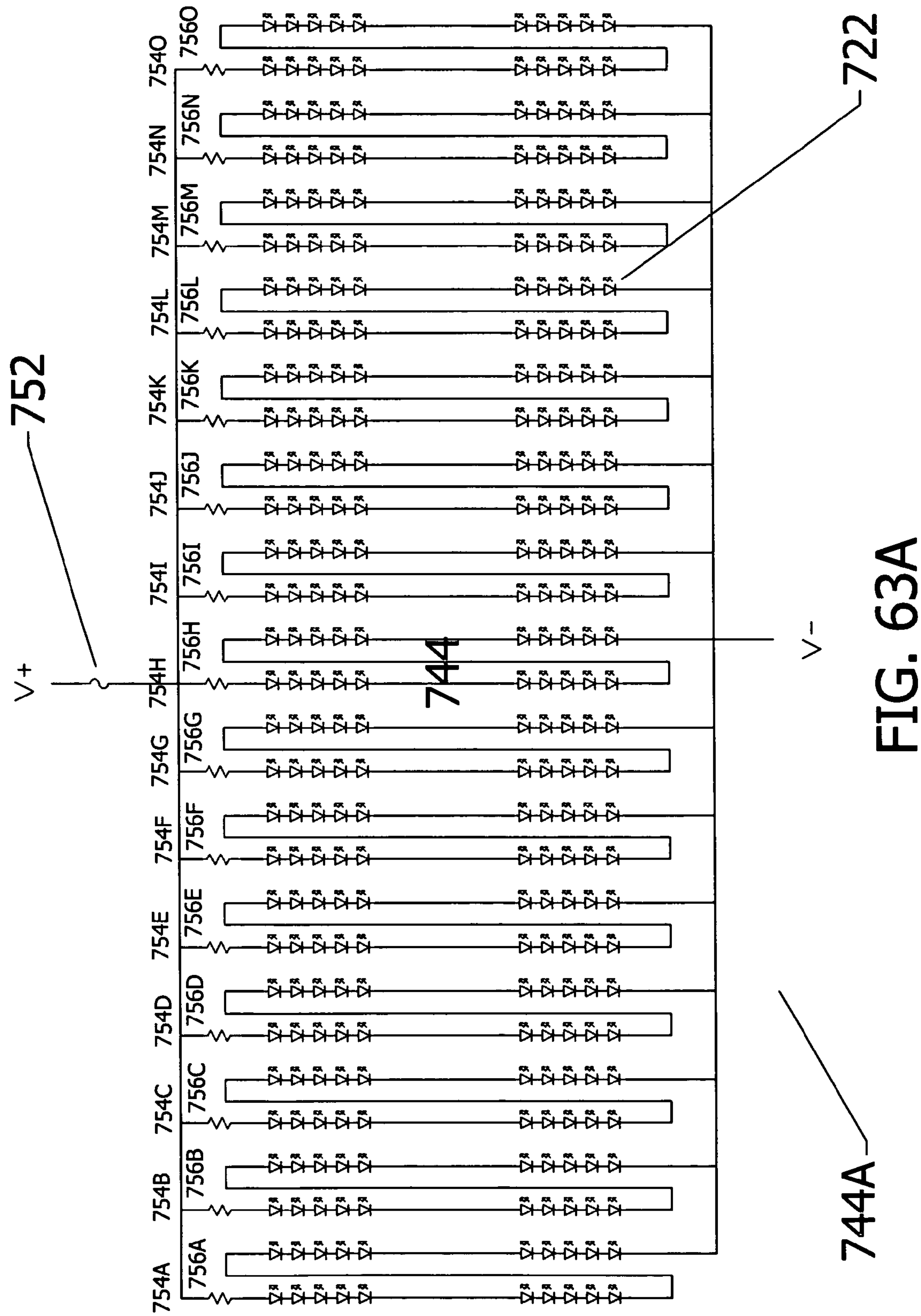
Figure 63B:
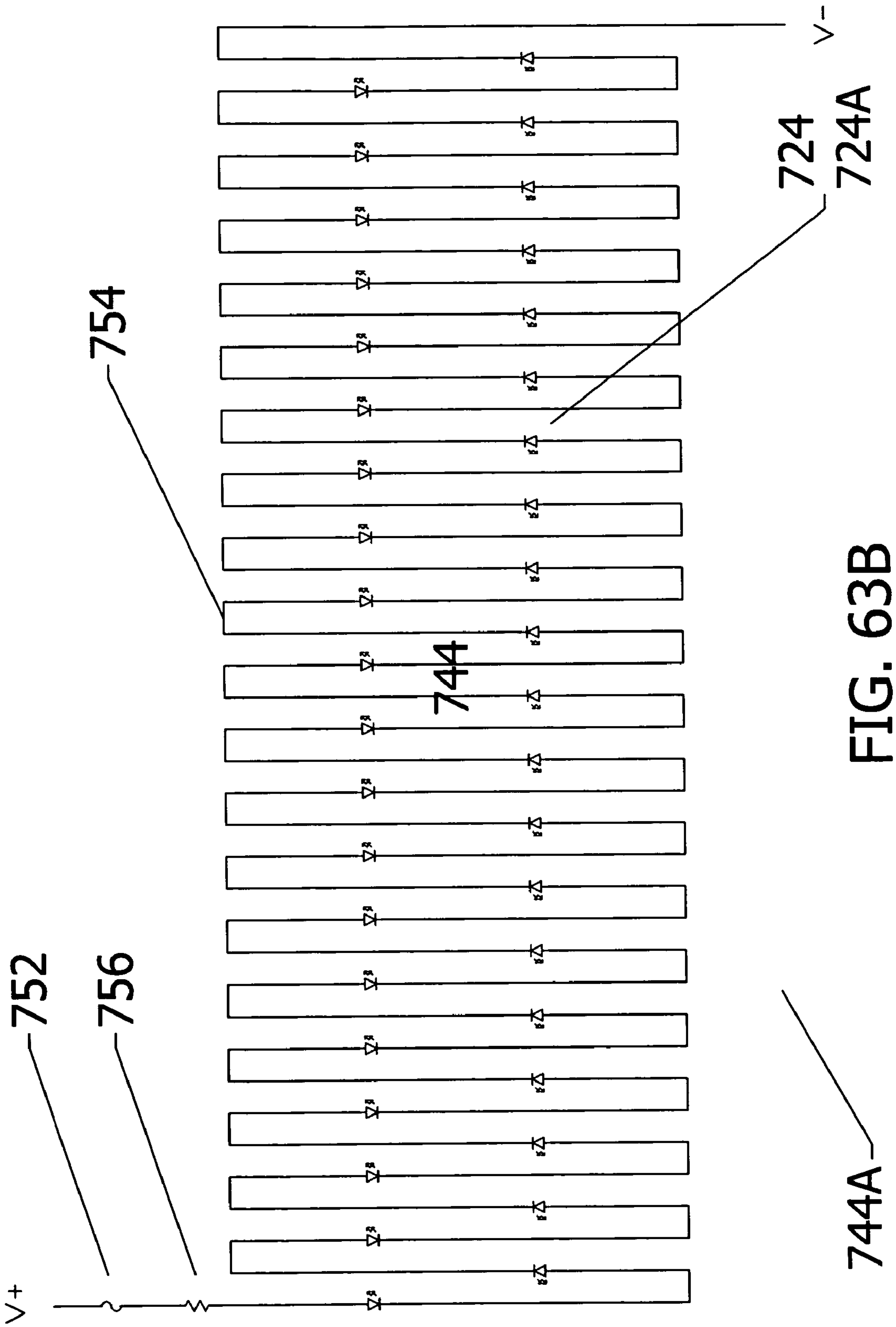
Figure 63C:
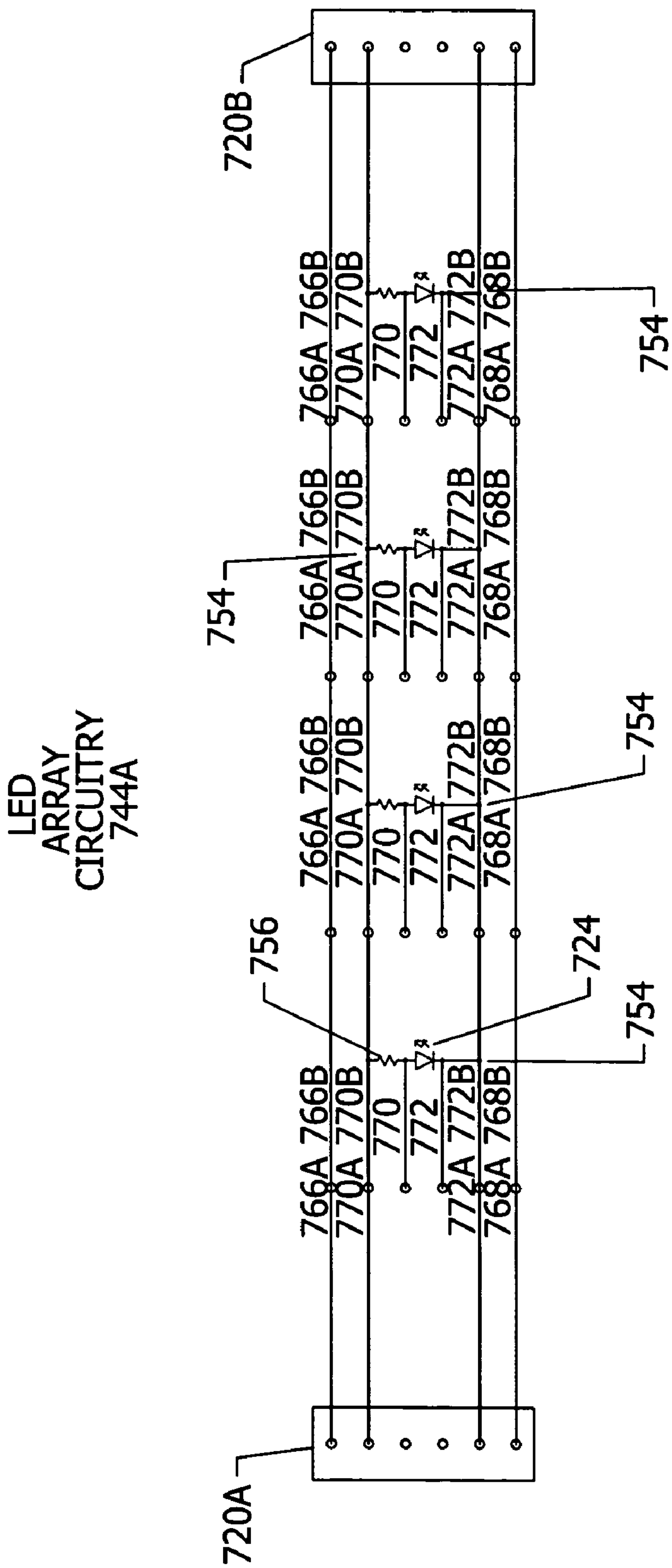
Figure 63D:
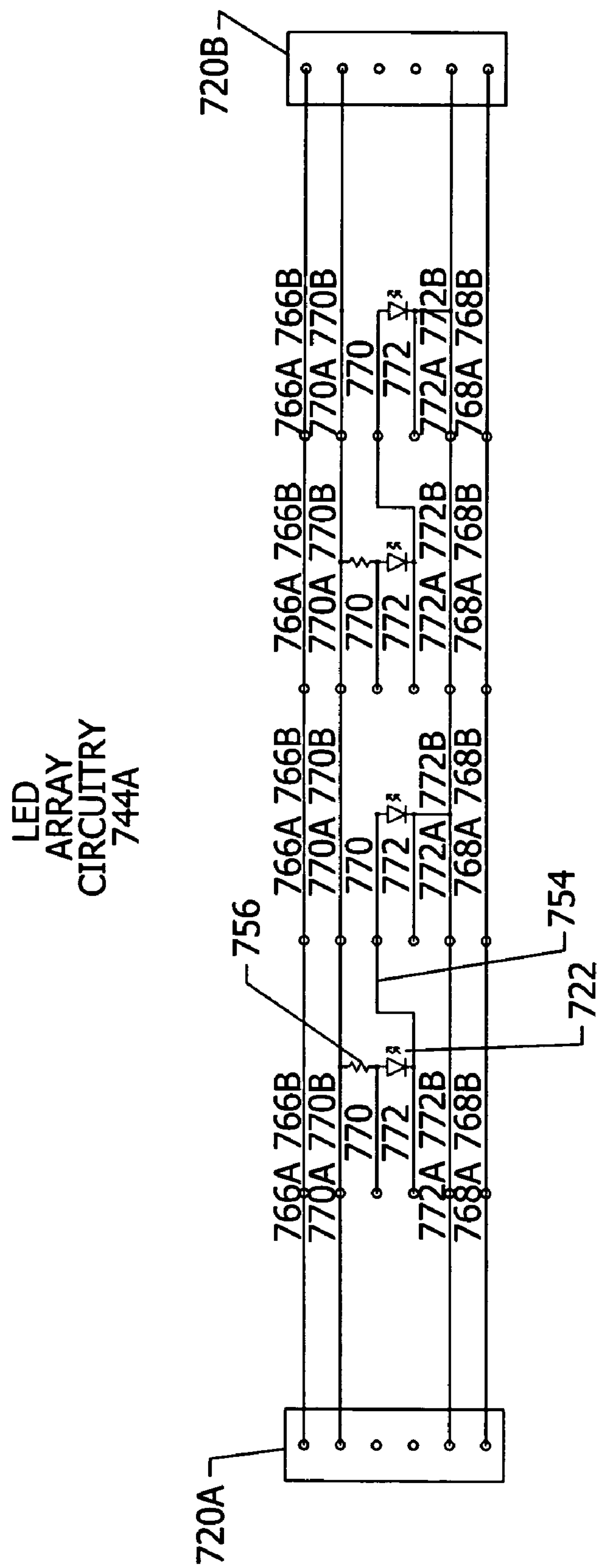
Figure 63E:
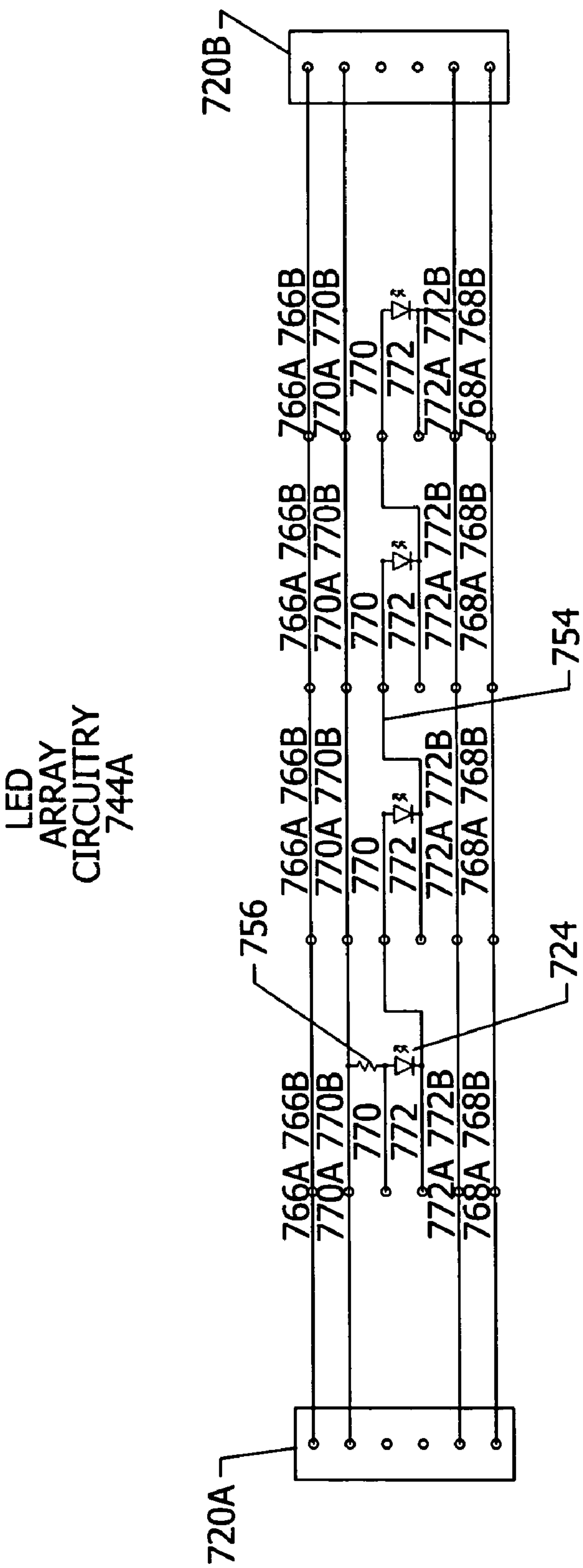
Figure 63F:
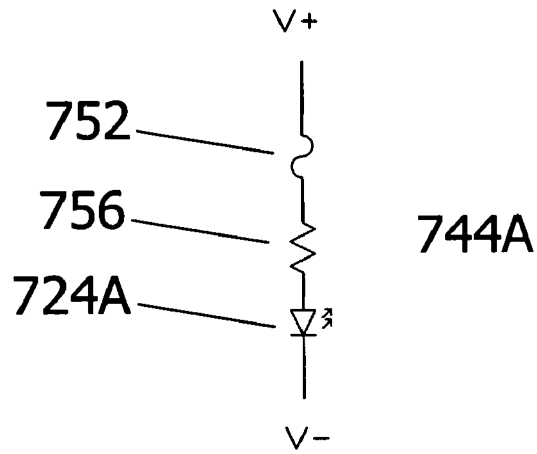
Figure 63G:
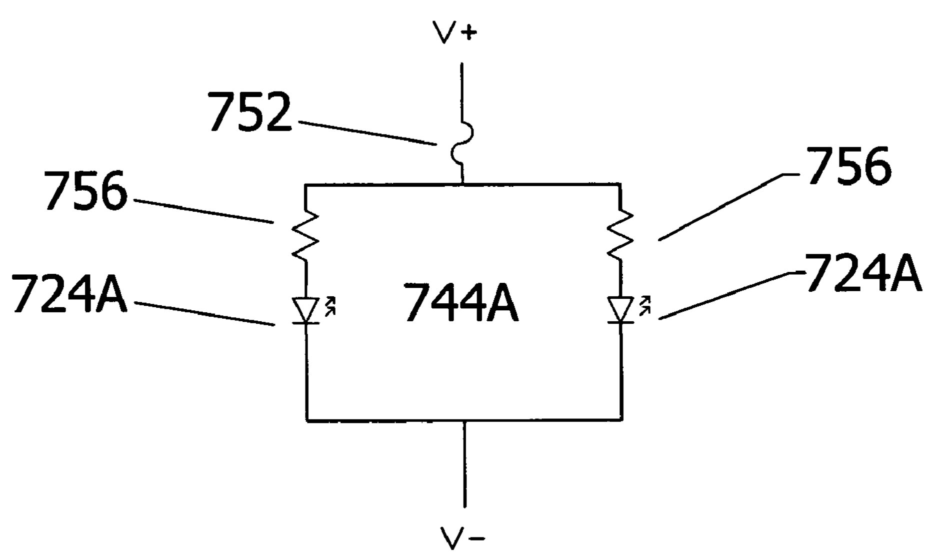
Figure 64:
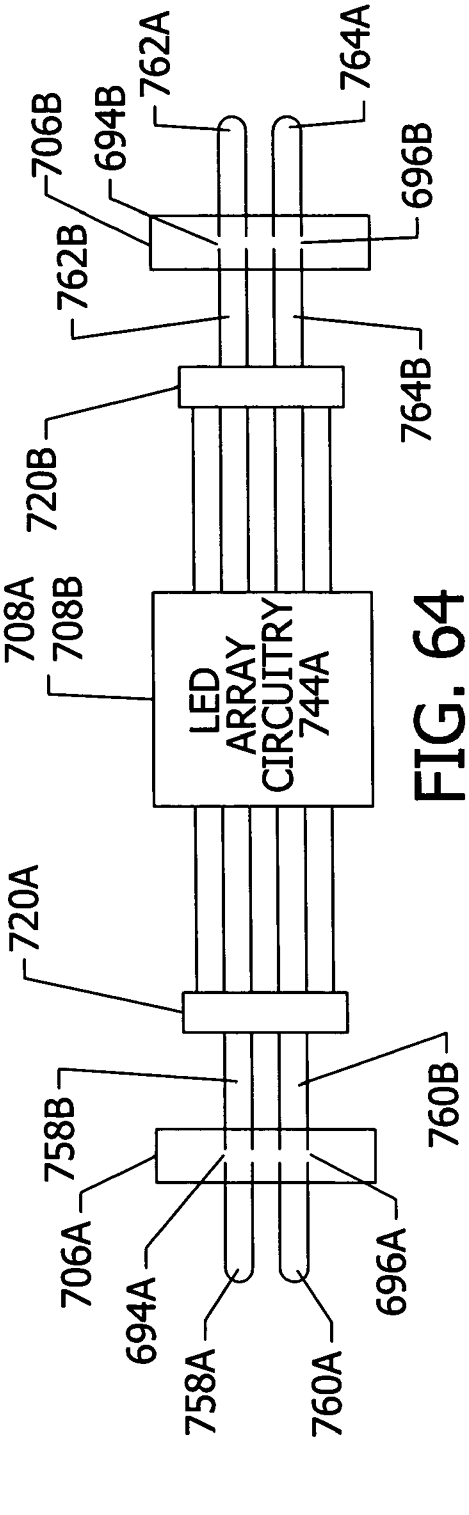
Figure 66:
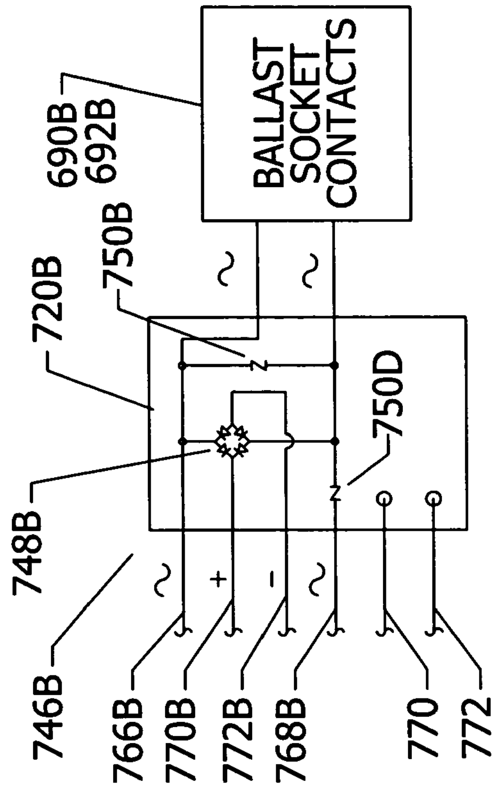
Figure 65:
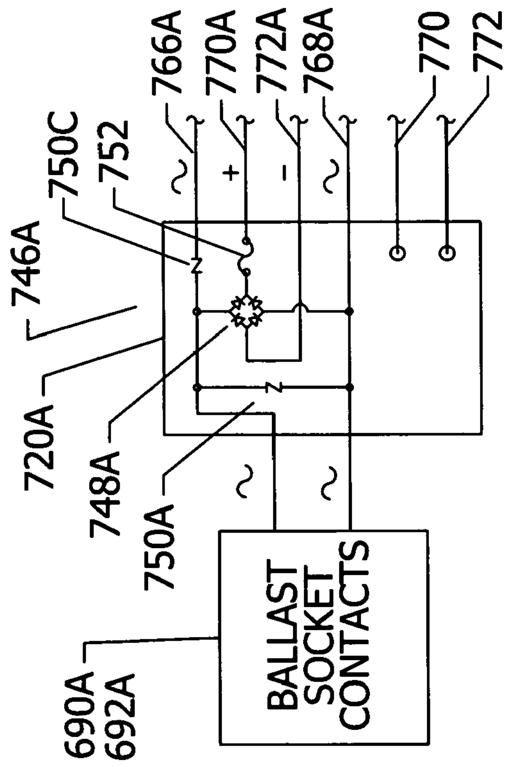
Figure 67:
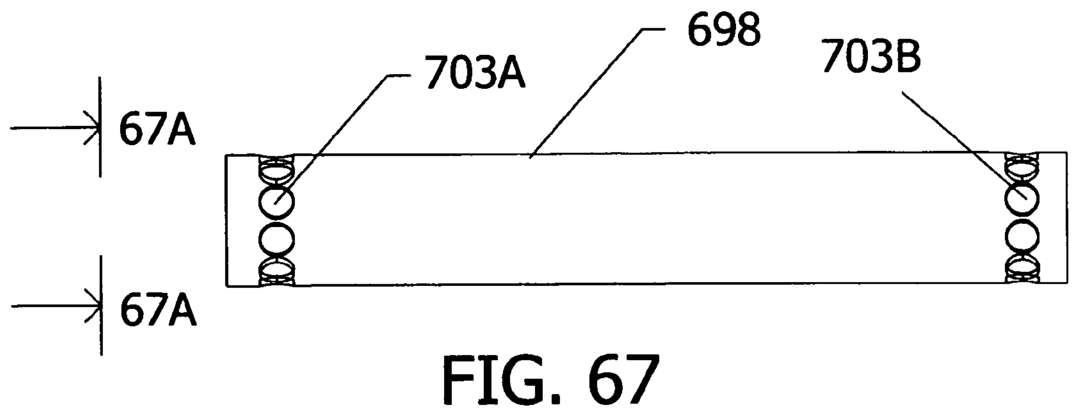
Figure 67A:
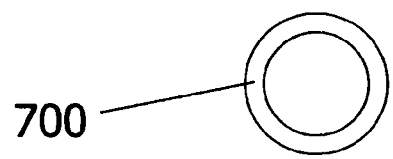
Figure 68:
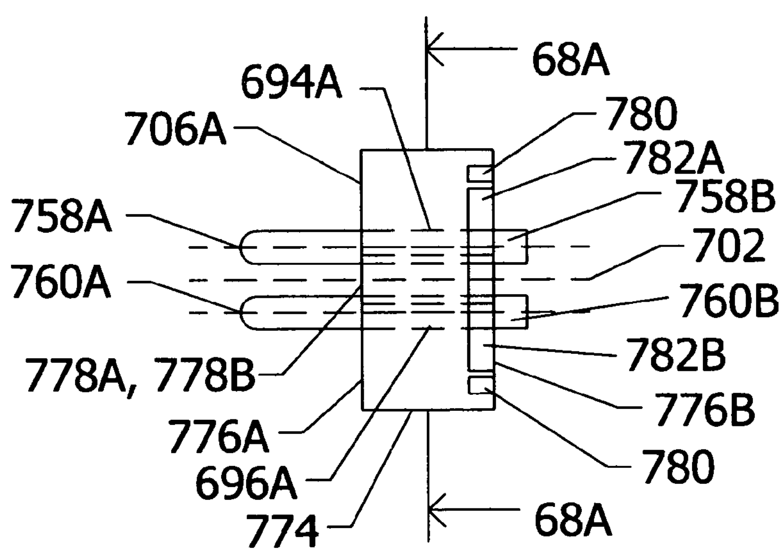
Figure 68A:
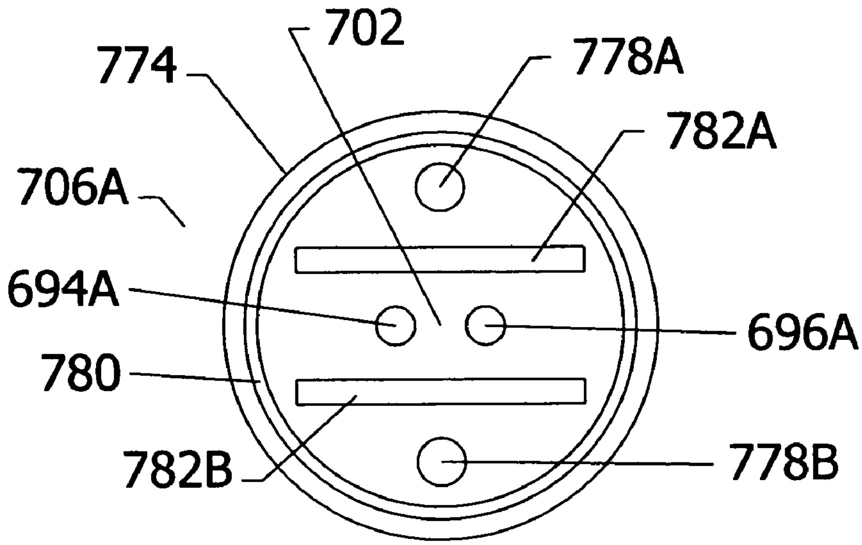
Figure 69:
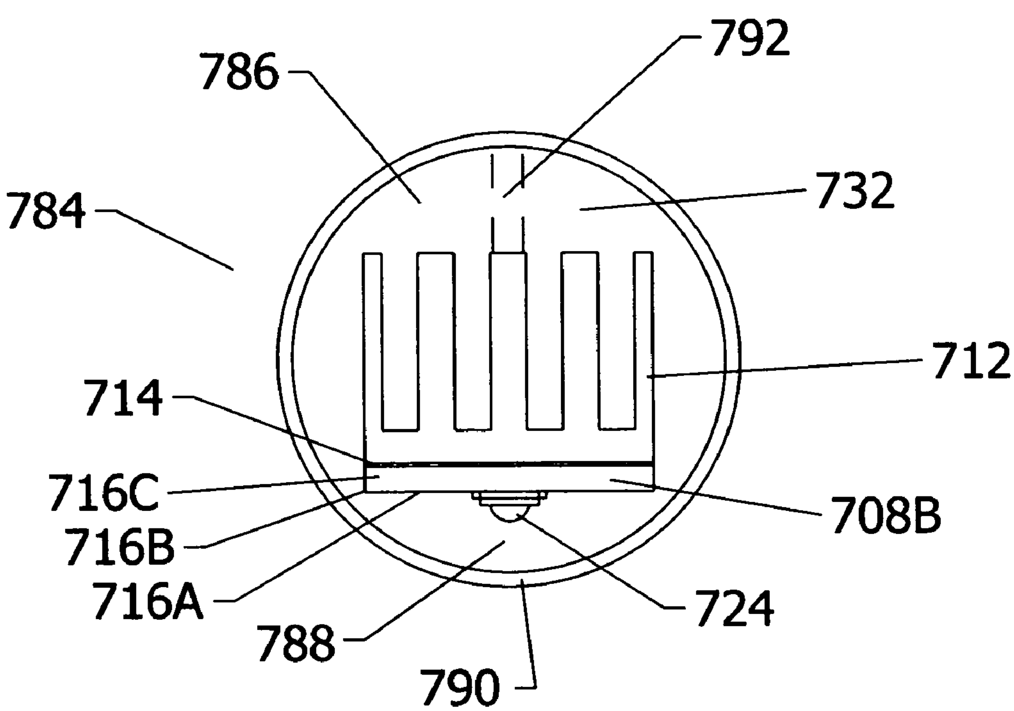
Figure 70:
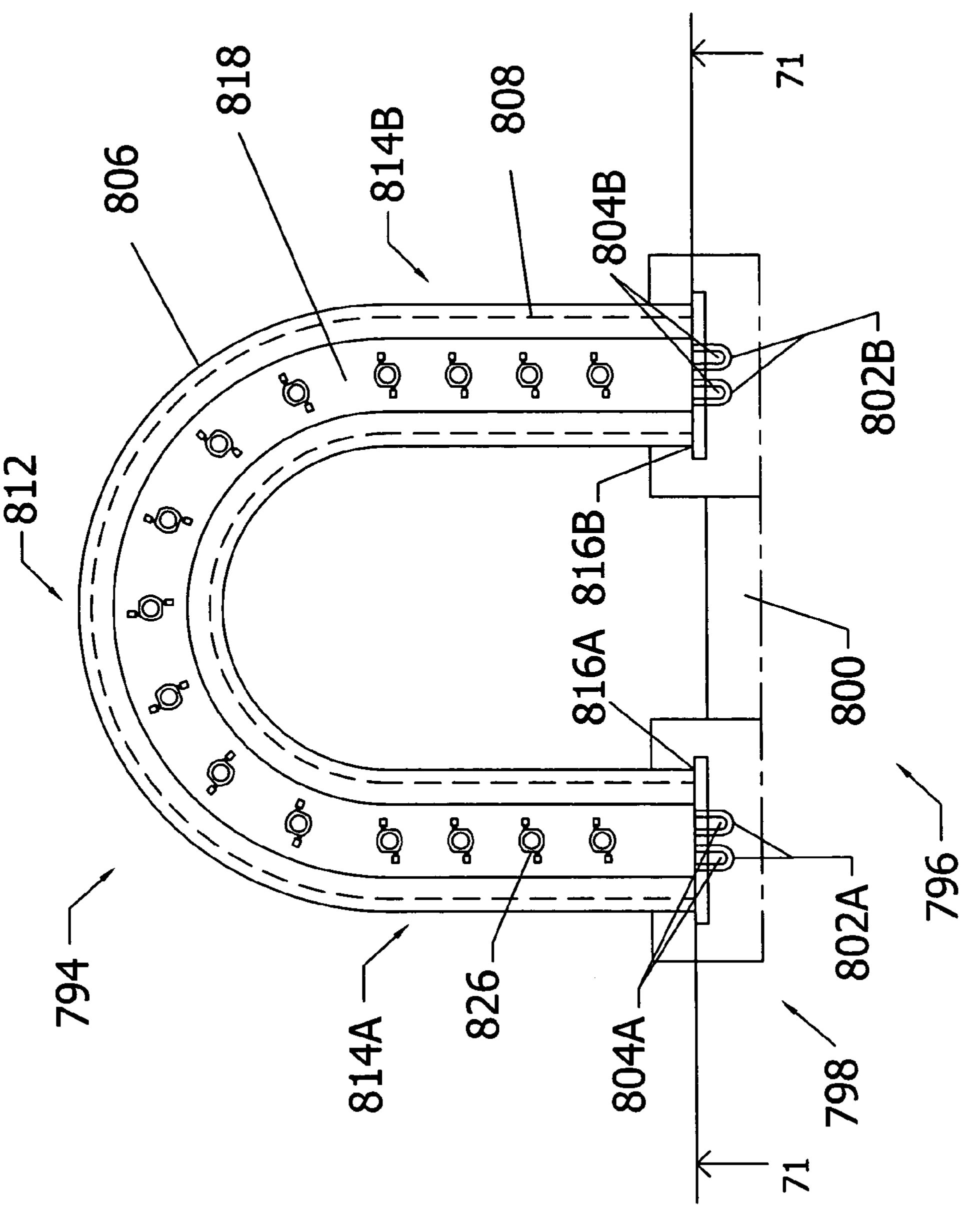
Figure 71:
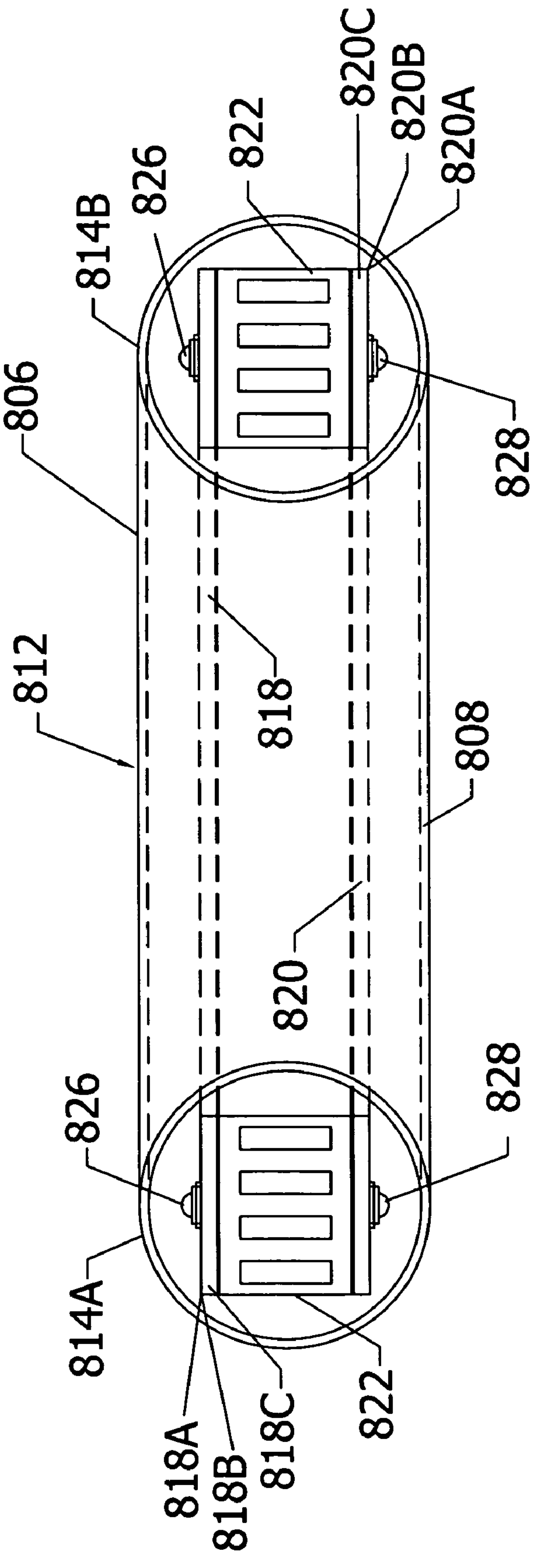
Figure 72:
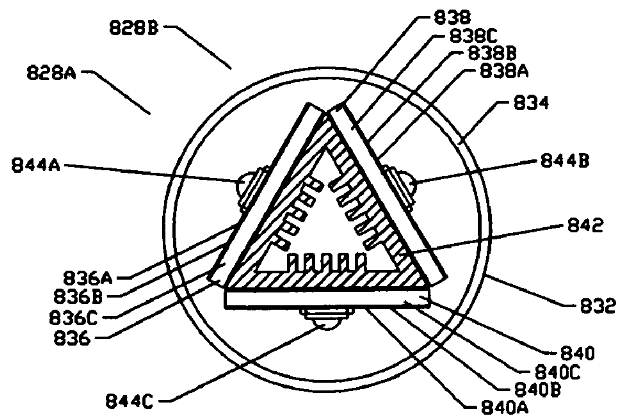
Figure 72A:
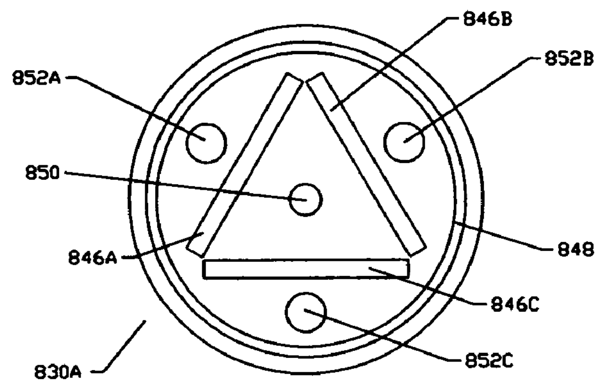
Figure 72B:
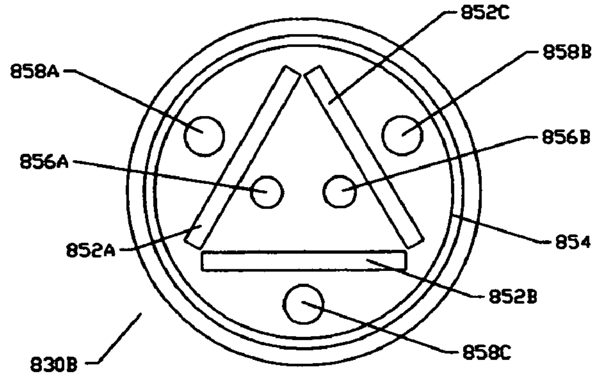
Figure 73:
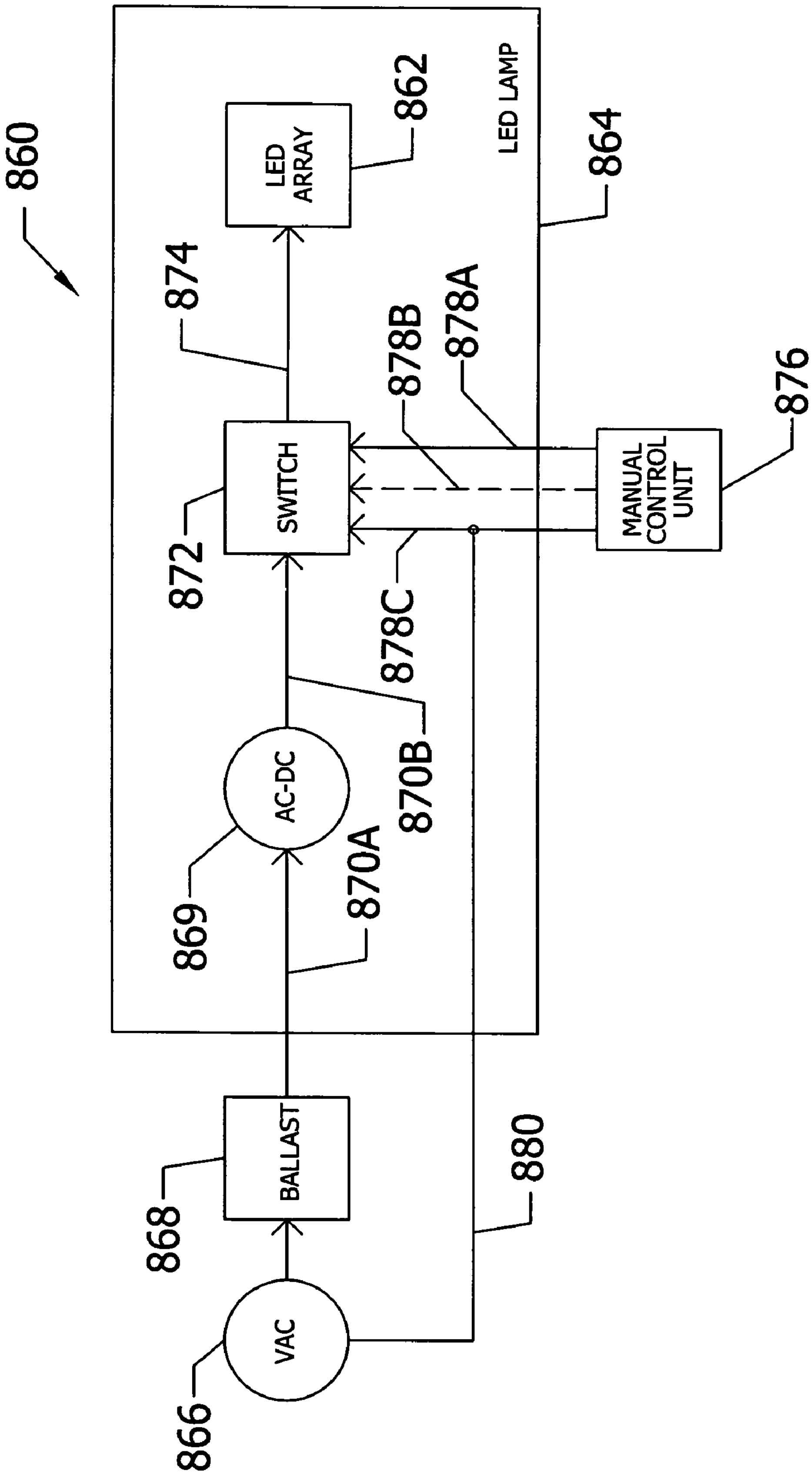
Figure 73A:
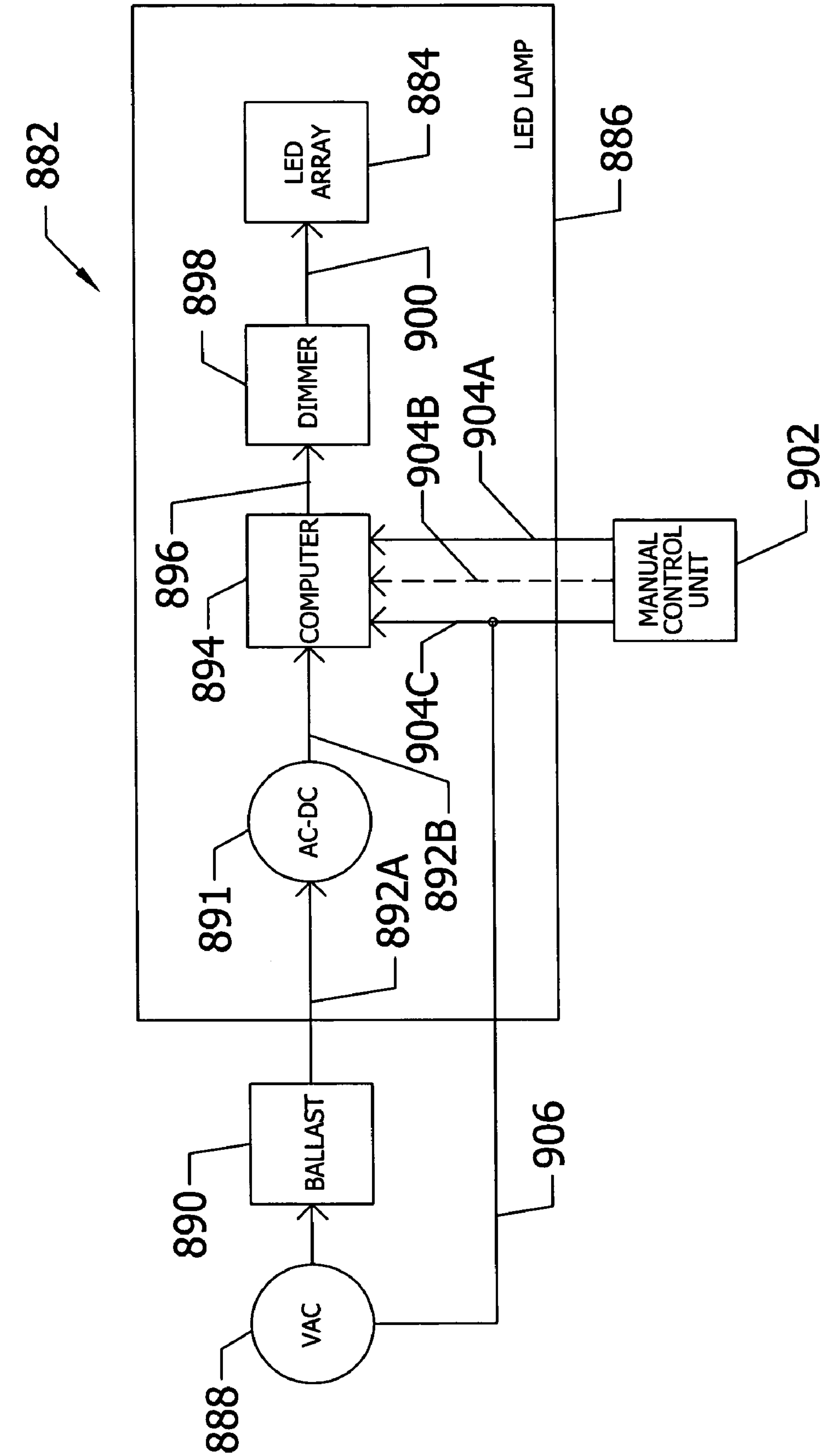
Figure 74:
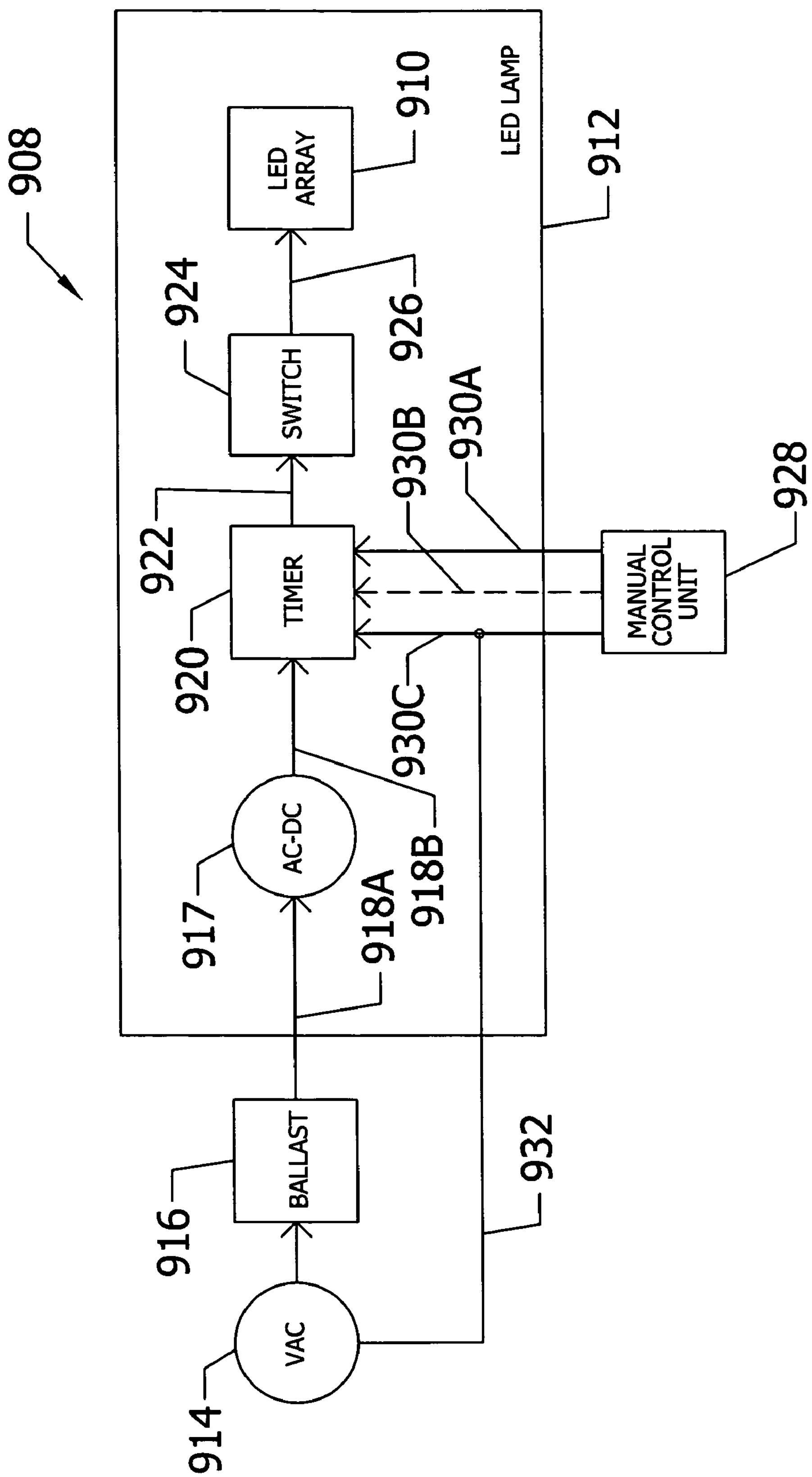
Figure 74A:
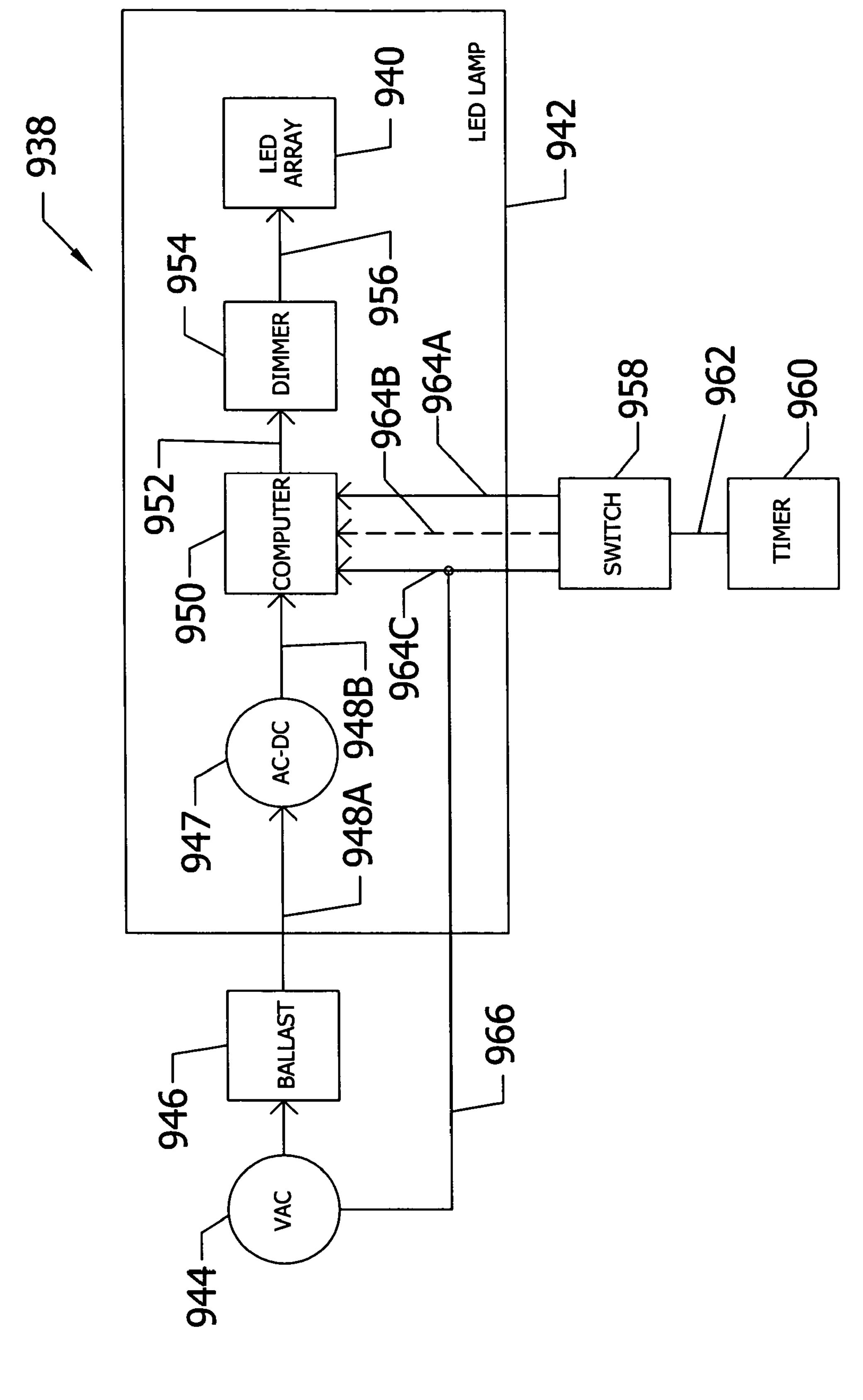
Figure 74B:
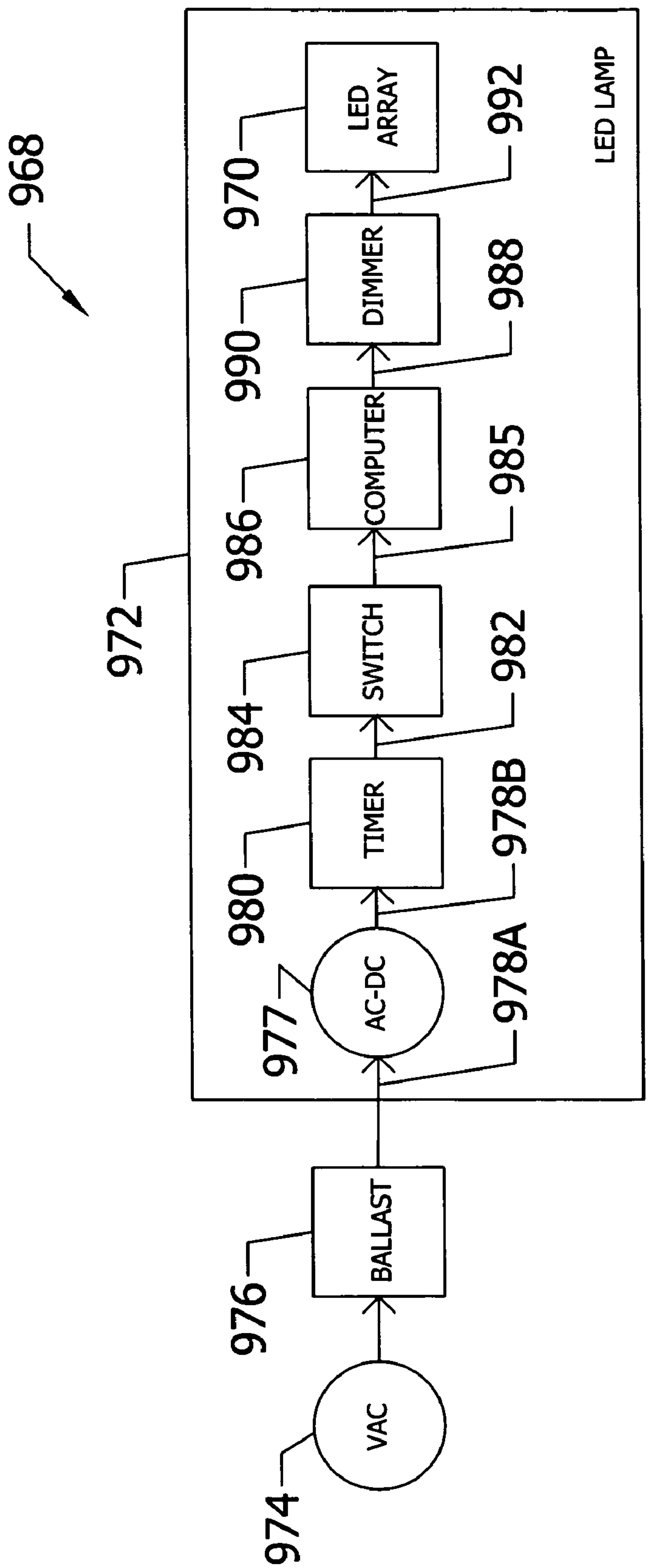
Figure 75:
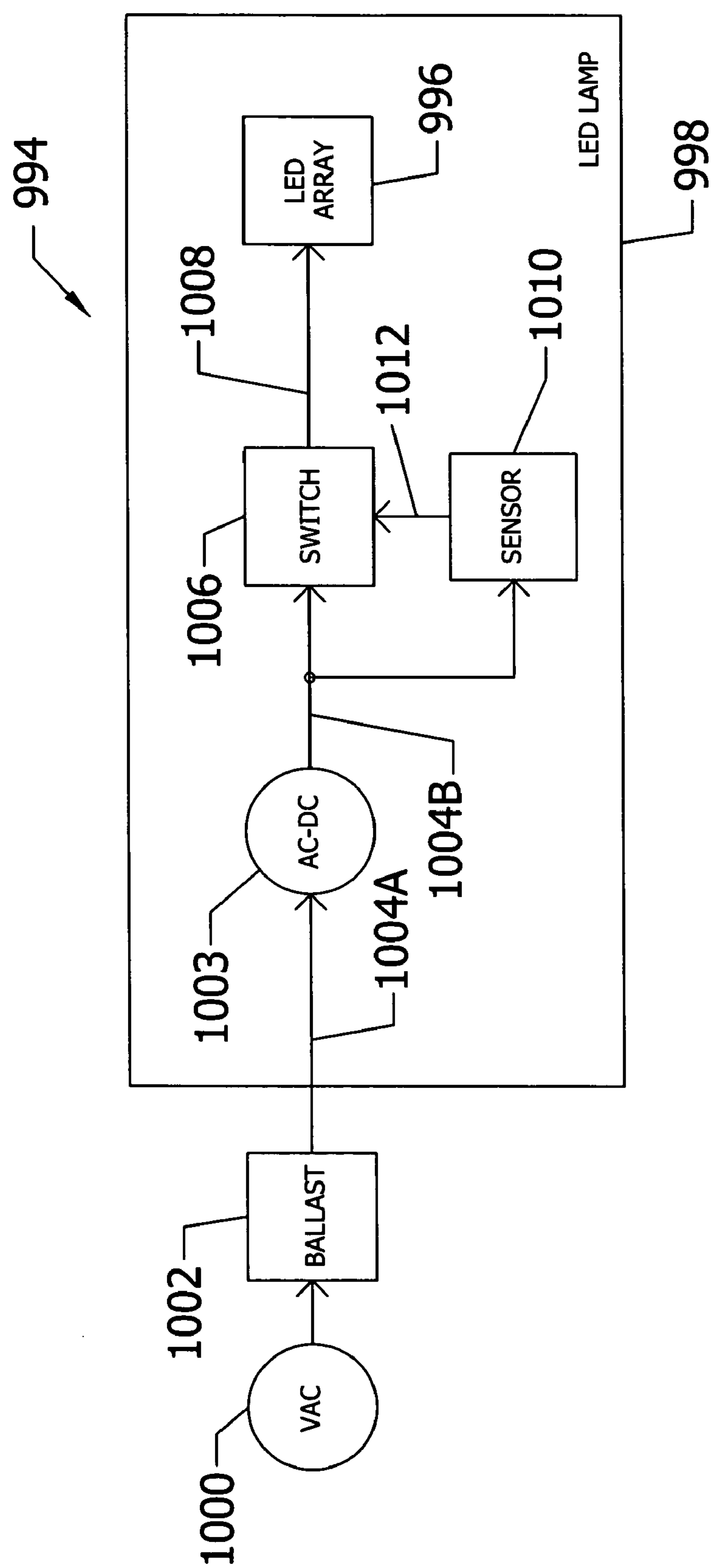
Figure 75A:
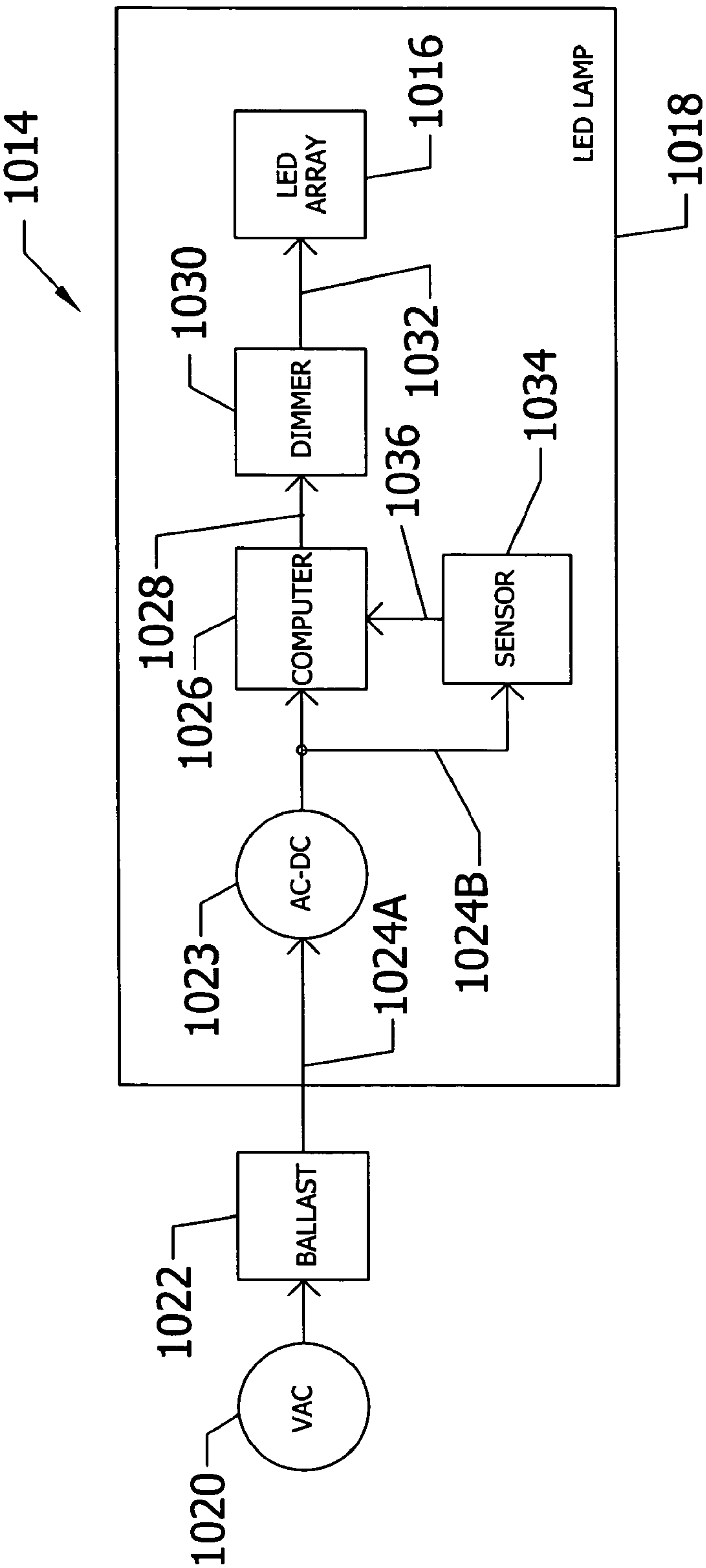
Figure 75B:
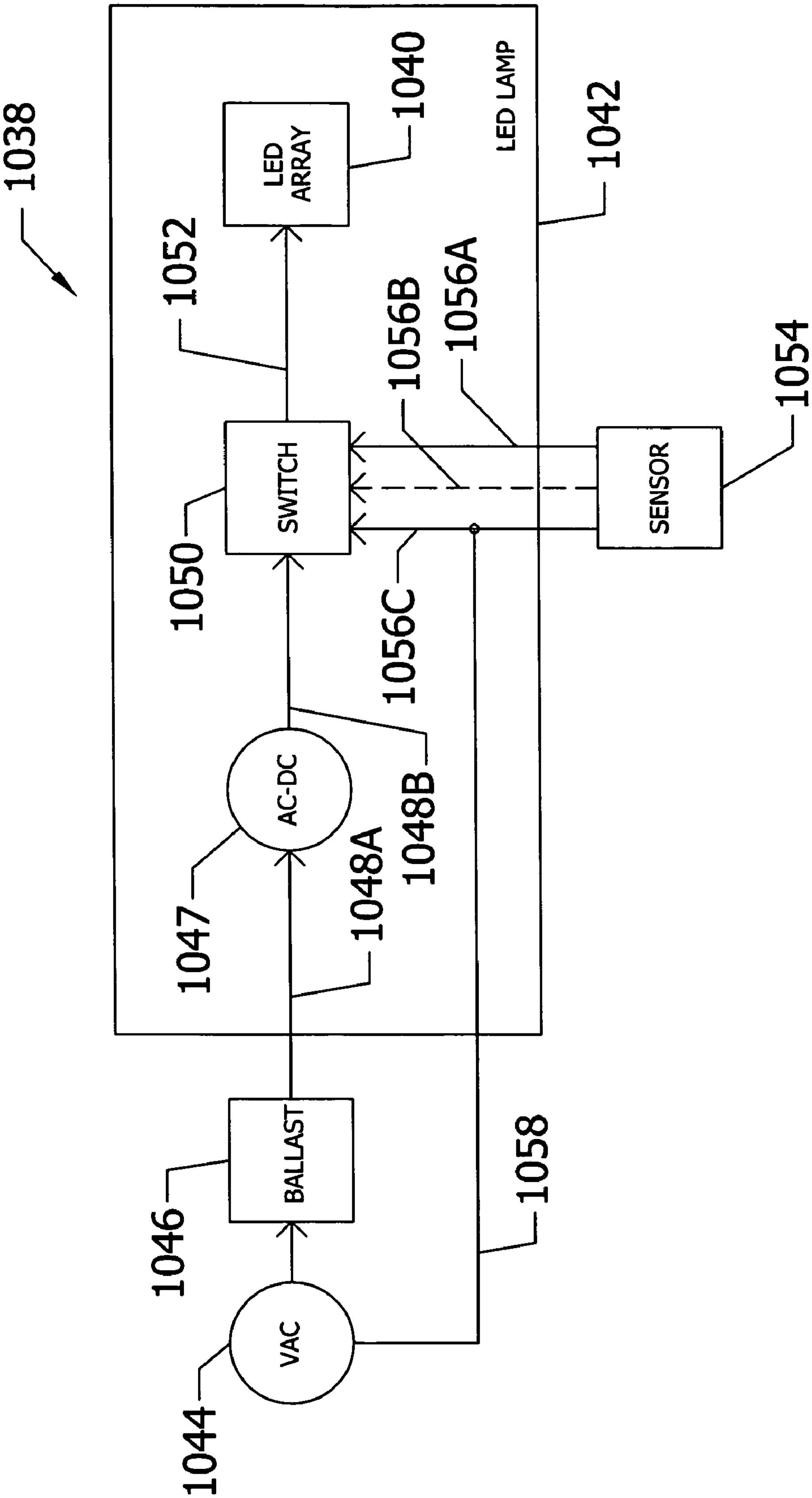
Figure 75C:
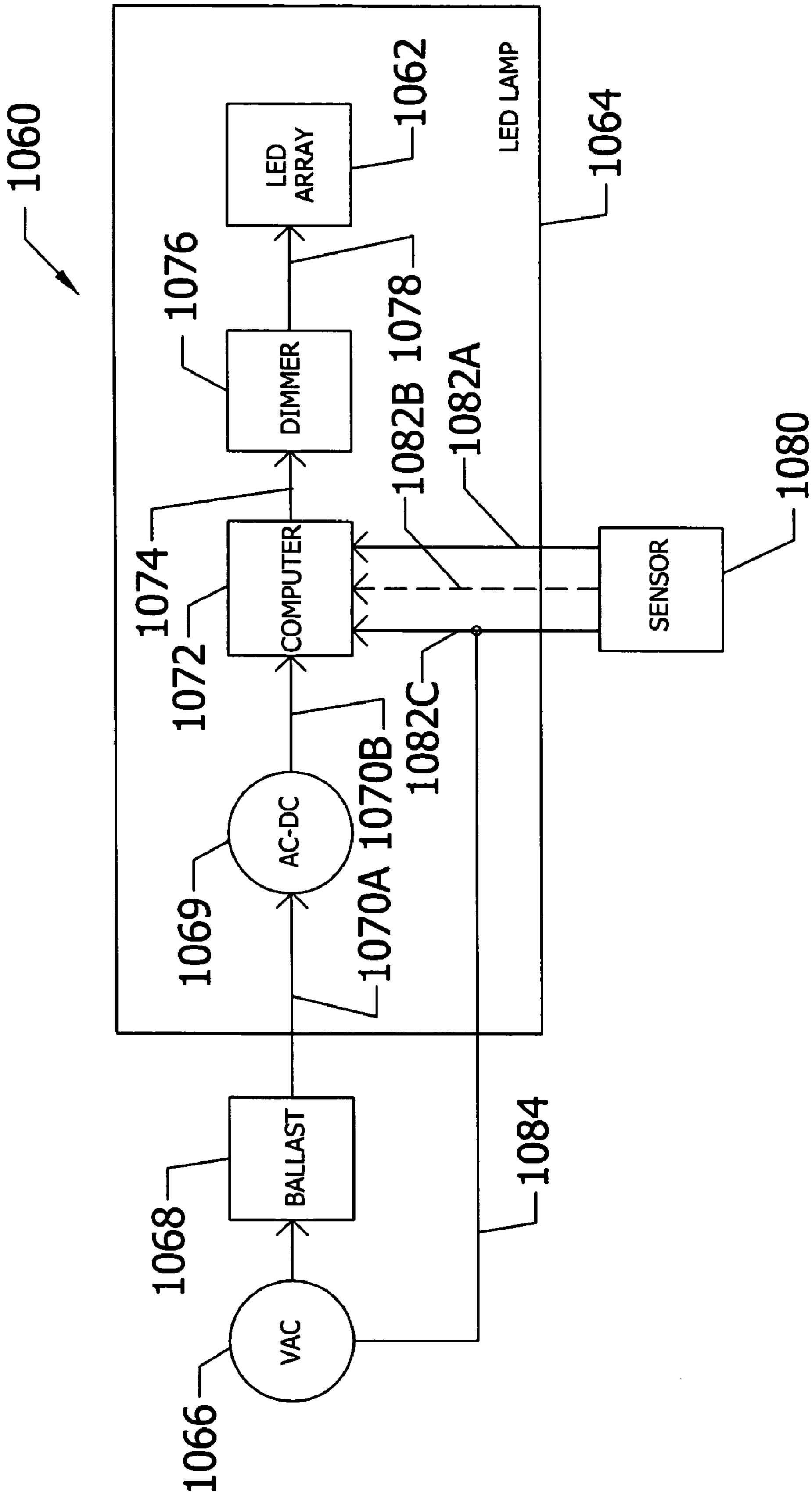
Figure 76:
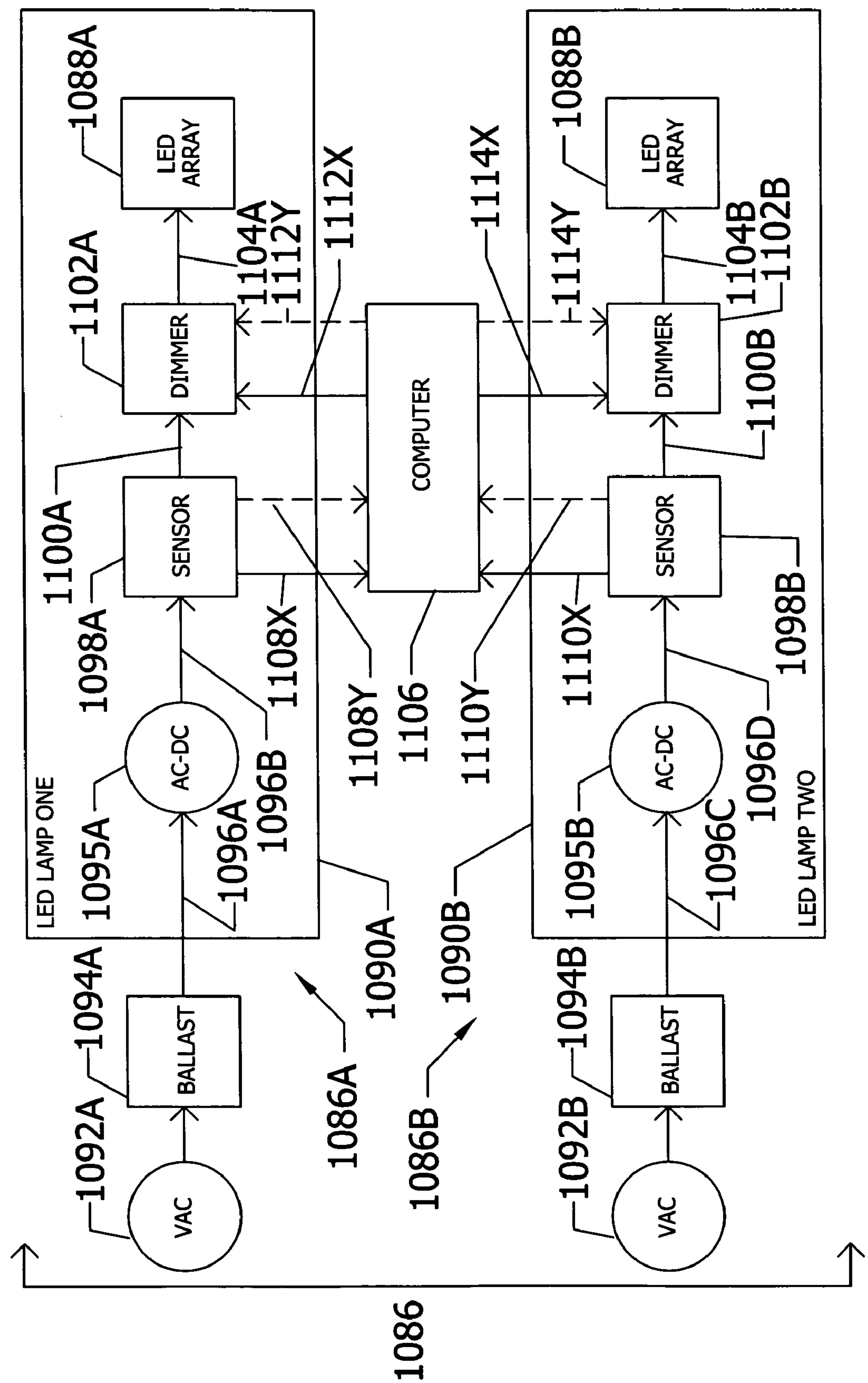
Figure 76A:
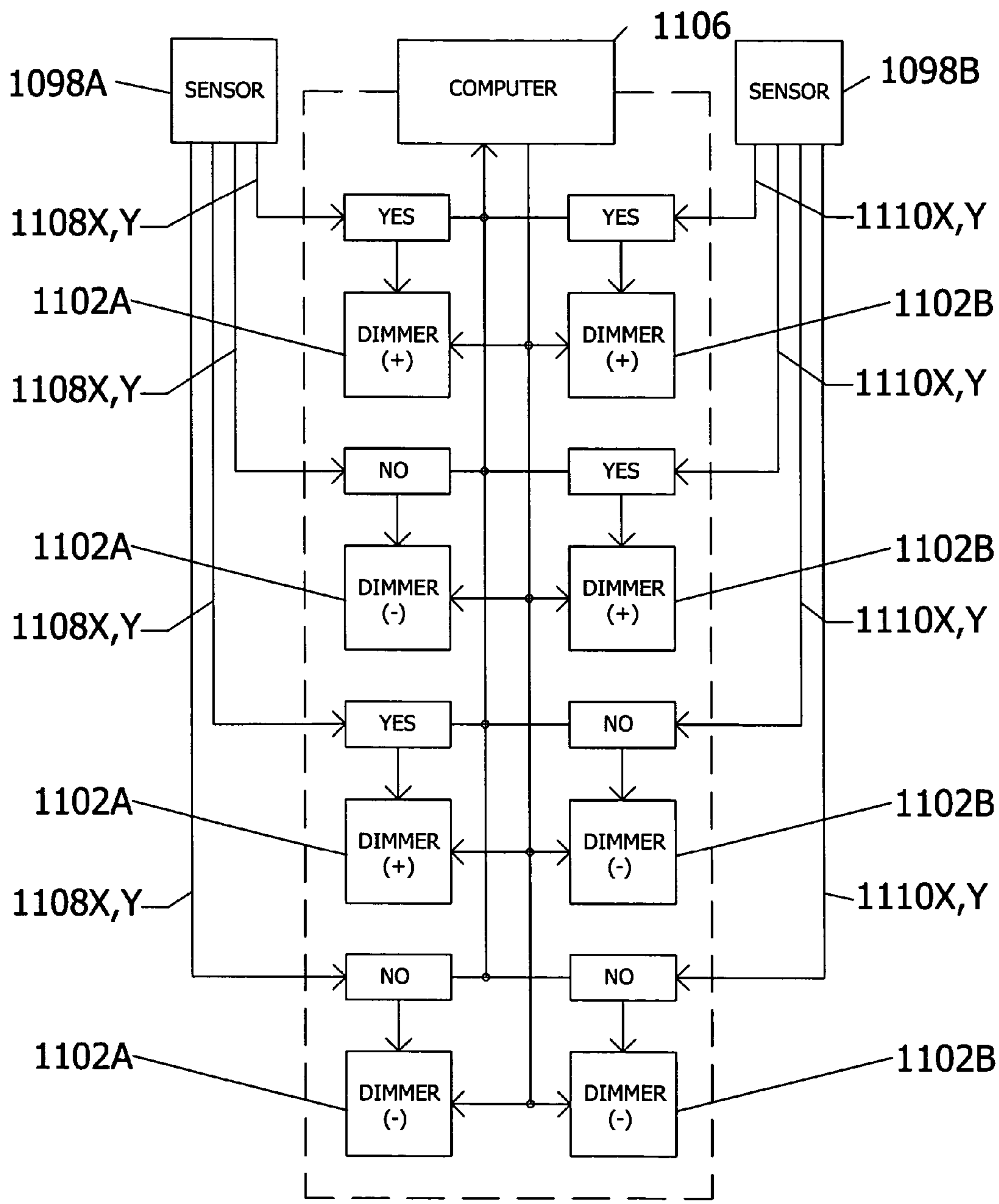
Figure 77:
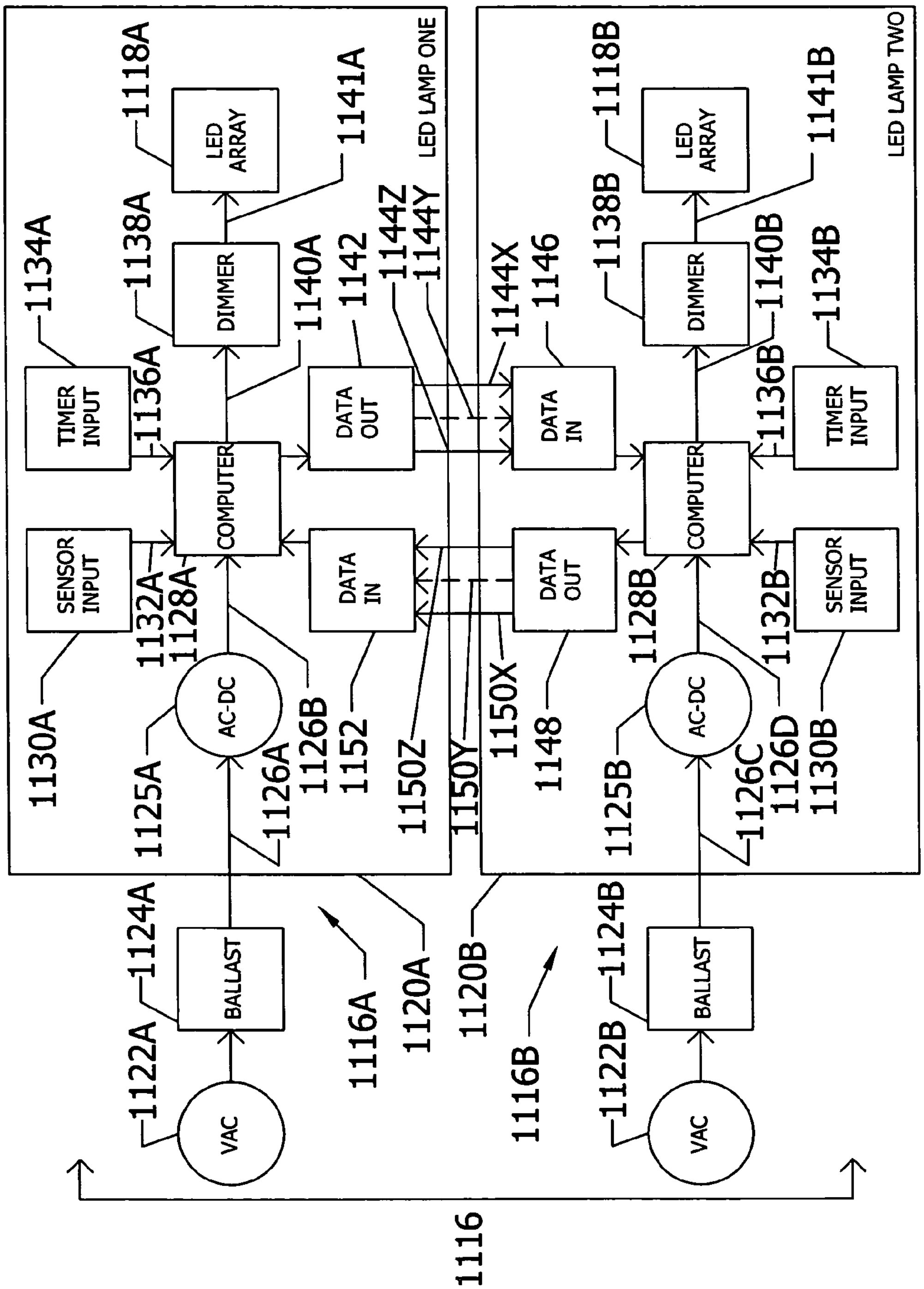
Figure 78:
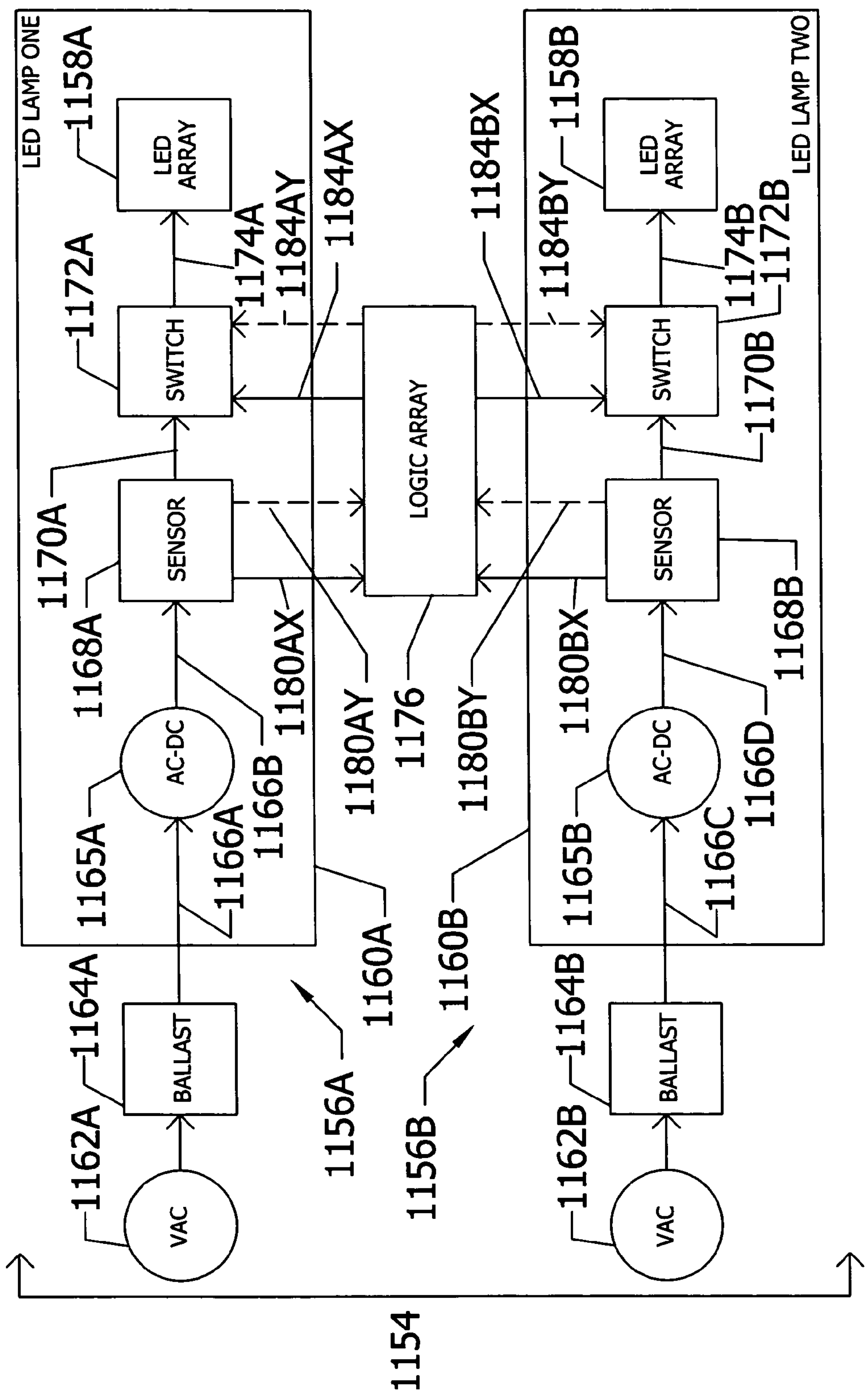
Figure 78A:
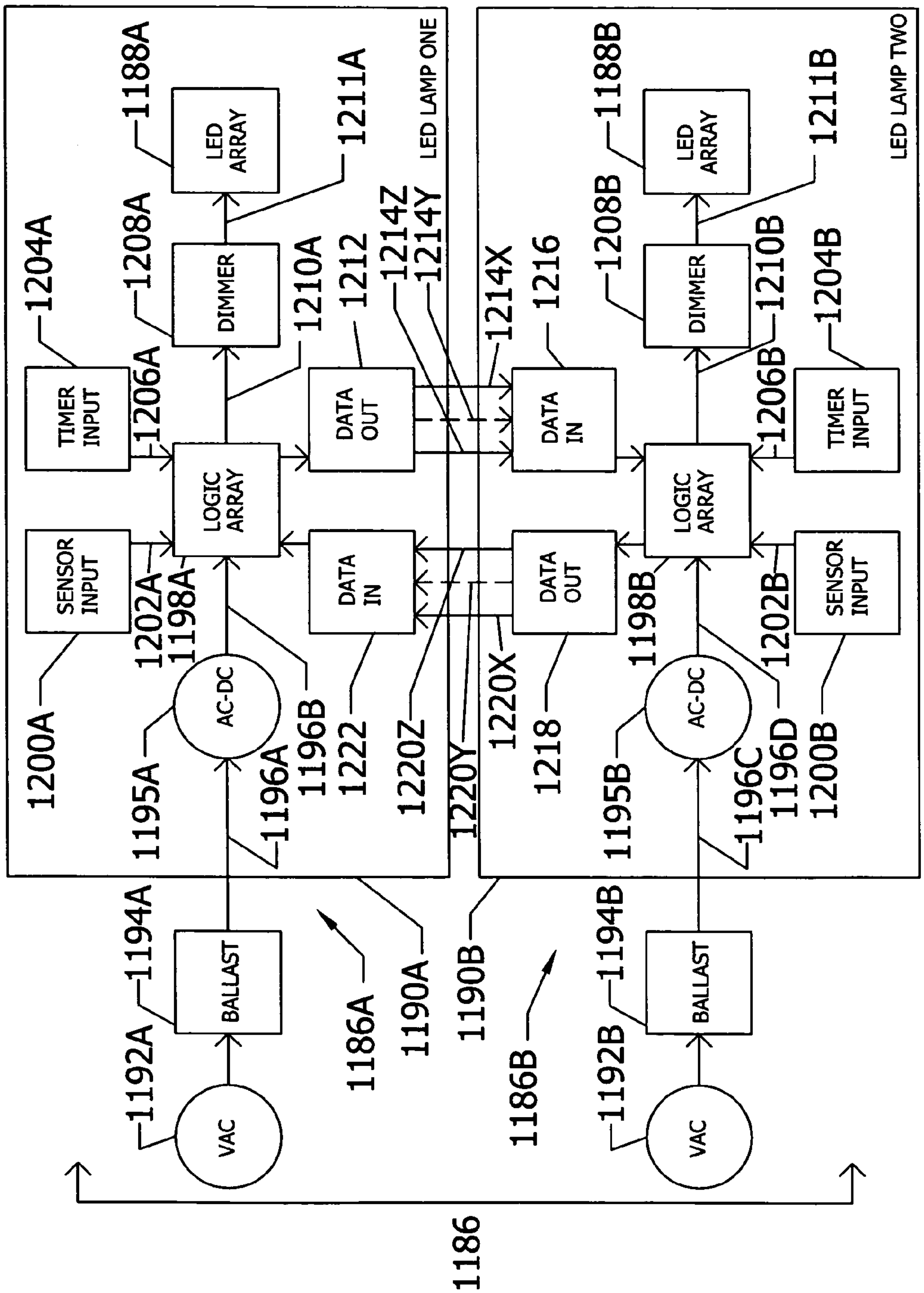
Figure 79A:
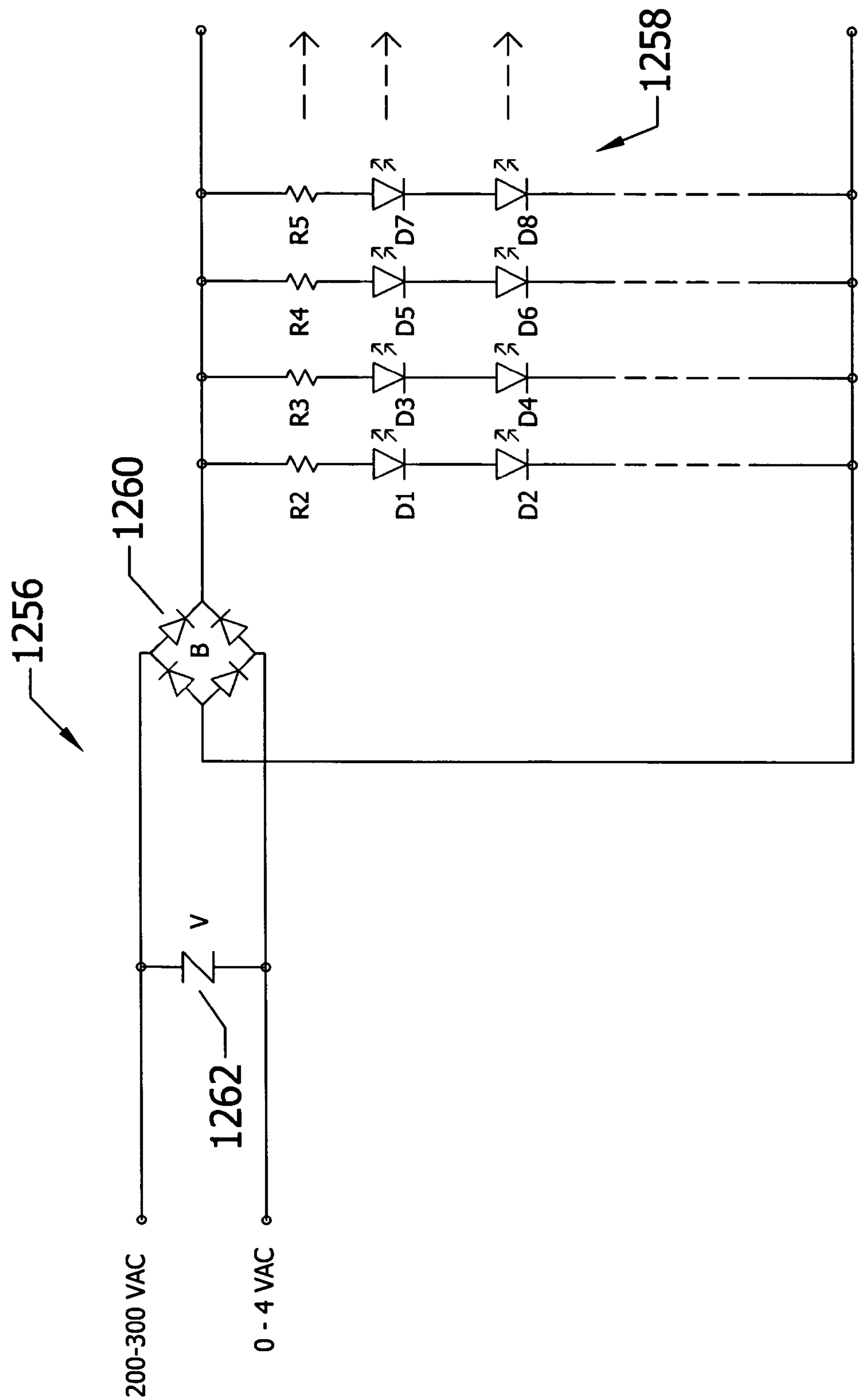
Figure 79B:
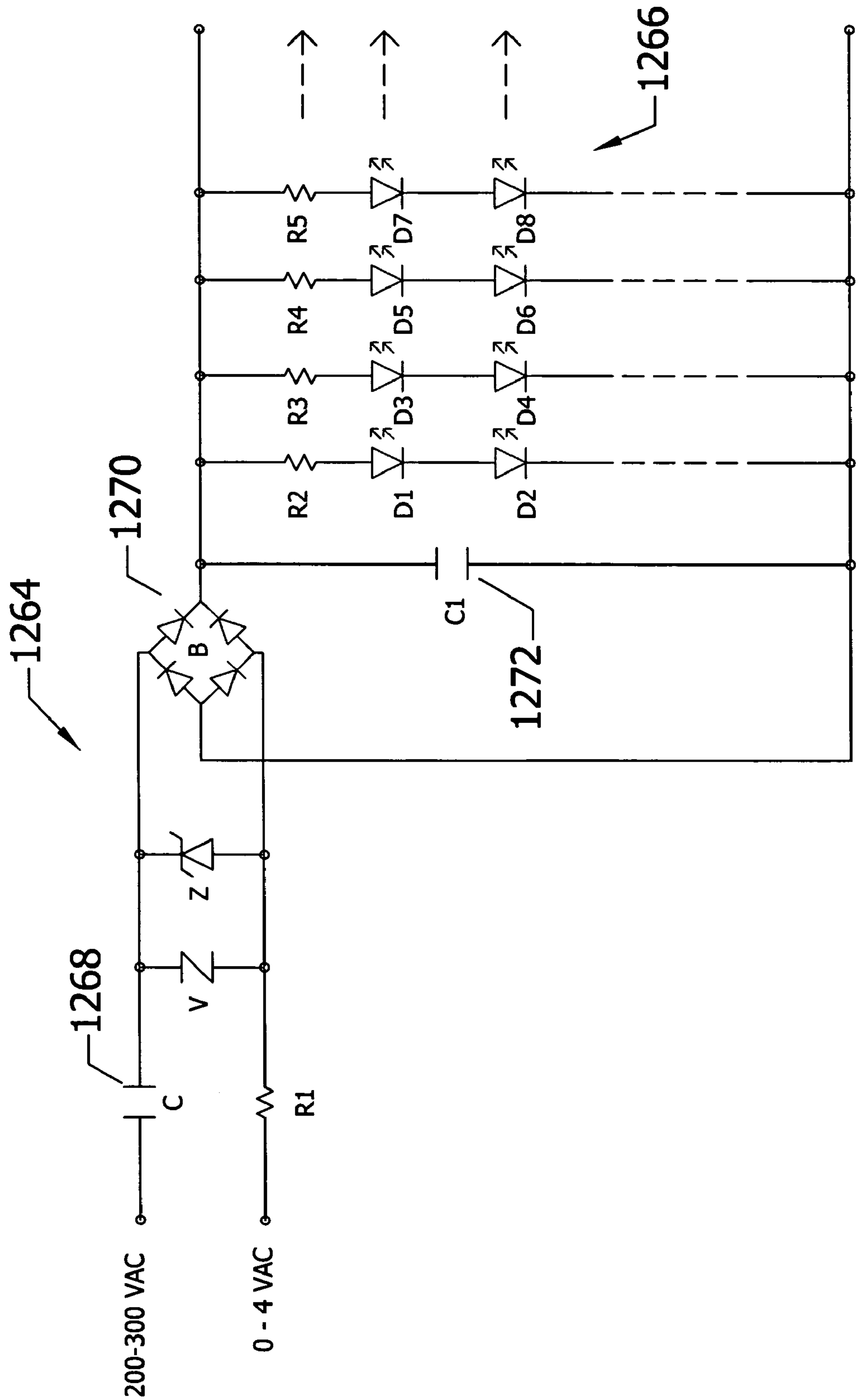
Figure 80A:
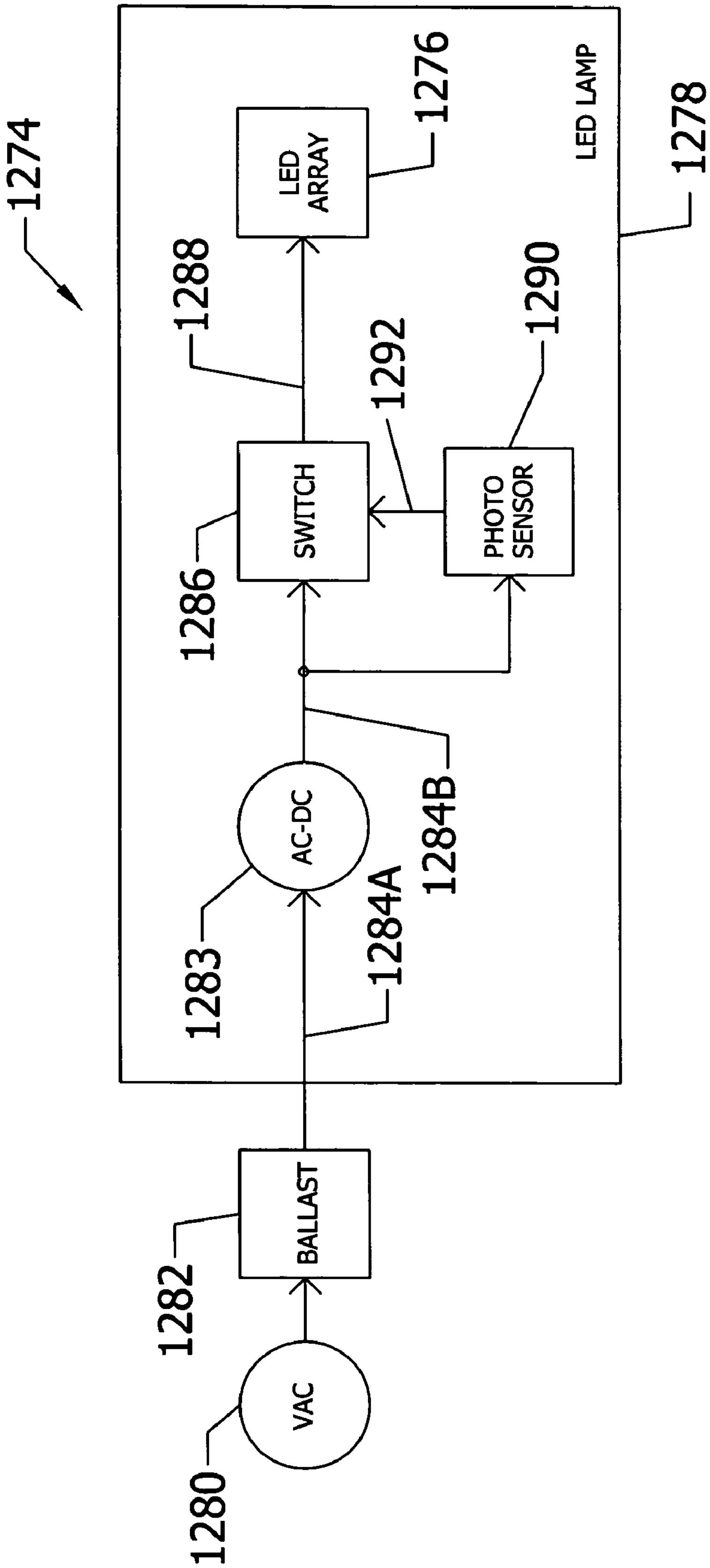
Figure 80B:
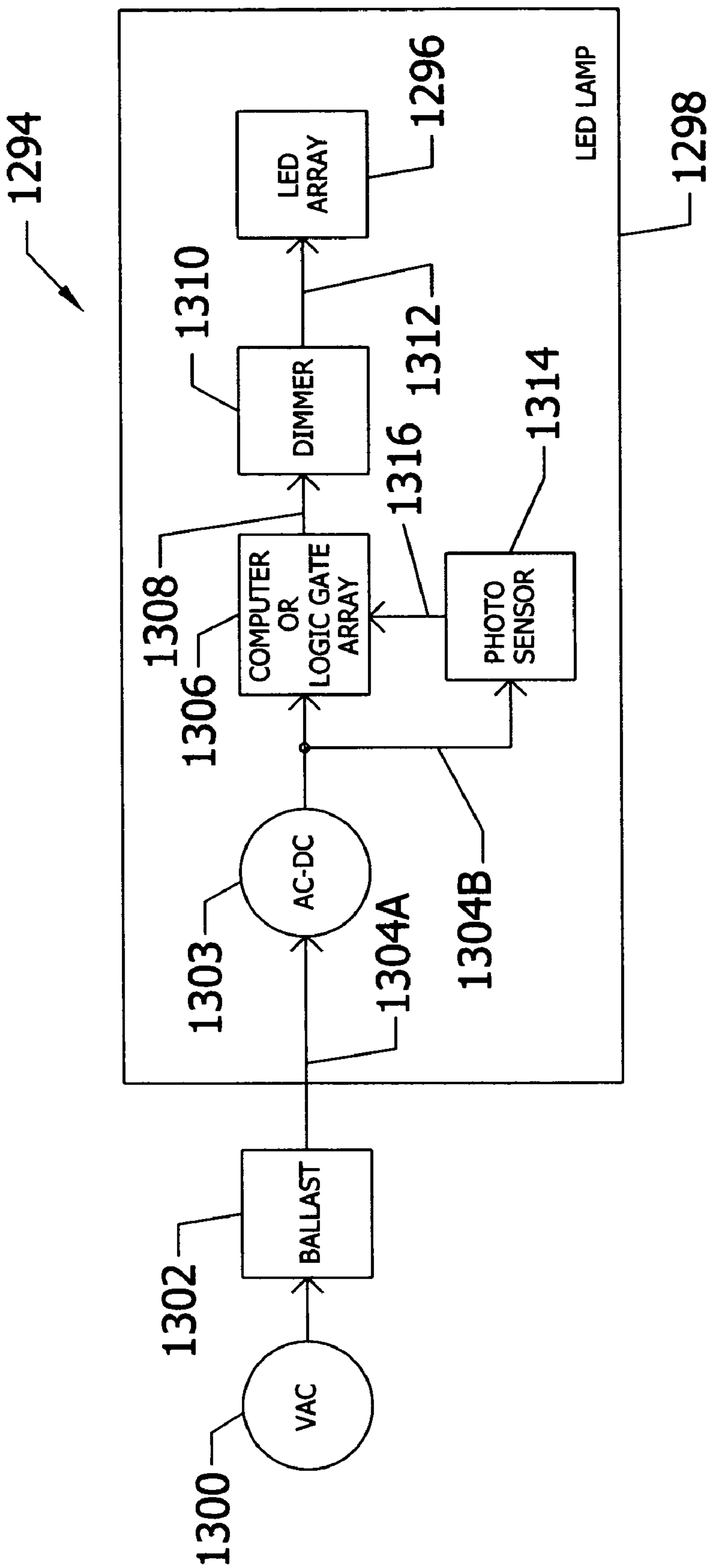
Figure 80C:
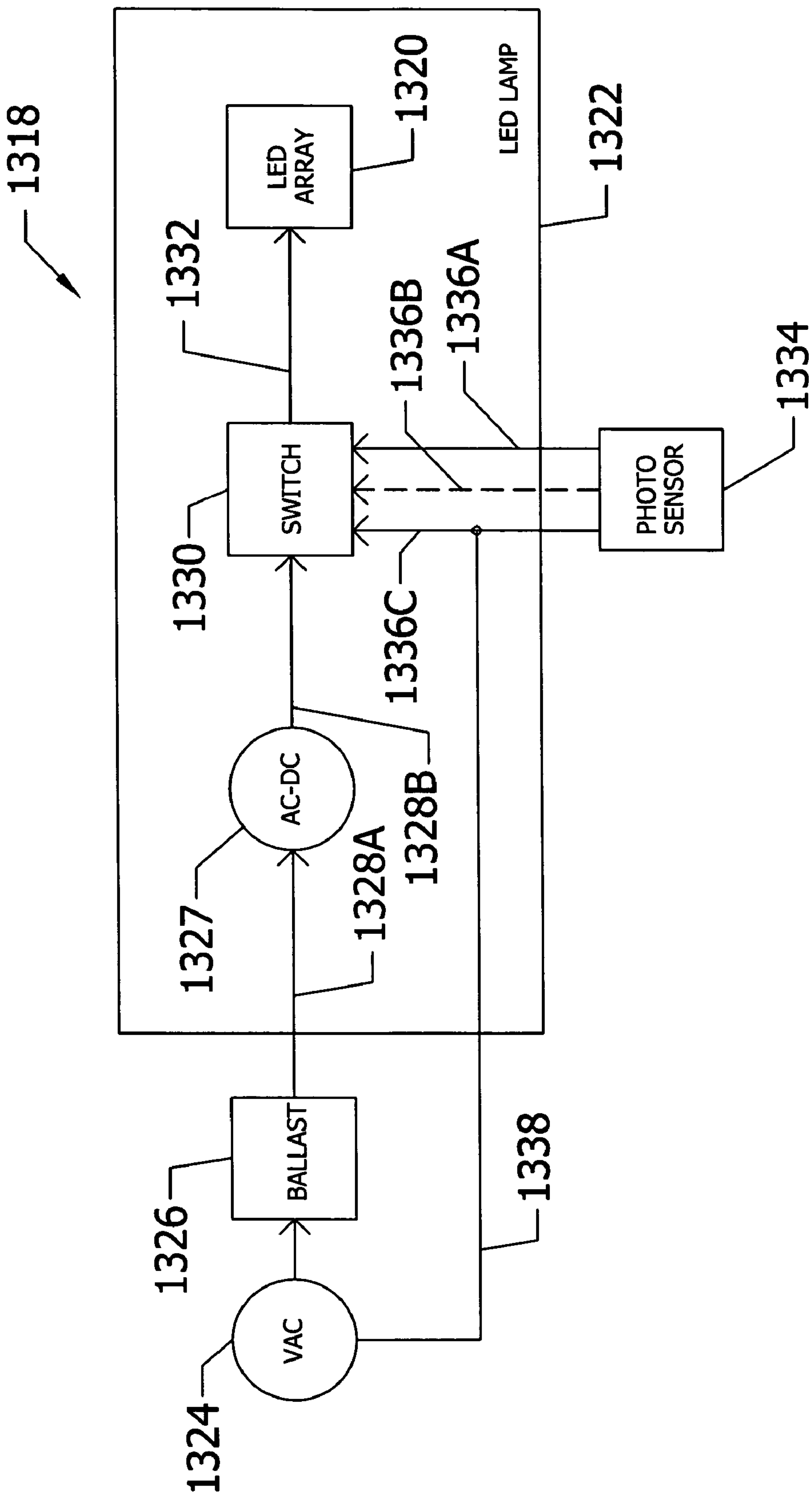
Figure 80D:
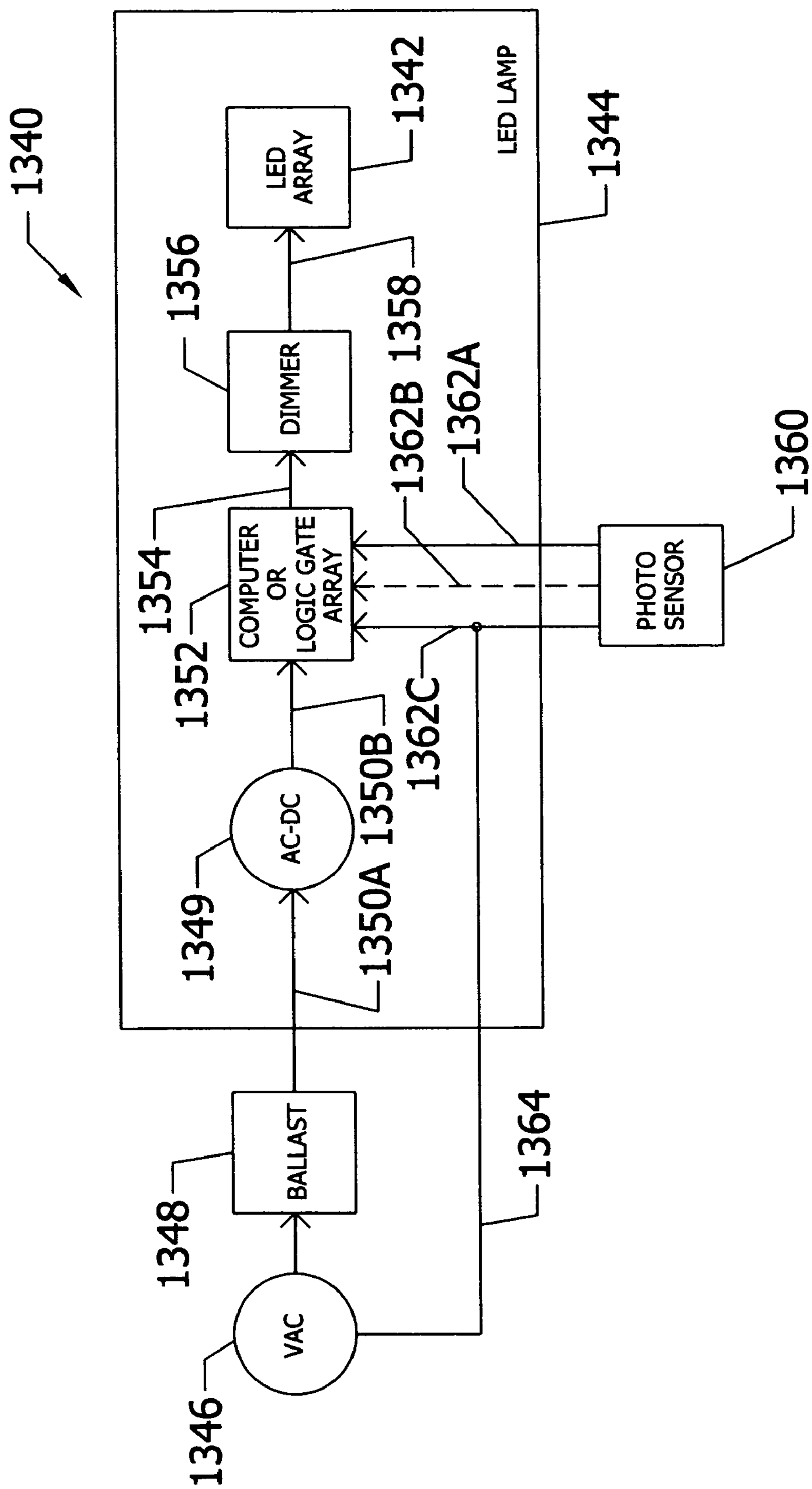
Figure 81:
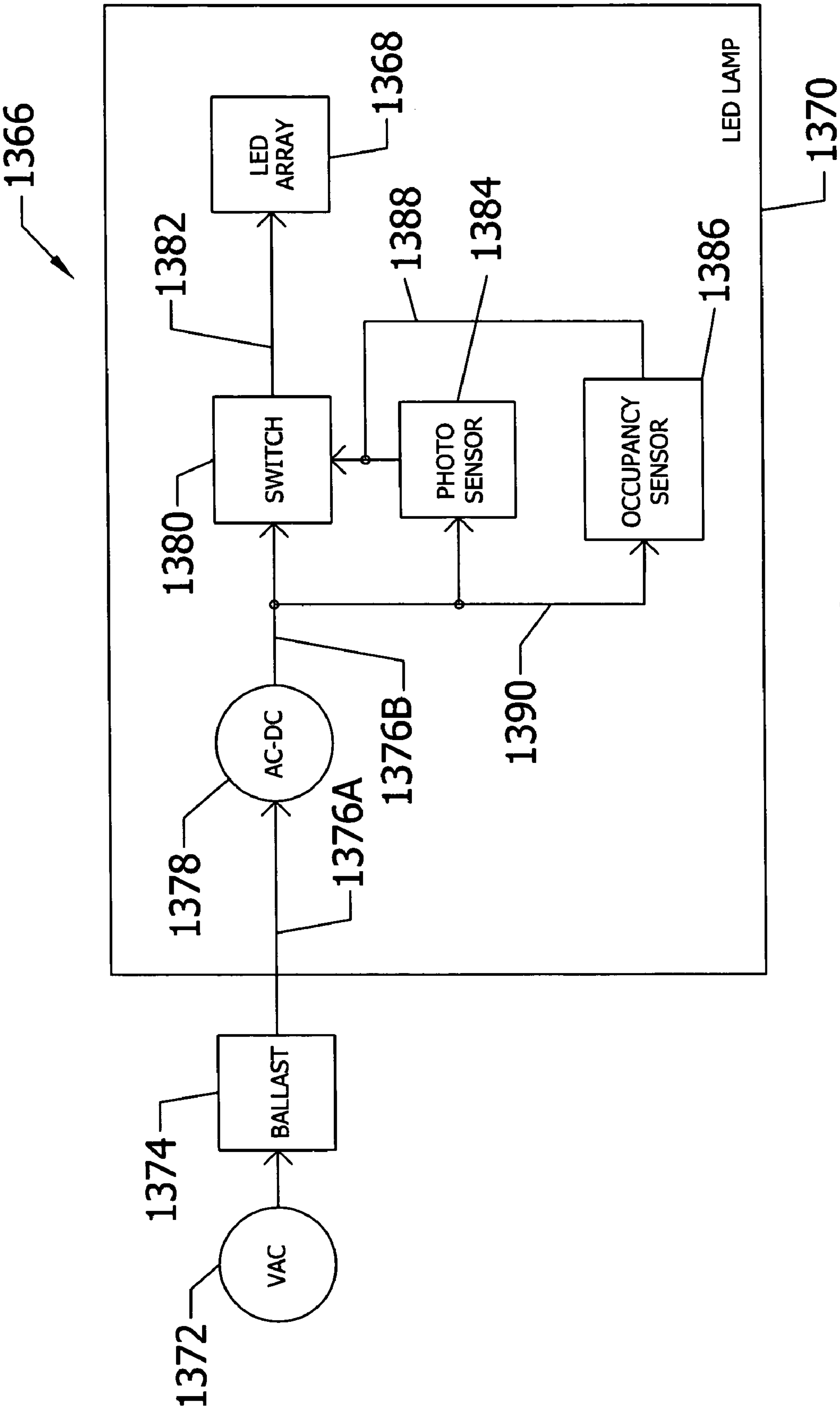
Figure 82:
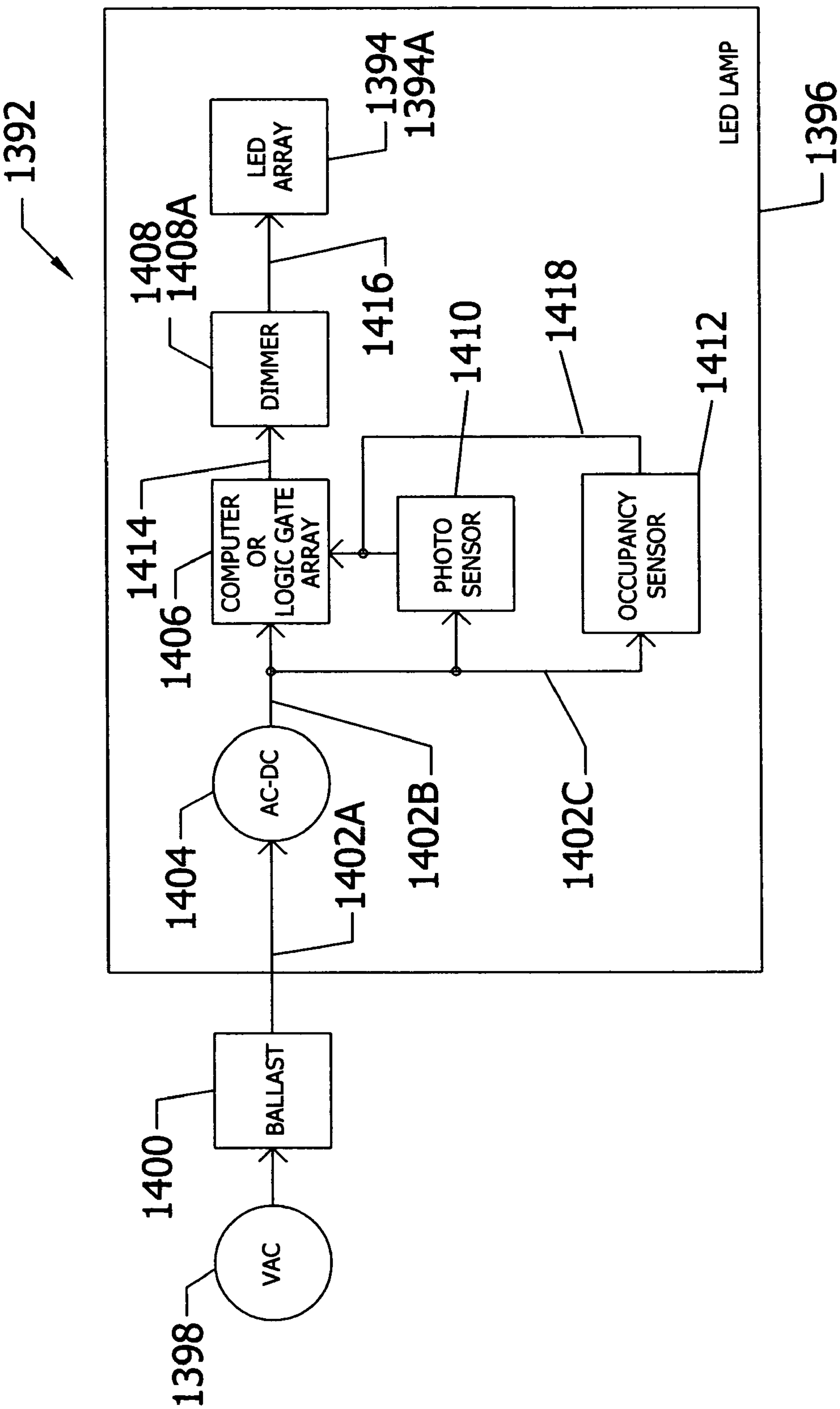
Figure 83:
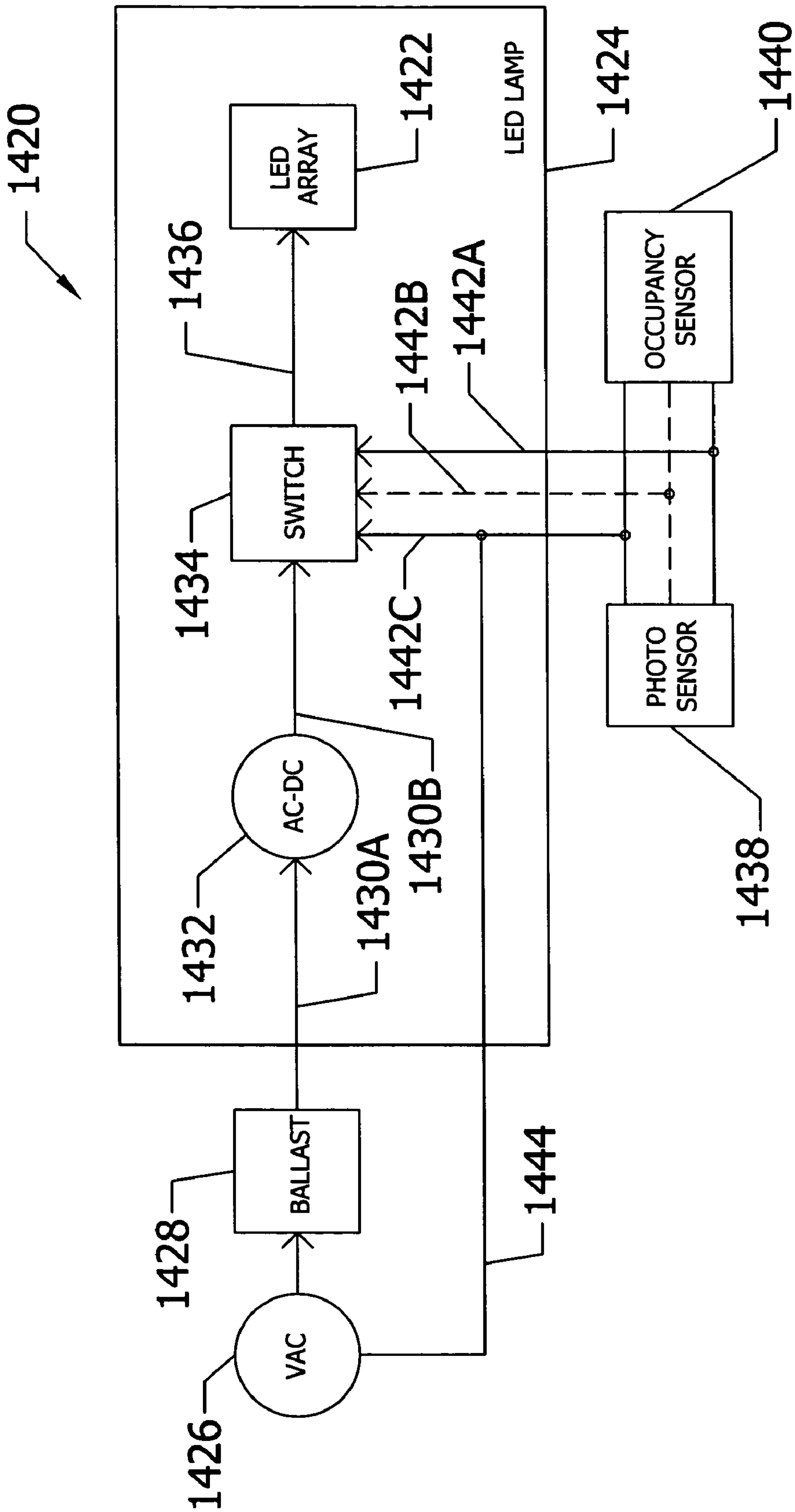
Figure 84:
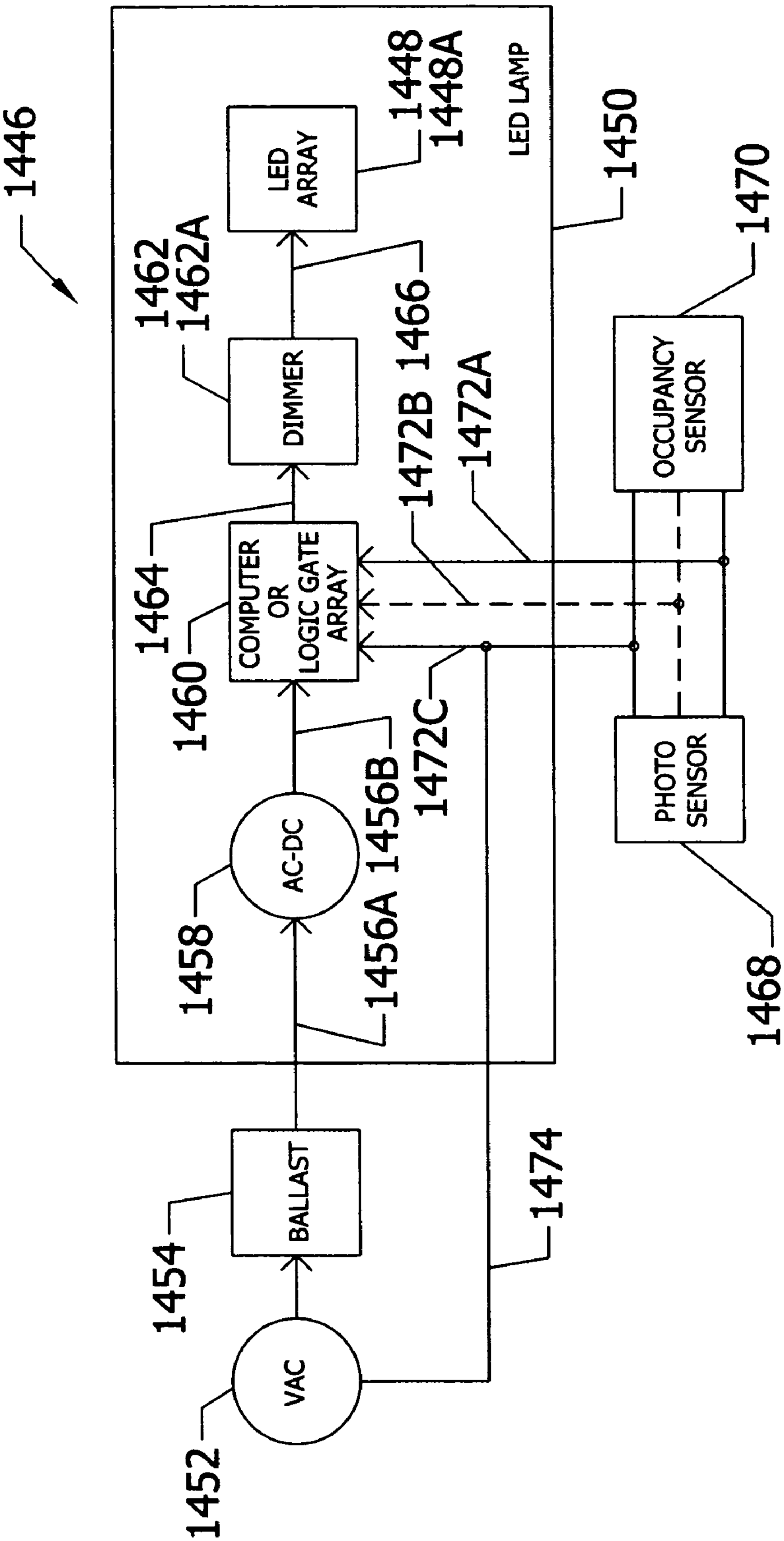
Figure 85:
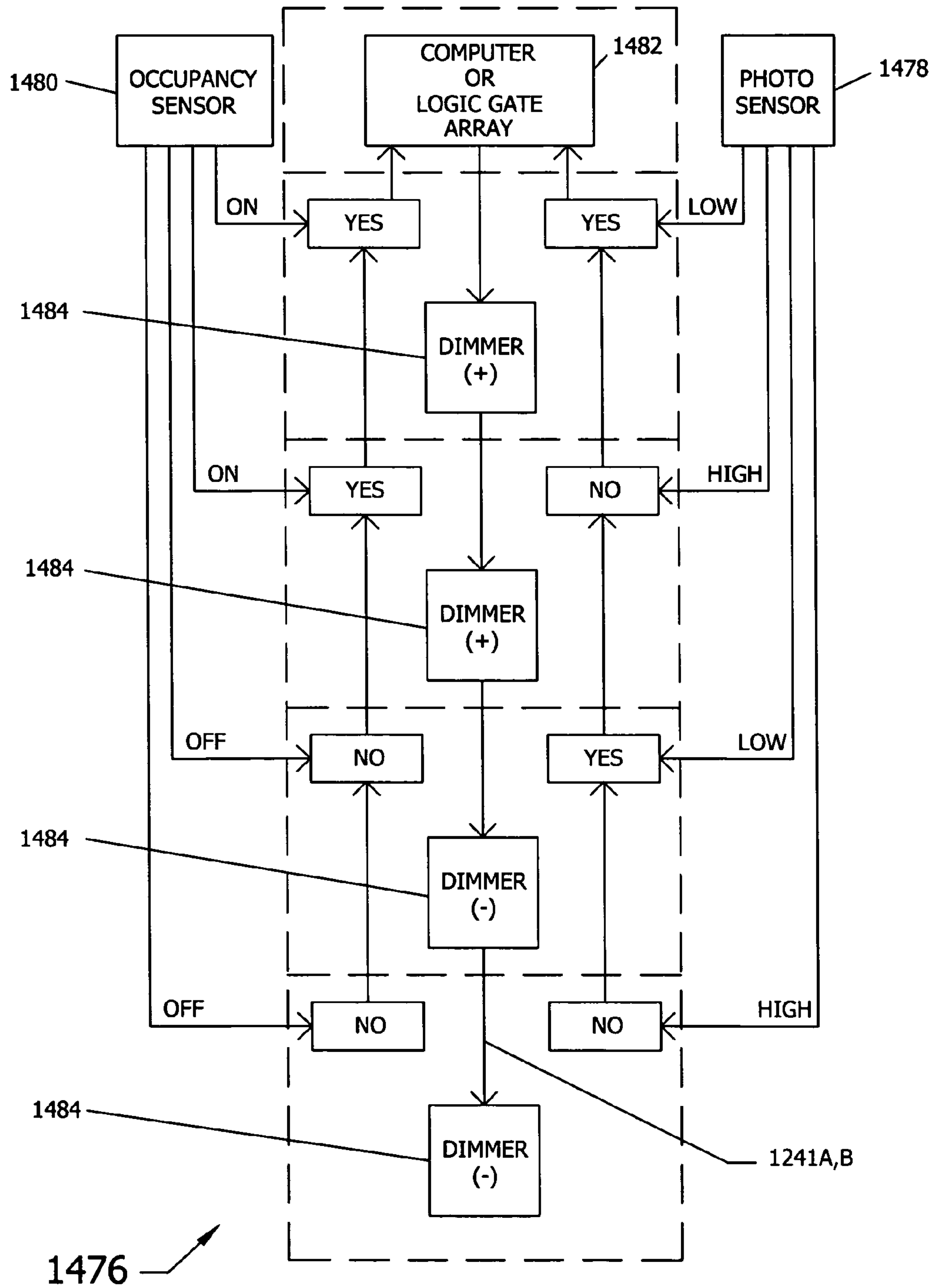
Figure 86:
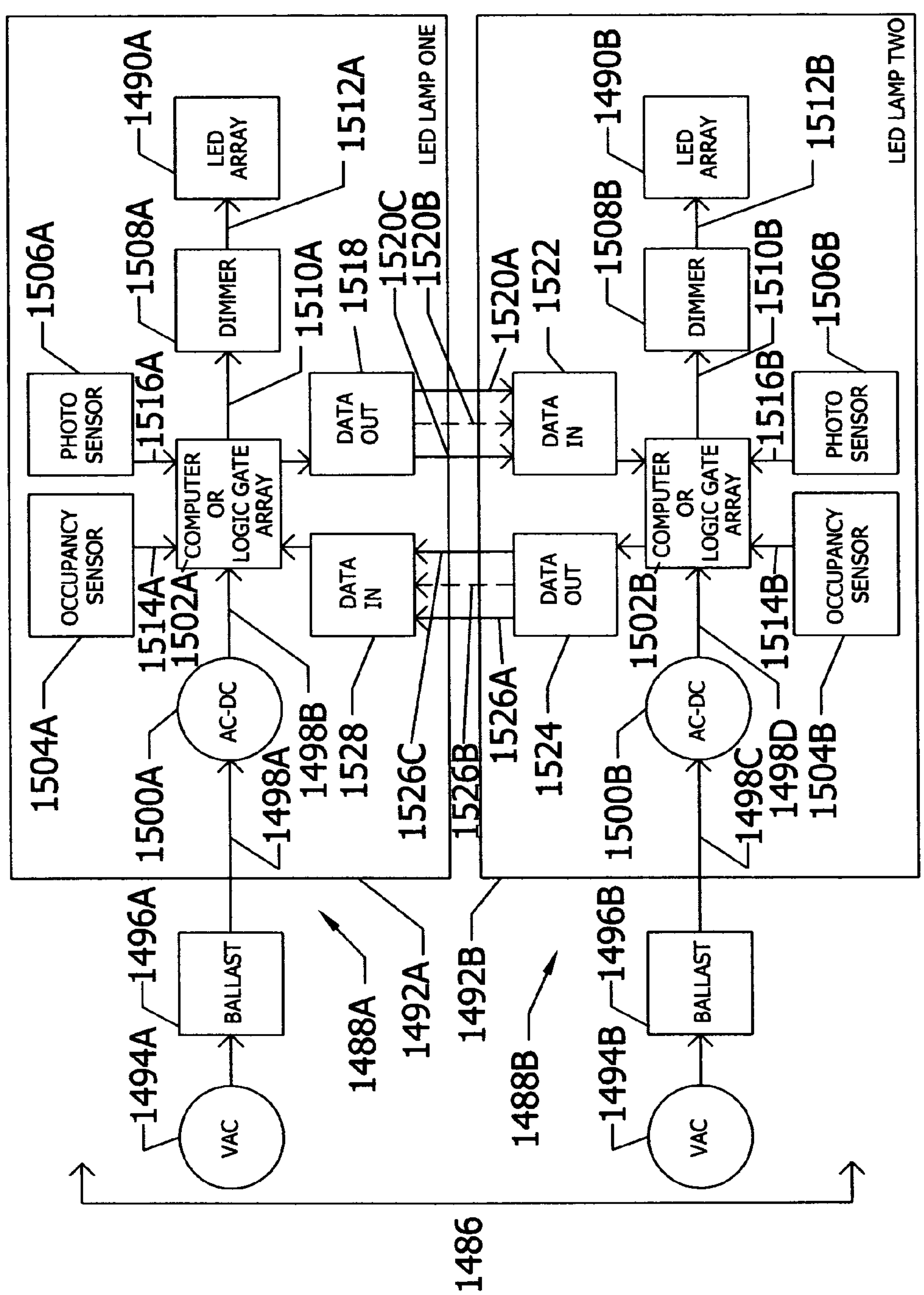

FIG. 63G shows two high-brightness LEDs in an electrical parallel arrangement of two parallel strings with one high-brightness LED positioned on each of the two parallel strings for the overall electrical circuit shown in FIG. 63 for the alternate retrofit lamp;

FIG. 64 is a schematic view showing the LED array in FIGS. 63 and 63A electrically connected to two opposed integral electronics circuitry that are electrically connected to base end caps each having a bi-pin connections;

FIG. 65 is a schematic circuit of one of the two integral electronics circuitry in FIG. 64 positioned at one side of the alternating current voltage emanating from the ballast for the LED array shown in FIGS. 63 and 63A;

FIG. 66 is a schematic circuit of the other of the two integral electronics circuitry shown in FIG. 64 positioned at the other side of the alternating current voltage emanating from the ballast for the LED array shown in FIGS. 63 and 63A;

FIG. 67 is an isolated side view of the elongated cylindrical housing shown in FIGS. 60 and 61 detailing the cooling vent holes located at opposite ends;

FIG. 67A is an end view taken through line 67A-67A in FIG. 67;

FIG. 68 is a side view of an isolated bi-pin end cap shown in FIGS. 60 and 64;

FIG. 68A is a sectional view taken through line 68A-68A of the end cap shown in FIG. 68;

FIG. 69 is an alternate sectional view to the sectional view of the alternate LED retrofit lamp taken through a single row of LEDs shown in FIG. 62;

FIG. 70 is a top view of an alternate LED retrofit lamp that is partly curved;

FIG. 71 is a sectional view of FIG. 70 taken through line 71-71;

FIG. 72 is a section view of an LED lamp 828A and 828B that is for mounting either to an instant start ballast assembly with opposed single pin contacts or to a rapid start ballast assembly with opposed bi-pin contacts;

FIG. 72A is an interior view of one circular single pin base end cap 830A taken in isolation representing both opposed base end caps of LED lamp 828A;

FIG. 72B is an interior view of one circular bi-pin base end cap 830B taken in isolation representing both opposed base end caps of LED lamp 828B;

FIG. 73 is a schematic block diagram showing an LED lamp including an AC power line from a ballast to a power converter and then to an LED array positioned in a tube with a switch on the DC power line also positioned therein and in operational power contact with an external manual control unit having three alternative data input signal lines to the switch;

FIG. 73A is a schematic block diagram showing an LED lamp including an AC power line from a ballast to a power converter and then to an LED array positioned in a tube with a computer and a dimmer on the DC power line also positioned therein and in operational power contact with an external manual control unit having three alternative data input signal lines to the computer;

FIG. 74 is a schematic block diagram showing an LED lamp including an AC power line from a ballast to a power converter and then to an LED array positioned in a tube with a timer and a switch on the DC power line also positioned therein and in operational contact with an external manual timer control unit having three alternative data input signal lines to the timer;

FIG. 74A is a schematic block diagram showing an LED lamp including an AC power line from a ballast to a power converter and then to an LED array positioned in a tube with a computer and a dimmer on the DC power line also positioned therein and in operational contact with an external manually operated timer and switch having three alternative data input signal lines to the computer;

FIG. 74B is a schematic block diagram showing an LED lamp including an AC power line from a ballast to a power converter and then to an LED array positioned in a tube with a timer, a switch, a computer, and a dimmer also positioned therein;

FIG. 75 is a schematic block diagram showing an LED lamp including an AC power line from a ballast to a power converter and then to an LED array positioned in a tube with a sensor in operational contact with a switch on the DC power line also positioned therein;

FIG. 75A is a schematic block diagram showing an LED lamp including an AC power line from a ballast to a power converter and then to an LED array positioned in a tube with a computer in operational communication with a sensor and a dimmer on the DC power line also positioned therein;

FIG. 75B is a schematic block diagram showing an LED lamp including an AC power line from a ballast to a power converter and then to an LED array positioned in a tube and a switch also positioned in the tube on the DC power line and in operational contact with a sensor positioned external to the tube having three alternative signal lines to the switch;

FIG. 75C is a schematic block diagram showing an LED lamp including an AC power line from a ballast to a power converter and then to an LED array positioned in a tube with a computer and a dimmer on the DC power line also positioned therein and a sensor positioned external to the tube having three alternative signal lines to the computer;

FIG. 76 is a schematic block diagram showing two LED lamps in network communication each including an AC power line from a ballast to a power converter and then to an LED array positioned in a tube with a sensor and a dimmer on the DC power line also positioned therein, and a computer in operational communication with both sensors and dimmers each using two alternative signal lines to and from the computer respectively;

FIG. 76A is a logic diagram related to the schematic block diagram shown in FIG. 76 that sets forth the four operational possibilities between the two LED lamps;

FIG. 77 is a schematic block diagram showing two LED lamps in network communication each including an AC power line from a ballast to a power converter and then to an LED array positioned in a tube with a computer in operational contact with a sensor, a timer, and a dimmer also positioned therein in each LED lamp, and both computers being in operational signal communications with each other using two alternative signal lines;

FIG. 78 is a schematic block diagram showing two LED lamps in network communication each including an AC power line from a ballast to a power converter and then to an LED array positioned in a tube with a sensor and switch on the DC power line and in operational contact also positioned therein, and logic arrays in operational communication with the both sensors and switches each using two alternative signal lines to and from the logic arrays respectively;

FIG. 78A is a schematic block diagram showing two LED lamps in network communication each including an AC power line from a ballast to a power converter and then to an LED array positioned in a tube with logic arrays in operational contact with a sensor, a timer, and a switch also positioned therein in each LED lamp, and both sets of logic arrays being in operational signal communications with each other using two alternative signal lines;

FIG. 79A is an electrical circuit for providing DC power from a ballast to an LED array incorporating a voltage suppressor and a bridge rectifier on the power input side;

FIG. 79B is an alternative electrical circuit analogous to FIG. 79A for providing DC power from a ballast to an LED array positioned in a tube incorporating a non-polarized capacitor, a zener diode, a varistor, and a bridge rectifier on the power input side. An optional filter capacitor is also shown;

FIG. 80A is a schematic block diagram showing an LED lamp including an AC power line from a ballast to a power converter and then to an LED array positioned in a tube with a light level photosensor in operational contact with a switch on the DC power line also positioned therein;

FIG. 80B is a schematic block diagram showing an LED lamp including an AC power line from a ballast to a power converter and then to an LED array positioned in a tube with a computer in operational communication with a light level photosensor and a dimmer on the DC power line also positioned therein;

FIG. 80C is a schematic block diagram showing an LED lamp including an AC power line from a ballast to a power converter and then to an LED array positioned in a tube and a switch also positioned in the tube on the DC power line and in operational contact with a light level photosensor positioned external to the tube having three alternative signal lines to the switch;

FIG. 80D is a schematic block diagram showing an LED lamp including an AC power line from a ballast to a power converter and then to an LED array positioned in a tube with a computer and a dimmer on the DC power line also positioned therein and a light level photosensor positioned external to the tube having three alternative signal lines to the computer;

FIG. 81 is a schematic block diagram showing an LED lamp including an AC power line from a ballast to a power converter and then to an LED array positioned in a tube with a light level photosensor and an occupancy sensor both in operational contact with a switch on the DC power line also positioned therein;

FIG. 82 is a schematic block diagram showing an LED lamp including an AC power line from a ballast to a power converter and then to an LED array positioned in a tube with a computer in operational communication with a light level photosensor, an occupancy sensor, and a dimmer on the DC power line also positioned therein;

FIG. 83 is a schematic block diagram showing an LED lamp including an AC power line from a ballast to a power converter and then to an LED array positioned in a tube and a switch also positioned in the tube on the DC power line and in operational contact with a light level photosensor and an occupancy sensor both positioned external to the tube having three alternative signal lines to the switch;

FIG. 84 is a schematic block diagram showing an LED lamp including an AC power line from a ballast to a power converter and then to an LED array positioned in a tube with a computer and a dimmer on the DC power line also positioned therein and a light level photosensor an occupancy sensor both positioned external to the tube having three alternative signal lines to the computer;

FIG. 85 is a logic diagram related to the schematic block diagram shown in FIG. 84 that sets forth the four operational possibilities between the two types of sensors; and FIG. 86 is a schematic block diagram showing two LED lamps in network communication each including an AC power line from a ballast to a power converter and then to an LED array positioned in a tube with an occupancy sensor input and a photosensor input and a dimmer on the DC power line also positioned therein, and a computer in operational communication with the light level sensors, occupancy sensors, and dimmers.

DETAILED DESCRIPTION OF THE PREFERRED EMBODIMENT

Reference is now made to the drawings and in particular to FIGS. 1-10 in which identical of similar parts are designated by the same reference numerals throughout.

Figure 1:
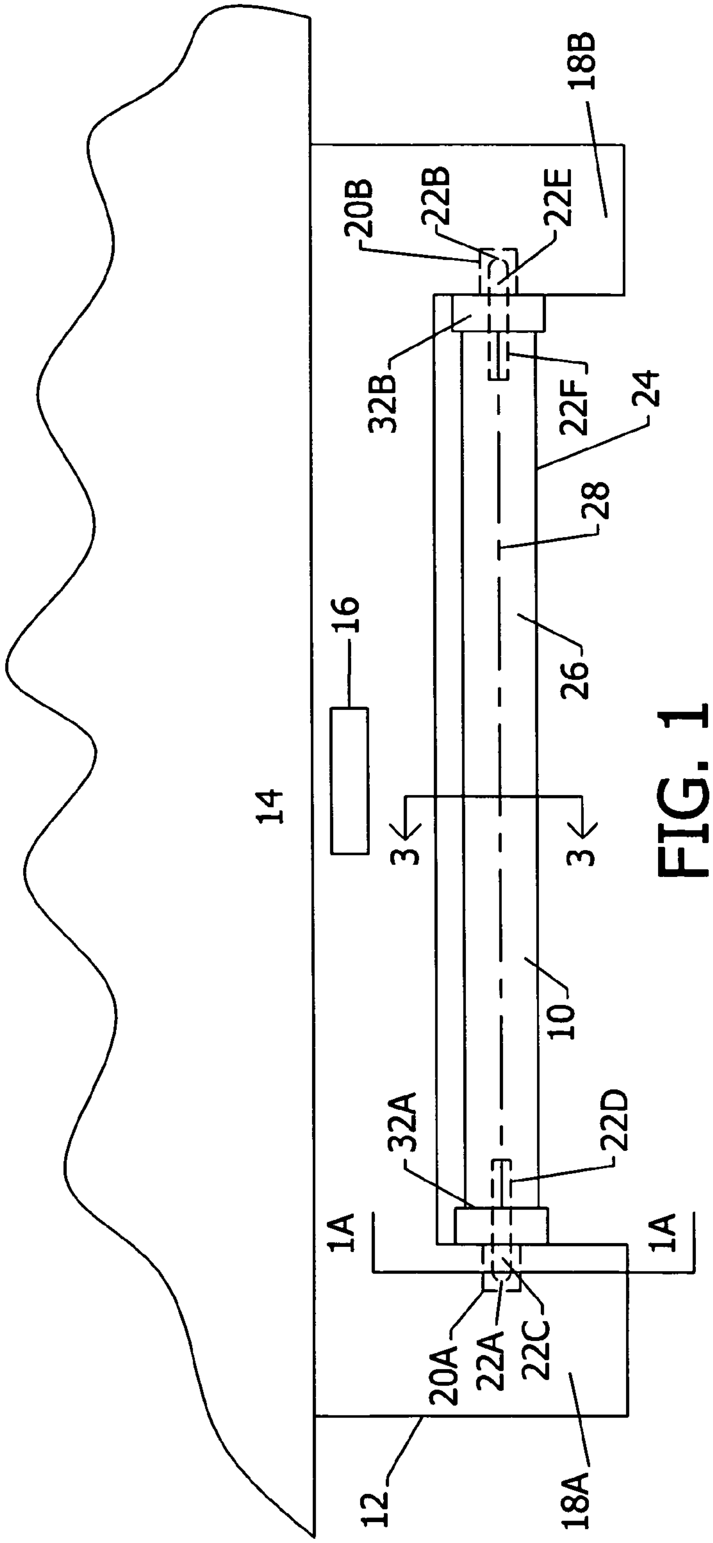
FIG. 1 is an elevational side view of a retrofitted single-pin LED lamp mounted to an existing fluorescent fixture having an electronic instant start, hybrid, or magnetic ballast having a pair of single contact electrical socket connectors.
Figure 1A:
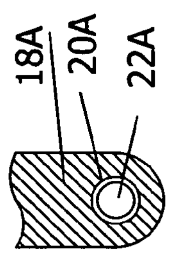
FIG. 1A is a detailed end view of the LED retrofit lamp taken through line 1A-1A of FIG. 1 showing a single-pin.

An LED lamp 10 shown in FIGS. 1-10 is seen in FIG. 1 retrofitted to an existing elongated fluorescent fixture 12 mounted to a ceiling 14. An instant start type ballast assembly 16 is positioned within the upper portion of fixture 12. Fixture 12 further includes a pair of fixture mounting portions 18A and 18B extending downwardly from the ends of fixture 12 that include ballast electrical contacts shown as ballast end sockets 20A and 20B that are in electrical contact with ballast assembly 16. Fixture sockets 20A and 20B are each single contact sockets in accordance with the electrical operational requirement of an instant start type ballast. As also seen in FIG. 1A, LED lamp 10 includes opposed single-pin electrical contacts 22A and 22B that are positioned in ballast sockets 20A and 20B, respectively, so that LED lamp 10 is in electrical contact with ballast assembly 16.

Figure 2:
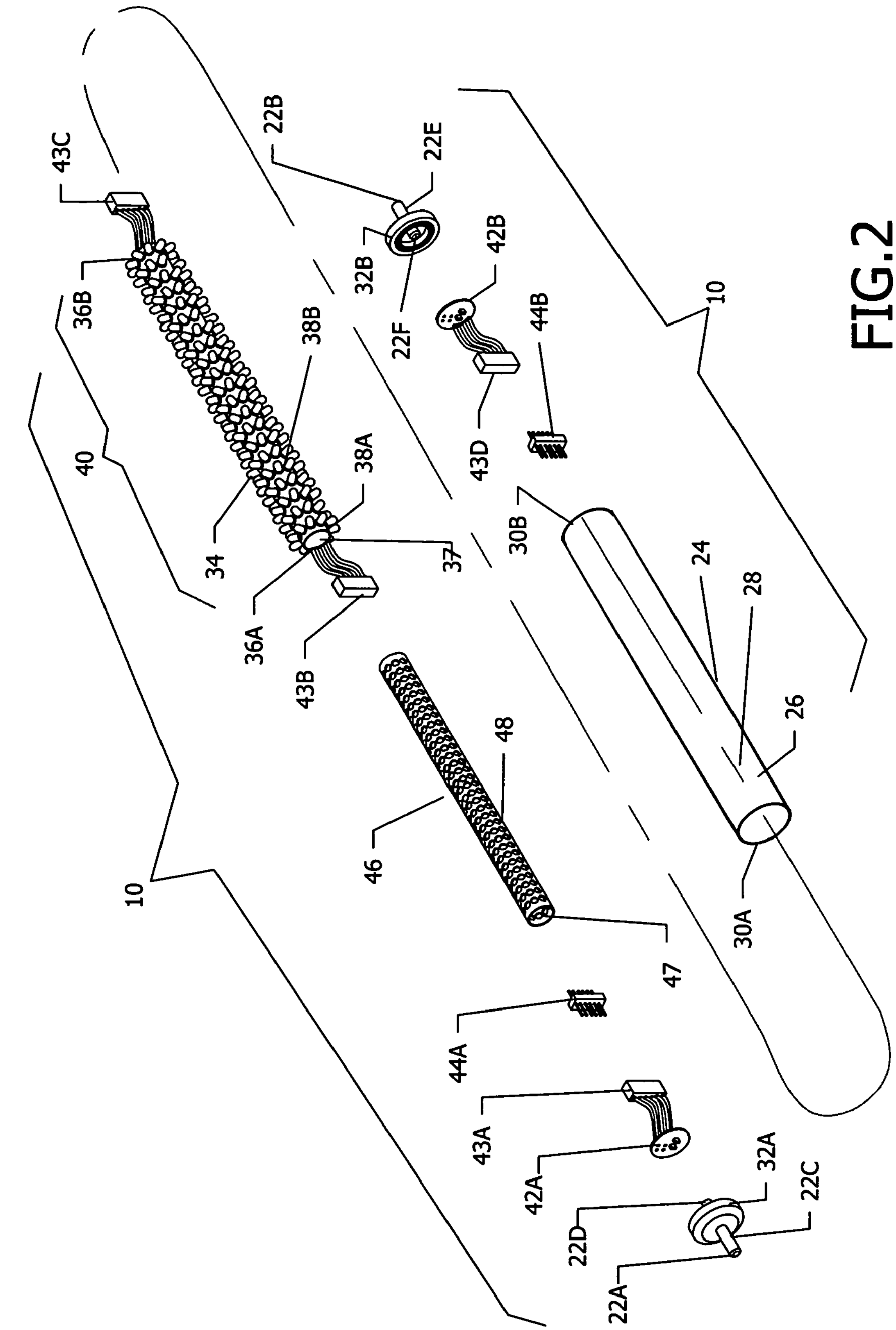
FIG. 2 is an exploded perspective view of the LED retrofit lamp shown in FIG. 1 taken in isolation.
Figure 3:
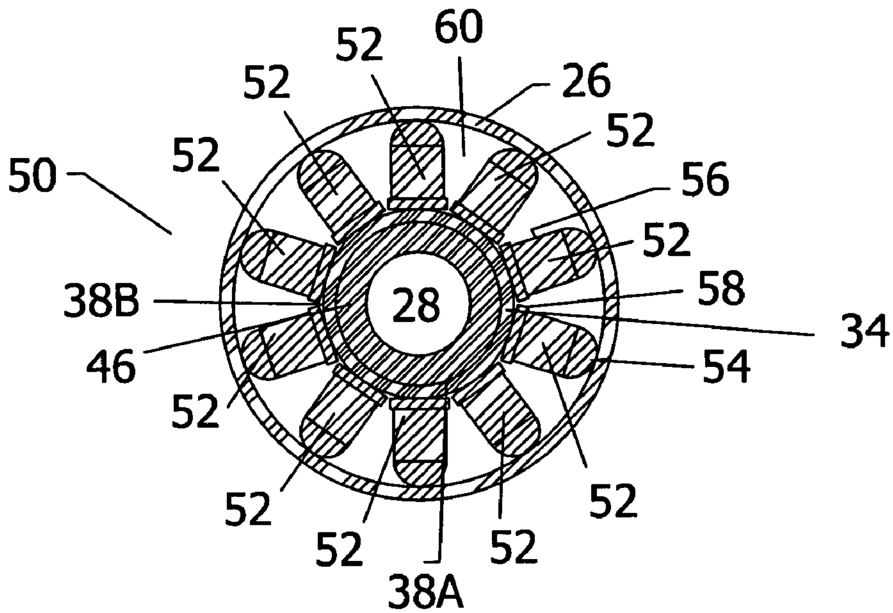
FIG. 3 is a cross-sectional view of the LED retrofit lamp through a single row of LEDs taken through line 3-3 of FIG. 1.
Figure 4:
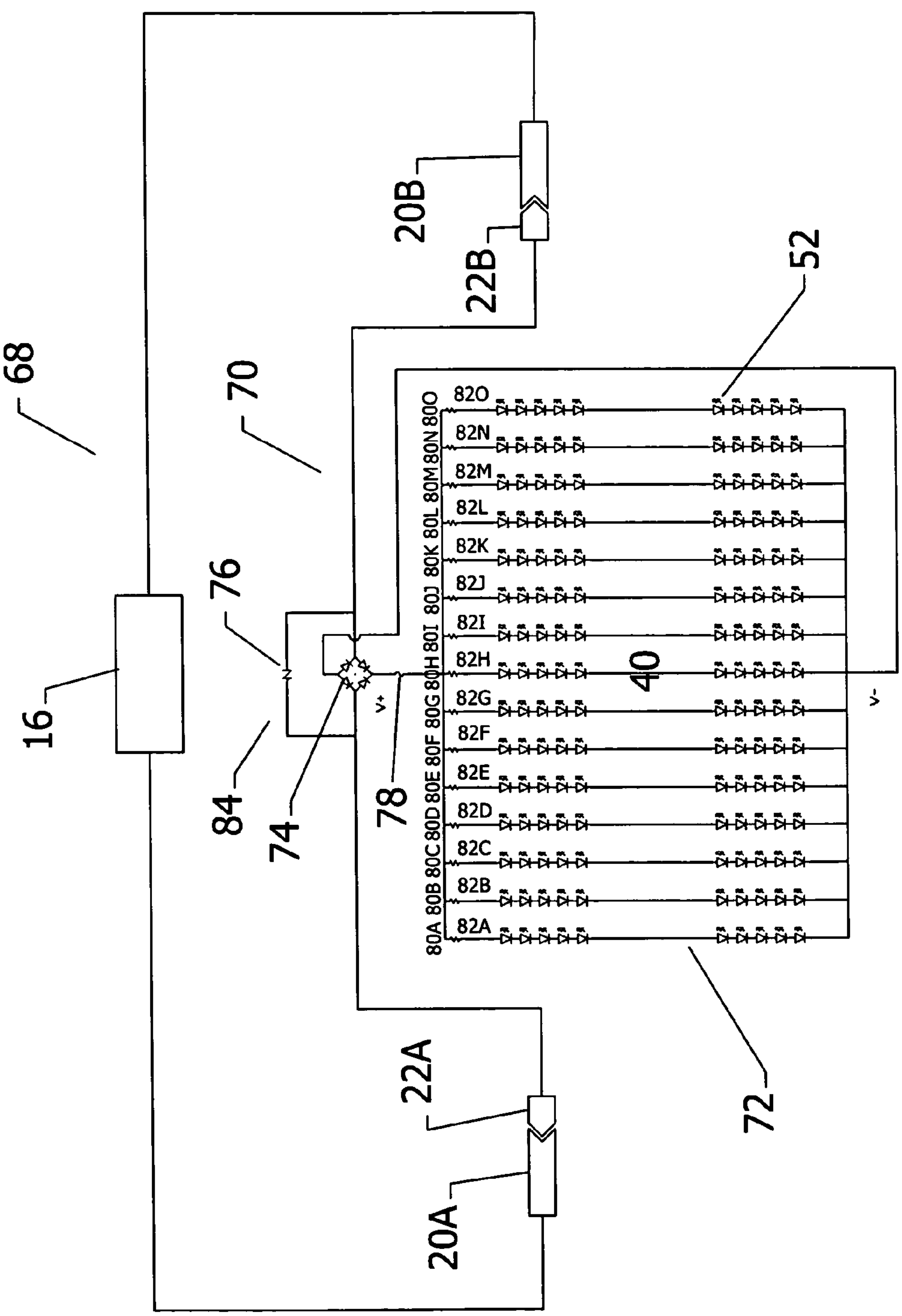
FIG. 4 is an overall electrical circuit for the retrofitted LED lamp shown in FIG. 1 wherein the array of LEDs are arranged in an electrical parallel relationship and shown for purposes of exposition in a flat position.

As shown in the disassembled mode of FIG. 2 and also indicated schematically in FIG. 4, LED lamp 10 includes an elongated housing 24 particularly configured as a tubular wall 26 circular in cross-section taken transverse to a center line 28 that is made of a translucent material such as plastic or glass and preferably having a diffused coating. Tubular wall 26 has opposed tubular wall ends 30A and 30B. LED lamp 10 further includes a pair of opposed lamp base end caps 32A and 32B mounted to single electrical contact pins 22A and 22B, respectively for insertion in ballast electrical socket contacts 20A and 20B in electrical power connection to ballast assembly 16 so as to provide power to LED lamp 10. Tubular wall 26 is mounted to opposed base end caps 32A and 32B at tubular wall ends 30A and 30B in the assembled mode as shown in FIG. 1. LED lamp 10 also includes an electrical LED array circuit board 34 that is cylindrical in configuration. Although this embodiment describes a generally cylindrical configuration, it can be appreciated by someone skilled in the art to form the flexible circuit board 34 into shapes other than a cylinder for example, such as an elongated oval, triangle, rectangle, hexagon, octagon, etc. Accordingly, the shape of the tubular housing 24 holding the individual flexible circuit board 34 can be made in a similar shape to match the shape of the formed flexible circuit board 34 configuration. LED array circuit board 34 is positioned and held within tubular wall 26. In particular, LED array circuit board 34 has opposed circuit board circular ends 36A and 36B that are slightly inwardly positioned from tubular wall ends 30A and 30B, respectively. LED array circuit board 34 has interior and exterior cylindrical sides 38A and 38B, respectively with interior side 38A forming an elongated central passage 37 between tubular wall circular ends 30A and 30B and with exterior side 38B being spaced from tubular wall 26. LED array circuit board 34 is preferably assembled from a material that has a flat preassembled unbiased mode and an assembled self-biased mode as shown in the mounted position in FIGS. 2 and 3 wherein cylindrical sides 38A and 38B press outwardly towards tubular wall 26. LED array circuit board 34 is shown in FIG. 2 and indicated schematically in FIG. 5. LED lamp 10 further includes an LED array 40 comprising one hundred and fifty LEDs mounted to LED array circuit board 34. An integral electronics circuit board 42A is positioned between LED array circuit board 34 and base end cap 32A, and an integral electronics circuit board 42B is positioned between LED array circuit board 34 and base end cap 32B.

Figure 5:
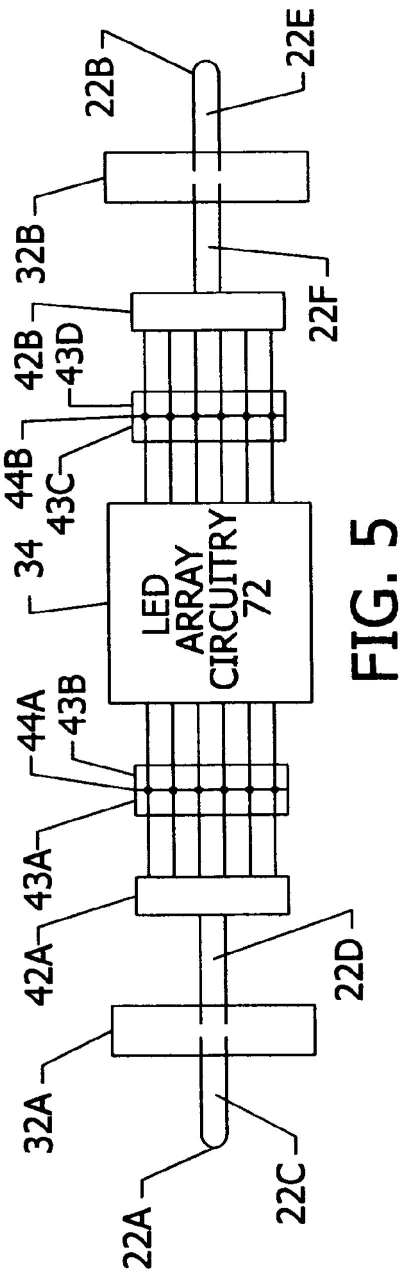
FIG. 5 is a schematic view showing the LED arrays in FIGS. 4 and 4A electrically connected by pin headers and connectors to two opposed integral electronics circuit boards that are electrically connected to base end caps each having a single-pin connection.

As seen in FIGS. 2 and 5, LED lamp 10 also includes a 6-pin connector 43A connected to integral electronics circuit board 42A, and a 6-pin header 44A positioned between and connected to 6-pin connector 43A and LED array circuit board 34. LED lamp 10 also includes a 6-pin connector 43B positioned for connection to 6-pin header 44A and LED array circuit board 34. Also, a 6-pin connector 43C is positioned for connection to LED array circuit board 34 and to a 6-pin header 44B, which is positioned for connection to a 6-pin connector 43D, which is connected to integral electronics circuit board 42B.

LED lamp 10 also includes an optional elongated cylindrical support member 46 defining a central passage 47 that is positioned within elongated housing 24 positioned immediately adjacent to and radially inward relative to and in support of cylindrical LED array electrical LED array circuit board 34. Cylindrical support member 46 is also shown in isolation in FIGS. 8 and 8A. Optional support member 46 is made of an electrically non-conductive material such as rubber or plastic and is rigid in its position. It is preferably made of a self-biasable material and is in a biased mode in the cylindrical position, so that it presses radially outward in support of cylindrical LED array electrical LED array circuit board 34. Optional support member 46 is longitudinally aligned with tubular center line 28 of tubular member 26. Optional support member 46 further isolates integral electronics circuit boards 42A and 42B from LED array circuit board 34 containing the compact LED array 40. Optional support member 46, which is preferably made of a heat conducting material, may operate as a heat sink to draw heat away from LED array circuit board 34 and LED array 40 to the center of elongated housing 24 and thereby dissipating the heat out at the two ends 30A and 30B of tubular wall 26. Optional support member 46 defines cooling holes or holes 48 to allow heat from LED array 40 to flow to the center area of tubular wall 26 and from there to be dissipated at tubular circular ends 30A and 30B.

Figure 3A:
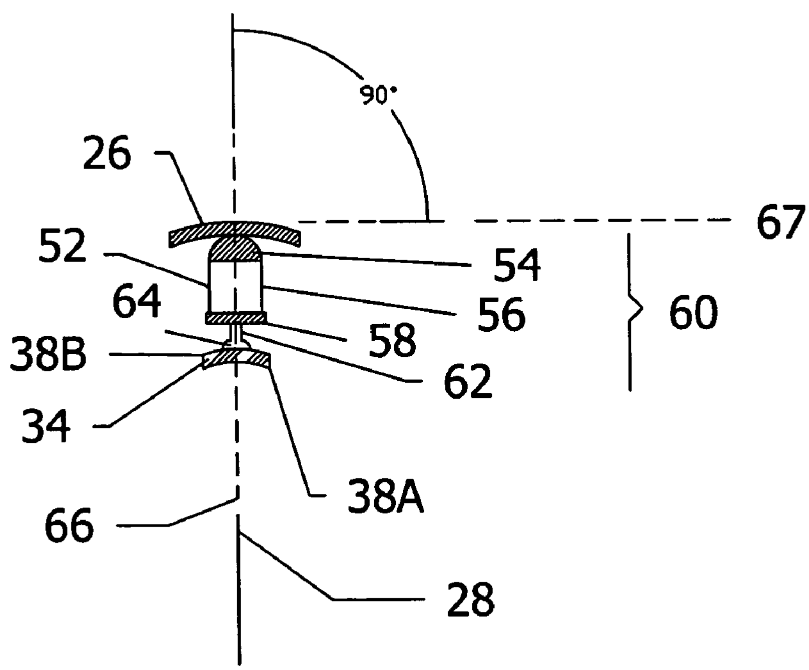
FIG. 3A is a detailed mid-sectional cross-sectional view of a single LED of the LEDs shown in FIG. 3 with portions of the tubular wall and LED circuit board but devoid of the optional linear housing.

The sectional view of FIG. 3 taken through a typical single LED row 50 comprising ten individual LEDs 52 of the fifteen rows of LED array 40 shown in FIG. 4. LED row 50 is circular in configuration, which is representative of each of the fifteen rows of LED array 40 as shown in FIG. 4. Each LED 52 includes a light emitting lens portion 54, a body portion 56, and a base portion 58. A cylindrical space 60 is defined between interior side 38A of LED array circuit board 34 and cylindrical tubular wall 26. Each LED 52 is positioned in space 60 as seen in the detailed view of FIG. 3A, which is devoid of optional linear housing 24. Lens portion 54 is in juxtaposition with the inner surface of tubular wall 26 and base portion 58 is mounted to the outer surface of LED array circuit board 34 in electrical contact therewith. A detailed view of a single LED 52 shows a rigid LED electrical lead 62 extending from LED base portion 58 to LED array circuit board 34 for electrical connection therewith. Lead 62 is secured to LED circuit board 34 by solder 64. An LED center line 66 is aligned transverse to center line 28 of tubular wall 26. As shown in the sectional view of FIG. 3, light is emitted through tubular wall 26 by the ten LEDs 52 in equal strength about the entire circumference of tubular wall 26. Projection of this arrangement is such that all fifteen LED rows 50 are likewise arranged to emit light rays in equal strength the entire length of tubular wall 26 in equal strength about the entire 360-degree circumference of tubular wall 26. The distance between LED center line 66 and LED array circuit board 34 is the shortest that is geometrically possible. In FIG. 3A, LED center line 66 is perpendicular to tubular wall center line 28. FIG. 3A indicates a tangential plane 67 relative to the cylindrical inner surface of linear wall 26 in phantom line at the apex of LED lens portion 54 that is perpendicular to LED center line 66 so that all LEDs 52 emit light through tubular wall 26 in a direction perpendicular to tangential line 67 so that maximum illumination is obtained from all LEDs 52.

FIG. 4 shows the total LED electrical circuitry for LED lamp 10. The total LED circuitry is shown in a schematic format that is flat for purposes of exposition. The total LED circuitry comprises two circuit assemblies, namely, existing ballast assembly circuitry 68 and LED circuitry 70, the latter including LED array circuitry 72, and integral electronics circuitry 84. LED circuitry 70 provides electrical circuits for LED lighting element array 40. When electrical power, normally 120 VAC or 240 VAC at 50 or 60 Hz, is applied, ballast circuitry 68 as is known in the art of instant start ballasts provides either an AC or DC voltage with a fixed current limit across ballast socket electrical contacts 20A and 20B, which is conducted through LED circuitry 70 by way of single contact pins 22A and 22B to a voltage input at a bridge rectifier 74. Bridge rectifier 74 converts AC voltage to DC voltage if ballast circuitry 68 supplies AC voltage. In such a situation wherein ballast circuitry 68 supplies DC voltage, the voltage remains DC voltage even in the presence of bridge rectifier 74.

LEDs 52 have an LED voltage design capacity, and a voltage suppressor 76 is used to protect LED lighting element array 40 and other electronic components primarily including LEDs 52 by limiting the initial high voltage generated by ballast circuitry 68 to a safe and workable voltage.

Bridge rectifier 74 provides a positive voltage V+ to an optional resettable fuse 78 connected to the anode end and also provides current protection to LED array circuitry 72. Fuse 78 is normally closed and will open and de-energize LED array circuitry 72 only if the current exceeds the allowable current through LED array 40. The value for resettable fuse 78 should be equal to or be lower than the maximum current limit of ballast assembly 16. Fuse 78 will reset automatically after a cool-down period.

Ballast circuitry 68 limits the current going into LED circuitry 70. This limitation is ideal for the use of LEDs in general and of LED lamp 10 in particular because LEDs are basically current devices regardless of the driving voltage. The actual number of LEDs will vary in accordance with the actual ballast assembly 16 used. In the example of the embodiment herein, ballast assembly 16 provides a maximum current limit of 300 mA.

LED array circuitry 72 includes fifteen electrical strings 80 individually designated as strings 80A, 80B, 80C, 80D, 80E, 80F, 80G, 80H, 80I,80J, 80K, 80L, 80M, 80N and 80O all in parallel relationship with all LEDs 52 within each string 80A-80O being electrically wired in series. Parallel strings 80 are so positioned and arranged that each of the fifteen strings 80 is equidistant from one another. LED array circuitry 72 includes ten LEDs 52 electrically mounted in series within each of the fifteen parallel strings 80A-O for a total of one-hundred and fifty LEDs 52 that constitute LED array 40. LEDs 52 are positioned in equidistant relationship with one another and extend generally the length of tubular wall 26, that is, generally between tubular wall ends 30A and 30B. As shown in FIG. 4, each of strings 80A-80O includes an optional resistor 82 designated individually as resistors 82A, 82B, 82C, 82D, 82E, 82F, 82G, 82H, 82I, 82J, 82K, 82L, 82M, 82N, and 82O in respective series alignment with strings 80A-80O at the current input for a total of fifteen resistors 82. The current limiting resistors 82A-82O are purely optional, because the existing fluorescent ballast used here is already a current limiting device. The resistors 82A-82O then serve as secondary protection devices. A higher number of individual LEDs 52 can be connected in series within each LED string 80. The maximum number of LEDs 52 being configured around the circumference of the 1.5-inch diameter of tubular wall 26 in the particular example herein of LED lamp 10 is ten. Each LED 52 is configured with the anode towards the positive voltage V+ and the cathode towards the negative voltage V−. When LED array circuitry 72 is energized, the positive voltage that is applied through resistors 82A-82O to the anode end circuit strings 80A-80O and the negative voltage that is applied to the cathode end of circuit strings 80A-80O will forward bias LEDs 52 connected to strings 80A-80O and cause LEDs 52 to turn on and emit light.

Ballast assembly 16 regulates the electrical current through LEDs 52 to the correct value of 20 mA for each LED 52. The fifteen LED strings 80 equally divide the total current applied to LED array circuitry 72. Those skilled in the art will appreciate that different ballasts provide different current outputs.

If the forward drive current for LEDs 52 is known, then the output current of ballast assembly 16 divided by the forward drive current gives the exact number of parallel strings of LEDs 52 in the particular LED array, here LED array 40. The total number of LEDs in series within each LED string 80 is arbitrary since each LED 52 in each LED string 80 will see the same current. Again in this example, ten LEDs 52 are shown connected in series within each LED string 80 because of the fact that only ten LEDs 52 of the 5 mm discrete type of LED will fit around the circumference of a 1.5-inch diameter lamp housing. Ballast assembly 16 provides 300 mA of current, which when divided by the fifteen LED strings 80 of ten LEDs 52 per LED string 80 gives 20 mA per LED string 80. Each of the ten LEDs 52 connected in series within each LED string 80 sees this 20 mA. In accordance with the type of ballast assembly 16 used, when ballast assembly 16 is first energized, a high voltage may be applied momentarily across ballast socket contacts 20A and 20B, which conduct to pin contacts 22A and 22B. Such high voltage is normally used to help ignite a fluorescent tube and establish conductive phosphor gas, but high voltage is unnecessary for LED array circuitry 72 and voltage surge absorber 76 absorbs the voltage applied by ballast circuitry 68, so that the initial high voltage supplied is limited to an acceptable level for the circuit. Optional resettable fuse 78 is also shown to provide current protection to LED array circuitry 72.

Figure 4A:
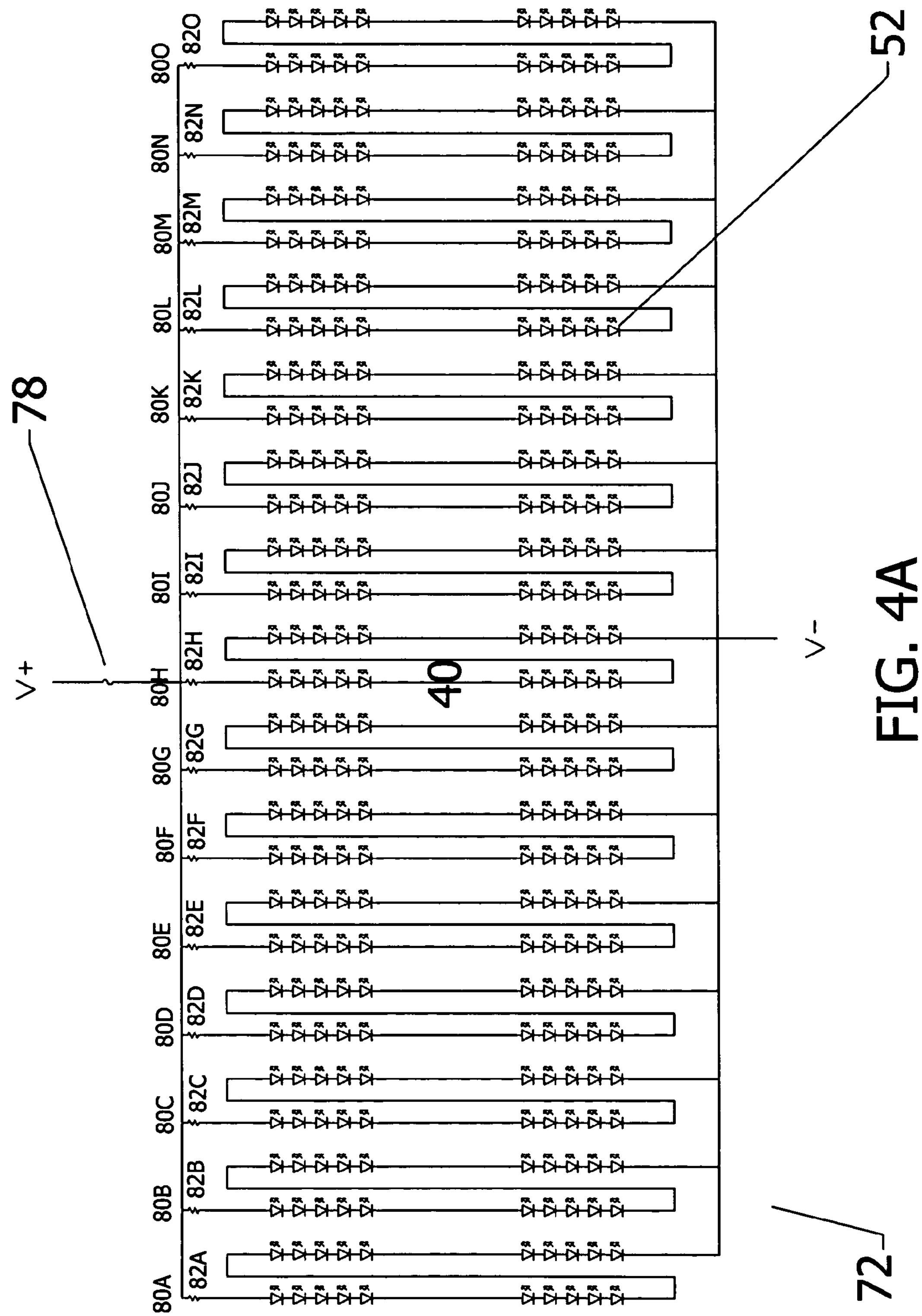
FIG. 4A is an alternate arrangement of the array of LEDs arranged in an electrical parallel relationship shown for purposes of exposition in a flat position for the overall electrical circuit analogous to the overall electrical circuit shown in FIG. 4 for the LED retrofit lamp.

As can be seen from FIG. 4A, there can be more than ten LEDs 52 connected in series within each string 80A-80O. There are twenty LEDs 52 in this example, but there can be more LEDs 52 connected in series within each string 80A-80O. The first ten LEDs 52 of each parallel string will fill the first 1.5-inch diameter of the circumference of tubular wall 26, the second ten LEDs 52 of the same parallel string will fill the next adjacent 1.5-inch diameter of the circumference of tubular wall 26, and so on until the entire length of the tubular wall 26 is substantially filled with all LEDs 52 comprising the total LED array 40.

LED array circuitry 72 includes fifteen electrical LED strings 80 individually designated as strings 80A, 80B, 80C, 80D, 80E, 80F, 80G, 80H, 80I, 80J, 80K, 80L, 80M, 80N and 80O all in parallel relationship with all LEDs 52 within each string 80A-80O being electrically wired in series. Parallel strings 80 are so positioned and arranged that each of the fifteen strings 80 is equidistant from one another. LED array circuitry 72 includes twenty LEDs 52 electrically mounted in series within each of the fifteen parallel strings 80A-O for a total of three-hundred LEDs 52 that constitute LED array 40. LEDs 52 are positioned in equidistant relationship with one another and extend generally the length of tubular wall 26, that is, generally between tubular wall ends 30A and 30B. As shown in FIGS. 4 and 4A, each of strings 80A-80O includes an optional resistor 82 designated individually as resistors 82A, 82B, 82C, 82D, 82E, 82F, 82G, 82H, 82I, 82J, 82K, 82L, 82M, 82N, and 82O in respective series alignment with strings 80A-80O at the current input for a total of fifteen resistors 82. Again, a higher number of individual LEDs 52 can be connected in series within each LED string 80. The maximum number of LEDs 52 being configured around the circumference of the 1.5-inch diameter of tubular wall 26 in the particular example herein of LED lamp 10 is ten. Each LED 52 is configured with the anode towards the positive voltage V+ and the cathode towards the negative voltage V−. When LED array circuitry 72 is energized, the positive voltage that is applied through resistors 82A-82O to the anode end circuit strings 80A-80O and the negative voltage that is applied to the cathode end of circuit strings 80A-80O will forward bias LEDs 52 connected to strings 80A-80O and cause LEDs 52 to turn on and emit light.

Ballast assembly 16 regulates the electrical current through LEDs 52 to the correct value of 20 mA for each LED 52. The fifteen LED strings 80 equally divide the total current applied to LED array circuitry 72. Those skilled in the art will appreciate that different ballasts provide different current outputs.

If the forward drive current for LEDs 52 is known, then the output current of ballast assembly 16 divided by the forward drive current gives the exact number of parallel strings of LEDs 52 in the particular LED array, here LED array 40. The total number of LEDs in series within each LED string 80 is arbitrary since each LED 52 in each LED string 80 will see the same current. Again in this example, twenty LEDs 52 are shown connected in series within each LED string 80 because of the fact that only ten LEDs 52 of the 5 mm discrete type of LED will fit around the circumference of a 1.5-inch diameter lamp housing. Ballast assembly 16 provides 300 mA of current, which when divided by the fifteen strings 80 of ten LEDs 52 per LED string 80 gives 20 mA per LED string 80. Each of the twenty LEDs 52 connected in series within each LED string 80 sees this 20 mA. In accordance with the type of ballast assembly 16 used, when ballast assembly 16 is first energized, a high voltage may be applied momentarily across ballast socket contacts 20A and 20B, which conduct to pin contacts 22A and 22B. Such high voltage is normally used to help ignite a fluorescent tube and establish conductive phosphor gas, but high voltage is unnecessary for LED array circuitry 72 and voltage surge absorber 76 absorbs the voltage applied by ballast circuitry 68, so that the initial high voltage supplied is limited to an acceptable level for the circuit.

Figure 4B:
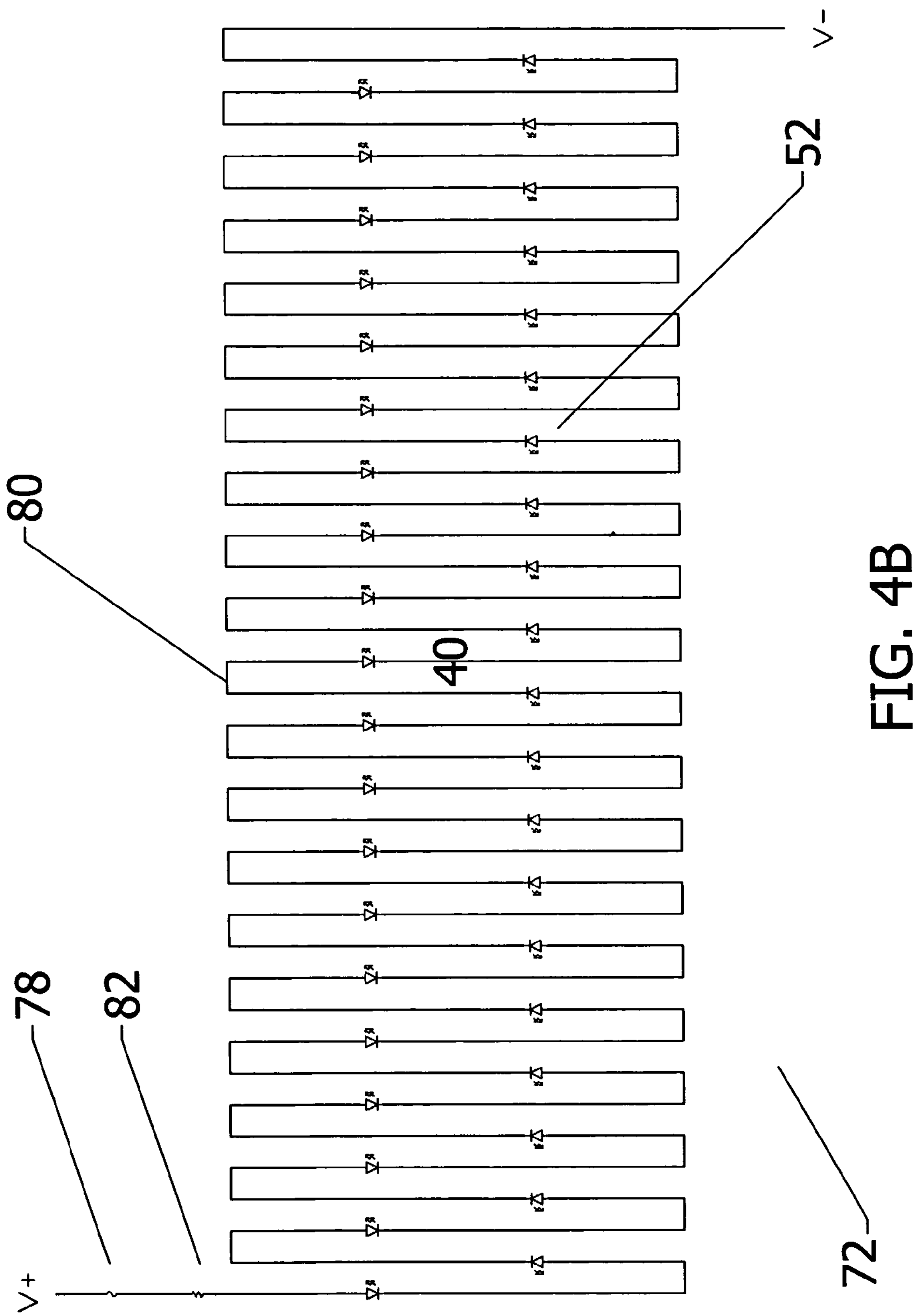
FIG. 4B is another alternate arrangement of an array of LEDs arranged in an electrical series relationship shown for purposes of exposition in a flat compressed position for an overall electrical circuit analogous to the electrical circuit shown in FIG. 4 for the LED retrofit lamp.

FIG. 4B shows another alternate arrangement of LED array circuitry 72. LED array circuitry 72 consists of a single LED string 80 of LEDs 52 arranged in series relationship including for exposition purposes only forty LEDs 52 all electrically connected in series. Positive voltage V+ is connected to optional resettable fuse 78, which in turn is connected to one side of current limiting resistor 82. The anode of the first LED in the series string is then connected to the other end of resistor 82. A number other than forty LEDs 52 can be connected within the series LED string 80 to fill up the entire length of the tubular wall of the present invention. The cathode of the first LED 52 in the series LED string 80 is connected to the anode of the second LED 52; the cathode of the second LED 52 in the series LED string 80 is then connected to the anode of the third LED 52, and so forth. The cathode of the last LED 52 in the series LED string 80 is likewise connected to ground or the negative potential V−. The individual LEDs 52 in the single series LED string 80 are so positioned and arranged such that each of the forty LEDs is spaced equidistant from one another substantially filling the entire length of tubular wall 26. LEDs 52 are positioned in equidistant relationship with one another and extend substantially the length of tubular wall 26, that is, generally between tubular wall ends 30A and 30B. As shown in FIG. 4B, the single series LED string 80 includes an optional resistor 82 in respective series alignment with single series LED string 80 at the current input. Each LED 52 is configured with the anode towards the positive voltage V+ and the cathode towards the negative voltage V−. When LED array circuitry 72 is energized, the positive voltage that is applied through resistor 82 to the anode end of single series LED string 80 and the negative voltage that is applied to the cathode end of single series LED string 80 will forward bias LEDs 52 connected in series within single series LED string 80, and cause LEDs 52 to turn on and emit light.

The single series LED string 80 of LEDs 52 as described above works ideally with the high-brightness or brighter high flux white LEDs available from Lumileds and Nichia in the SMD (surface mounted device) packages as discussed earlier herein. Since these new devices require more current to drive them and run on low voltages, the high current available from existing fluorescent ballast outputs with current outputs of 300 mA and higher, along with their characteristically higher voltage outputs provide the perfect match for the present invention. The high-brightness LEDs 52A have to be connected in series, so that each high-brightness LED 52A within the same single LED string 80 will see the same current and therefore output the same brightness. The total voltage required by all the high-brightness LEDs 52A within the same single LED string 80 is equal to the sum of all the individual voltage drops across each high-brightness LED 52A and should be less than the maximum voltage output of ballast assembly 16.

Figure 4C:
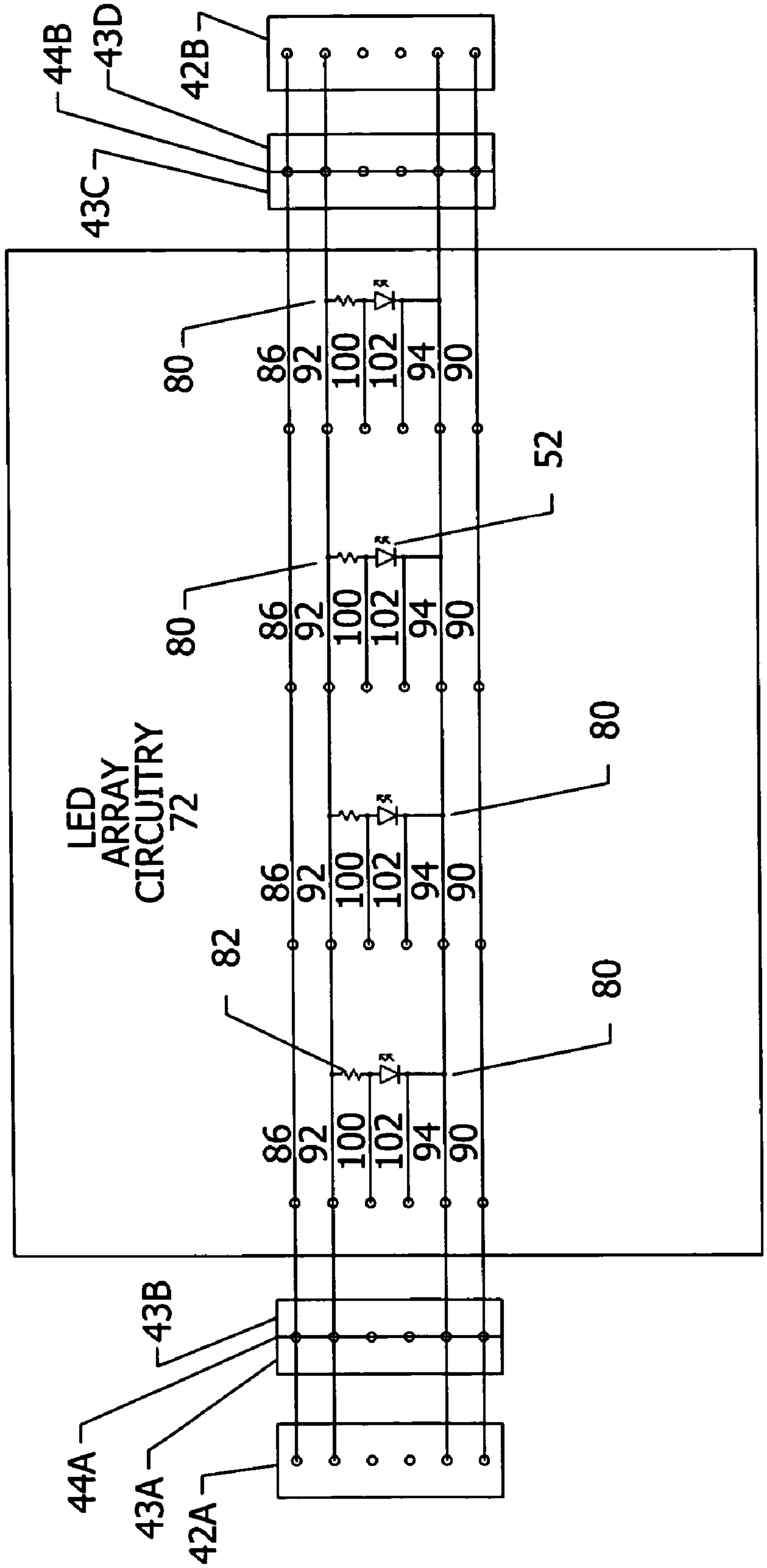
FIG. 4C is a simplified arrangement of the array of LEDs shown for purposes of exposition in a flat compressed position for the overall electrical circuit shown in FIG. 4 including lead lines and pin headers and connectors for the LED retrofit lamp.

FIG. 4C shows a simplified arrangement of the LED array circuitry 72 of LEDs 52 shown for purposes of exposition in a flat compressed position for the overall electrical circuit shown in FIG. 4. AC lead lines 86 and 90 and DC positive lead line 92 and DC negative lead line 94 are connected to integral electronics circuit boards 42A and 42B by way of 6-pin headers 44A and 44B and connectors 43A-43D. Four parallel LED strings 80 each including a resistor 82 are each connected to DC positive lead line 92 on one side, and to LED positive lead line 100 or the anode side of each LED 52 and on the other side. The cathode side of each LED 52 is then connected to LED negative lead line 102 and to DC negative lead line 94 directly. AC lead lines 86 and 90 simply pass through LED array circuitry 72.

Figure 4D:
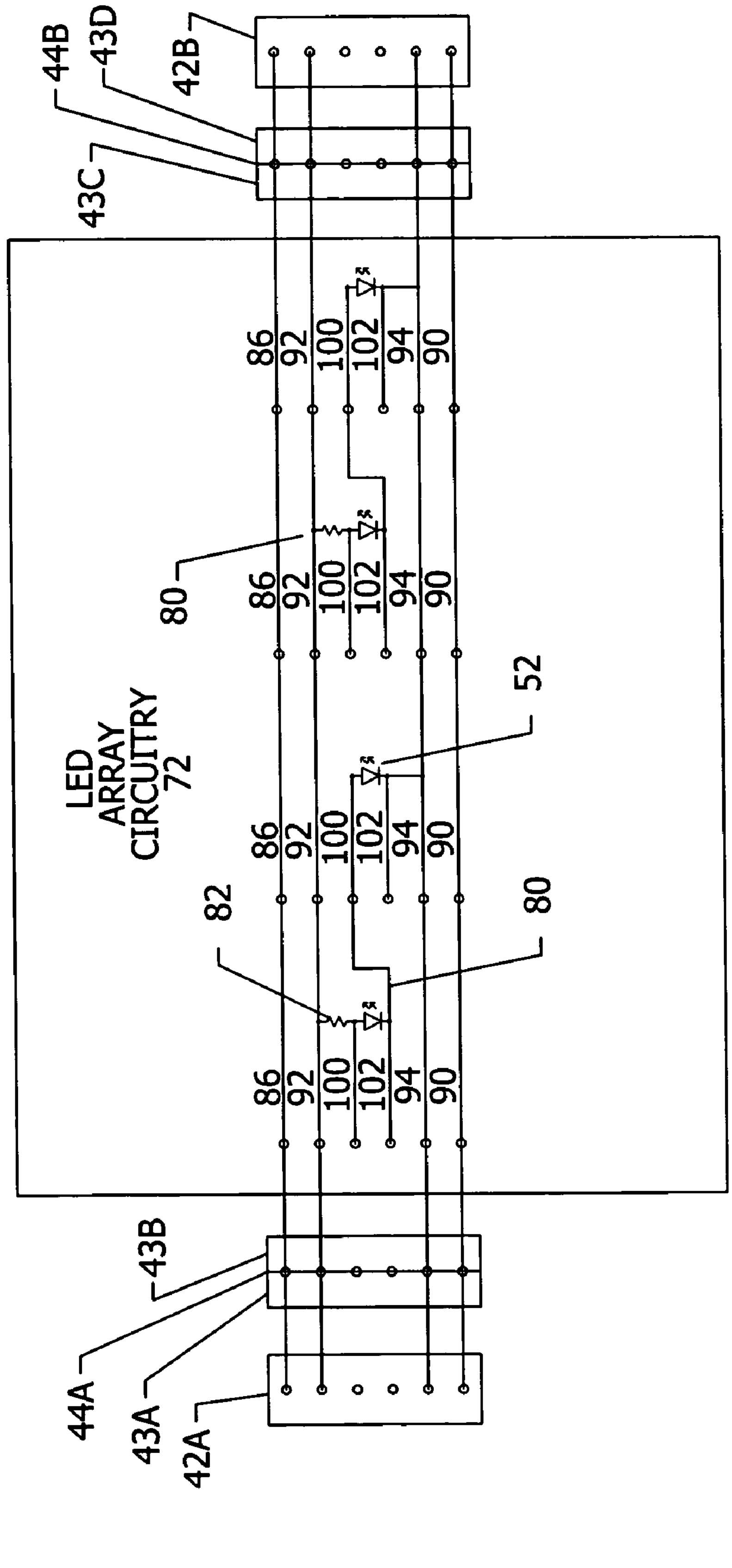
FIG. 4D is a simplified arrangement of the array of LEDs shown for purposes of exposition in a flat compressed position for the overall electrical circuit shown in FIG. 4A including lead lines and pin headers and connectors for the LED retrofit lamp.

FIG. 4D shows a simplified arrangement of the LED array circuitry 72 of LEDs 52 shown for purposes of exposition in a flat compressed position for the overall electrical circuit shown in FIG. 4A. AC lead lines 86 and 90 and DC positive lead line 92 and DC negative lead line 94 are connected to integral electronics boards 42A and 42B by way of 6-pin headers 44A and 44B and connectors 43A-43D. Two parallel LED strings 80 each including a single resistor 82 are each connected to DC positive lead line 92 on one side, and to LED positive lead line 100 or the anode side of the first LED 52 in each LED string 80 on the other side. The cathode side of the first LED 52 is connected to LED negative lead line 102 and to adjacent LED positive lead line 100 or the anode side of the second LED 52 in the same LED string 80. The cathode side of the second LED 52 is then connected to LED negative lead line 102 and to DC negative lead line 94 directly in the same LED string 80. AC lead lines 86 and 90 simply pass through LED array circuitry 72.

Figure 4E:
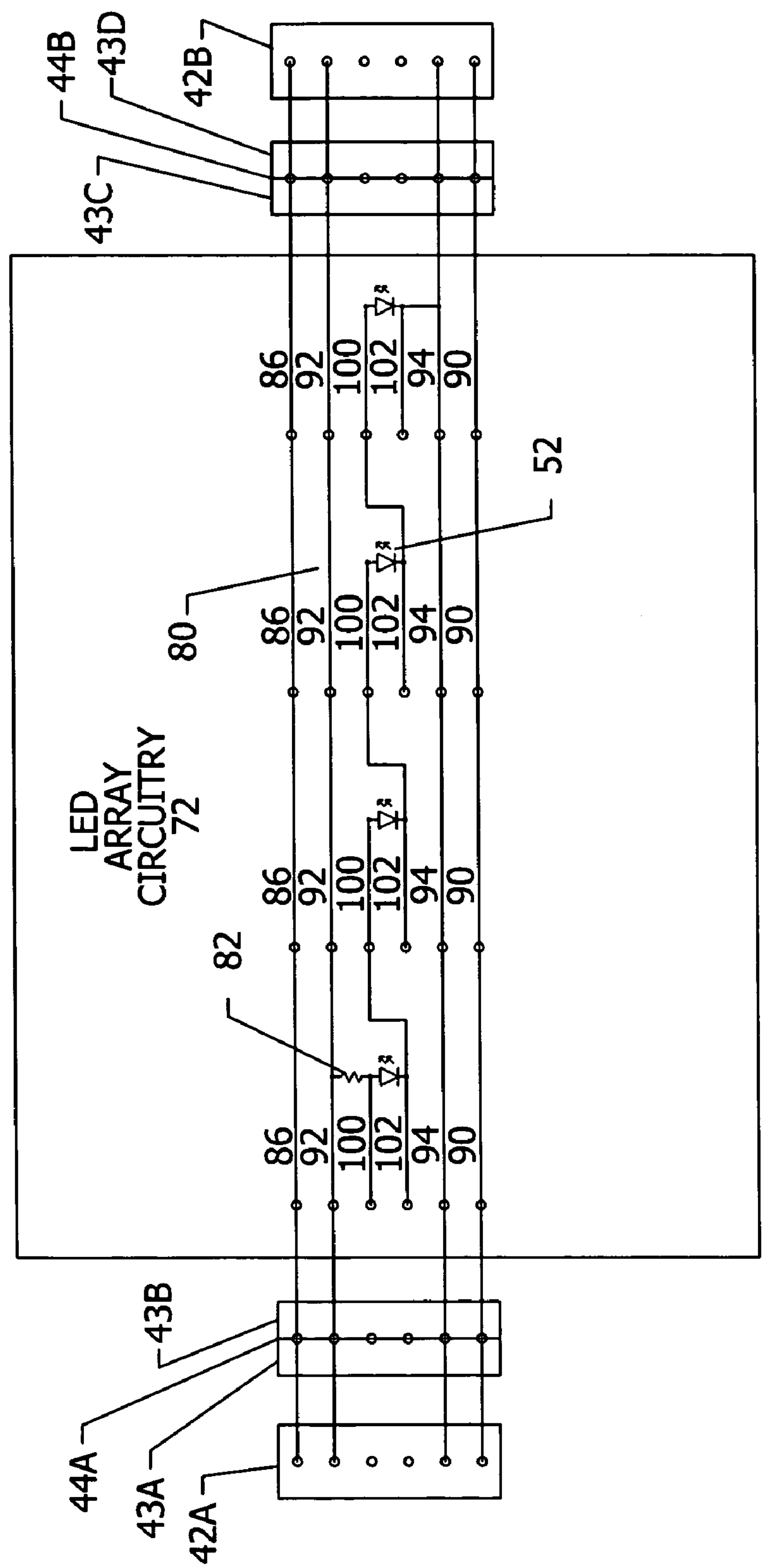
FIG. 4E is a simplified arrangement of the array of LEDs shown for purposes of exposition in a flat compressed position for the overall electrical circuit shown in FIG. 4B including lead lines and pin headers and connectors for the LED retrofit lamp.

FIG. 4E shows a simplified arrangement of the LED array circuitry 72 of LEDs 52 shown for purposes of exposition in a flat compressed position for the overall electrical circuit shown in FIG. 4B. AC lead lines 86 and 90 and DC positive lead line 92 and DC negative lead line 94 are connected to integral electronics boards 42A and 42B by way of 6-pin headers 44A and 44B and connectors 43A-43D. Single parallel LED string 80 including a single resistor 82 is connected to DC positive lead line 92 on one side, and to LED positive lead line 100 or the anode side of the first LED 52 in the LED string 80 on the other side. The cathode side of the first LED 52 is connected to LED negative lead line 102 and to adjacent LED positive lead line 100 or the anode side of the second LED 52. The cathode side of the second LED 52 is connected to LED negative lead line 102 and to adjacent LED positive lead line 100 or the anode side of the third LED 52. The cathode side of the third LED 52 is connected to LED negative lead line 102 and to adjacent LED positive lead line 100 or the anode side of the fourth LED 52. The cathode side of the fourth LED 52 is then connected to LED negative lead line 102 and to DC negative lead line 94 directly. AC lead lines 86 and 90 simply pass through LED array circuitry 72.

The term high-brightness as describing LEDs herein is a relative term. In general, for the purposes of the present application, high-brightness LEDs refer to LEDs that offer the highest luminous flux outputs. Luminous flux is defined as lumens per watt. For example, Lumileds Luxeon high-brightness LEDs produce the highest luminous flux outputs at the present time. Luxeon 5-watt high-brightness LEDs offer extreme luminous density with lumens per package that is four times the output of an earlier Luxeon 1-watt LED and up to 50 times the output of earlier discrete 5 mm LED packages. Gelcore is soon to offer an equivalent and competitive product.

Figure 4F:
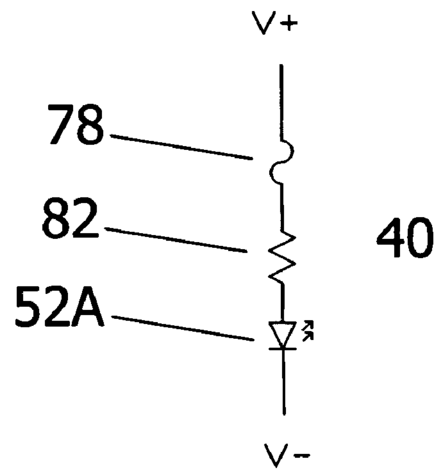
FIG. 4F shows a single high-brightness LED positioned on a single string in electrical series arrangement shown for purposes of exposition in a flat compressed mode for the overall electrical circuit shown in FIG. 4 for the retrofit lamp.

With the new high-brightness LEDs in mind, FIG. 4F shows a single high-brightness LED 52A positioned on an electrical string in what is defined herein as an electrical series arrangement with single a high-brightness LED 52A for the overall electrical circuit shown in FIG. 4. The single high-brightness LED 52A fulfills a particular lighting requirement formerly fulfilled by a fluorescent lamp.

Figure 4G:
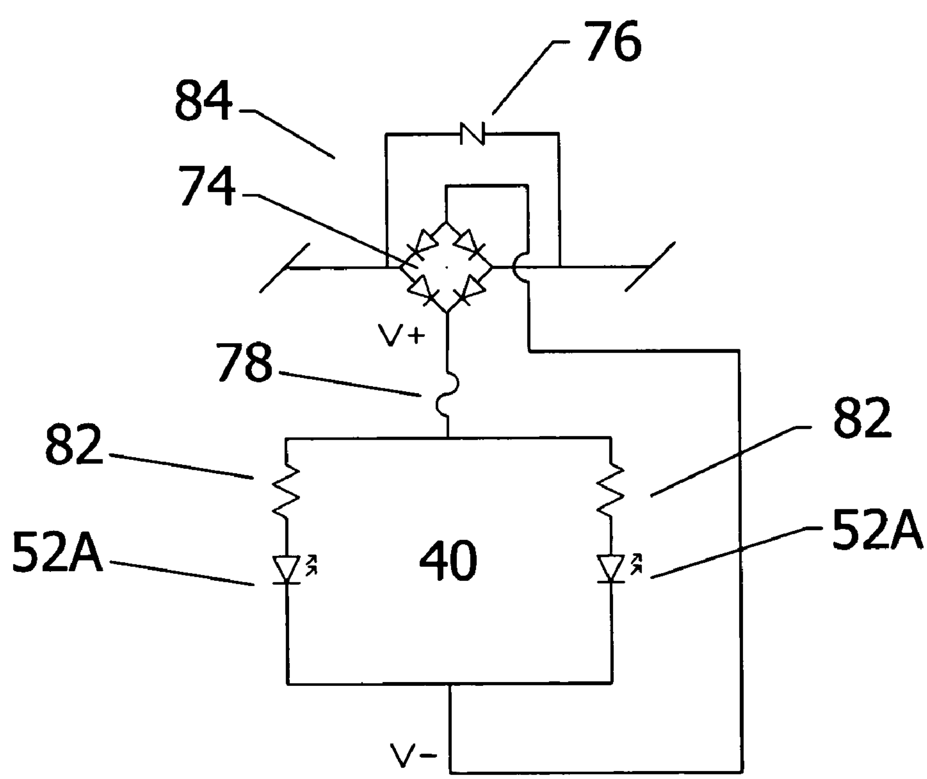
FIG. 4G shows two high-brightness LEDs in an electrical parallel arrangement of two parallel strings with one high-brightness LED positioned on each of the two parallel strings shown for purposes of exposition in a flat compressed mode for the overall electrical circuit shown in FIG. 4 for the retrofit lamp.

Likewise, FIG. 4G shows two high-brightness LEDs 52A in electrical parallel arrangement with one high-brightness LED 52A positioned on each of the two parallel strings for the overall electrical circuit shown in FIG. 4. The two high-brightness LEDs 52A fulfill a particular lighting requirement formerly fulfilled by a fluorescent lamp.

The single LED string 80 of SMD LEDs 52 connected in series can be mounted onto a long thin strip flexible circuit board made of polyimide or equivalent material. The flexible circuit board 34 is then spirally wrapped into a generally cylindrical configuration. Although this embodiment describes a generally cylindrical configuration, it can be appreciated by someone skilled in the art to form the flexible circuit board 34 into shapes other than a cylinder, such as an elongated oval, triangle, rectangle, hexagon, and octagon, as some examples of a wide possible variation of configurations. Accordingly, the shape of the tubular housing 24 holding the single wrapped flexible circuit board 34 can be made in a similar shape to match the shape of the formed flexible circuit board 34 configuration.

LED array circuit board 34 is positioned and held within tubular wall 26. As in FIGS. 2 and 5, LED array circuit board 34 has opposed circuit board circular ends 36A and 36B that are slightly inwardly positioned from tubular wall ends 30A and 30B, respectively. LED array circuit board 34 has interior and exterior cylindrical sides 38A and 38B, respectively with interior side 38A forming an elongated central passage 37 between tubular wall circular ends 30A and 30B with exterior side 38B being spaced from tubular wall 26. LED array circuit board 34 is preferably assembled from a material that has a flat preassembled unbiased mode and an assembled self-biased mode wherein cylindrical sides 38A and 38B press outwardly towards tubular wall 26. The SMD LEDs 52 are mounted on exterior cylindrical side 38B with the lens 54 of each LED 52 held in juxtaposition with tubular wall 25 and pointing radially outward from center line 28. As shown in the sectional view of FIG. 3, light is emitted through tubular wall 26 by LEDs 52 in equal strength about the entire 360-degree circumference of tubular wall 26.

As described earlier in FIGS. 2 and 5, an optional support member 46 is made of an electrically non-conductive material such as rubber or plastic and is held rigid in its position. It is preferably made of a self-biasable material and is in a biased mode in the cylindrical position, so that it presses radially outward in holding support of cylindrical LED array electrical LED array circuit board 34. Optional support member 46 is longitudinally aligned with tubular center line 28 of tubular member 26. Optional support member 46 further isolates integral electronics circuit boards 42A and 42B from LED array circuit board 34 containing the compact LED array 40. Optional support member 46, which is preferably made of a heat conducting material, may operate as a heat sink to draw heat away from LED array circuit board 34 and LED array 40 to the center of elongated housing 24 and thereby dissipating the heat out at the two ends 30A and 30B of tubular wall 26. Optional support member 46 defines cooling holes or holes 48 to allow heat from LED array 40 to flow to the center area of tubular wall 26 and from there to be dissipated at tubular circular ends 30A and 30B.

Ballast assembly 16 regulates the electrical current through LEDs 52 to the correct value of 300 mA or other ballast assembly 16 rated lamp current output for each LED 52. The total current is applied to both the single LED string 80 and to LED array circuitry 72. Again, those skilled in the art will appreciate that different ballasts provide different rated lamp current outputs.

If the forward drive current for LEDs 52 is known, then the output current of ballast assembly 16 divided by the forward drive current gives the exact number of parallel strings 80 of LEDs 52 in the particular LED array, here LED array 40 shown in electrically parallel configuration in FIG. 4 and in electrically series configurations in FIGS. 4A and 4B. Since the forward drive current for LEDs 52 is equal to the output current of ballast assembly 16, then the result is a single series LED string 80 of LEDs 52. The total number of LEDs in series within each series LED string 80 is arbitrary since each LED 52 in each series LED string 80 will see the same current. Again in this example shown in FIG. 4B, forty LEDs 52 are shown connected within series LED string 80. Ballast assembly 16 provides 300 mA of current, which when divided by the single series LED string 80 of forty LEDs 52 gives 300 mA for single series LED string 80. Each of the forty LEDs 52 connected in series within single series LED string 80 sees this 300 mA. In accordance with the type of ballast assembly 16 used, when ballast assembly 16 is first energized, a high voltage may be applied momentarily across ballast socket contacts 20A and 20B, which conduct to pin contacts 22A and 22B. Such high voltage is normally used to help ignite a fluorescent tube and establish conductive phosphor gas, but high voltage is unnecessary for LED array circuitry 72 and voltage surge absorber 76 absorbs the voltage applied by ballast circuitry 68, so that the initial high voltage supplied is limited to an acceptable level for the circuit.

It can be seen from someone skilled in the art from FIGS. 4, 4A, and 4B that the LED array 40 can consist of at least one parallel electrical LED string 80 containing at least one LED 52 connected in series within each parallel electrical LED string 80. Therefore, the LED array 40 can consist of any number of parallel electrical strings 80 combined with any number of LEDs 52 connected in series within electrical strings 80, or any combination thereof.

FIGS. 4C, 4D, and 4E show simplified electrical arrangements of the array 40 of LEDs 52 shown with at least one LED 52 in a series parallel configuration. Each LED string 80 has an optional resistor 82 in series with each LED 52.

As shown in the schematic electrical and structural representations of FIG. 5, LED array circuit board 34 of LED array 40 is positioned between integral electronics circuit board 42A and 42B that in turn are electrically connected to ballast circuitry 68 by single contact pins 22A and 22B, respectively. Single contact pins 22A and 22B are mounted to and protrude out from base end caps 32A and 32B, respectively, for electrical connection to integral electronics circuit boards 42A and 42B. Contact pins 22A and 22B are soldered directly to integral electronics circuit boards 42A and 42B, respectively. In particular, pin inner extension 22D of connecting pin 22A is electrically connected by being soldered directly to the integral electronics circuit board 42A. Similarly, being soldered directly to integral electronics circuit board 42B electrically connects pin inner extension 22F of connecting pin 22B. 6-pin connector 44A is shown positioned between and in electrical connection with integral electronics circuit board 42A and LED array circuit board 34 and LED circuitry 70 shown in FIG. 4 mounted thereon. 6-pin connector 44B is shown positioned between and in electrical connection with integral electronics circuit board 42B and LED array circuit board 34 and LED circuitry 70 mounted thereon.

Figure 6:
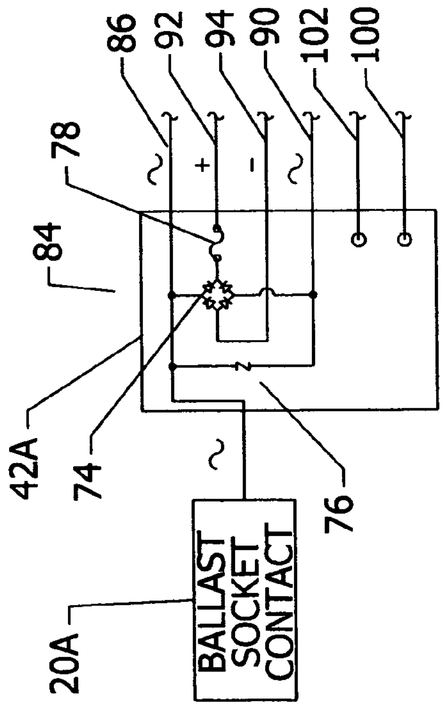
FIG. 6 is a schematic circuit of one of the two integral electronics circuit boards shown in FIG. 5 positioned at one side of the alternating current voltage emanating from the ballast for the LED array shown in FIGS. 4 and 4A.

As seen in FIG. 6, a schematic of integral electronics circuitry 84 is mounted on integral electronics circuit board 42A. Integral electronics circuit 84 is also shown in FIG. 4 as part of the schematically shown LED circuitry 70. Integral electronics circuitry 84 is in electrical contact with ballast socket contact 20A, which is shown as providing AC voltage. Integral electronics circuitry 84 includes bridge rectifier 74, voltage surge absorber 76, and fuse 78. Bridge rectifier 74 converts AC voltage to DC voltage. Voltage surge absorber 76 limits the high voltage to a workable voltage within the design voltage capacity of LEDs 52. The DC voltage circuits indicated as plus (+) and minus (−) and indicated as DC leads 92 and 94 lead to and from LED array 40 (not shown). It is noted that FIG. 6 indicates the presence of AC voltage by an AC wave symbol ~. Each AC voltage could be DC voltage supplied by certain ballast assemblies 16 as mentioned earlier herein. In such a case DC voltage would be supplied to LED lighting element array 40 even in the presence of bridge rectifier 74. It is particularly noted that in such a case, voltage surge absorber 76 would remain operative.

Figure 7:
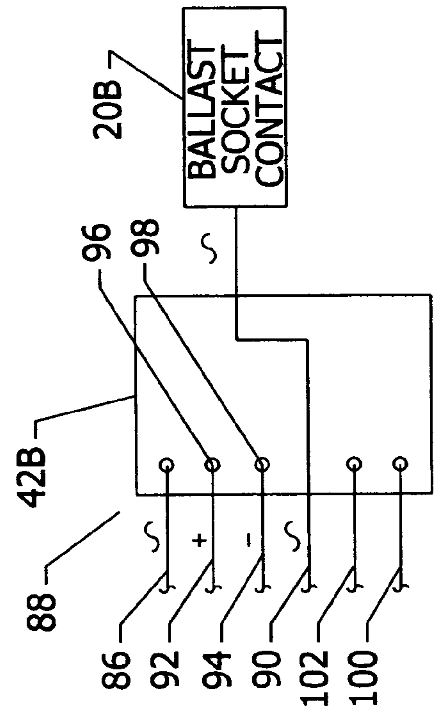
FIG. 7 is a schematic circuit of the other of the two integral electronics circuit boards shown in FIG. 5 positioned at the other side of the alternating current voltage emanating from the ballast for the LED array shown in FIGS. 4 and 4A.

FIG. 7 shows a further schematic of integral electronics circuit 42B that includes integral electronics circuitry 88 mounted on integral electronics board 42B with voltage protected AC lead line 90 extending from LED array 40 (not shown) and by extension from integral electronics circuitry 84. The AC lead line 90 having passed through voltage surge absorber 76 is a voltage protected circuit and is in electrical contact with ballast socket contact 20B. Integral circuitry 88 includes DC positive and DC negative lead lines 92 and 94, respectively, from LED array circuitry 72 to positive and negative DC terminals 96 and 98, respectively, mounted on integral electronics board 42B. Integral circuitry 88 further includes AC lead line 90 from LED array circuitry 72 to ballast socket contact 20B.

FIGS. 6 and 7 show the lead lines going into and out of LED circuitry 70 respectively. The lead lines include AC lead lines 86 and 90, positive DC voltage 92, DC negative voltage 94, LED positive lead line 100, and LED negative lead line 102. The AC lead lines 86 and 90 are basically feeding through LED circuitry 70, while the positive DC voltage lead line 92 and negative DC voltage lead line 94 are used primarily to power the LED array 40. DC positive lead line 92 is the same as LED positive lead line 100 and DC negative lead line 94 is the same as LED negative lead line 102. LED array circuitry 72 therefore consists of all electrical components and internal wiring and connections required to provide proper operating voltages and currents to LEDs 52 connected in parallel, series, or any combinations of the two.

Figure 8:
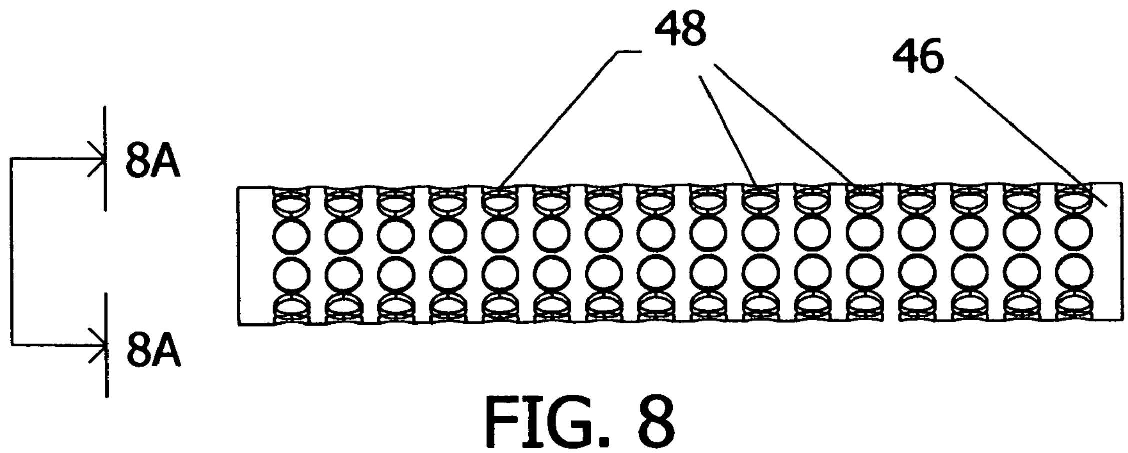
FIG. 8 is an isolated side view of the cylindrical internal support shown in FIGS. 2 and 3.
Figure 8A:
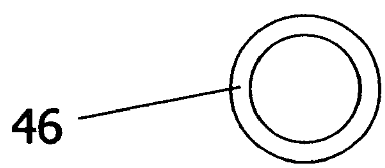
FIG. 8A is an end view taken through line 8A-8A in FIG. 8.

FIGS. 8 and 8A show the optional support member 46 with cooling holes 48 in both side and cross-sectional views respectively.

Figure 9:
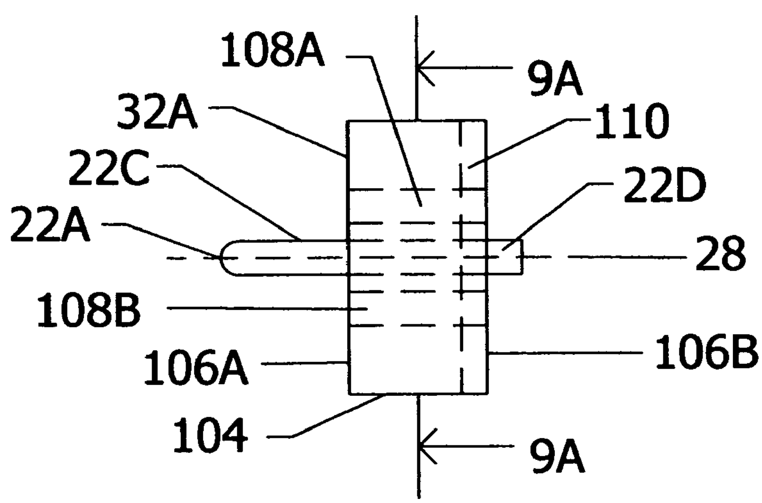
FIG. 9 is a side view of an isolated single-pin end cap shown in FIGS. 1 and 5.
Figure 9A:
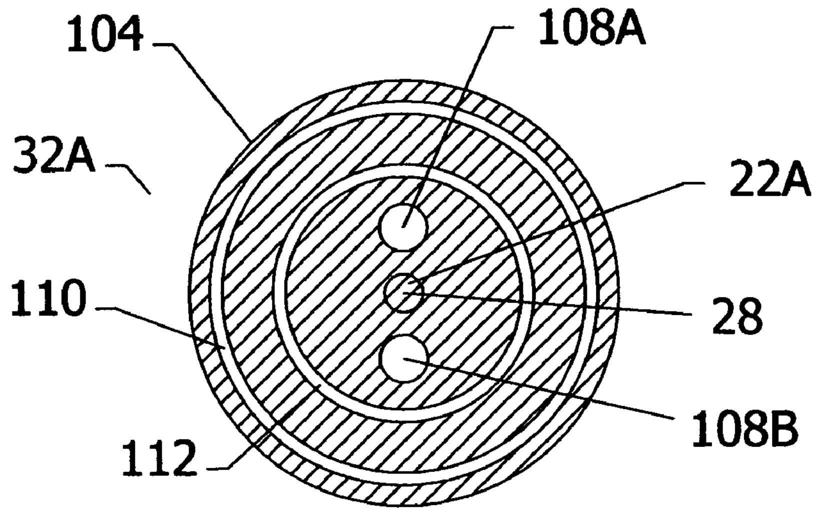
FIG. 9A is a sectional view taken through line 9A-9A of the end cap shown in FIG. 9.

FIG. 9 shows an isolated view of one of the base end caps, namely, base end cap 32A, which is the same as base end cap 32B, mutatis mutandis. Single-pin contact 22A extends directly through the center of base end cap 32A in the longitudinal direction in alignment with center line 28 of tubular wall 26 relative to tubular wall 26. Single-pin 22A as also shown in FIG. 1 where single-pin contact 22A is mounted into ballast socket contact 20A. Single-pin contact 22A also includes pin extension 22D that is outwardly positioned from base end cap 32A in the direction towards tubular wall 26. Base end cap 32A is a solid cylinder in configuration as seen in FIGS. 9 and 9A and forms an outer cylindrical wall 104 that is concentric with center line 28 of tubular wall 26 and has opposed flat end walls 106A and 106B that are perpendicular to center line 28. Two cylindrical parallel vent holes 108A and 108B are defined between flat end walls 106A and 106B spaced directly above and below and lateral to single-pin contact 22A. Single-pin contact 22A includes external side pin extension 22C and internal side pin extension 22D that each extend outwardly positioned from opposed flat end walls 106A and 106B, respectively, for electrical connection with ballast socket contact 20A and with integral electronics board 42A. Analogous external and internal pin extensions for contact pin 22B likewise exist for electrical connections with ballast socket contact 20B and with integral electronics board 42B.

As also seen in FIG. 9A, base end cap 32A defines an outer circular slot 110 that is concentric with center line 28 of tubular wall 26 and concentric with and aligned proximate to circular wall 104. Circular slot 110 is spaced from cylindrical wall 104 at a convenient distance. Circular slot 110 is of such a width and circular end 30A of tubular wall 26 is of such a thickness that circular end 30A is fitted into circular slot 110 and is thus supported by circular slot 110. Base end cap 32B (not shown in detail) defines another circular slot (not shown) analogous to circular slot 110 that is likewise concentric with center line 28 of tubular wall 26 so that circular end 30B of tubular wall 26 can be fitted into the analogous circular slot of base end cap 32B wherein circular end 30B is also supported. In this manner tubular wall 26 is mounted to end caps 32A and 32B.

As also seen in FIG. 9A, base end cap 32A defines another inner circular slot 112 that is concentric with center line 28 of tubular wall 26 and concentric with and spaced radially inward from circular slot 110. Circular slot 112 is spaced from circular slot 110 at such a distance that would be occupied by LEDs 52 mounted to LED array circuit board 34 within tubular wall 26. Circular slot 112 is of such a width and circular end 36A of LED array circuit board 34 is of such a thickness that circular end 36A is fitted into circular slot 112 and is thus supported by circular slot 112. Base end cap 32B (not shown) defines another circular slot analogous to circular slot 112 that is likewise concentric with center line 28 of tubular wall 26 so that circular end 36B of LED array circuit board 34 can be fitted into the analogous circular slot of base end cap 32B wherein circular end 36B is also supported. In this manner LED array circuit board 34 is mounted to end caps 32A and 32B.

Circular ends 30A and 30B of tubular wall 26 and also circular ends 36A and 36B of LED array circuit board 34 are secured to base end caps 32A and 32B preferably by gluing in a manner known in the art. Other securing methods known in the art of attaching such as cross-pins or snaps can be used.

An analogous circular slot (not shown) concentric with center line 28 is optionally formed in flat end walls 106A and 106B of base end cap 32A and analogous circular slot in the flat end walls of base end cap 32B radially inward from LED circuit board circular slot 112 for insertion of the opposed ends of optional support member 46.

Circular ends 30A and 30B of tubular wall 26 are optionally press fitted to circular slot 110 of base end cap 32A and the analogous circular slot of base end cap 32B.

Figure 10:
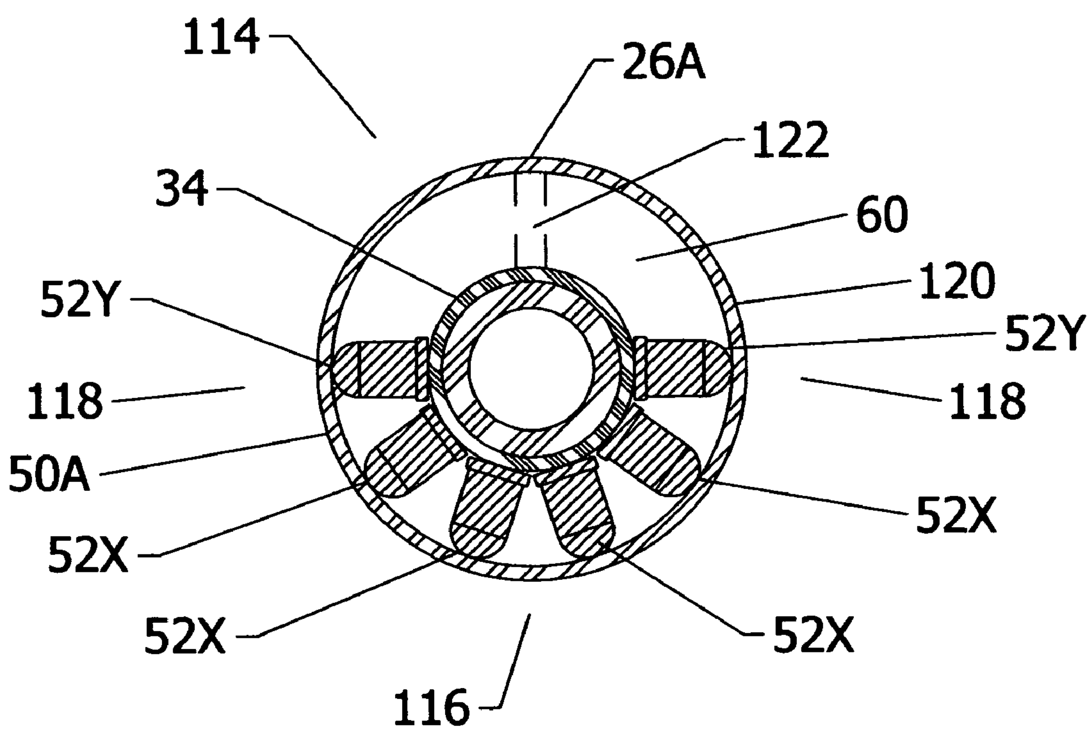
FIG. 10 is an alternate sectional view to the sectional view of the LED retrofit lamp taken through a single row of LEDs shown in FIG. 3.

FIG. 10 is a sectional view of an alternate LED lamp 114 mounted to tubular wall 26 that is a version to LED lamp 10 as shown in FIG. 3. The sectional view of LED lamp 114 shows a single row 50A of the LEDs of LED lamp 114 and includes a total of six LEDs 52, with four LEDs 52X being positioned at equal intervals at the bottom area 116 of tubular wall 26 and with two LEDs 52Y positioned at opposed side areas 118 of tubular wall 26A. LED array circuitry 72 previously described with reference to LED lamp 10 would be the same for LED lamp 114. That is, all fifteen strings 80 of the LED array of LED lamp 10 would be the same for LED lamp 114, except that a total of ninety LEDs 52 would comprise LED lamp 114 with the ninety LEDs 52 positioned at strings 80 at such electrical connectors that would correspond with LEDs 52X and 52Y throughout. The reduction to ninety LEDs 52 of LED lamp 114 from the one hundred and fifty LEDs 52 of LED lamp 10 would result in a forty percent reduction of power demand with an illumination result that would be satisfactory under certain circumstances. Additional stiffening of LED array circuit board 34 for LED lamp 114 is accomplished by circular slot 112 for tubular wall 26 or optionally by the additional placement of LEDs 52 at the top vertical position in space 60 (not shown) or optionally a vertical stiffening member 122 shown in phantom line that is positioned at the upper area of space 60 between LED array circuit board 34 and the inner side of tubular wall 26 and extends the length of tubular wall 26 and LED array circuit board 34.

LED lamp 10 as described above will work for both AC and DC voltage outputs from an existing fluorescent ballast assembly 16. In summary, LED array 40 will ultimately be powered by DC voltage. If existing fluorescent ballast 16 operates with an AC output, bridge rectifier 74 converts the AC voltage to DC voltage. Likewise, if existing fluorescent ballast 16 operates with a DC voltage, the DC voltage remains a DC voltage even after passing through bridge rectifier 26.

Figures 11, 11A:
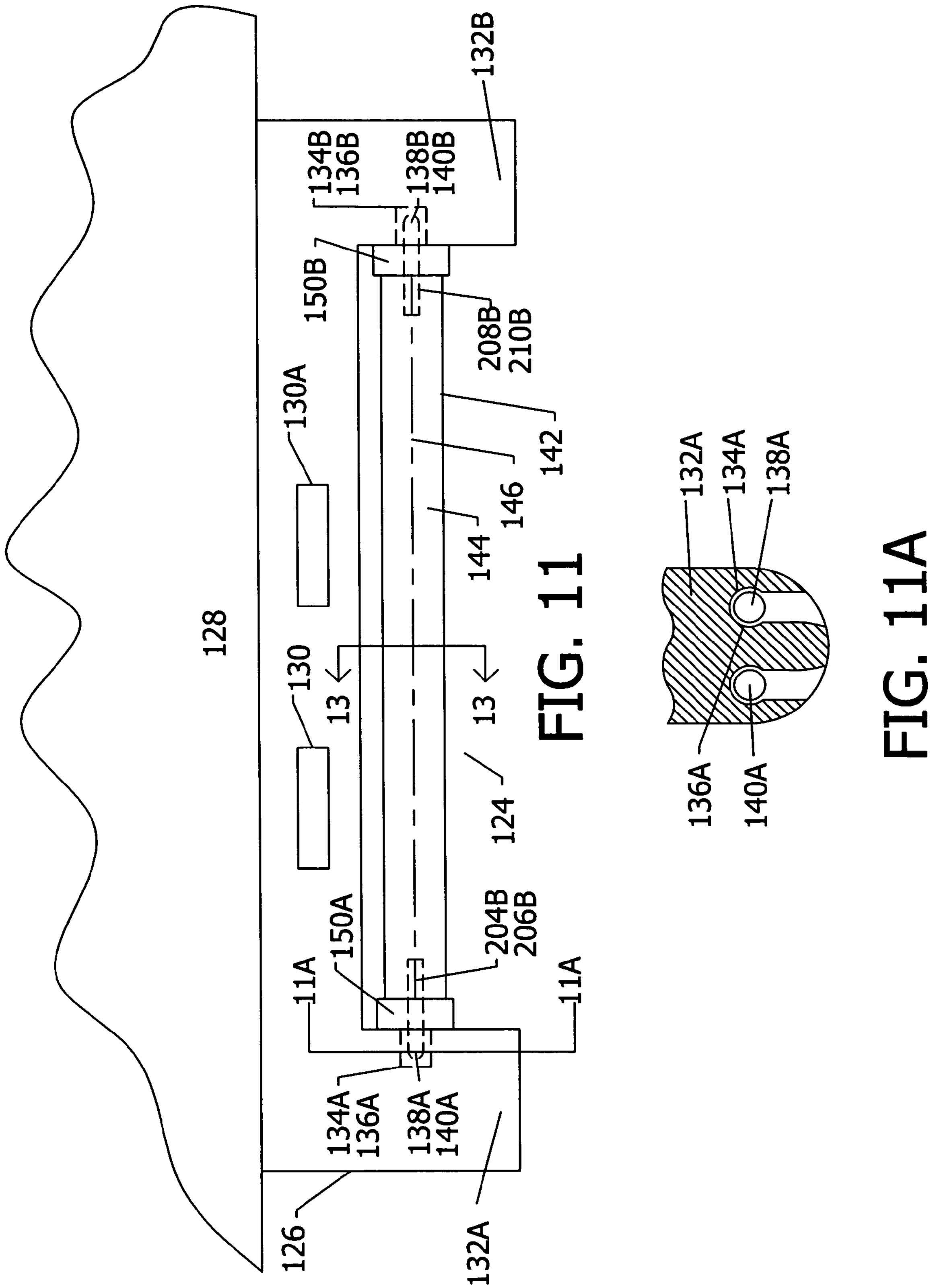
FIG. 11 is an elevational side view of a retrofitted LED lamp mounted to an existing fluorescent fixture having an electronic rapid start, hybrid, or magnetic ballast having a pair of double contact electrical socket connectors.
FIG. 11A is a detailed end view of the LED retrofit lamp taken through line 11A-11A of FIG. 11 showing a bi-pin electrical connector.

Another embodiment of a retrofitted LED lamp is shown in FIGS. 11-20. FIG. 11 shows an LED lamp 124 retrofitted to an existing elongated fluorescent fixture 126 mounted to a ceiling 128. A rapid start type ballast assembly 130 including a starter 130A is positioned within the upper portion of fixture 126. Fixture 126 further includes a pair of fixture mounting portions 132A and 132B extending downwardly from the ends of fixture 126 that include ballast electrical contacts shown in FIG. 11A as ballast double contact sockets 134A and 136A and ballast opposed double contact sockets 134A and 136B that are in electrical contact with ballast assembly 130. Ballast double contact sockets 134A, 136A and 134B, 136B are each double contact sockets in accordance with the electrical operational requirement of a rapid start type ballast. As also seen in FIG. 11A, LED lamp 124 includes bi-pin electrical contacts 138A and 140A that are positioned in ballast double contact sockets 134A and 136A, respectively. LED lamp 124 likewise includes opposed bi-pin electrical contacts 138B and 140B that are positioned in ballast double contact sockets 134B and 136B, respectively. In this manner, LED lamp 124 is in electrical contact with ballast assembly 130.

Figure 12:
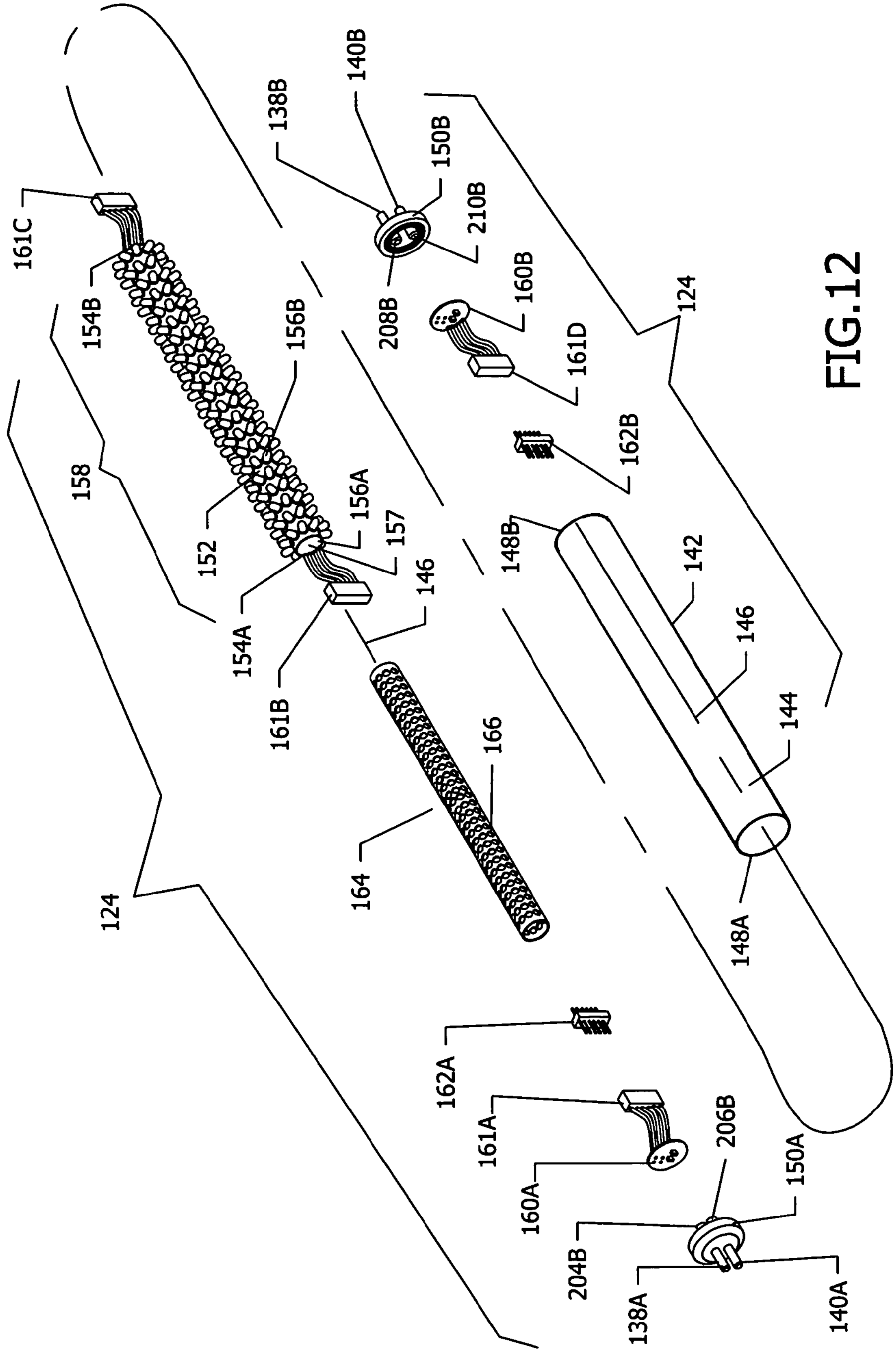
FIG. 12 is an exploded perspective view of the LED retrofit lamp shown in FIG. 11 taken in isolation.
Figure 14:
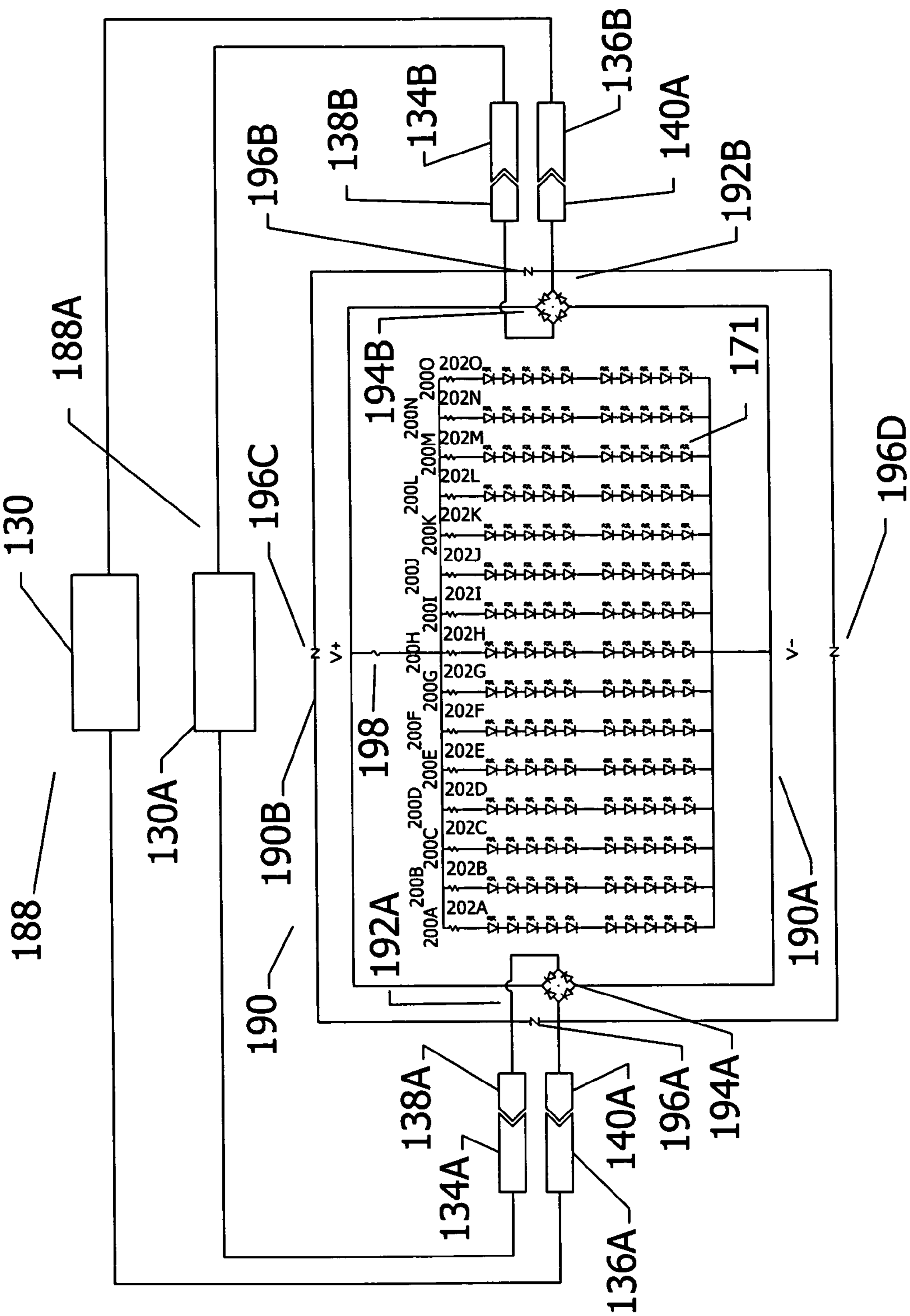
FIG. 14 is an overall electrical circuit for the retrofitted LED lamp shown in FIG. 11 wherein the array of LEDs are arranged in an electrical parallel relationship and shown for purposes of exposition in a flat position.

As shown in the disassembled mode of FIG. 12 and also indicated schematically in FIG. 14, LED lamp 124 includes an elongated tubular housing 142 particularly configured as a tubular wall 144 circular in cross-section taken transverse to a center line 146. Tubular wall 144 is made of a translucent material such as plastic or glass and preferably has a diffused coating. Tubular wall 144 has opposed tubular wall circular ends 148A and 148B. LED lamp 124 further includes a pair of opposed lamp base end caps 150A and 150B mounted to bi-pin electrical contacts 138A, 140A and 138B, 140B, respectively, for insertion in ballast electrical socket contacts 134A, 136A and 134B, 136B, respectively, in electrical power connection to ballast assembly 130 so as to provide power to LED lamp 124. Tubular wall 144 is mounted to opposed base end caps 150A and 150B at tubular wall circular ends 148A and 148B, respectively, in the assembled mode as shown in FIG. 11. LED lamp 124 also includes an LED array electrical circuit board 152 that is cylindrical in configuration and has opposed circuit board circular ends 154A and 154B.

It can be appreciated by someone skilled in the art to form the flexible circuit board 152 into shapes other than a cylinder, such as an elongated oval, triangle, rectangle, hexagon, octagon, among many possible configurations when the elongated tubular housing 142 has a like configuration. It can also be said that the shape of the tubular housing 142 holding the individual flexible circuit board 152 can be made in a similar shape to match the shape of the formed flexible circuit board 152 frame. Circuit board 152 is positioned and held within tubular wall 144. In particular, circuit board 152 has opposed circuit board ends 154A and 154B that are slightly inwardly positioned from tubular wall ends 148A and 148B, respectively. Circuit board 152 has opposed interior and exterior cylindrical sides 156A and 156B, respectively with exterior side 156B being spaced from tubular wall 144. Circuit board 152 is preferably assembled from a material that has a flat preassembled unbiased mode and an assembled self-biased mode as shown in the mounted position in FIGS. 12 and 13 wherein cylindrical sides 156A and 156B press outwardly towards tubular wall 144. Circuit board 152 is shown in FIG. 12 and indicated schematically in FIG. 14. LED lamp 124 further includes an LED array 158 comprising one hundred and fifty LEDs mounted to circuit board 152. An integral electronics circuit board 160A is positioned between circuit board 152 and base end cap 150A, and an integral electronics circuit board 160B is positioned between circuit board 152 and base end cap 150B.

Figure 15:
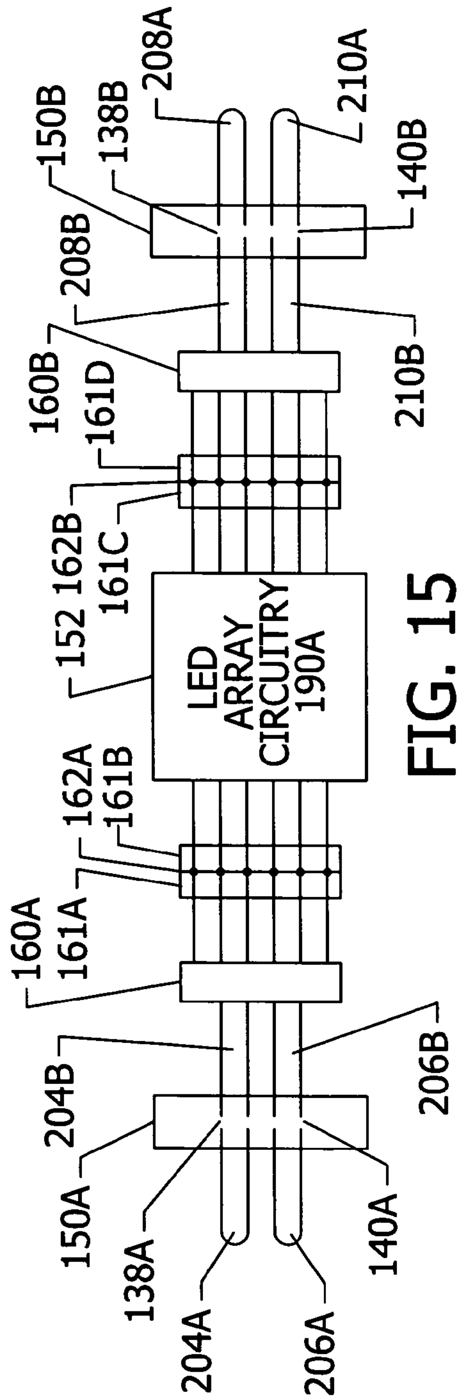
FIG. 15 is a schematic view showing the LED array in FIGS. 14 and 14A electrically connected by pin headers and connectors to two opposed integral electronics circuit boards that are electrically connected to base end caps each having a bi-pin connections.

As seen in FIGS. 12 and 15, LED lamp 124 also includes a 6-pin connector 161A connected to integral electronics circuit board 160A, and a 6-pin header 162A positioned between and connected to 6-pin connector 161A and circuit board 152. LED lamp 124 also includes a 6-pin connector 161B positioned for connection to 6-pin header 162A and circuit board 152. Also, a 6-pin connector 161C is positioned for connection to circuit board 152 and to a 6-pin header 162B, which is positioned for connection to a 6-pin connector 161D, which is connected to integral electronics circuit board 160B.

LED lamp 124 also includes an optional elongated cylindrical support member 164 that is positioned within elongated housing 142 positioned immediately adjacent to and radially inward relative to and in support of LED array electrical circuit board 152. Optional support member 164 is also shown in isolation in FIGS. 18 and 18A. Optional support member 164 is made of an electrically non-conductive material such as rubber or plastic and is rigid in its position. It is preferably made of a self-biasable material and is in a biased mode in the cylindrical position, so that it presses radially outward in support of cylindrical LED array electrical circuit board 152. Optional support member 164 is longitudinally and cylindrically aligned with tubular center line 146 of tubular wall 144. Optional support member 164 further isolates integral electronics circuit boards 160A and 160B from LED array circuit board 152 containing the circuitry for LED array 158. Optional support member 164, which may be made of a heat conducting material, can operate as a heat sink to draw heat away from LED circuit board 152 including the circuitry for LED array 158 to the center of elongated housing 142 and thereby dissipating the heat at the two ends 148A and 148B of tubular wall 144. Optional support member 164 defines cooling holes or holes 166 to allow heat from LED array 158 to flow into the center area of tubular wall 144 and from there to be dissipated at tubular circular ends 148A and 148B.

Figure 13:
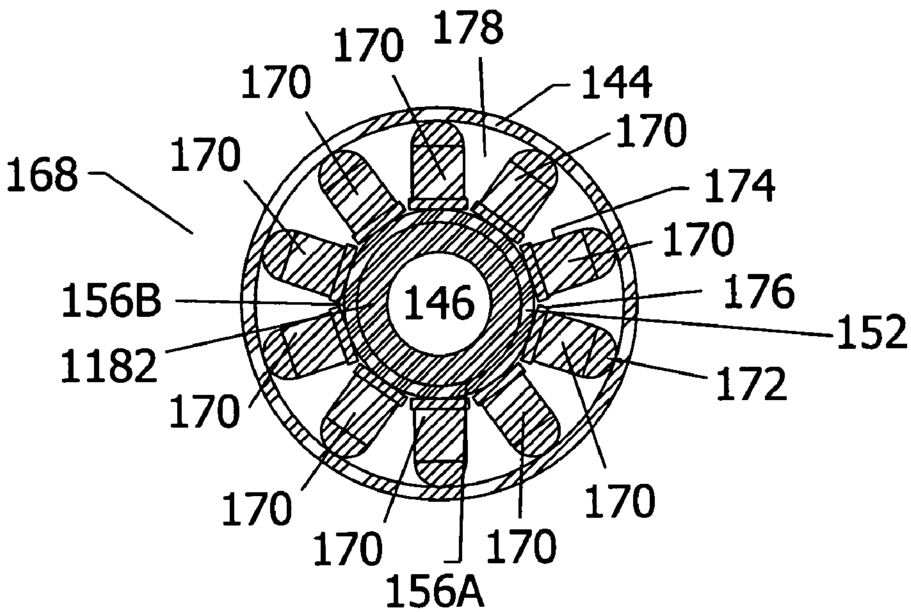
FIG. 13 is a cross-sectional view of the LED retrofit lamp through a single row of LEDs taken through line 13-13 of FIG. 11.
Figure 13A:
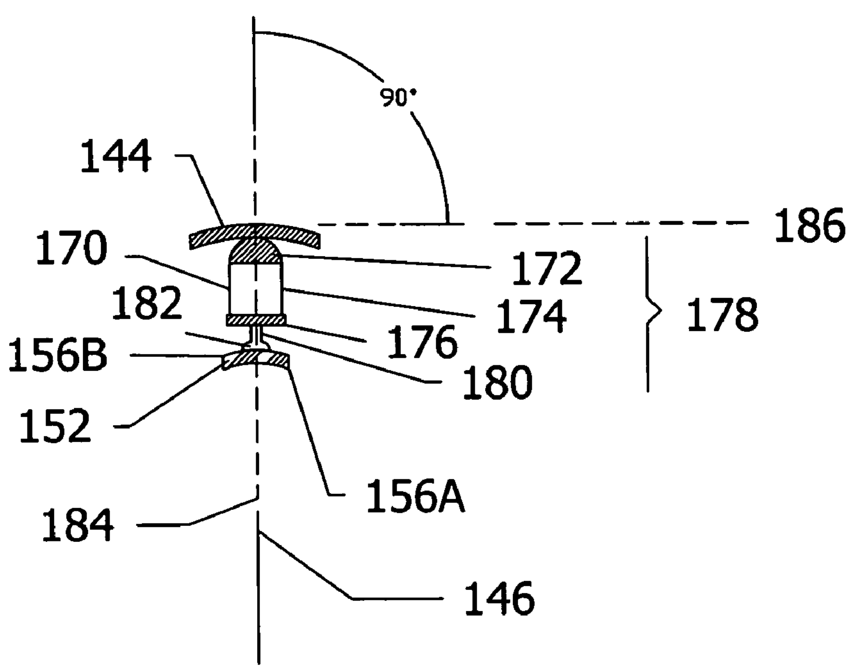
FIG. 13A is a detailed mid-sectional cross-sectional view of a single LED of the LEDs shown in FIG. 13 with portions of the tubular wall and LED circuit board but devoid of the optional linear housing.

The sectional view of FIG. 13 taken through a typical single LED row 168 comprises ten individual LEDs 170 of the fifteen rows of LED array 158 is shown in FIG. 14. LED row 168 is circular in configuration, which is representative of each of the fifteen rows of LED array 158 as shown in FIG. 14. Each LED 170 includes an LED light emitting lens portion 172, an LED body portion 174, and an LED base portion 176. A cylindrical space 178 is defined between exterior side 156B of circuit board 152 and cylindrical tubular wall 144. Each LED 170 is positioned in space 178 as seen in the detailed view of FIG. 13A, which is devoid of optional support member 164. LED lens portion 172 is positioned in proximity with the inner surface of tubular wall 144, and LED base portion 176 is mounted proximate to the outer surface of LED array circuit board 152 in electrical contact with electrical elements thereon in a manner known in the art. A detailed view in FIG. 13A of a single LED 170 shows a rigid LED electrical lead 180 extending from LED base portion 176 to LED array circuit board 152 for electrical connection therewith. Lead 180 is secured to LED array circuit board 152 by solder 182. An LED center line 184 is aligned transverse to center line 146 of tubular wall 144 and as seen in FIG. 13A in particular perpendicular to center line 146. As shown in the sectional view of FIG. 13, light is emitted through tubular wall 144 by the ten LEDs 170 in equal strength about the entire circumference of tubular wall 144. Projection of this arrangement is such that all fifteen LED rows 168 are likewise arranged to emit light rays in equal strength the entire length of tubular wall 144 in equal strength about the entire 360-degree circumference of tubular wall 144. The distance between LED center line 184 and LED circuit board 152 is the shortest that is geometrically possible. FIG. 13A indicates a tangential line 186 relative to the cylindrical inner surface of tubular wall 144 in phantom line at the apex of LED lens portion 172 that is perpendicular to LED center line 184 so that all LEDs 170 emit light through tubular wall 144 in a direction perpendicular to tangential line 186 so that maximum illumination is obtained from all LEDs 170. Each LED 170 is designed to operate within a specified LED operating voltage capacity.

FIG. 14 shows a complete electrical circuit for LED lamp 124, which is shown in a schematic format that is flat for purposes of exposition. The complete LED circuit comprises two major circuit assemblies, namely, existing ballast circuitry 188, which includes starter circuit 188A, and LED circuitry 190. LED circuitry 190 includes integral electronics circuitry 192A and 192B, which are associated with integral electronics circuit boards 160A and 160B. LED circuitry 190 also includes an LED array circuitry 190A and an LED array voltage protection circuit 190B.

When electrical power, normally 120 volt VAC or 240 VAC at 50 or 60 Hz is applied to rapid start ballast assembly 130, existing ballast circuitry 188 provides an AC or DC voltage with a fixed current limit across ballast socket electrical contacts 136A and 136B, which is conducted through LED circuitry 190 by way of LED circuit bi-pin electrical contacts 140A and 140B, respectively, (or in the event of the contacts being reversed, by way of LED circuit bi-pin contacts 138A and 138B) to the input of bridge rectifiers 194A and 194B, respectively.

Ballast assembly 130 limits the current going into LED lamp 124. Such limitation is ideal for the present embodiment of the inventive LED lamp 124 because LEDs in general are current driven devices and are independent of the driving voltage, that is, the driving voltage does not affect LEDs. The actual number of LEDs 170 will vary in accordance with the actual ballast assembly 130 used. In the example of the embodiment of LED lamp 124, ballast assembly 130 provides a maximum current limit of 300 mA.

Figure 16:
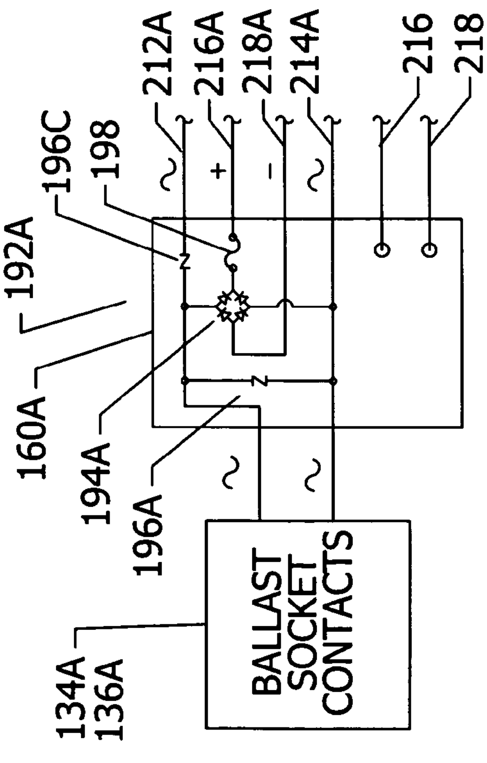
FIG. 16 is a schematic circuit of one of the two integral electronics circuit boards shown in FIG. 15 positioned at one side of the alternating current voltage emanating from the ballast for the LED array shown in FIGS. 14 and 14A.
Figure 17:
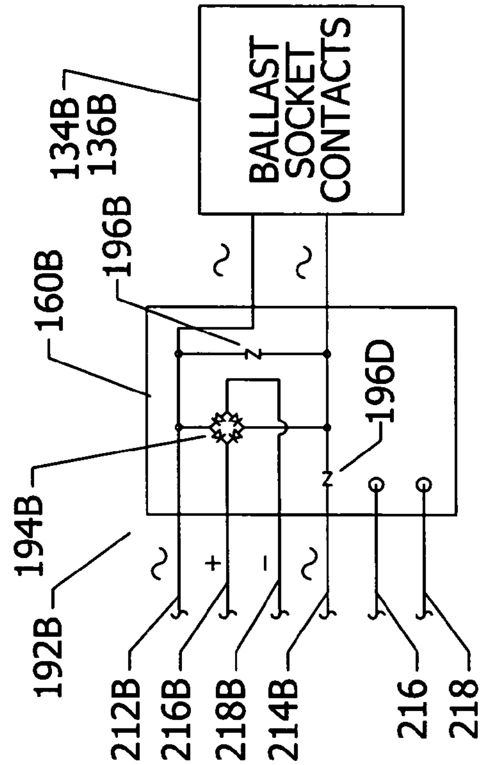
FIG. 17 is a schematic circuit of the other of the two integral electronics circuit boards shown in FIG. 15 positioned at the other side of the alternating current voltage emanating from the ballast for the LED array shown in FIGS. 14 and 14A.

Voltage surge absorbers 196A, 196B, 196C and 196D are positioned on LED voltage protection circuit 190B for LED array circuitry 190A in electrical association with integral electronics control circuitry 192A and 192B. Bridge rectifiers 194A and 194B are connected to the anode and cathode end buses, respectively of LED circuitry 190 and provide a positive voltage V+ and a negative voltage V−, respectively as is also shown in FIGS. 16 and 17. FIGS. 16 and 17 also show schematic details of integral electronics circuitry 192A and 192B. As seen in FIGS. 16 and 17, an optional resettable fuse 198 is integrated with integral electronics circuitry 192A. Resettable fuse 198 provides current protection for LED array circuitry 190A. Resettable fuse 198 is normally closed and will open and de-energize LED array circuitry 190A in the event the current exceeds the current allowed. The value for resettable fuse 198 is equal to or is lower than the maximum current limit of ballast assembly 130. Resettable fuse 198 will reset automatically after a cool down period.

When ballast assembly 130 is first energized, starter 130A may close creating a low impedance path from bi-pin electrical contact 138A to bi-pin electrical contact 138B, which is normally used to briefly heat the filaments in a fluorescent lamp in order to help the establishment of conductive phosphor gas. Such electrical action is unnecessary for LED lamp 124, and for that reason such electrical connection is disconnected from LED circuitry 190 by way of the biasing of bridge rectifiers 194A and 194B.

LED array circuitry 190A includes fifteen electrical circuit strings 200 individually designated as strings 200A, 200B, 200C, 200D, 200E, 200F, 200G, 200H, 200I, 200J, 200K, 200L, 200M, 200N and 200O all in parallel relationship with each string 200A-200O being electrically wired in series. Parallel strings 200 are so positioned and arranged so that each of the fifteen strings 200A-O is equidistant from one another. LED array circuitry 190A provides for ten LEDs 170 electrically mounted in series to each of the fifteen parallel strings 200 for a total of one hundred and fifty LEDs 170 that constitute LED array 158. LEDs 170 are positioned in equidistant relationship with one another and extend substantially the length of tubular wall 144, that is, generally between tubular wall ends 148A and 148B. As shown in FIG. 14, each of strings 200A-200O includes a resistor 202A-202O in alignment with strings 200A-200O connected is series to the anode end of each LED string 200 for a total of fifteen resistors 202. The current limiting resistors 202A-202O are purely optional, because the existing fluorescent ballast used here is already a current limiting device. The resistors 202A-202O then serve as secondary protection devices. A higher number of individual LEDs 170 can be connected in series at each LED string 200. The maximum number of LEDs 170 being configured around the circumference of the 1.5-inch diameter of tubular wall 144 in the particular example herein of LED lamp 124 is ten. Each LED 170 is configured with the anode towards the positive voltage V+ and the cathode towards the negative voltage V−. When ballast 130 is energized, positive voltage that is applied through resistors 202 to the anode end of circuit strings 200 and the negative voltage that is applied to the cathode end of circuit strings 200 will forward bias LEDs 170 connected to circuit strings 200A-200O and cause LEDs 170 to turn on and emit light.

Ballast assembly 130 regulates the electrical current through LEDs 170 to the correct value of 20 mA for each LED 170. The fifteen LED strings 200 equally divide the total current applied to LED array circuitry 190A. Those skilled in the art will appreciate that different ballasts provide different current outputs.

If the forward drive current for LEDs 170 is known, then the output current of ballast assembly 130 divided by the forward drive current gives the exact number of parallel strings of LEDs 170 in the particular LED array, here LED array 158. The total number of LEDs in series within each LED string 200 is arbitrary since each LED 170 in each LED string 200 will see the same current. Again in this example, ten LEDs 170 are shown connected in each series LED string 200 because only ten LEDs 170 of the 5 mm discrete type of LED will fit around the circumference of a 1.5-inch diameter lamp housing. Ballast assembly 130 provides 300 mA of current, which when divided by the fifteen strings 200 of ten LEDs 170 per LED string 200 gives 20 mA per LED string 200. Each of the ten LEDs 170 connected in series within each LED string 200 sees this 20 mA. In accordance with the type of ballast assembly 130 used, when ballast assembly 130 is first energized, a high voltage may be applied momentarily across ballast socket contacts 136A and 136B, which conducts to bi-pin contacts 140A and 140B (or 138A and 138B). This is normally used to help ignite a fluorescent tube and establish conductive phosphor gas, but is unnecessary for this circuit and is absorbed by voltage surge absorbers 196A, 196B, 196C, and 196D to limit the high voltage to an acceptable level for the circuit.

Figure 14A:
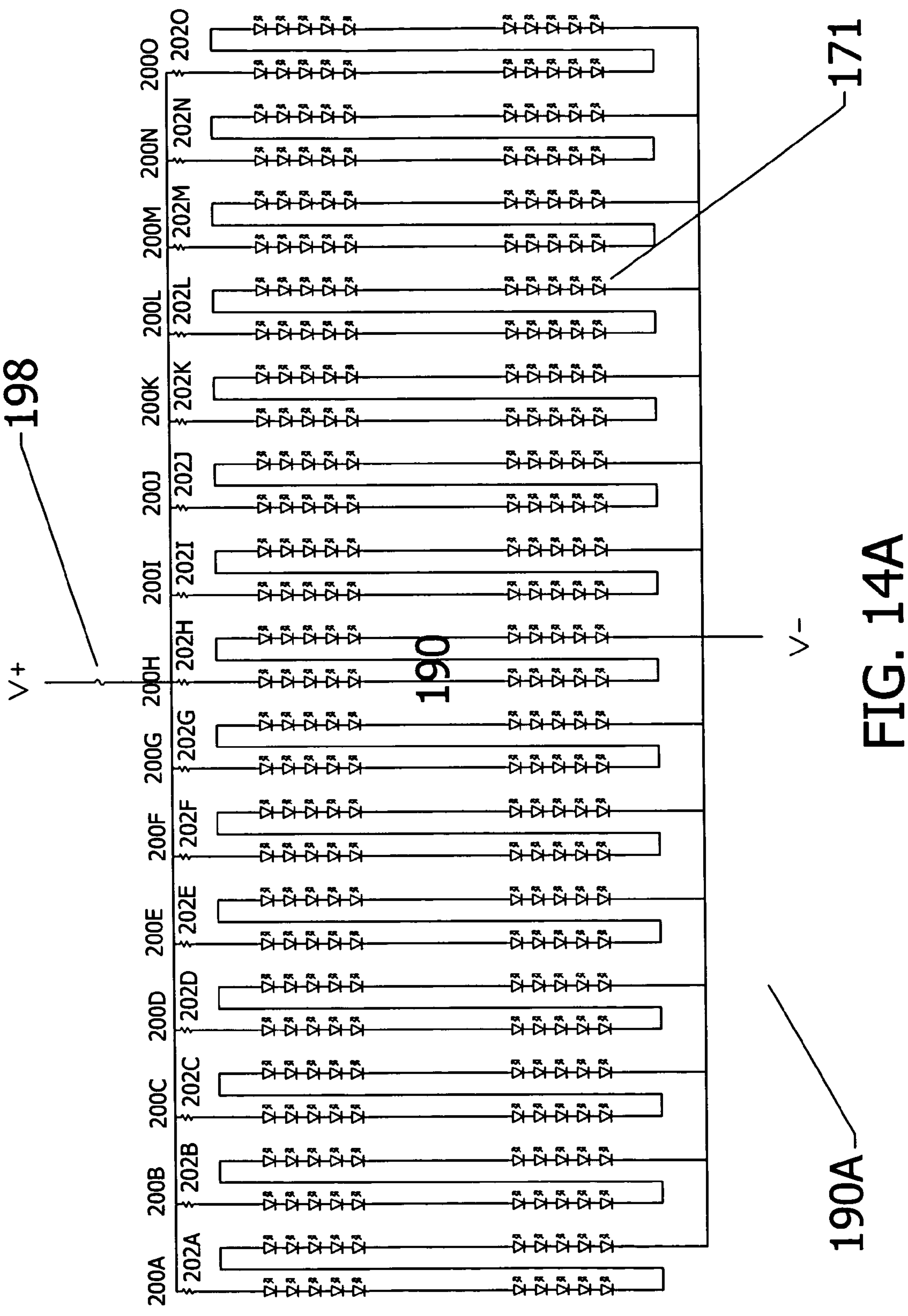
FIG. 14A is an alternate arrangement of the array of LEDs arranged in an electrically parallel relationship shown for purposes of exposition in a flat position for the overall electrical circuit shown in FIG. 14 for the LED retrofit lamp.

As can be seen from FIG. 14A, there can be more than ten LEDs 170 connected in series within each string 200A-200O. There are twenty LEDs 170 in this example, but there can be more LEDs 170 connected in series within each string 200A-200O. The first ten LEDs 170 of each parallel string will fill the first 1.5-inch diameter of the circumference of tubular wall 144, the second ten LEDs 170 of the same parallel string will fill the next adjacent 1.5-inch diameter of the circumference of tubular wall 144, and so on until the entire length of the tubular wall 144 is substantially filled with all LEDs 170 comprising the total LED array 158. LED array circuitry 190A includes fifteen electrical strings 200 individually designated as strings 200A, 200B, 200C, 200D, 200E, 200F, 200G, 200H, 200I, 200J, 200K, 200L, 200M, 200N and 200O all in parallel relationship with all LEDs 170 within each string 200A-200O being electrically wired in series. Parallel strings 200 are so positioned and arranged that each of the fifteen strings 200 is equidistant from one another. LED array circuitry 190A includes twenty LEDs 170 electrically mounted in series within each of the fifteen parallel strings of LEDS 200A-O for a total of three-hundred LEDs 170 that constitute LED array 158. LEDs 170 are positioned in equidistant relationship with one another and extend generally the length of tubular wall 144, that is, generally between tubular wall ends 148A and 148B. As shown in FIG. 14A, each of strings 200A-200O includes an optional resistor 202 designated individually as resistors 202A, 202B, 202C, 202D, 202E, 202F, 202G, 202H, 202I, 202J, 202K, 202L, 202M, 202N, and 202O in respective series alignment with strings 200A-200O at the current input for a total of fifteen resistors 202. Again, a higher number of individual LEDs 170 can be connected in series within each LED string 200. The maximum number of LEDs 170 being configured around the circumference of the 1.5-inch diameter of tubular wall 144 in the particular example herein of LED lamp 124 is ten. Each LED 170 is configured with the anode towards the positive voltage V+ and the cathode towards the negative voltage V−. When LED array circuitry 190A is energized, the positive voltage that is applied through resistors 202A-202O to the anode end circuit strings 200A-200O and the negative voltage that is applied to the cathode end of circuit strings 200A-200O will forward bias LEDs 170 connected to strings 200A-200O and cause LEDs 170 to turn on and emit light.

Ballast assembly 130 regulates the electrical current through LEDs 170 to the correct value of 20 mA for each LED 170. The fifteen LED strings 200 equally divide the total current applied to LED array circuitry 190A. Those skilled in the art will appreciate that different ballasts provide different current outputs.

Figure 14B:
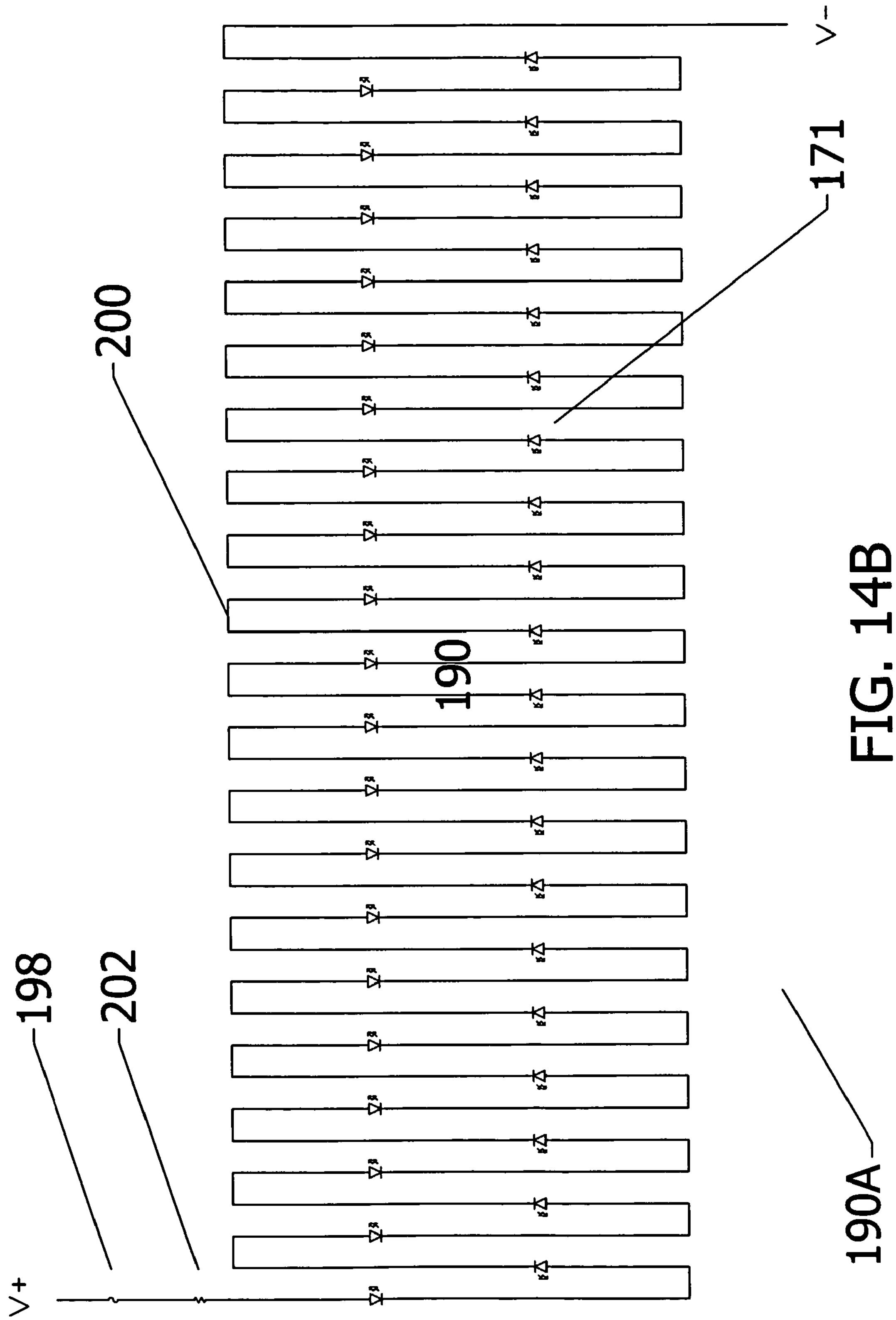
FIG. 14B is another alternate arrangement of the array of LEDs arranged in an electrically parallel relationship shown for purposes of exposition in a flat compressed position for an overall electrical circuit analogous to the overall electrical circuit shown in FIG. 14 for the LED retrofit lamp.

If the forward drive current for LEDs 170 is known, then the output current of ballast assembly 130 divided by the forward drive current gives the exact number of parallel strings of LEDs 170 in the particular LED array, here LED array 158. The total number of LEDs in series within each LED string 200 is arbitrary since each LED 170 in each LED string 200 will see the same current. Again in this example, twenty LEDs 170 are shown connected in series within each LED string 200 because of the fact that only ten LEDs 170 of the 5 mm discrete type of LED will fit around the circumference of a 1.5-inch diameter lamp housing. Ballast assembly 130 provides 300 mA of current, which when divided by the fifteen strings 200 of ten LEDs 170 per LED string 200 gives 20 mA per LED string 200. Each of the twenty LEDs 170 connected in series within each LED string 200 sees this 20 mA. In accordance with the type of ballast assembly 130 used, when ballast assembly 130 is first energized, a high voltage may be applied momentarily across ballast socket contacts 134A, 136A and 134B, 136B, which conduct to pin contacts 138A, 140A and 138B, 140B. Such high voltage is normally used to help ignite a fluorescent tube and establish conductive phosphor gas, but high voltage is unnecessary for LED array circuitry 190A and voltage surge absorbers 196A, 196B, 196C, and 196D suppress the voltage applied by ballast circuitry 190, so that the initial high voltage supplied is limited to an acceptable level for the circuit. FIG. 14B shows another alternate arrangement of LED array circuitry 190A. LED array circuitry 190A consists of a single LED string 200 of LEDs 170 including for exposition purposes only, forty LEDs 170 all electrically connected in series. Positive voltage V+ is connected to optional resettable fuse 198, which in turn is connected to one side of current limiting resistor 202. The anode of the first LED in the series string is then connected to the other end of resistor 202. A number other than forty LEDs 170 can be connected within the series LED string 200 to fill up the entire length of the tubular wall of the present invention. The cathode of the first LED 170 in the series LED string 200 is connected to the anode of the second LED 170; the cathode of the second LED 170 in the series LED string 200 is then connected to the anode of the third LED 170, and so forth. The cathode of the last LED 170 in the series LED string 200 is likewise connected to ground or the negative potential V−. The individual LEDs 170 in the single series LED string 200 are so positioned and arranged such that each of the forty LEDs is spaced equidistant from one another substantially filling the entire length of the tubular wall 144. LEDs 170 are positioned in equidistant relationship with one another and extend substantially the length of tubular wall 144, that is, generally between tubular wall ends 148A and 148B. As shown in FIG. 14B, the single series LED string 200 includes an optional resistor 202 in respective series alignment with single series LED string 200 at the current input. Each LED 170 is configured with the anode towards the positive voltage V+ and the cathode towards the negative voltage V−. When LED array circuitry 190A is energized, the positive voltage that is applied through resistor 202 to the anode end of single series LED string 200 and the negative voltage that is applied to the cathode end of single series LED string 200 will forward bias LEDs 170 connected in series within single series LED string 200, and cause LEDs 170 to turn on and emit light.

The present invention works ideally with the brighter high flux white LEDs available from Lumileds and Nichia in the SMD packages. Since these new devices require more current to drive them and run on low voltages, the high current available from existing fluorescent ballast outputs with current outputs of 300 mA and higher, along with their characteristically higher voltage outputs provide the perfect match for the present invention. The LEDs 170 have to be connected in series, so that each LED 170 within the same single LED string 200 will see the same current and therefore output the same brightness. The total voltage required by all the LEDs 170 within the same single LED string 200 is equal to the sum of all the individual voltage drops across each LED 170 and should be less than the maximum voltage output of ballast assembly 130.

The single LED string 200 of SMD LEDs 170 connected in series can be mounted onto a long thin strip flexible circuit board made of polyimide or equivalent material. The flexible circuit board 152 is then spirally wrapped into a generally cylindrical configuration. Although this embodiment describes a generally cylindrical configuration, it can be appreciated by someone skilled in the art to form the flexible circuit board 152 into shapes other than a cylinder, such as an elongated oval, triangle, rectangle, hexagon, and octagon, as examples of a wide possibility of configurations. Accordingly, the shape of the tubular housing 142 holding the single wrapped flexible circuit board 152 can be made in a similar shape to match the shape of the formed flexible circuit board 152 configuration.

LED array circuit board 152 is positioned and held within tubular wall 144. As in FIGS. 12 and 15, LED array circuit board 152 has opposed circuit board circular ends 154A and 154B that are slightly inwardly positioned from tubular wall ends 148A and 148B, respectively. LED array circuit board 152 has interior and exterior cylindrical sides 156A and 156B, respectively with interior side 156A forming an elongated central passage 157 between tubular wall circular ends 148A and 148B with exterior side 156B being spaced from tubular wall 144. LED array circuit board 152 is preferably assembled from a material that has a flat preassembled unbiased mode and an assembled self-biased mode wherein cylindrical sides 156A and 156B press outwardly towards tubular wall 144. The SMD LEDs 170 are mounted on exterior cylindrical side 156B with the lens 54 of each LED in juxtaposition with tubular wall 25 and pointing radially outward from center line 146. As shown in the sectional view of FIG. 13, light is emitted through tubular wall 144 by the LEDs 170 in equal strength about the entire 360-degree circumference of tubular wall 144. As described earlier in FIGS. 12 and 15, an optional support member 164 is made of an electrically non-conductive material such as rubber or plastic and is rigid in its position. It is preferably made of a self-biasable material and is in a biased mode in the cylindrical position, so that it presses radially outward in support of cylindrical LED array electrical LED array circuit board 152. Optional support member 164 is longitudinally aligned with tubular center line 146 of tubular member 144. Optional support member 164 further isolates integral electronics circuit boards 42A and 42B from LED array circuit board 152 containing the compact LED array 158. Optional support member 164, which is preferably made of a heat conducting material, may operate as a heat sink to draw heat away from LED array circuit board 152 and LED array 158 to the center of elongated housing 142 and thereby dissipating the heat out at the two ends 148A and 148B of tubular wall 144. Optional support member 164 defines cooling holes or holes 166 to allow heat from LED array 158 to flow to the center area of tubular wall 144 and from there to be dissipated at tubular circular ends 148A and 148B.

Ballast assembly 130 regulates the electrical current through LEDs 170 to the correct value of 300 mA or other ballast assembly 130 rated lamp current output for each LED 170. The total current is applied to both the single LED string 200 and to LED array circuitry 190A. Again, those skilled in the art will appreciate that different ballasts provide different rated lamp current outputs.

If the forward drive current for LEDs 170 is known, then the output current of ballast assembly 130 divided by the forward drive current gives the exact number of parallel strings 200 of LEDs 170 in the particular LED array, here LED array 158. Since the forward drive current for LEDs 170 is equal to the output current of ballast assembly 130, then the result is a single LED string 200 of LEDs 170. The total number of LEDs in series within each LED string 200 is arbitrary since each LED 170 in each LED string 200 will see the same current. Again in this example, forty LEDs 170 are shown connected within each series LED string 200. Ballast assembly 130 provides 300 mA of current, which when divided by the single LED string 200 of forty LEDs 170 gives 300 mA for single LED string 200. Each of the forty LEDs 170 connected in series within single LED string 200 sees this 300 mA. In accordance with the type of ballast assembly 130 used, when ballast assembly 130 is first energized, a high voltage may be applied momentarily across ballast socket contacts 134A, 136A and 134B, 136B, which conduct to pin contacts 138A, 140A and 138B, 140B. Such high voltage is normally used to help ignite a fluorescent tube and establish conductive phosphor gas, but high voltage is unnecessary for LED array circuitry 190A and voltage surge absorbers 196A, 196B, 196C, and 196D suppress the voltage applied by ballast circuitry 70, so that the initial high voltage supplied is limited to an acceptable level for the circuit.

It can be seen from someone skilled in the art from FIGS. 14, 14A, and 14B that the LED array 158 can consist of at least one parallel electrical LED string 200 containing at least one LED 170 connected in series within the parallel electrical LED string 200. Therefore, the LED array 158 can consist of any number of parallel electrical strings 200 combined with any number of LEDs 170 connected in series within electrical strings 200, or any combinations thereof.

Figure 14C:
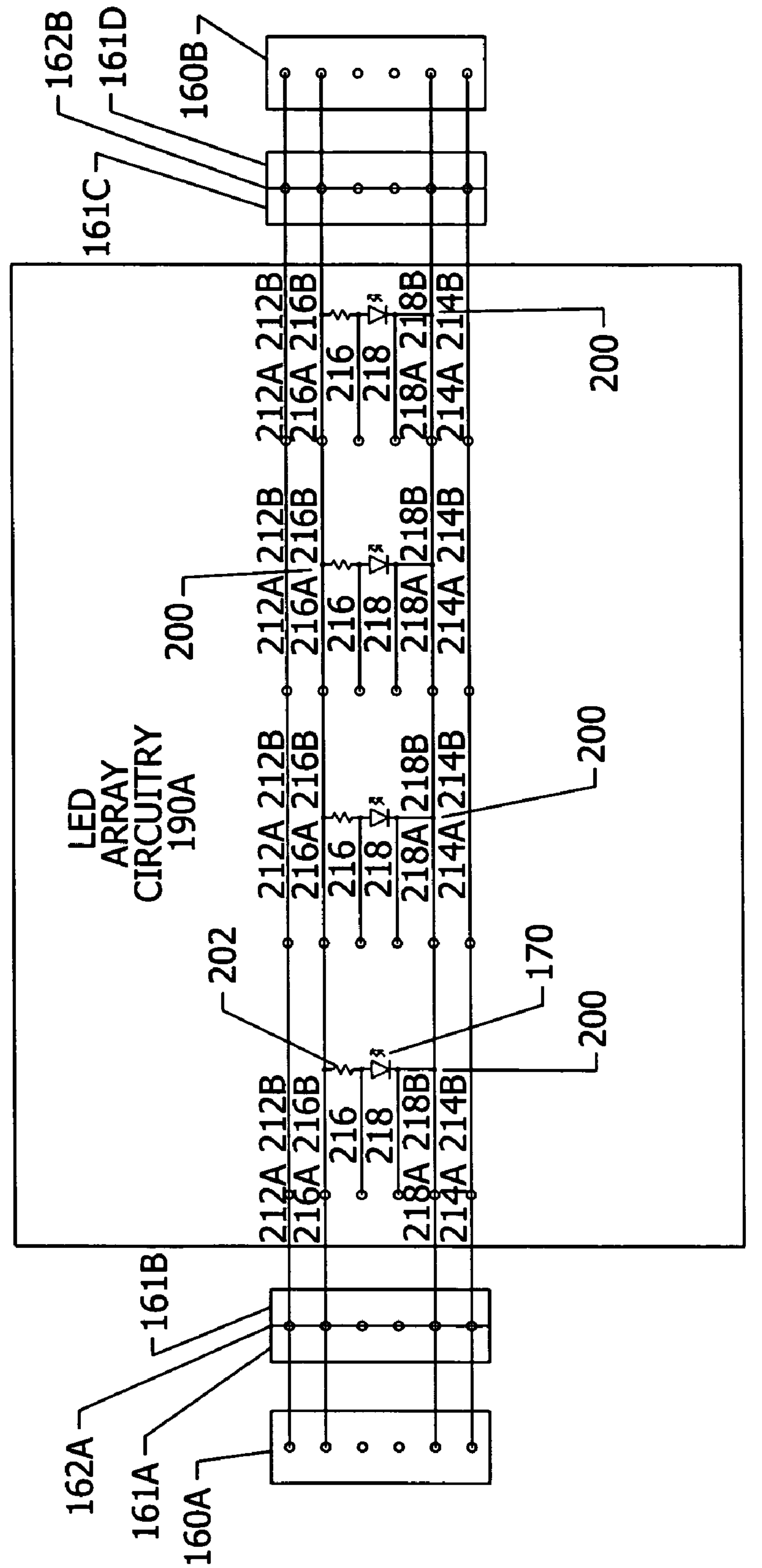
FIG. 14C is a simplified arrangement of the array of LEDs shown for purposes of exposition in a flat compressed position for the overall electrical circuit shown in FIG. 14 including lead lines and pin headers and connectors for the LED retrofit lamp.

FIG. 14C shows a simplified arrangement of the LED array circuitry 190A of LEDs 170 shown for purposes of exposition in a flat compressed position for the overall electrical circuit shown in FIG. 14. AC lead lines 212A, 212B and 214A, 214B and DC positive lead lines 216A, 216B and DC negative lead lines 218A, 218B are connected to integral electronics circuit boards 160A and 160B by way of 6-pin headers 162A and 162B and connectors 161A-161D. Four parallel LED strings 200 each including a resistor 202 are each connected to DC positive lead lines 216A, 216B on one side, and to LED positive lead line 216 or the anode side of each LED 170 and on the other side. The cathode side of each LED 170 is then connected to LED negative lead line 218 and to DC negative lead lines 218A, 218B directly. AC lead lines 212A, 212B and 214A, 214B simply pass through LED array circuitry 190A.

Figure 14D:
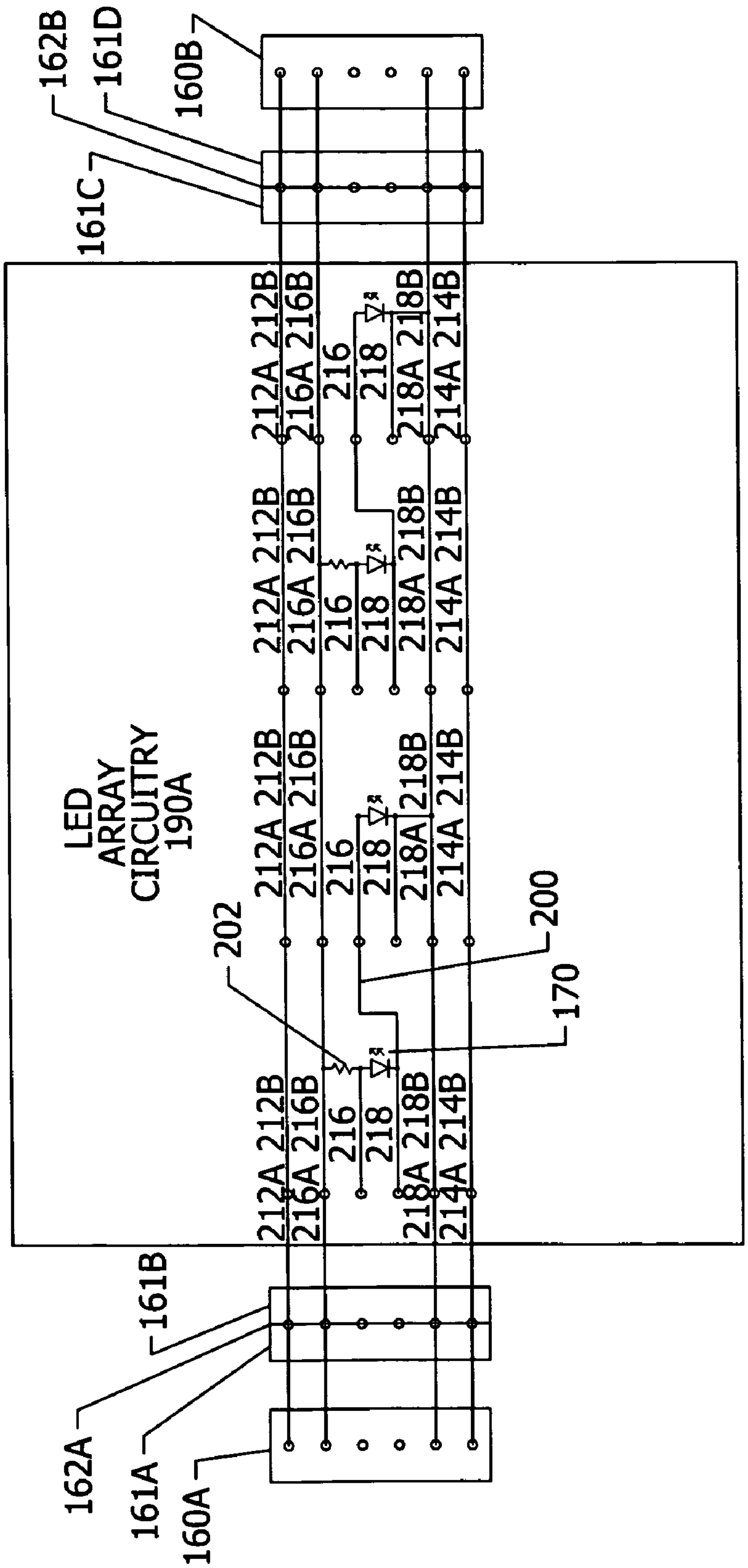
FIG. 14D is a simplified arrangement of the array of LEDs shown for purposes of exposition in a flat compressed position for the overall electrical circuit shown in FIG. 14A including lead lines and pin headers and connectors for the LED retrofit lamp.

FIG. 14D shows a simplified arrangement of the LED array circuitry 190A of LEDs 170 shown for purposes of exposition in a flat compressed position for the overall electrical circuit shown in FIG. 14A. AC lead lines 212A, 212B and 214A, 214B and DC positive lead lines 216A, 216B and DC negative lead lines 218A, 218B are connected to integral electronics boards 160A and 160B by way of 6-pin headers 162A and 162B and connectors 161A-161D. Two parallel LED strings 200 each including a single resistor 202 are each connected to DC positive lead lines 216A, 216B on one side, and to LED positive lead line 216 or the anode side of the first LED 170 in each LED string 200 on the other side. The cathode side of the first LED 170 is connected to LED negative lead line 218 and to adjacent LED positive lead line 216 or the anode side of the second LED 107 in the same LED string 200. The cathode side of the second LED 170 is then connected to LED negative lead line 218 and to DC negative lead lines 218A, 218B directly in the same LED string 200. AC lead lines 212A, 212B and 214A, 214B simply pass through LED array circuitry 190A.

Figure 14E:
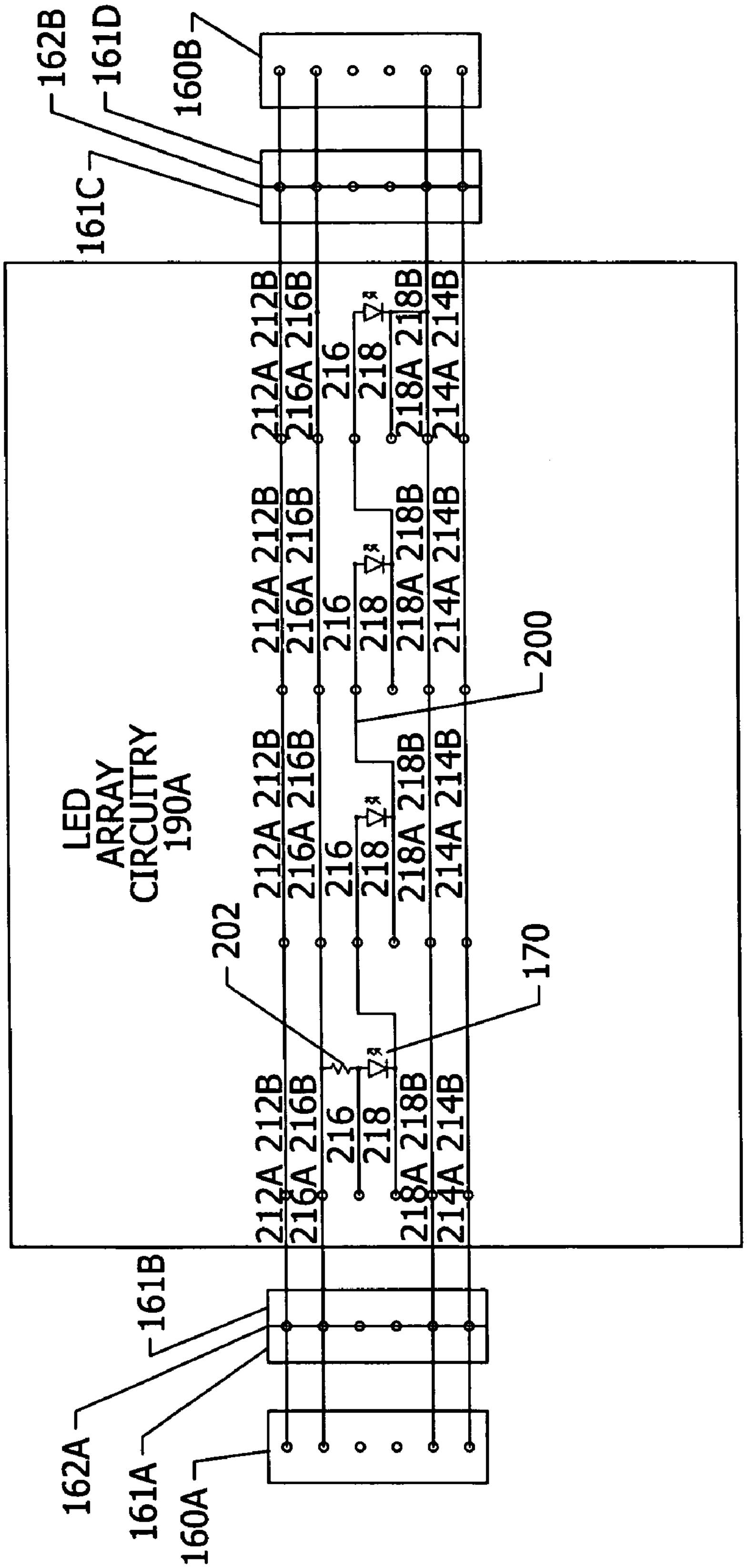
FIG. 14E is a simplified arrangement of the array of LEDs shown for purposes of exposition in a flat compressed position for the overall electrical circuit shown in FIG. 14B including lead lines and pin headers and connectors for the LED retrofit lamp.

FIG. 14E shows a simplified arrangement of the LED array circuitry 190A of LEDs 170 shown for purposes of exposition in a flat compressed position for the overall electrical circuit shown in FIG. 14B. AC lead lines 212A, 212B and 214A, 214B and DC positive lead lines 216A, 216B and DC negative lead lines 218A, 218B are connected to integral electronics boards 160A and 160B by way of 6-pin headers 162A and 162B and connectors 161A-161D. Single parallel LED string 200 including a single resistor 202 is connected to DC positive lead lines 216A, 216B on one side, and to LED positive lead line 216 or the anode side of the first LED 170 in the LED string 200 on the other side. The cathode side of the first LED 170 is connected to LED negative lead line 218 and to adjacent LED positive lead line 216 or the anode side of the second LED 170. The cathode side of the second LED 170 is connected to LED negative lead line 218 and to adjacent LED positive lead line 216 or the anode side of the third LED 170. The cathode side of the third LED 170 is connected to LED negative lead line 218 and to adjacent LED positive lead line 216 or the anode side of the fourth LED 170. The cathode side of the fourth LED 170 is then connected to LED negative lead line 218 and to DC negative lead lines 218A, 218B directly. AC lead lines 212A, 212B and 214A, 214B simply pass through LED array circuitry 190A.

Figure 14F:
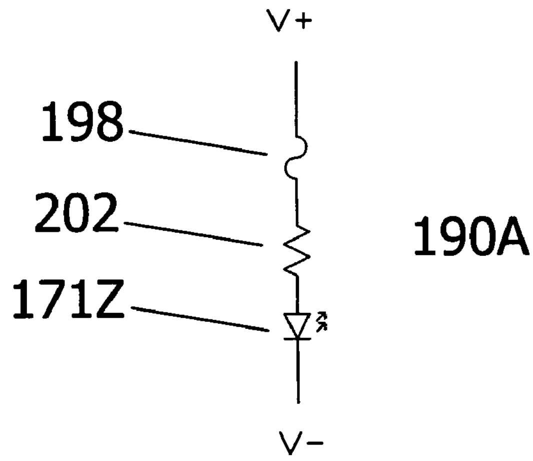
FIG. 14F shows a single high-brightness LED positioned on a single string in electrical series arrangement shown for purposes of exposition in a flat compressed mode for the overall electrical circuit shown in FIG. 14 for the retrofit lamp.

With the new high-brightness LEDs in mind, FIG. 14F shows a single high-brightness LED 171Z positioned on an electrical string in what is defined herein as an electrical series arrangement for the overall electrical circuit shown in FIG. 14 and also analogous to FIG. 14B. The single high-brightness 171Z fulfills a particular lighting requirement formerly fulfilled by a fluorescent lamp.

Figure 14G:
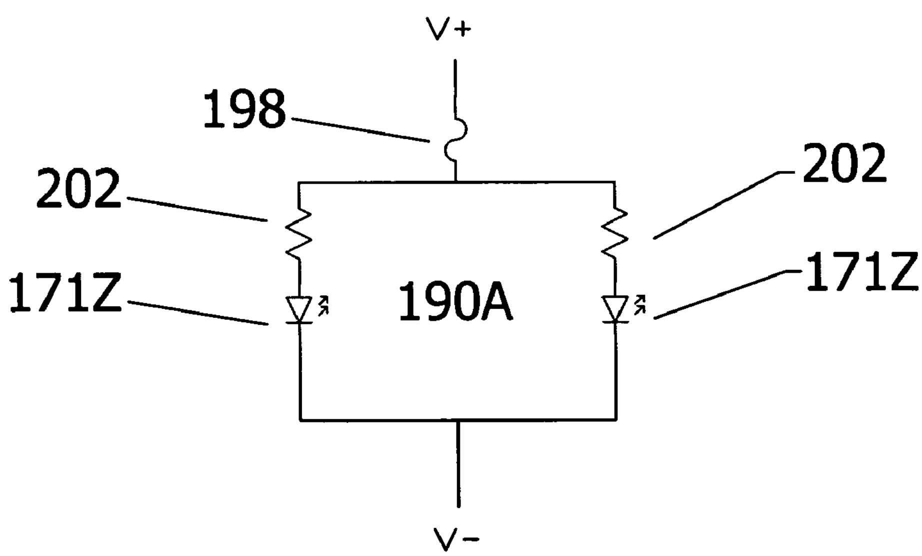
FIG. 14G shows two high-brightness LEDs in an electrical parallel arrangement of two parallel strings with one high-brightness LED positioned on each of the two parallel strings shown for purposes of exposition in a flat compressed mode for the overall electrical circuit shown in FIG. 14 for the retrofit lamp.

Likewise, FIG. 14G shows two high-brightness LEDs 171Z in electrical parallel arrangement with one high-brightness LED 171Z positioned on each of the two parallel strings for the overall electrical circuit shown in FIG. 14 and also analogous to the electrical circuit shown in FIG. 14A. The two high-brightness LEDs 171Z fulfill a particular lighting requirement formerly fulfilled by a fluorescent lamp.

As shown in the schematic electrical and structural representations of FIG. 15, circuit board 152 for LED array 158 which has mounted thereon LED array circuitry 190A is positioned between integral electronics circuit boards 160A and 160B that in turn are electrically connected to ballast assembly circuitry 188 by bi-pin electrical contacts 138A, 140A and 138B, 140B, respectively, which are mounted to base end caps 150A and 150B, respectively. Bi-pin contact 138A includes an external extension 204A that protrudes externally outwardly from base end cap 150A for electrical connection with ballast socket contact 134A and an internal extension 204B that protrudes inwardly from base respect 150A for electrical connection to integral electronics circuit boards 160A. Bi-pin contact 140A includes an external extension 206A that protrudes externally outwardly from base end cap 150A for electrical connection with ballast socket contact 136A and an internal extension 206B that protrudes inwardly from base end cap 150A for electrical connection to integral electronics circuit boards 160A. Bi-pin contact 138B includes an external extension 208A that protrudes externally outwardly from base end cap 150B for electrical connection with ballast socket contact 134B and an internal extension 208B that protrudes inwardly from base end cap 150B for electrical connection to integral electronics circuit board 160B. Bi-pin contact 140B includes an external extension 210A that protrudes externally outwardly from base end cap 150B for electrical connection with ballast socket contact 136B and an internal extension 210B that protrudes inwardly from base end cap 150B for electrical connection to integral electronics circuit board 160B. Bi-pin contacts 138A, 140A, 138B, and 140B are soldered directly to integral electronics circuit boards 160A and 160B, respectively. In particular, bin-pin contact extensions 204A and 206A are associated with bi-pin contacts 138A and 140A, respectively, and bi-pin contact extensions 208A and 210A are associated with bi-pin contacts 138B and 140B, respectively. Being soldered directly to integral electronics circuit board 160A electrically connects bi-pin contact extensions 204B and 206B. Similarly, being soldered directly to integral electronics circuit board 160B electrically connects bi-pin contact extensions 208B and 2101B. 6-pin header 162A is shown positioned between and in electrical connection with integral electronics circuit board 160A and LED array circuit board 152 and LED array circuitry 190A mounted thereon as shown in FIG. 14. 6-pin header 162B is shown positioned between and in electrical connection with integral electronics circuit board 160B and LED array circuit board 152 and LED array circuitry 190A mounted thereon.

FIG. 16 shows a schematic of integral electronics circuit 192A mounted on integral electronics circuit board 160A. Integral electronics circuit 192A is also indicated in part in FIG. 14 as connected to LED array circuitry 190A. Integral electronics circuit 192A is in electrical contact with bi-pin contacts 138A, 140A, which are shown as providing either AC or DC voltage. Integral electronics circuit 192A includes bridge rectifier 194A, voltage surge absorbers 196A and 196C, and resettable fuse 198. Integral electronic circuit 192A leads to or from LED array circuitry 190A. It is noted that FIG. 16 indicates the presence of possible AC voltage (rather than possible DC voltage) by an AC wave symbol ~. Each AC voltage could be DC voltage supplied by certain ballast assemblies 188 as mentioned earlier herein. In such a case DC voltage would be supplied to LED array 158 even in the presence of bridge rectifier 194A. It is particularly noted that in such a case, voltage surge absorbers 196A and 196C would remain operative. AC lead lines 212A and 214A are in a power connection with ballast assembly 188. DC lead lines 216A and 218A are in positive and negative direct current relationship with LED array circuitry 190A. Bridge rectifier 194A is in electrical connection with four lead lines 212A, 214A, 216A and 218A. A voltage surge absorber 196A is in electrical contact with lead lines 212A and 214A and voltage surge absorber 196C is positioned on lead line 212A. Lead lines 216A and 218A are in electrical contact with bridge rectifier 194A and in power connection with LED array circuitry 190A. Fuse 198 is positioned on lead line 216A between bridge rectifier 194A and LED array circuitry 190A.

FIG. 17 shows a schematic of integral electronics circuit 192B mounted on integral electronics circuit board 160B. Integral electronics circuit 192B is also indicated in part in FIG. 14 as connected to LED array circuitry 190A. Integral electronics circuit 192B is a close mirror image or electronics circuit 192A mutatis mutandis. Integral electronics circuit 192B is in electrical contact with bi-pin contacts 138B, 140B, which are shown as providing either AC or DC voltage. Integral electronics circuit 192B includes bridge rectifier 194B, voltage surge absorbers 196B and 196D. Integral electronic circuit 192B leads to or from LED array circuitry 190A. It is noted that FIG. 17 indicates the presence of possible AC voltage (rather than possible DC voltage) by an AC wave symbol ~. Each AC voltage could be DC voltage supplied by certain ballast assemblies 188 as mentioned earlier herein. In such a case DC voltage would be supplied to LED array 158 even in the presence of bridge rectifier 194B. It is particularly noted that in such a case, voltage surge absorbers 196B and 196D would remain operative. AC lead lines 212B and 214B are in a power connection with ballast assembly 188. DC lead lines 216B and 218B are in positive and negative direct current relationship with LED array circuitry 190A. Bridge rectifier 194B is in electrical connection with four lead lines 212B, 214B, 216B and 218B. A voltage surge absorber 196B is in electrical contact with lead lines 212B and 214B and voltage surge absorber 196D is positioned on lead line 214B. Lead lines 216B and 218B are in electrical contact with bridge rectifier 194B and in power connection with LED array circuitry 190A.

FIGS. 16 and 17 show the lead lines going into and out of LED circuitry 190 respectively. The lead lines include AC lead lines 212B and 214B, positive DC voltage 216B, and DC negative voltage 218B. The AC lead lines 212B and 214B are basically feeding through LED circuitry 190, while the positive DC voltage lead line 216B and negative DC voltage lead line 218B are used primarily to power the LED array 158. DC positive lead lines 216A and 216B are the same as LED positive lead line 216 and DC negative lead lines 218A and 218B are the same as LED negative lead line 218. LED array circuitry 190A therefore consists of all electrical components and internal wiring and connections required to provide proper operating voltages and currents to LEDs 170 connected in parallel, series, or any combinations of the two.

Figure 18:
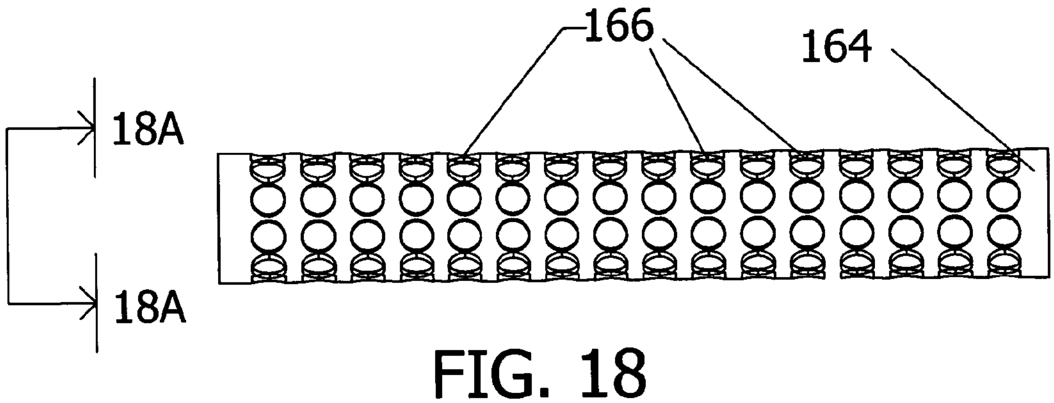
FIG. 18 is an isolated side view of the cylindrical internal support shown in FIGS. 12 and 13.
Figure 18A:
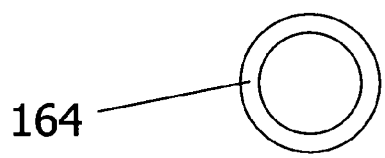
FIG. 18A is an end view taken through line 18A-18A in FIG. 18.

FIGS. 18 and 18A show the optional support member 164 with cooling holes 166 in both side and cross-sectional views respectively.

Figure 19:
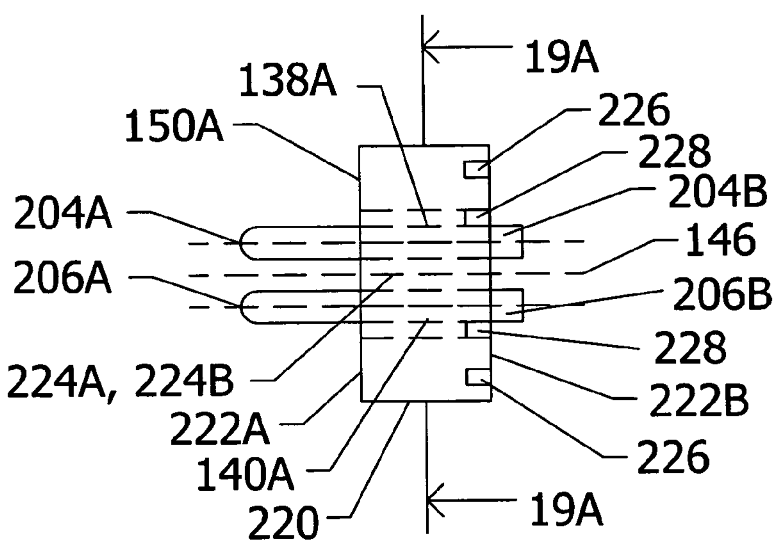
FIG. 19 is a side view of an isolated bi-pin end cap shown in FIGS. 11 and 15.
Figure 19A:
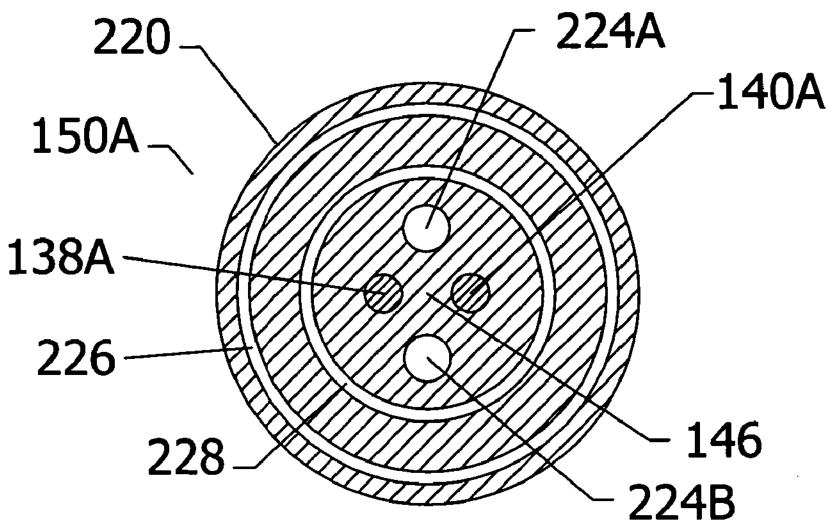
FIG. 19A is a sectional view taken through line 19A-19A of the end cap shown in FIG. 19.

FIG. 19 shows an isolated top view of one of the base end caps, namely, base end cap 150A, which is analogous to base end cap 150B, mutatis mutandis. Bi-pin electrical contacts 138A, 140A extend directly through base end cap 150A in the longitudinal direction in alignment with center line 146 of tubular wall 144 with bi-pin external extensions 204A, 206A and internal extensions 204B, 206B shown. Base end cap 150A is a solid cylinder in configuration as seen in FIGS. 19 and 19A and forms an outer cylindrical wall 220 that is concentric with center line 146 of tubular wall 144 and has opposed flat end walls 222A and 222B that are perpendicular to center line 146. Two cylindrical parallel vent holes 224A and 224B are defined between end walls 222A and 222B in vertical alignment with center line 146.

As also seen in FIG. 19A, base end cap 150A defines an outer circular slot 226 that is concentric with center line 146 of tubular wall 144 and concentric with and aligned proximate to circular wall 220. Outer circular slot 226 is of such a width and circular end 148A of tubular wall 144 is of such a thickness and diameter that outer circular slot 226 accepts circular end 148A into a fitting relationship and circular end 148A is thus supported by circular slot 226. Base end cap 150B defines another outer circular slot (not shown) analogous to outer circular slot 226 that is likewise concentric with center line 146 of tubular wall 144 so that circular end 148B of tubular wall 144 can be fitted into the analogous circular slot of base end cap 150B wherein circular end 148B of tubular wall 144 is also supported. In this manner tubular wall 144 is mounted to end caps 150A and 150B.

As also seen in FIG. 19A, base end cap 150A defines an inner circular slot 228 that is concentric with center line 146 of tubular wall 144 and concentric with and spaced radially inward from outer circular slot 226. Inner circular slot 228 is spaced from outer circular slot 226 at such a distance that would be occupied by LEDs 170 mounted to LED circuit board 152 within tubular wall 144. Inner circular slot 228 is of such a width and diameter and circular end 154A of LED circuit board 152 is of such a thickness and diameter that circular end 154A is fitted into inner circular slot 228 and is thus supported by inner circular slot 228. Base end cap 150B defines another outer circular slot (not shown) analogous to outer circular slot 226 that is likewise concentric with center line 146 of tubular wall 144 so that circular end 154B of LED circuit board 152 can be fitted into the analogous inner circular slot of base end cap 150B wherein circular end 154B is also supported. In this manner LED circuit board 152 is mounted to end caps 150A and 150B.

Circular ends 148A and 148B of tubular wall 144 and also circular ends 154A and 154B of LED circuit board 152 are secured to base end caps 150A and 150B preferably by gluing in a manner known in the art. Other securing methods known in the art of attaching such as cross-pins or snaps can be used.

An analogous circular slot (not shown) concentric with center line 146 is optionally formed in flat end walls 222A and 222B of base end cap 150A and an analogous circular slot in the flat end walls of base end cap 150B for insertion of the opposed ends of optional support member 164 so that optional support member 164 is likewise supported by base end caps 150A and 150B. Circular ends 148A and 148B of tubular wall 144 are optionally press fitted to circular slot 226 of base end cap 150A and the analogous circular slot of base end cap 150B.

Figure 20:
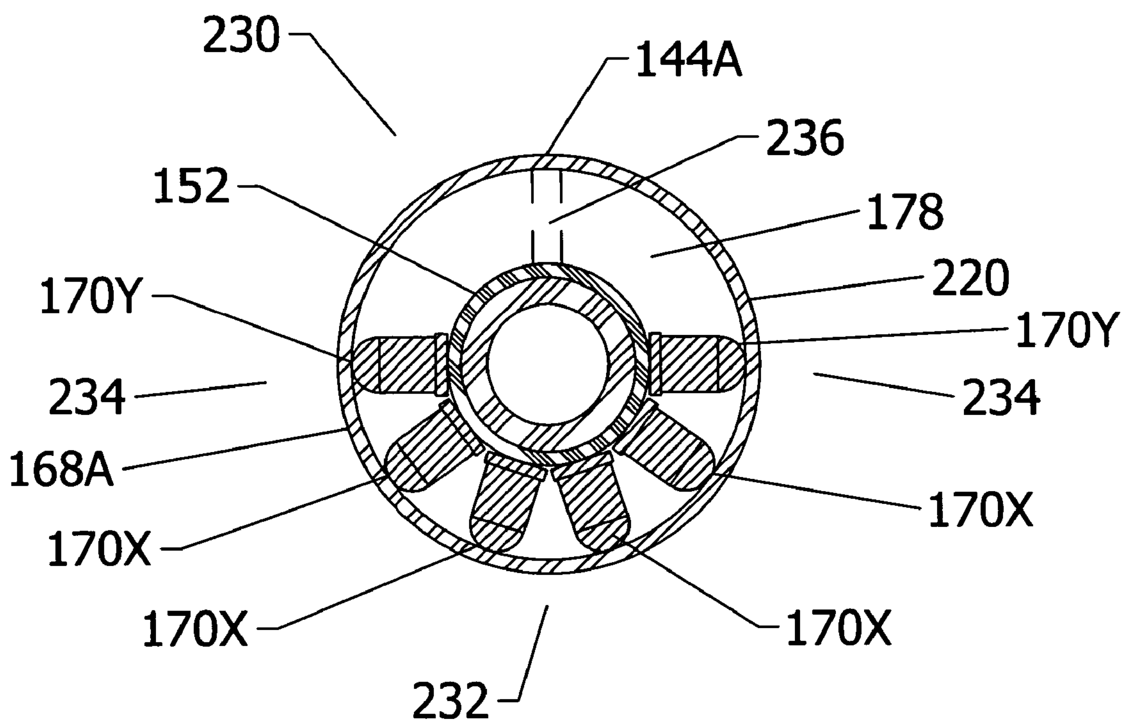
FIG. 20 is an alternate sectional view to the sectional view of the LED retrofit lamp taken through a single row of LEDs shown in FIG. 13.

FIG. 20 is a sectional view of an alternate LED lamp mounted to tubular wall 144A that is a version of LED lamp 124 as shown in FIG. 13. The sectional view of LED lamp 230 shows a single row 168A of the LEDs of LED lamp 230 and includes a total of six LEDs 170, with four LEDs 170Y being positioned at equal intervals at the bottom area 232 of tubular wall 144A and with two LEDs 170Y being positioned at opposed side areas 234 of tubular wall 144A. LED circuitry 190 previously described with reference to LED lamp 124 would be the same for LED lamp 230. That is, all fifteen strings 200 of LED array 158 of LED lamp 124 would be the same for LED lamp 230 except that a total of ninety LEDs 170 would comprise LED lamp 230 with the ninety LEDs 170 positioned at strings 200 at such electrical connectors that would correspond with LEDs 170X and 170Y throughout. The reduction to ninety LEDs 170 of LED lamp 230 from the one hundred and fifty LEDs 170 of LED lamp 124 would result in a forty percent reduction of power demand with an illumination result that would be satisfactory under certain circumstances. Stiffening of circuit board for LED lamp 230 is accomplished by circular slot 228 for tubular wall 144A or optionally by the additional placement of LEDs 170 (not shown) at the top vertical position in space 178 or optionally a vertical stiffening member 236 shown in phantom line that is positioned vertically over center line 146 of tubular wall 144A at the upper area of space 178 between LED circuit board 152 and the inner side of tubular wall 144A and extends the length of tubular wall 144A and LED circuit board 152.

LED lamp 124 as described above will work for both AC and DC voltage outputs from an existing fluorescent ballast assembly 130. In summary, LED array 158 will ultimately be powered by DC voltage. If existing fluorescent ballast assembly 130 operates with an AC output, bridge rectifiers 194A and 194B convert the AC voltage to DC voltage. Likewise, if existing fluorescent ballast 130 operates with a DC voltage, the DC voltage remains a DC voltage even after passing through bridge rectifiers 194A and 194B.

Figure 21:
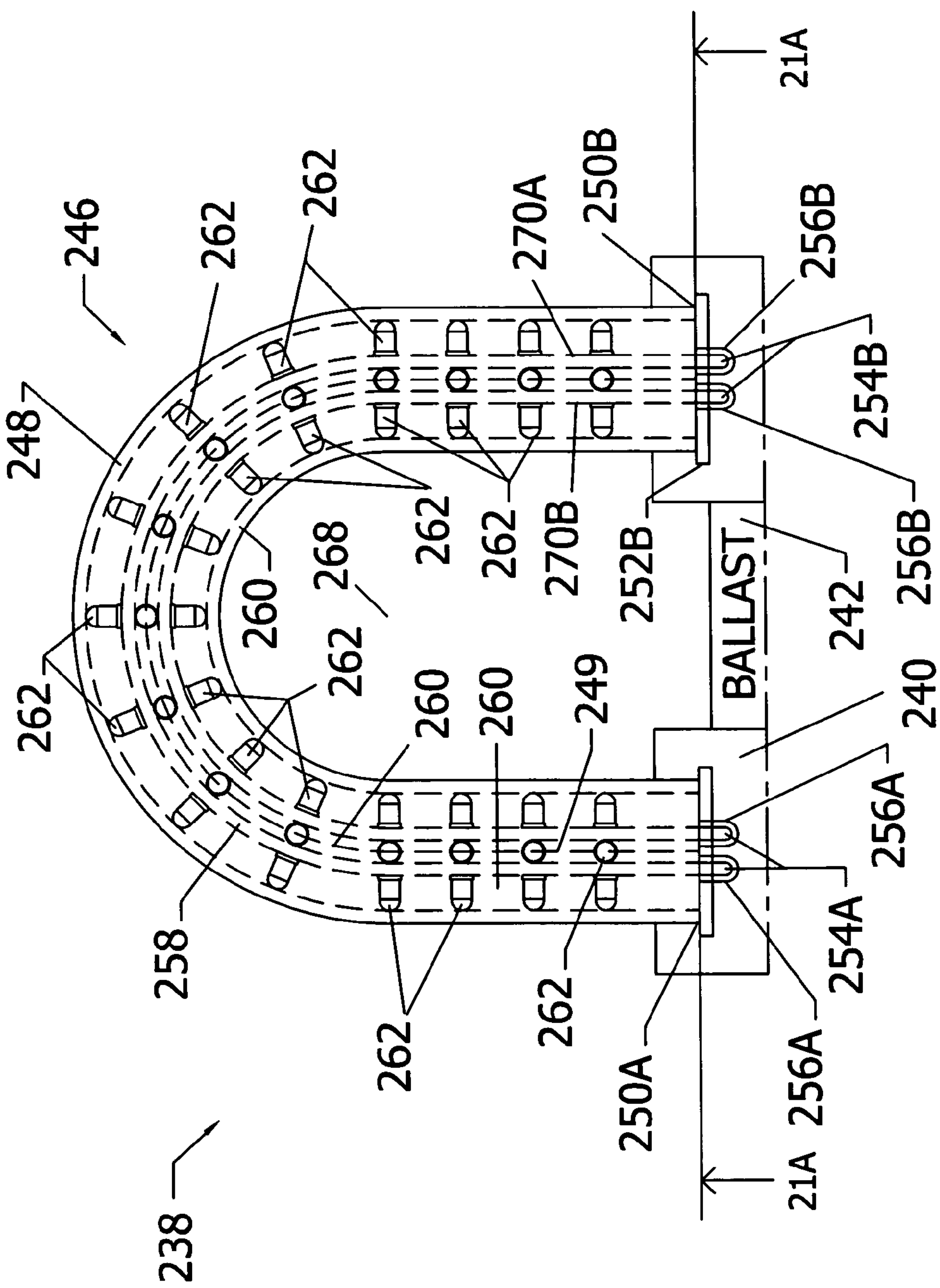
FIG. 21 is top view of a retrofitted semi-circular LED lamp mounted to an existing fluorescent fixture having an electronic rapid start, hybrid, or magnetic ballast.
Figure 22:
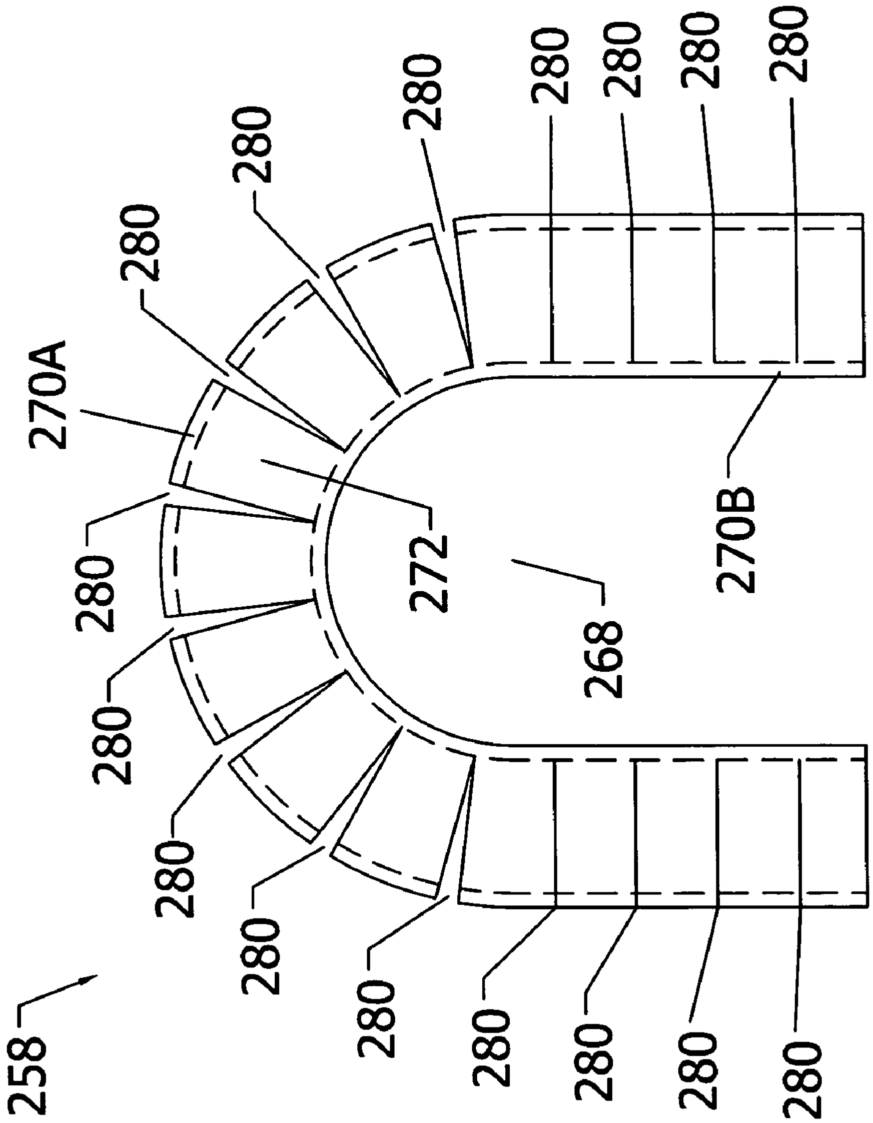
FIG. 22 is a top view taken in isolation of the semi-circular circuit board with slits shown in FIG. 21.

FIGS. 21 and 22 show a top view of a horizontally aligned curved LED lamp 238 that is secured to an existing fluorescent fixture 240 schematically illustrated in phantom line including existing fluorescent ballast 242 that in turn is mounted in a vertical wall 244. Fluorescent ballast 242 can be either an electronic instant start or rapid start, a hybrid, or a magnetic ballast assembly for the purposes of illustrating the inventive curved LED lamp 238, which is analogous to and includes mutatis mutandis the variations discussed herein relating to linear LED lamps 10 and 124.

Curved LED lamp 238 is generally hemispherical, or U-shaped, as viewed from above and is of a type of LED lamp that can be used as lighting over a mirror, for example, or for decorative purposes, or for other uses when such a shape of LED lamp would be retrofitted to an existing fluorescent lamp fixture.

Figure 21A:
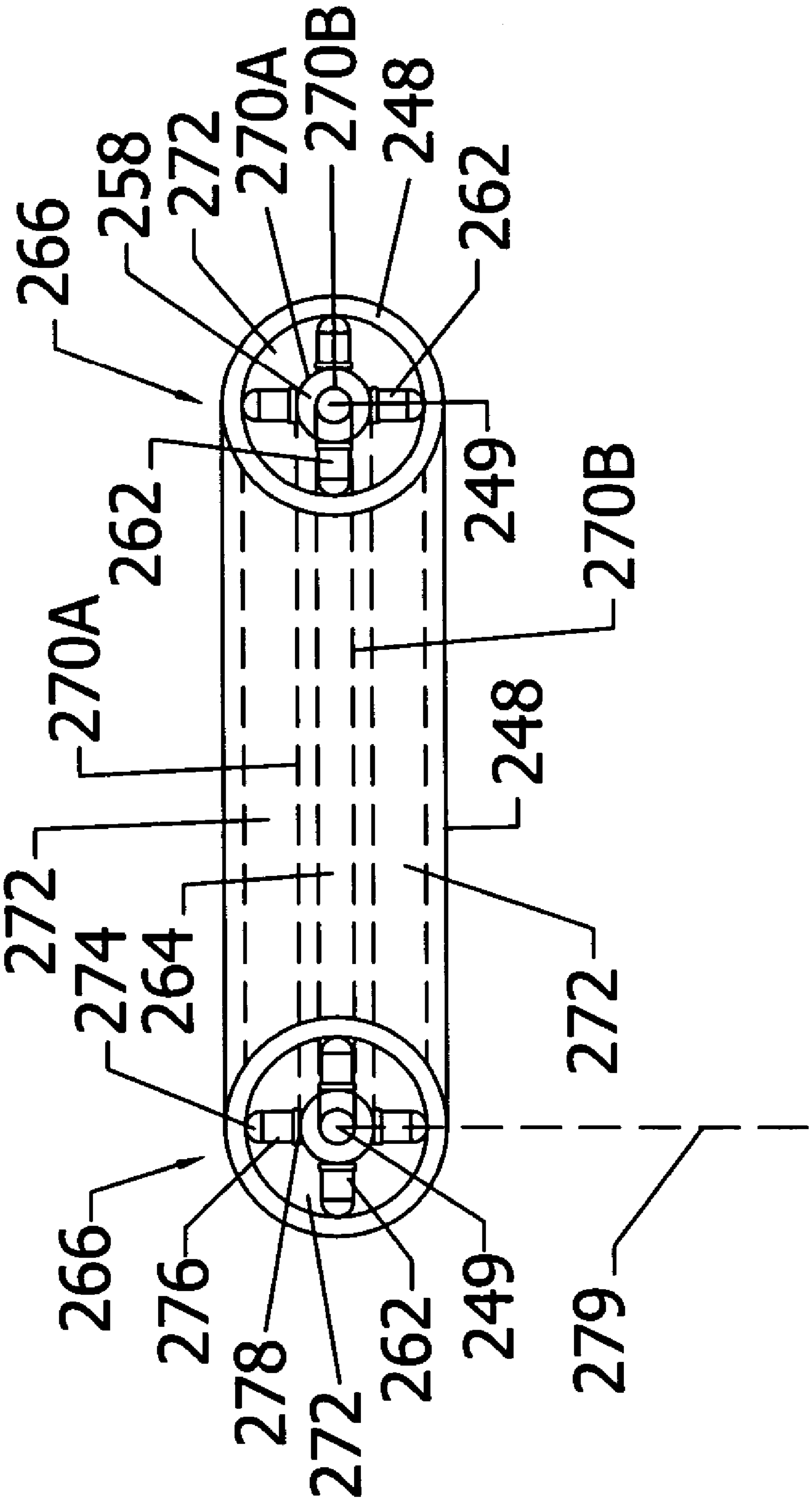
FIG. 21A is a view taken through line 21A-21A in FIG. 21.

LED lamp 238 as shown in FIGS. 21 and 21A includes a curved housing 246 comprising a curved hemispherical tubular wall 248 having a center line 249 and tubular ends 250A and 250B. A pair of end caps 252A and 252B secured to tubular ends 250A and 250B, respectively, are provided with bi-pin electrical connectors 254A and 254B that are electrically connected to ballast double contact electrical sockets 256A and 256B in a manner previously described herein with regard to LED lamp 124. Base end caps 252A and 252B are such as those described in FIGS. 9A and 19A regarding LED lamps 10 and 124. Curved LED lamp 238 includes a curved circuit board 258 that supports an LED array 260 mounted thereon comprising twenty eight individual LEDs 262 positioned at equal intervals. Curved circuit board 258 is tubular and hemispherical and is positioned and held in tubular wall 248. Curved circuit board 258 forms a curved central cylindrical passage 264 that extends between the ends of tubular wall 248 and opens at tubular wall ends 250A and 250B for exhaust of heat generated by LED array 260. Curved circuit board 258 has opposed circuit board circular ends that are slightly inwardly positioned from tubular wall ends 250A and 250B, respectively.

Fifteen parallel electrical strings are displayed and described herein. In particular, fifteen rows 264 of four LEDs 262 are positioned in tubular wall 248. LED lamp 238 is provided with integral electronics (not shown) analogous to integral electronic circuits 192A and 192B described previously for LED lamp 124. Ballast circuitry and LED circuitry are analogous to those described with regard to LED lamp 124, namely, ballast circuitry 188, starter circuit 188A, LED circuitry 190 and LED array circuitry 190A. The LED array circuit for curved LED lamp 124 is mounted on the exterior side 270A of circuit board 258. In particular, fifteen parallel electrical strings for each one of the fifteen LED rows 266 comprising four LEDs 262 positioned within curved tubular wall 248 are mounted on curved circuit board 258. As seen in FIG. 21, curved tubular wall 248 and curved circuit board 258 forms a hemispherical configuration about an axial center 268. The electrical circuitry for curved LED lamp 238 is analogous to the electrical circuitry set forth herein for LED lamp 124 including LED array circuitry 190A and the parallel electrical circuit strings 200 therein with the necessary changes having been made. The physical alignment of parallel electrical circuit strings 200 of LED array circuitry 190A are parallel as shown in FIG. 14 and are radially extending in FIG. 21, but in both LED lamp 124 and curved LED lamp 238 the electrical structure of the parallel electrical circuit strings are both parallel in electrical relationship. The radial spreading of LED rows 266 outwardly extending relative to the axial center 268 of hemispherical shaped tubular wall 248 is coincidental with the physical radial spreading of the parallel electrical strings to which LED rows 266 are electrically connected.

Curved circuit board 258 has exterior and interior sides 270A and 270B, respectively, which are generally curved circular in cross-section as indicated in FIG. 21A. Although this embodiment describes a generally curved cylindrical configuration, it can be appreciated by someone skilled in the art to form the curved flexible circuit board 258 into shapes other than a cylinder for example, such as an elongated oval, triangle, rectangle, hexagon, octagon, etc. Accordingly, the shape of the curved tubular housing 246 holding the individual curved flexible circuit board 258 can be made in a similar shape to match the shape of the formed curved flexible circuit board 258 configuration. Exterior side 270A is spaced from tubular wall 248 so as to define a curved space 272 there between in which LEDs 262 are positioned. Curved space 270 is toroidal in cross-section as shown in FIG. 21A. Each LED 262 includes an LED lens portion 274, an LED body portion 276, and an LED base portion 278 with LED 262 having an LED center line 279. LEDs 262 are positioned in curved tubular wall 248 aligned to center line 249 of curved tubular wall 248 relative to a plane defined by each LED row 266. Lens portion 274 is in juxtaposition with curved tubular wall 248 and base portion 278 is mounted to curved circuit board 258 in a manner previously described herein with regard to LED lamp 124. LEDs 262 have LED center lines 279.

Curved circuit board 258 is preferably made of a flexible material that is unbiased in a preassembled flat, and movable to an assembled self-biased mode. The latter as shown in the mounted position in FIGS. 21, 21A, and 22 wherein the exterior and internal sides 270A and 270B of curved board 258 presses outwardly towards curved tubular wall 248 in structural support of LEDs 262.

As shown in the isolated view of curved circuit board 258 in FIG. 22 wherein curved circuit board 258 is in the biased mode as shown in FIGS. 21 and 21A, curved exterior side 270A is stretched to accommodate the greater area that exterior side 270A must encompass as compared to the area occupied by curved interior side 270B. Exterior side 270A defines a plurality of slits 280 that are formed lateral to the curved elongated orientation or direction of circuit board 258, and slits 280 are formed transverse to the axial center. After circuit board 258 is rolled from the flat, unbiased mode to the rolled cylindrical mode, circuit board 258 is further curved from the rolled mode to the curved mode as shown in FIGS. 21, 21A, and 22. By this action, exterior side 270A is stretched so that slits 280 become separated as shown in FIG. 22. Interior side 270B in turn becomes compressed as shown. Curved circuit board 258 is made of a material that is both biasable to accommodate the stretchability of exterior wall 270A and to some extent compressible to accommodate the compressed mode of interior wall 270B.

Curved LED lamp 238 as described above is a bi-pin type connector LED lamp such as bi-pin type LED lamp 124 for purposes of exposition only. The basic features of LED lamp 238 as described above would likewise apply to a single-pin type LED lamp such as single-pin lamp 10 described herein.

The description of curved LED lamp 238 as a hemispherical LED is for purposes of exposition only and the principles expounded herein would be applicable in general to any curvature of a curved LED lamp including the provision of a plurality of slits 280 that would allow the stretching of the external side of a biasable circuit board.

Figure 23:
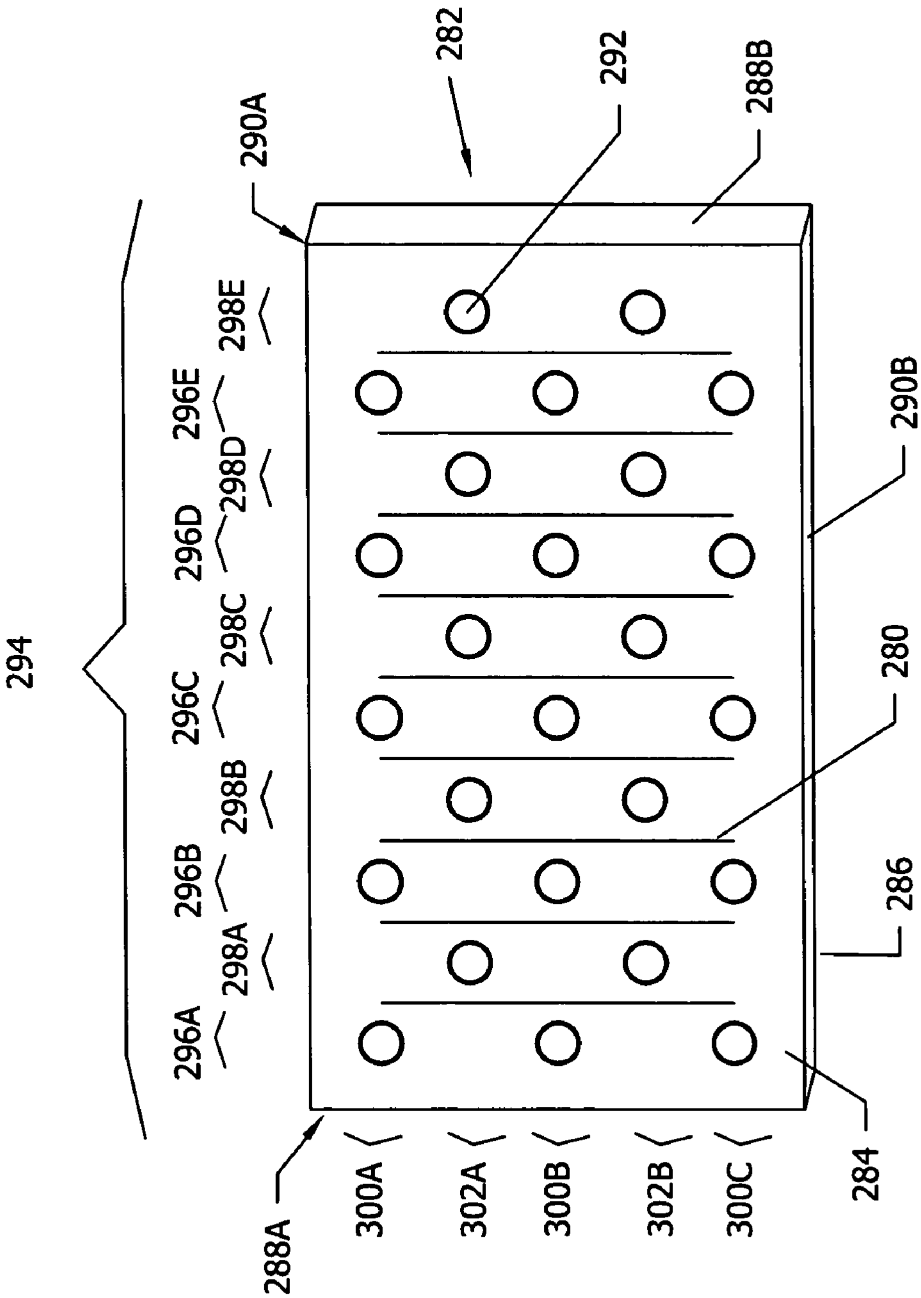
FIG. 23 is a perspective top view taken in isolation of a circuit board in a flat pre-assembly mode with LEDs mounted thereon in a staggered pattern.
Figure 25:
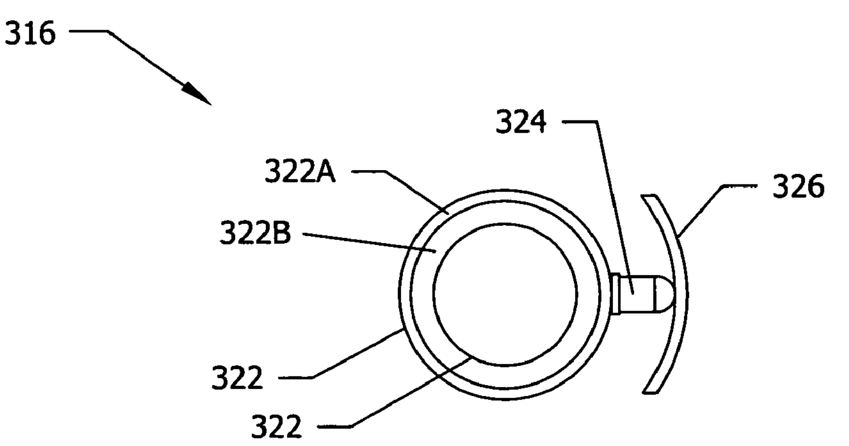
FIG. 25 is a partial fragmentary end view of a layered circuit board for a retrofitted LED lamp for a fluorescent lamp showing a typical LED mounted thereto proximate a tubular wall.

FIG. 23 shows in an isolated circuit board 282 in a flat mode subsequent to having an LED circuitry mounted thereon and further subsequent to having LEDs mounted thereon and connected to the LED circuitry, and prior to assembly to insertion into a tubular housing analogous tubular housings 24, 142, and 246 of LED lamps 10, 124, and 238. Circuit board 282 is a variation of LED array circuit board 34 of LED lamp 10, circuit board 152 for LED lamp 114, and circuit board 258 for LED lamp 238. Circuit board 282 has a flat top side 284 and an opposed flat bottom side 286. Circuit board 282 is rectangular in configuration having opposed linear end edges 288A and 288B and opposed linear side edges 290A and 290B. A total of twenty-five LEDs 292 are secured to top side 284 with each LED 292 being aligned perpendicular to flat top side 284. LED circuitry consisting of pads, tracks and vias, etc. (not shown) to provide electrical power to LEDs 292 can be mounted to top side 284 or to bottom side 286. Such LED circuitry is analogous to LED circuitry 70 for LED lamp 10 or LED circuitry 190 for LED lamp 124, as the case may be. Such LED circuitry can be mounted directly to top side 284 or can be mounted to a separate thin, biasable circuit board that is in turn secured by gluing to top side 284 as shown in FIG. 25. A manner of mounting twenty-five LEDs 292 into an alternate LED matrix 294 to that shown in FIGS. 3A and 13A is shown by way of exposition as shown in FIG. 23. Five columns 296A, 296B, 296C, 296D and 296E of three LEDs 292 each, and five columns 298A, 298B, 298C, 298D and 298E of two LEDs 292 each are aligned at equal intervals between columns 296A-E. Matrix 294 further includes the same 25 LEDs 292 being further arranged in three rows 300A, 300B, and 300C aligned at equal intervals, and in two rows 302A and 302B aligned at equal intervals between rows 300A-C. LEDs 292 are connected to an LED electrical series parallel circuit. The staggered pattern of LEDs 292 shown in FIG. 23 illustrates by way of exposition merely one of many possible patterns of placement of LEDs other than the LED pattern of placements shown in LED lamps 10, 124, and 238.

Figure 24:
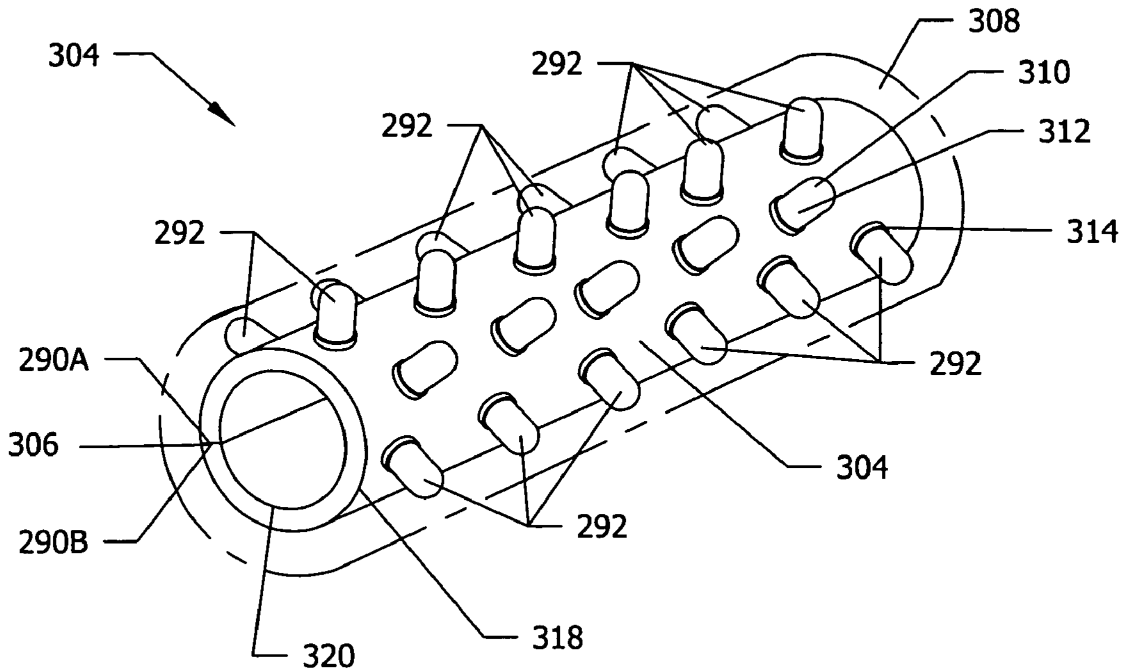
FIG. 24 is a perspective view of the circuit board shown in FIG. 23 in a cylindrically assembled configuration in preparation for mounting into a linear tubular wall.

As shown in FIG. 24, flat circuit board 282 with LEDs 292 is shown rolled into a cylindrical configuration indicated as cylindrical circuit board 304 in preparation for assembly into a tubular wall such as tubular walls 26 and 144 of LED lamps 10 and 124 previously described and also mutatis mutandis of LED lamp 238. Flat top side 284 of flat circuit board 282 is shown as cylindrical exterior side 318 of cylindrical circuit board 304; and flat bottom side 286 of flat circuit board 282 is shown as cylindrical interior side 320 of cylindrical circuit board 304. The process of rolling flat circuit board 282 into cylindrical circuit board 304 can be done physically by hand, but is preferably done automatically by a machine.

A mating line 306 is shown at the juncture of linear side edges 290A and 290B shown in FIG. 23. The material of flat circuit board 282, that is, of cylindrical circuit board 304, is flexible to allow the cylindrical configuration of circuit board 304 and is resilient and self-biased. That is, circuit board 304 is moveable between a flat unbiased mode and a cylindrical biased mode, wherein the cylindrical biased mode circuit board 304 self-biases to return to its flat unbiased mode. As such, in the cylindrical mode, cylindrical circuit board 304 presses outwardly and thus presses LEDs 292 against the tubular wall in which it is positioned and held, as described previously with regard to LED lamps 10 and 124 wherein the LEDs themselves are pressed outwardly against such a tubular wall shown schematically in phantom line as tubular wall

308 in FIG. 24. Each LED 292 as previously discussed herein includes a lens portion 310, a body portion 312, and a base portion 314 so that lens portion 310 is pressed against tubular wall 306.

FIG. 25 shows an end view of a layered cylindrical circuit board 316 having opposed cylindrical interior and exterior sides 320 and 318 in isolation with a typical LED 324 shown for purposes of exposition mounted thereto in juxtaposition with a partially indicated tubular wall 326 analogous to tubular walls 26 for LED lamp 10 and tubular wall 144 for LED lamp 124 as described heretofore. Circuit board 316 is in general is analogous to circuit boards 34 in FIG. 3 of LED lamp 10 and circuit board 152 in FIG. 13 of LED lamp 124 with the proviso that circuit board 316 comprises two layers of material, namely cylindrical outer layer 322A and a cylindrical inner support layer 322B. Outer layer 322A is a thin flexible layer of material to which is mounted an LED circuit such as either LED array circuitry 72 for LED lamp 10 or LED array circuitry 190A for LED lamp 124. Outer layer 322A is attached to inner layer 322B by a means known in the art, for example, by gluing. Inner support layer 322B is made of a flexible material and preferably of a biasable material, and is in the biased mode when in a cylindrical position as shown in FIG. 25; and outer layer 322A is at least flexible prior to assembly and preferably is also made of a biasable material that is in the biased mode as shown in FIG. 25. Typical LED 324 is secured to outer layer 322A in the manner shown earlier herein in FIGS. 3 and 3A of LED lamp 10 and LED lamp 124. An LED array circuit (not shown) such as LED array circuitry 72 of LED lamp 10 and LED array circuitry 190A for LED lamp 124 can be mounted on cylindrical outer layer 322A prior to assembly of outer layer 322A to inner layer 322B. Typical LED 324 is electrically connected to the LED array circuitry mounted on outer layer 322A and/or inner layer 322B. Together outer layer 322A and inner layer 322B comprise circuit board 316.

Figure 26:
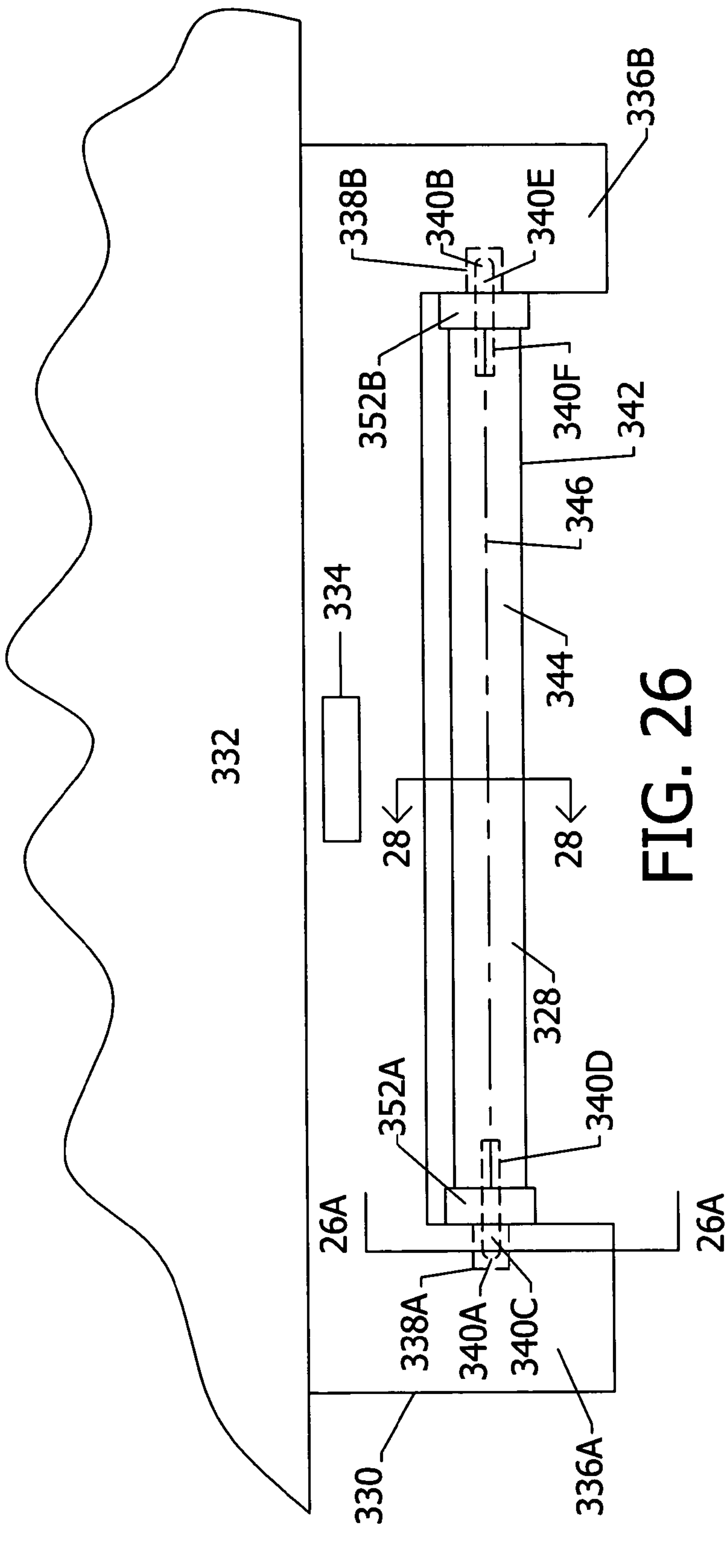
FIG. 26 is an elevational side view of another embodiment of a retrofitted single-pin type LED lamp mounted to an existing fluorescent fixture.
Figure 26A:
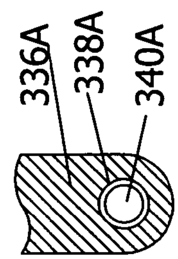
FIG. 26A is a view taken through line 26A-26A of FIG. 26 showing a single-pin type LED retrofit lamp wherein the existing fluorescent fixture has an electronic instant start, hybrid, or magnetic ballast having a pair of single contact electrical sockets.

FIGS. 26-35A show another embodiment of the present invention, in particular an LED lamp 328 seen in FIG. 26 retrofitted to an existing fluorescent fixture 330 mounted to a ceiling 332. An electronic instant start type ballast assembly 334, which can also be a hybrid, or a magnetic ballast assembly, is positioned within the upper portion of fixture 330. Fixture 330 further includes a pair of fixture mounting portions 336A and 336B extending downwardly from the ends of fixture 330 that include ballast electrical contacts shown as ballast end sockets 338A and 338B that are in electrical contact with ballast assembly 334. Fixture ballast end sockets 338A and 338B are each single contact sockets in accordance with the electrical operational requirement of an electronic instant start ballast, hybrid ballast, or one type of magnetic ballast. As also seen in FIG. 26A, LED lamp 328 includes opposed single-pin electrical contacts 340A and 340B that are positioned in ballast sockets 338A and 338B, respectively, so that LED lamp 328 is in electrical contact with ballast assembly 334.

Figure 27:
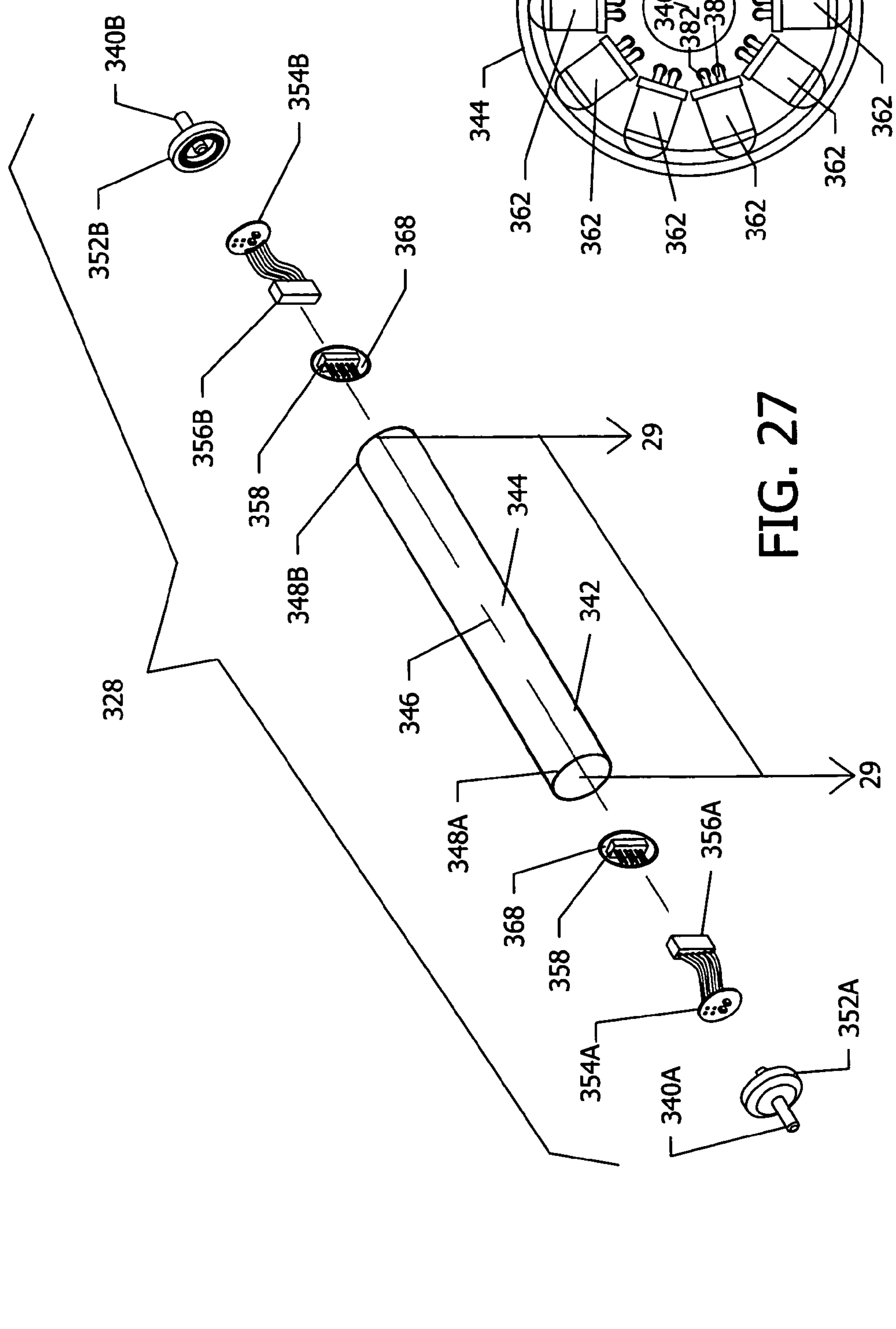
FIG. 27 is an exploded perspective view of the LED retrofit lamp shown in FIG. 26 including the integral electronics taken in isolation.

As shown in the disassembled mode of FIG. 27, LED lamp 328 includes an elongated housing 342 particularly configured as a linear tubular wall 344 circular in cross-section taken transverse to a center line 346 that is made of a translucent material such as plastic or glass and preferably having a diffused coating. Tubular wall 344 has opposed tubular wall ends 348A and 348B. LED lamp 328 further includes a pair of opposed lamp base end caps 352A and 352B mounted to single electrical contact pins 340A and 340B, respectively for insertion in ballast electrical socket contacts 338A and 338B in electrical power connection to ballast assembly 334, so as to provide power to LED lamp 328. Tubular wall 344 is mounted to opposed base end caps 352A and 352B at tubular wall ends 348A and 348B in the assembled mode as shown in FIG. 26. An integral electronics circuit board 354A is positioned between base end cap 352A and tubular wall end 348A, and an integral electronics circuit board 354B is positioned between base end cap 352B and tubular wall end 348B.

Figure 28:
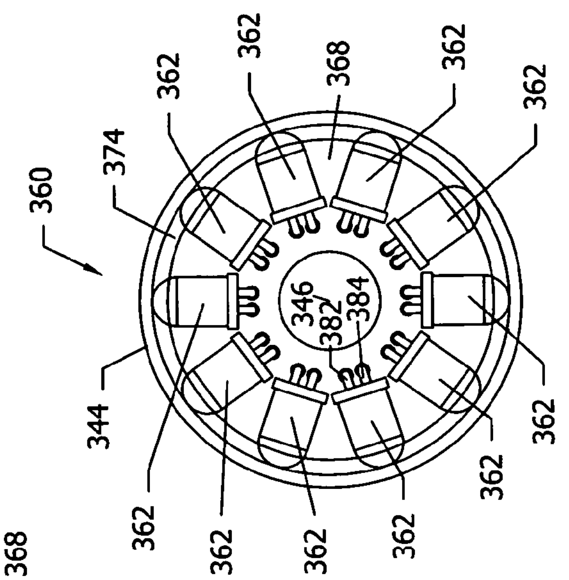
FIG. 28 is a sectional top view of the tubular wall taken through line 28-28 in FIG. 26 of a single row of LEDs.

As seen in FIGS. 27 and 28, LED lamp 328 also includes a 6-pin connector 356A connected to integral electronics circuit board 354A and to a 6-pin header 358 on first disk 368. LED lamp 328 also includes a 6-pin connector 356B connected to integral electronics circuit board 354B and to a 6-pin header 358 on last disk 368.

Figure 29:
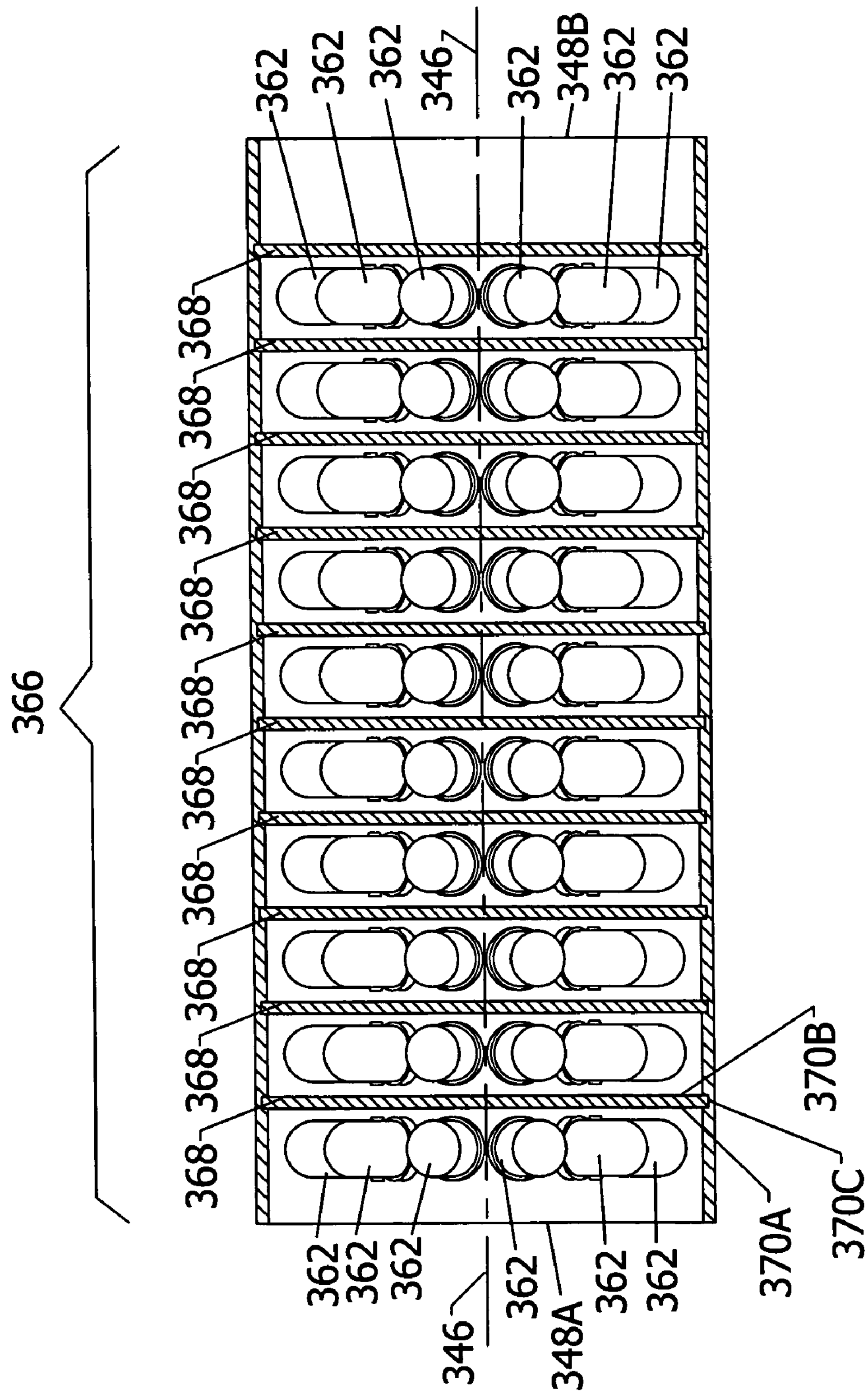
FIG. 29 is an elongated sectional view of that shown in FIG. 27 taken through plane 29-29 bisecting the cylindrical tube and the disks therein with LEDs mounted thereto.

For the purposes of exposition, only ten of the original fifteen parallel electrical strings are displayed and each LED electrical string 408 is herein described as containing LED row 360. In particular, FIG. 28 shows a typical single LED row 360 that includes ten individual LEDs 362. LED lamp 328 includes ten LED rows 360 that comprise LED array 366. FIG. 29 shows a partial view of six LEDs 362 of each of the ten LED rows 360. Each LED row 360 is circular in configuration, which is representative of each of the ten rows 360 of LED array 366 as shown in FIG. 29 with all LED rows 360 being aligned in parallel relationship.

In FIG. 29, ten circular disks 368 each having central circular apertures 372 and having opposed flat disk walls 370A and 370B and disk circular rims 370C are positioned and held in tubular wall 344 between tubular end walls 348A and 348B. Each disk 368 that is centrally aligned with center line 346 of tubular wall 344 defines a central circular aperture 372. Apertures 372 are provided for the passage of heat out of tubular wall 344 generated by LED array 366. Disks 368 are spaced apart at equal distances and are in parallel alignment. The inner side of tubular wall 344 defines ten equally spaced circular grooves 374 defining parallel circular configurations in which are positioned and held disk rims 370C.

Figure 29A:
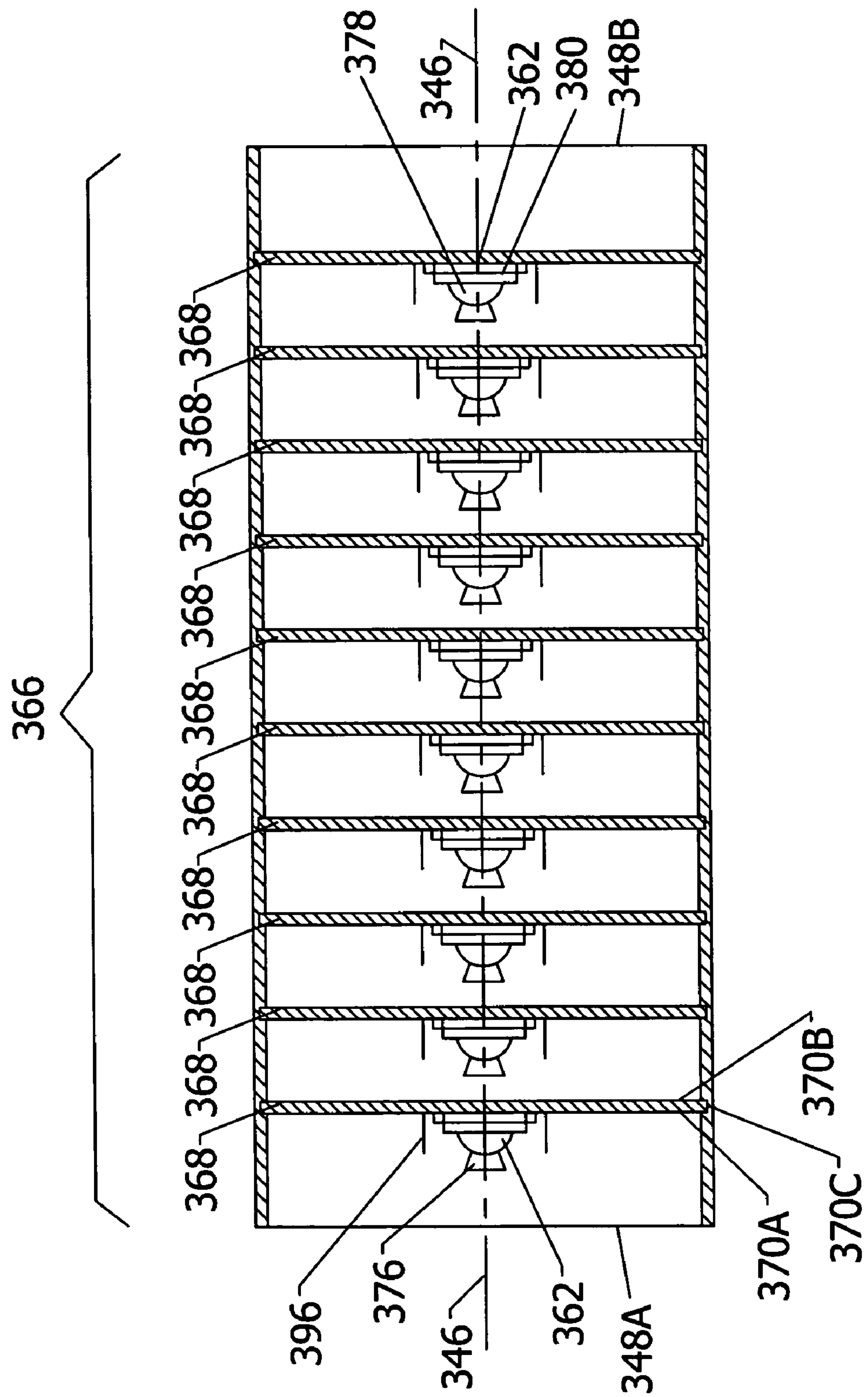
FIG. 29A is an alternate elongated sectional view of that shown in FIG. 27 taken through plane 29-29 bisecting the cylindrical tube and the disks therein with a single LED mounted in the center of each disk wherein ten LEDs are arranged in an electrically series relationship.

Similar to FIG. 29, FIG. 29A now shows a single LED row 360 that includes one individual LED 362. LED lamp 328 includes ten LED rows 360 that can comprise LED array 366. FIG. 29A shows a single LED 362 of each of the ten LED rows 360 mounted in the center of each disk 368. A heat sink 396 is attached to each LED 362 to extract heat away from LED 362. Ten circular disks 368 each having opposed flat disk walls 370A and 370B and disk circular rims 370C are positioned and held in tubular wall 344 between tubular end walls 348A and 348B. Apertures 372A are provided for the passage of heat out of tubular wall 344 generated by LED array 366. Disks 368 are spaced apart at equal distances and are in parallel alignment. The inner side of tubular wall 344 defines ten equally spaced circular grooves 374 defining parallel circular configurations in which are positioned and held disk rims 370C.

Figure 29B:
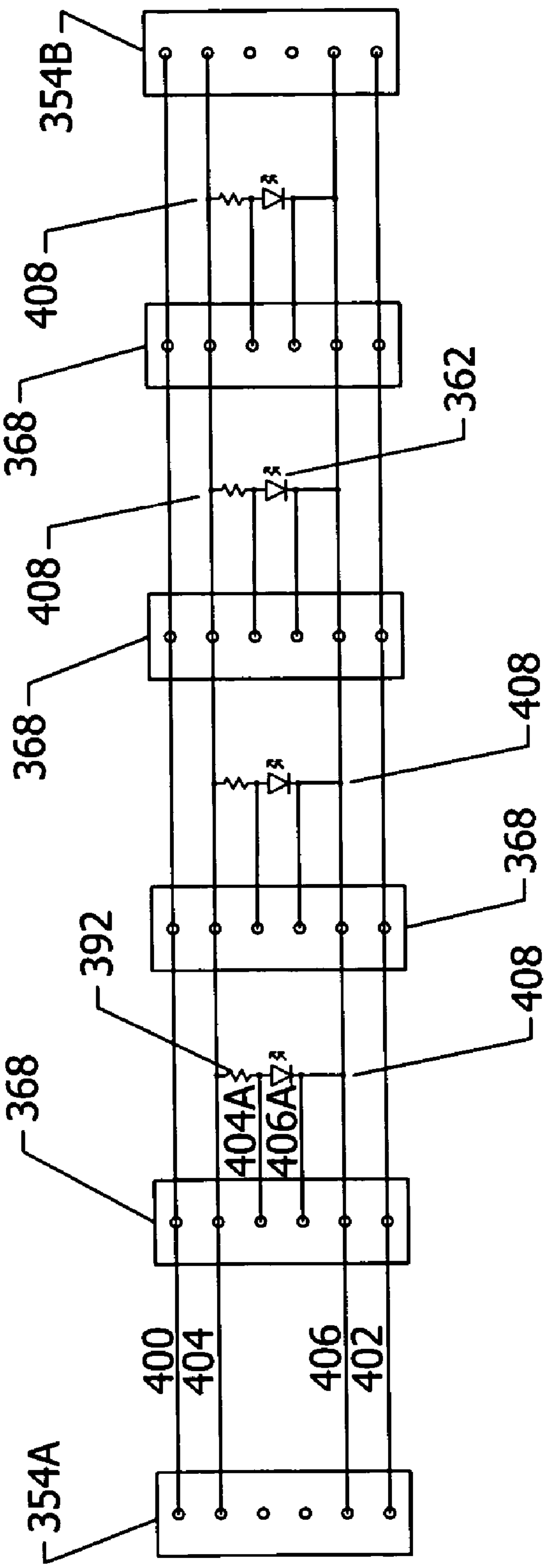
FIG. 29B is a simplified arrangement of the array of LEDs shown for purposes of exposition in a flat compressed position for the overall electrical circuit shown in FIG. 29 including lead lines and pin headers for the LED retrofit lamp.
Figure 29C:
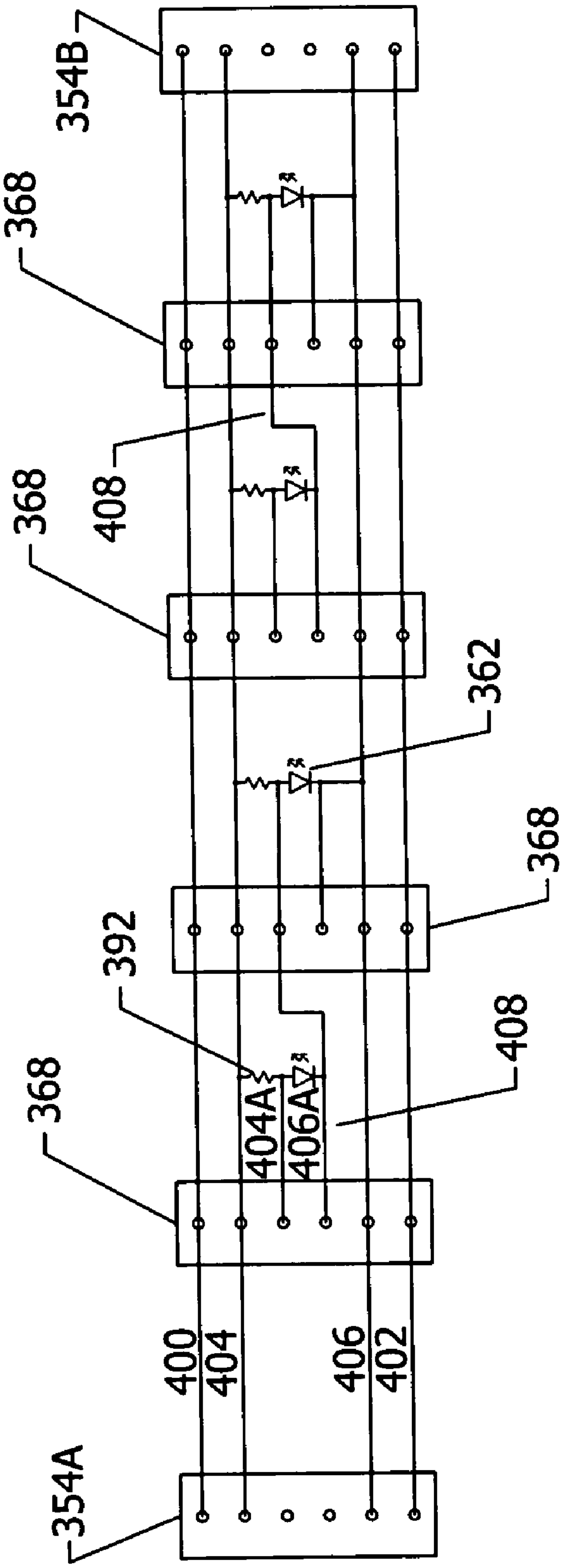
FIG. 29C is another simplified arrangement of the array of LEDs shown for purposes of exposition in a flat compressed position for the overall electrical circuit shown in FIG. 29 including lead lines and pin headers for the LED retrofit lamp.
Figure 29D:
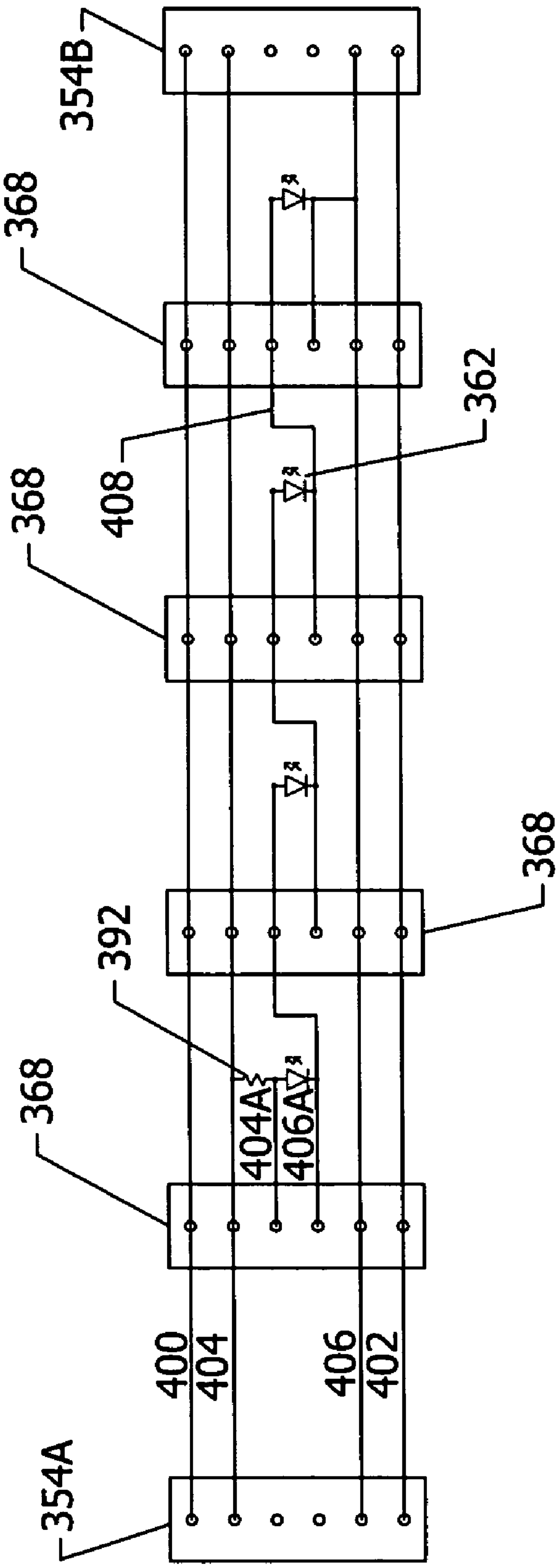
FIG. 29D is a simplified arrangement of the array of LEDs shown for purposes of exposition in a flat compressed position for the overall electrical circuit shown in FIG. 29A including lead lines and pin headers for the LED retrofit lamp.

Although FIGS. 28, 29, and 29A show round circular circuit board disks 368, it can be appreciated by someone skilled in the art to use circuit boards 368 made in shapes other than a circle. Likewise, the shape of the tubular housing 342 holding the individual circuit boards 368 can be made in a similar shape to match the shape of the circuit boards 368. FIGS. 29B, 29C, and 29D show simplified electrical arrangements of the array of LEDs shown with at least one LED in a series parallel configuration. Each LED string has an optional resistor in series with the LED.

Figure 30:
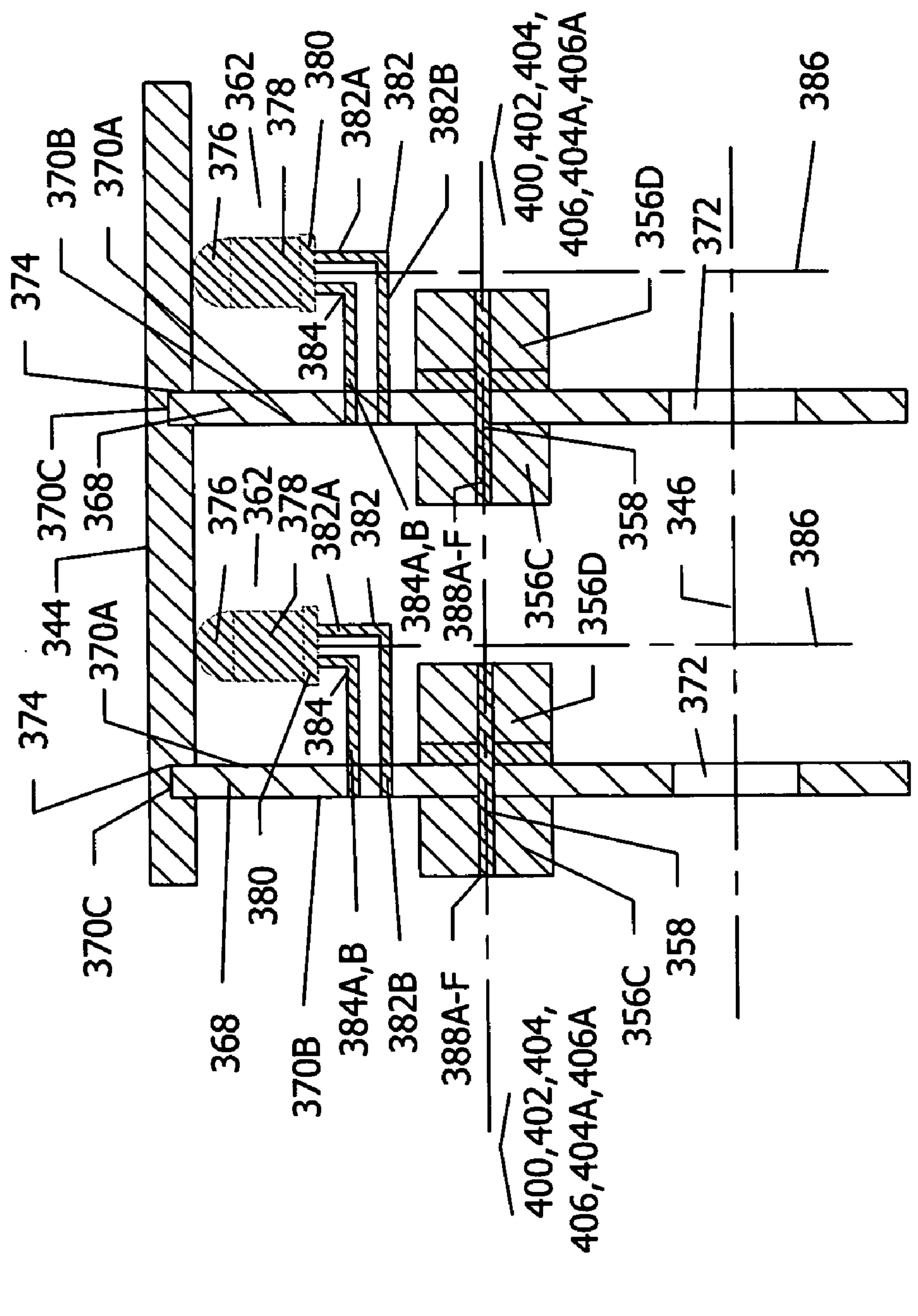
FIG. 30 shows a fragmented sectional side view of a portion of two cylindrical support disks and of two LEDs taken from adjoining LED rows as indicated in FIG. 29 and further showing electrical connections between the LEDs as related to the LED retrofit lamp of FIG. 26.

In FIG. 30, each LED 362 includes lens portion 376, body portion 378, and base portion 380. Each lens portion 376 is in juxtaposition with the inner surface of tubular wall 344. LED leads 382 and 384 extend out from the base portion 380 of LED 362. LED lead 382 is bent at a 90-degree angle to form LED lead portions 382A and 382B. Likewise, LED lead 384 is also bent at a 90-degree right angle to form LED lead portions 384A and 384B. In FIG. 30, a detailed isolated view of two typically spaced single LEDs 362 shows each LED 362 mounted to disk 368 with LED lead portions 382A and 384A lateral to disk 368 and LED lead portions 382B and 384B transverse to disk 368. Disks 368 are preferably made of rigid G10 epoxy fiberglass circuit board material, but can be made of other circuit board material known in the art. LED lead portions 382B and 384B extend through disk wall 370A of disk 368 to disk wall 370B of disk 368 by means known in the art as plated through hole pads. The LED leads 382 and 384 support LED 362 so that the center line 386 of each LED 362 is perpendicular to center line 346 of tubular wall 344. The pair of LED leads 382 and 384 connected to each LED 362 of LED array 366 extend through each disk 368 from disk wall 370A to disk wall 370B and then to DC positive lead line 404, or to DC negative lead line 406, or to another LED 362 (not shown) in the same LED string 408 by means known in the art as electrical tracks or traces located on the surface of disk wall 370A and/or disk wall 370B of disk 368.

Figure 30A:
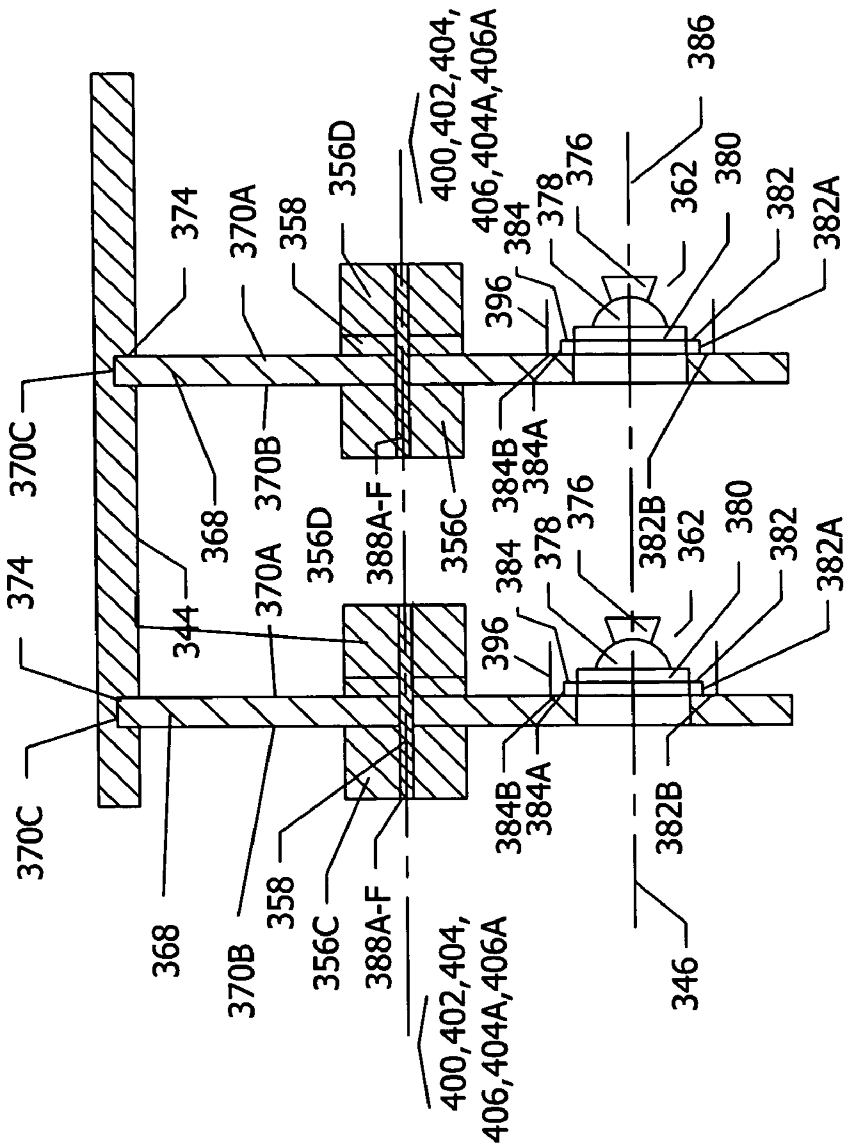
FIG. 30A shows an alternate fragmented sectional side view of a portion of two cylindrical support disks and of a single LED centrally mounted to each cylindrical support disks taken from adjoining LED rows as indicated in FIG. 29 and further showing electrical connections between the LEDs as related to the LED retrofit lamp of FIG. 26.

In FIG. 30A, a special single SMD LED is mounted to the center of disk 368. Each LED 362 includes lens portion 376, body portion 378, and base portion 380. Lens portion 376 allows the light from LED 362 to be emitted in a direction perpendicular to center line 386 of LED 362 and center line 346 of tubular wall 344 with the majority of light from LED 362 passing straight through tubular wall 344. LED leads 382 and 384 extend out from the base portion 380 of LED 362. LED lead 382 is bent at a 90-degree angle to form LED lead portions 382A and 382B. Likewise, LED lead 384 is also bent at a 90-degree right angle to form LED lead portions 384A and 384B. In FIG. 30A, a detailed isolated view of two typically spaced single LEDs 362 shows each LED 362 mounted to disk 368 with LED lead portions 382A and 384A transverse to disk 368 and LED lead portions 382B and 384B lateral to disk 368. Disks 368 are preferably made of rigid G10 epoxy fiberglass circuit board material, but can be made of other circuit board material known in the art. LED lead portions 382B and 384B rest on and are attached to disk wall 370A of disk 368 with solder to means known in the art as solder pads. The LED leads 382 and 384 support LED 362 so that the center line 386 of each LED 362 is parallel to center line 346 of tubular wall 344. The pair of LED leads 382 and 384 connected to each LED 362 of LED array 366 is then connected to DC positive lead line 404, or to DC negative lead line 406, or to another LED 362 (not shown) in the same LED string 408 by means known in the art as electrical tracks, plated through holes, vias, or traces located on the surface of disk wall 370A and/or disk wall 370B of disk 368. A heat sink 396 is attached to the base portion 380 of each LED 362 to sufficiently extract the heat generated by each LED 362.

Figure 30B:
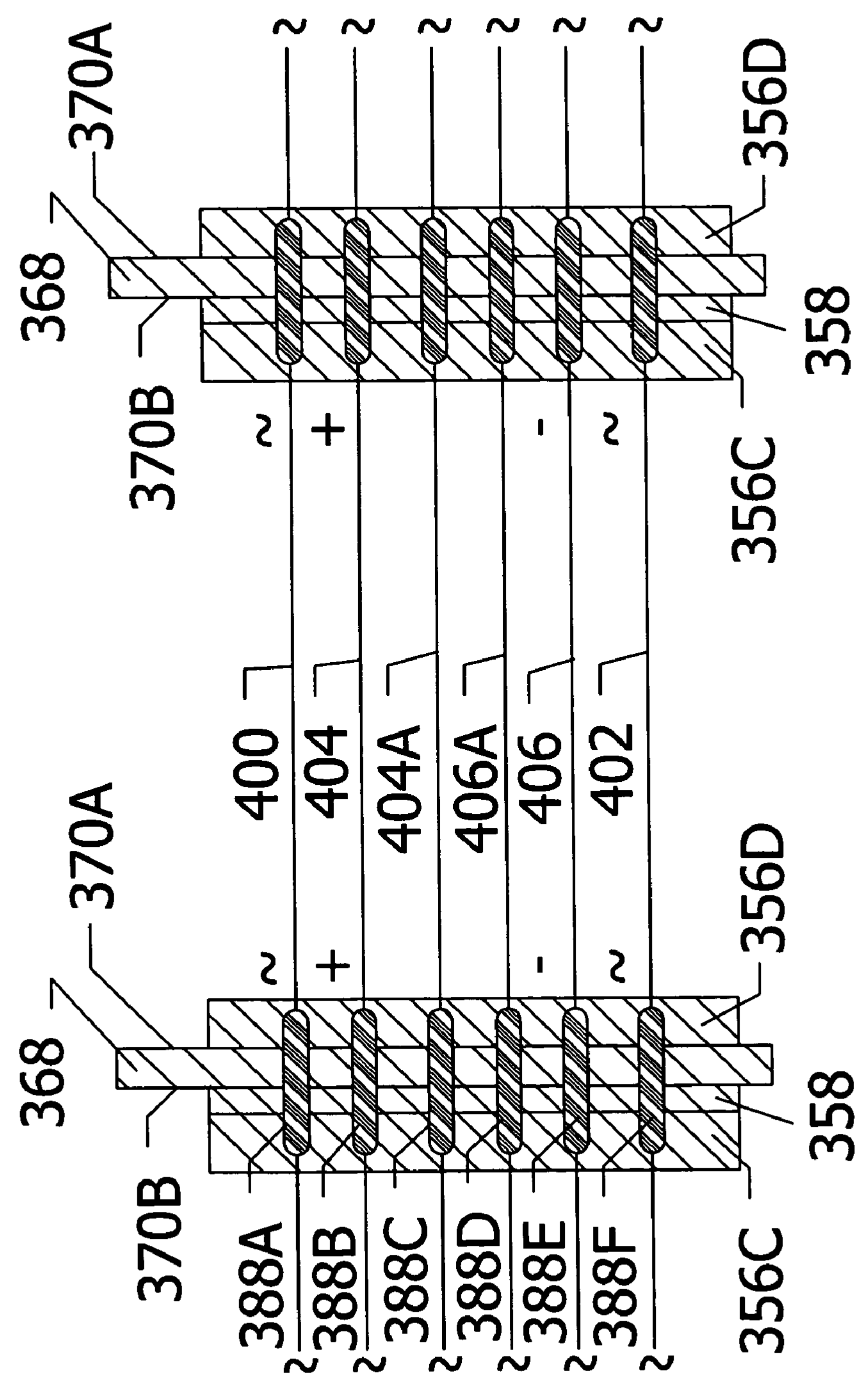
FIG. 30B is an isolated top view of the 6-wire electrical connectors and headers shown in side view in FIG. 30.
Figure 34:
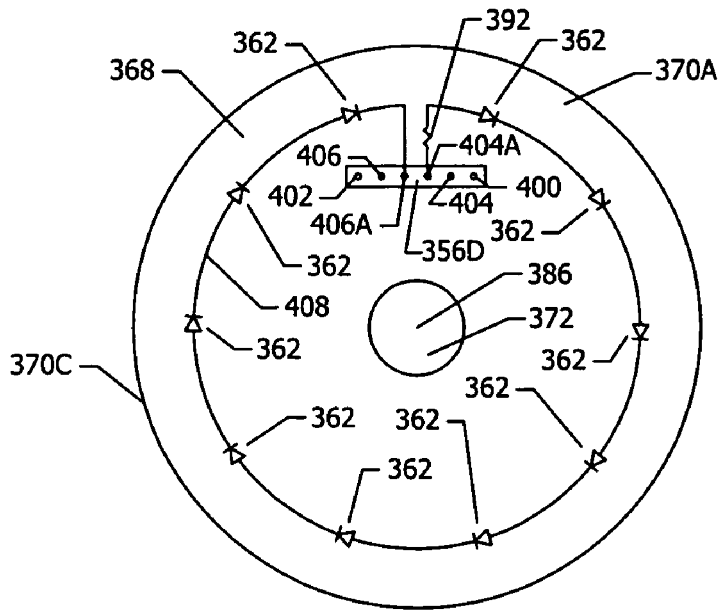
FIG. 34 shows a full frontal view of a single support disk as related to the LED retrofit lamp shown in FIG. 26 taken in isolation with an electrical schematic rendering showing a single row of ten LEDs connected in series within an electrical string as a part of the total parallel electrical structure for the LEDs.

As further indicated in FIGS. 30, 30A, and 30B, six electrical lead lines comprising AC lead line 400, AC lead line 402, DC positive lead line 404, DC negative lead line 406, LED positive lead line 404A, and LED negative lead line 406A are representative of lead lines that extend the entire length of tubular wall 344, in particular extending between and joined to each of the ten disks 368 so as to connect electrically each LED string 408 of each disk 368 as shown in FIG. 34. Each of the lead lines 400, 402, 404, 406, 404A, and 406A are held in position at each of disks 368 by six pins 388A, 388B, 388C, 388D, 388E, and 388F that extend through disks 368 and are in turn held in position by 6-pin connector 356C mounted to disks 368 shown as disk wall 370B for purposes of exposition. 6-pin connector 356C is mounted to each 6-pin header 358, and another 6-pin connector 356D is mounted to disk wall 370A.

Figure 31:
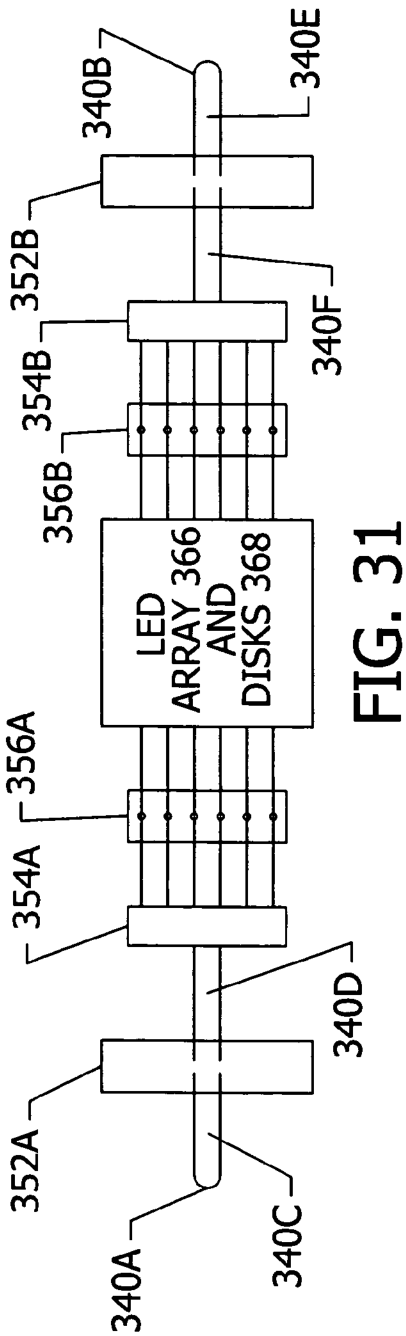
FIG. 31 is a schematic view showing the LED array in FIGS. 26 and 27 electrically connected by pin connectors to two opposed integral electronics circuit boards that are electrically connected to base end caps each having a single-pin connection.

As shown in the schematic electrical and structural representations of FIG. 31, disks 368 and LED array 366 are positioned between integral electronics circuit board 354A and 354B that in turn are electrically connected to ballast assembly 334 by single contact pins 340A and 340B, respectively. Single contact pins 340A and 340B are mounted to and protrude out from base end caps 352A and 352B, respectively, for electrical connection to LED array 366. Contact pins 340A and 340B are soldered directly to integral electronics circuit boards 354A and 354B, respectively. In particular, being soldered directly to the integral electronics circuit board 354A electrically connects pin inner extension 340C of single-pin contact 340A. Similarly, being soldered directly to integral electronics circuit board 354B electrically connects pin inner extension 340D of connecting pin 340B. 6-pin connector 356A is shown positioned between and in electrical connection with integral electronics circuit board 356A and LED array 366. 6-pin connector 356B is shown positioned between and in electrical connection with integral electronics circuit board 354B and LED array 366.

Figure 32:
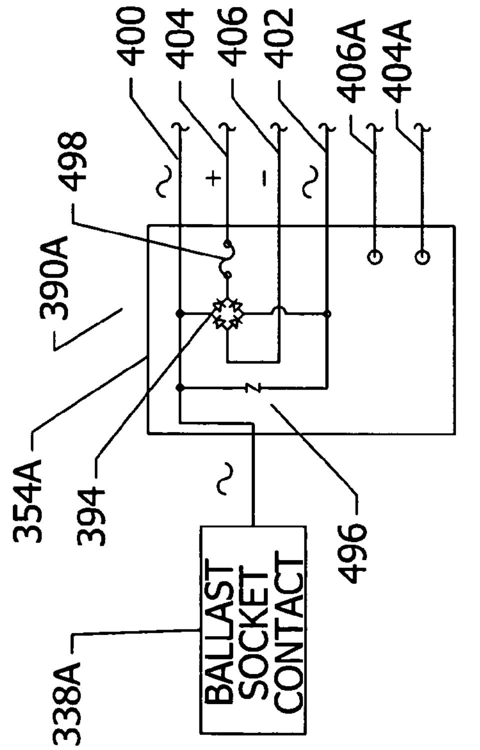
FIG. 32 is a schematic circuit of one of the two integral electronics circuit boards shown in FIG. 31 positioned at one side of the alternating current voltage emanating from the ballast for the LED array shown in FIG. 31.

As seen in FIG. 32, a schematic of an integral electronics circuit 390A is mounted on integral electronics circuit board 354A. Integral electronics circuit 390A is in electrical contact with ballast socket contact 338A, which is shown as providing AC voltage. Integral electronics circuit 390A includes bridge rectifier 394, voltage surge absorber 496, and resettable fuse 498. Bridge rectifier 394 converts AC voltage to DC voltage. Voltage surge absorber 496 limits the high voltage to a workable voltage within the design voltage capacity of LEDs 362. The DC voltage circuits indicated as plus (+) and minus (−) lead to and from LED array 366 and are indicated as DC lead line 404 and 406, respectively. The presence of AC voltage in indicated by an AC wave symbol ~. Each AC voltage could be DC voltage supplied by certain ballast assemblies 334. In such a case DC voltage would be supplied to LED array 366 even in the presence of bridge rectifier 394. It is particularly noted that in such a case, voltage surge absorber 496 would remain operative.

Figure 33:
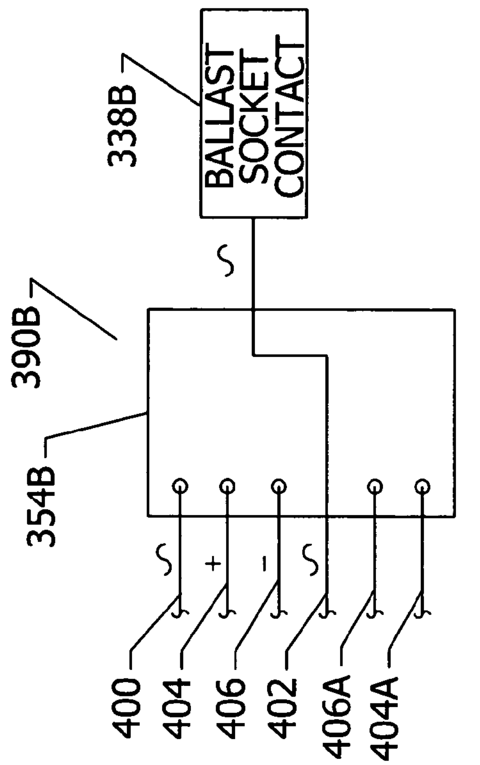
FIG. 33 is a schematic circuit of the other of the two integral electronics circuit boards shown in FIG. 31 positioned at the other side of the alternating current voltage emanating from the ballast for the LED array shown in FIG. 31.

FIG. 33 shows an integral electronics circuit 390B printed on integral electronics board 354B with voltage protected AC lead line 400 by extension from integral electronics circuit 390A. The AC lead line 400 having passed through voltage surge absorber 496 is a voltage protected circuit and is in electrical contact with ballast socket contact 338B. Integral circuit 390B includes DC positive and DC negative lead lines 404 and 406, respectively, from LED array 366 to positive and negative DC terminals 438 and 440, respectively, printed on integral electronics board 354B. Integral circuit 390B further includes bypass AC lead line 402 from integral electronics circuit 390A to ballast socket contact 338B.

Circuitry for LED array 366 with integral electronics circuits 390A and 390B as connected to the ballast circuitry of ballast assembly 334 is analogous to that shown previously herein in FIG. 4. As seen therein and as indicated in FIG. 29, the circuitry for LED array 366 includes ten electrical strings in electrical parallel relationship. The ten electrical strings are typified and represented in FIG. 34 by LED electrical string 408 mounted to disk 368 at one of the disk walls 370A or 370B, shown as disk wall 370A in FIG. 30 for purposes of exposition only. A single LED row 360 comprises ten LEDs 362 that are electrically connected at equal intervals along each string 408 that is configured in a circular pattern spaced from and concentric with disk rim 370C. A typical LED string 408 is shown in FIG. 34 as including an LED row 360 comprising ten LEDs 364A, 364B, 364C, 364D, 364E, 364F, 364G, 364H, 364I, and 364J. First and last LEDs 364A and 364J, respectively, of LED string 408 generally terminate at the 6-pin connectors shown in FIG. 30 as typical 6-pin connectors 356C and 356D and in FIG. 34 as typical 6-pin connector 356D. In particular, the anode side of typical LED 364A is connected to DC positive lead line 404 by way of LED positive lead line 404A with optional resistor 392 connected in series between the anode side of LED 364A connected to LED positive lead line 404A and DC positive lead line 404. The cathode side of typical LED 364J is connected to DC negative lead line 406 by way of LED negative lead line 406A. Both AC lead line 400 and AC lead line 402 are shown in FIGS. 32-34. FIG. 30B shows an isolated top view of AC leads 400 and 402, of positive and negative DC leads 404 and 406, and of positive and negative LED leads 404A and 406A, respectively, extending between disks 368.

Figure 34A:
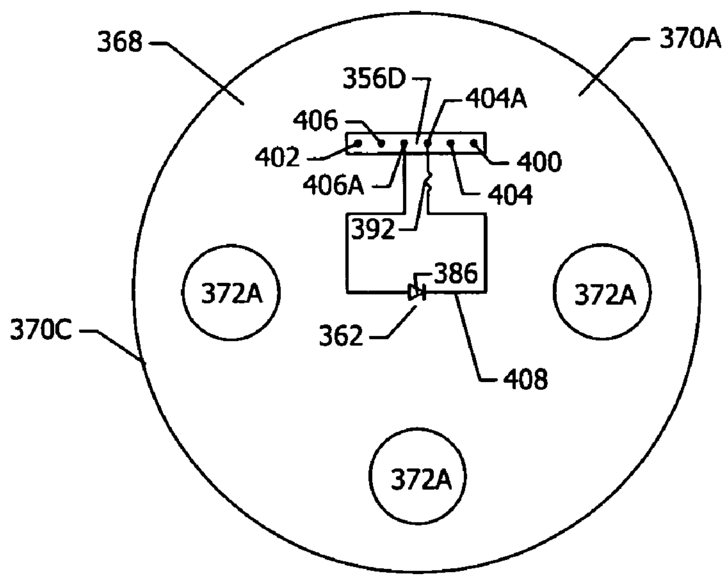
FIG. 34A shows a full frontal view of a single support disk as related to the LED retrofit lamp shown in FIG. 26 taken in isolation with an electrical schematic rendering showing a single LED to be connected in series within an electrical string as a part of the total parallel electrical structure for the LEDs.

Analogous to the circuit shown previously herein in FIG. 4A, for more than ten LEDs 362 connected in series within each LED electrical string 408, the LEDs 362 from one disk 368 will extend to the adjacent disk 368, etc. until all twenty LEDs 362 in LED electrical string 408 spread over two disks 368 are electrically connected into one single series connection. Circuitry for LED array 366 with integral electronics circuits 390A and 390B as connected to the ballast circuitry of ballast assembly 334 is also analogous to that shown previously herein in FIG. 4. As seen therein and as indicated in FIG. 29, the circuitry for LED array 366 includes ten electrical strings in electrical parallel relationship. The ten electrical strings are typified and represented in FIG. 34 by LED electrical string 408 mounted to disk 368 at one of the disk walls 370A or 370B, shown as disk wall 370A in FIG. 30 for purposes of exposition only. Each LED row 360 comprises ten LEDs 362 that are electrically connected at equal intervals along each string 408 that is configured in a circular pattern spaced from and concentric with disk rim 370C. A typical LED string 408 is shown in FIG. 34 as including an LED row 360 comprising ten LEDs 364A, 364B, 364C, 364D, 364E, 364F, 364G, 364H, 364I, and 364J. First and last LEDs 364A and 364J, respectively, of LED string 408 generally terminate at the 6-pin connectors shown in FIG. 30 as typical 6-pin connectors 356C and 356D and in FIG. 34 as typical 6-pin connector 356D. In particular, the anode side of typical LED 364A is connected to DC positive lead line 404 by way of LED positive lead line 404A with an optional resistor 392 connected in series between the anode side of LED 364A connected to LED positive lead line 404A and DC positive lead line 404. The cathode side of typical LED 364J is now connected to anode side of typical LED 364A of the adjacent LED string 408 of the adjacent disk 368. The cathode side of typical LED 364J of the adjacent LED string 408 of the adjacent disk 368 is connected to DC negative lead line 406 by way of LED negative lead line 406A. This completes the connection of the first twenty LEDs 362 in LED array 366. The next twenty LEDs 362 and so forth, continue to be connected in a similar manner as described. Both AC lead line 400 and AC lead line 402 are shown in FIGS. 32-34. FIG. 30B shows an isolated top view of AC leads 400 and 402, of positive and negative DC leads 404 and 406, and of positive and negative LED leads 404A and 406A, respectively, extending between disks 368. Now analogous to the circuit shown previously herein in FIG. 4B, for forty LEDs 362 all connected in series within one LED electrical string 408, a single LED 362 from one disk 368 will extend to the adjacent single LED 362 in adjacent disk 368, etc. until all forty LEDs 362 in LED electrical string 408 are electrically connected to form one single series connection. Circuitry for LED array 366 with integral electronics circuits 390A and 390B as connected to the ballast circuitry of ballast assembly 334 is also analogous to that shown previously herein in FIG. 4. As seen therein and as indicated in FIG. 29A, the circuitry for LED array 366 includes forty electrical strings in electrical parallel relationship. The forty electrical strings are typified and represented in FIG. 34A by LED electrical string 408 mounted to disk 368 at one of the disk walls 370A or 370B, shown as disk wall 370A in FIG. 30A for purposes of exposition only. Each LED row 360 comprises a single LED 362 that is centrally mounted and concentric with disk rim 370C. Central circular aperture 372 is no longer needed. Instead, vent holes 372A are provided around the periphery of disk 368 for proper cooling of entire LED array 366 and LED retrofit lamp 328. A typical LED string 408 is shown in FIG. 34A as including a single LED row 360 comprising single LED 364A. Each LED 364A of LED string 408 in each disk 368, generally terminate at the 6-pin connectors shown in FIG. 30 as typical 6-pin connectors 356C and 356D and in FIG. 34A as typical 6-pin connector 356D. In particular, the anode side of typical LED 364A is connected to DC positive lead line 404 by way of LED positive lead line 404A with an optional resistor 392 connected in series between the anode side of LED 364A connected to LED positive lead line 404A and DC positive lead line 404. The cathode side of typical LED 364A, which is connected to LED negative lead line 406A, is now connected to the anode side of typical LED 364A of the adjacent LED string 408 of the adjacent disk 368. The cathode side of typical LED 364A of the adjacent LED string 408 of the adjacent disk 368 is likewise connected to LED negative lead line 406A of the adjacent disk 368 and to the anode side of the next typical LED 364A of the adjacent LED string 408 of the adjacent disk 368 and so forth. The next thirty-eight LEDs 364A continue to be connected in a similar manner as described with the cathode of the last and fortieth LED 364A connected to DC negative lead line 406 by way of LED negative lead line 406A. This completes the connection of all forty LEDs 362 in LED array 366. Both AC lead line 400 and AC lead line 402 are shown in FIGS. 32-34. FIG. 30B shows an isolated top view of AC leads 400 and 402, of positive and negative DC leads 404 and 406, and of positive and negative LED leads 404A and 406A, respectively, extending between disks 368.

The single series string 408 of LEDs 362 as described works ideally with the high-brightness high flux white LEDs available from Lumileds and Nichia in the SMD (surface mounted device) packages discussed previously. Since these new devices require more current to drive them and run on low voltages, the high current available from existing fluorescent ballast outputs with current outputs of 300 mA and higher, along with their characteristically higher voltage outputs provide the perfect match for the present invention. The LEDs 362 have to be connected in series, so that each LED 362 within the same single string 408 will see the same current and therefore output the same brightness. The total voltage required by all the LEDs 362 within the same single string 408 is equal to the sum of all the individual voltage drops across each LED 362 and should be less than the maximum voltage output of ballast assembly 334.

Figure 35:
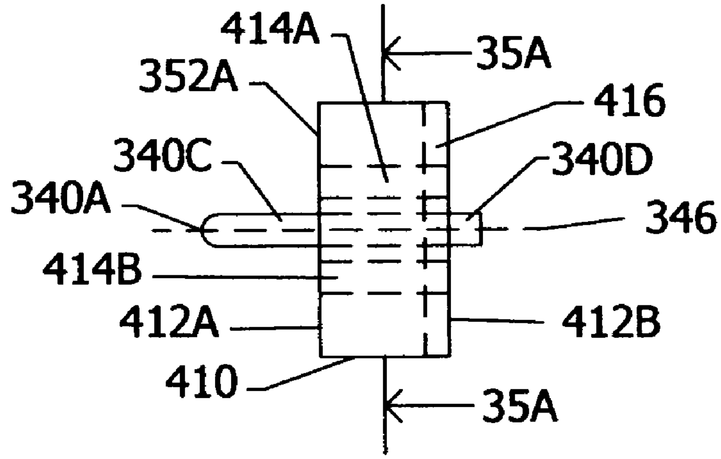
FIG. 35 is a side view of an isolated single-pin end cap of those shown in FIGS. 26 and 27.
Figure 35A:
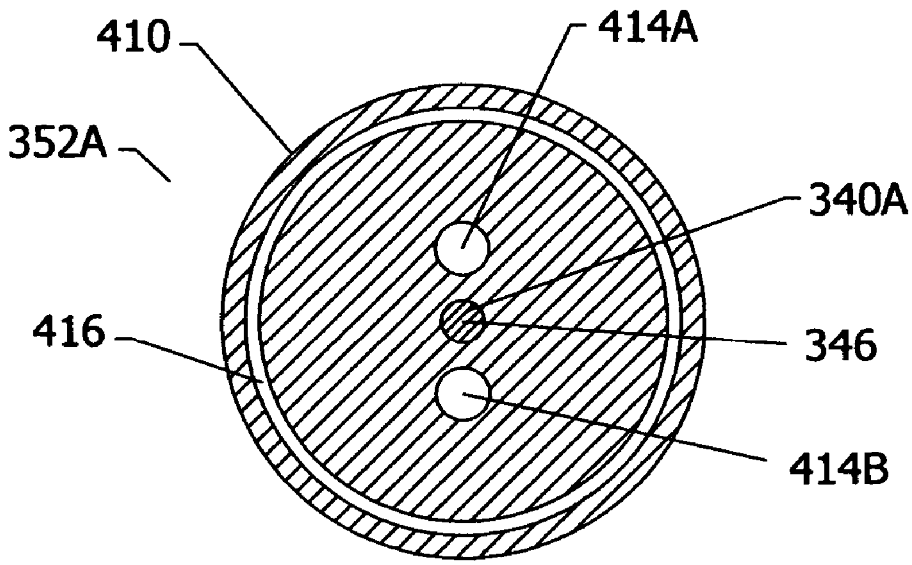
FIG. 35A is a sectional view taken through line 35A-35A of the end cap shown in FIG. 35.

FIG. 35 shows an isolated view of one of the base end caps shown for purposes of exposition as base end cap 352A, which is the same as base end cap 352B, mutatis mutandis. Single-pin contact 340A extends directly through the center of base end cap 352A in the longitudinal direction in alignment with center line 346 of tubular wall 344. Single-pin 340A as also shown in FIG. 26 where single-pin contact 340A is mounted into ballast socket 338A. Single-pin contact 340A also includes pin extension 340D that is outwardly positioned from base end cap 352A in the direction towards tubular wall 344. Base end cap 352A is a solid cylinder in configuration as seen in FIGS. 35 and 35A and forms an outer cylindrical wall 410 that is concentric with center line 346 of tubular wall 344 and has opposed flat end walls 412A and 412B that are perpendicular to center line 346. Two cylindrical parallel vent holes 414A and 414B are defined between end walls 412A and 412B spaced directly above and below and lateral to single-pin contact 340A. Single-pin contact 340A includes external side pin extension 340C and internal side pin extension 340D that each extend outwardly positioned from opposed flat end walls 412A and 412B, respectively, for electrical connection with ballast socket contact 338A and with integral electronics circuit board 354A. Analogous external and internal pin extensions 340E and 340F for contact pin 340B likewise exist for electrical connections with ballast socket contact 338B and with integral electronics circuit board 354B.

As also seen in FIG. 35A, base end cap 352A defines a circular slot 416 that is concentric with center line 346 of tubular wall 344 and concentric with and aligned proximate to circular wall 410. Circular slot 416 is spaced from cylindrical wall 410 at a convenient distance. Circular slot 416 is of such a width and circular end 348A of tubular wall 344 is of such a thickness that circular end 348A is fitted into circular slot 416 and is thus supported by circular slot 416. Base end cap 352B (not shown in detail) defines another circular slot (not shown) analogous to circular slot 416 that is likewise concentric with center line 346 of tubular wall 344 so that circular end 348B of tubular wall 344 can be fitted into the analogous circular slot of base end cap 352B wherein circular end 348B is also supported. In this manner tubular wall 344 is mounted to end caps 352A and 352B. Circular ends 348A and 348B of tubular wall 344 are optionally glued to circular slot 416 of base end cap 352A and the analogous circular slot of base end cap 352B.

Figure 36:
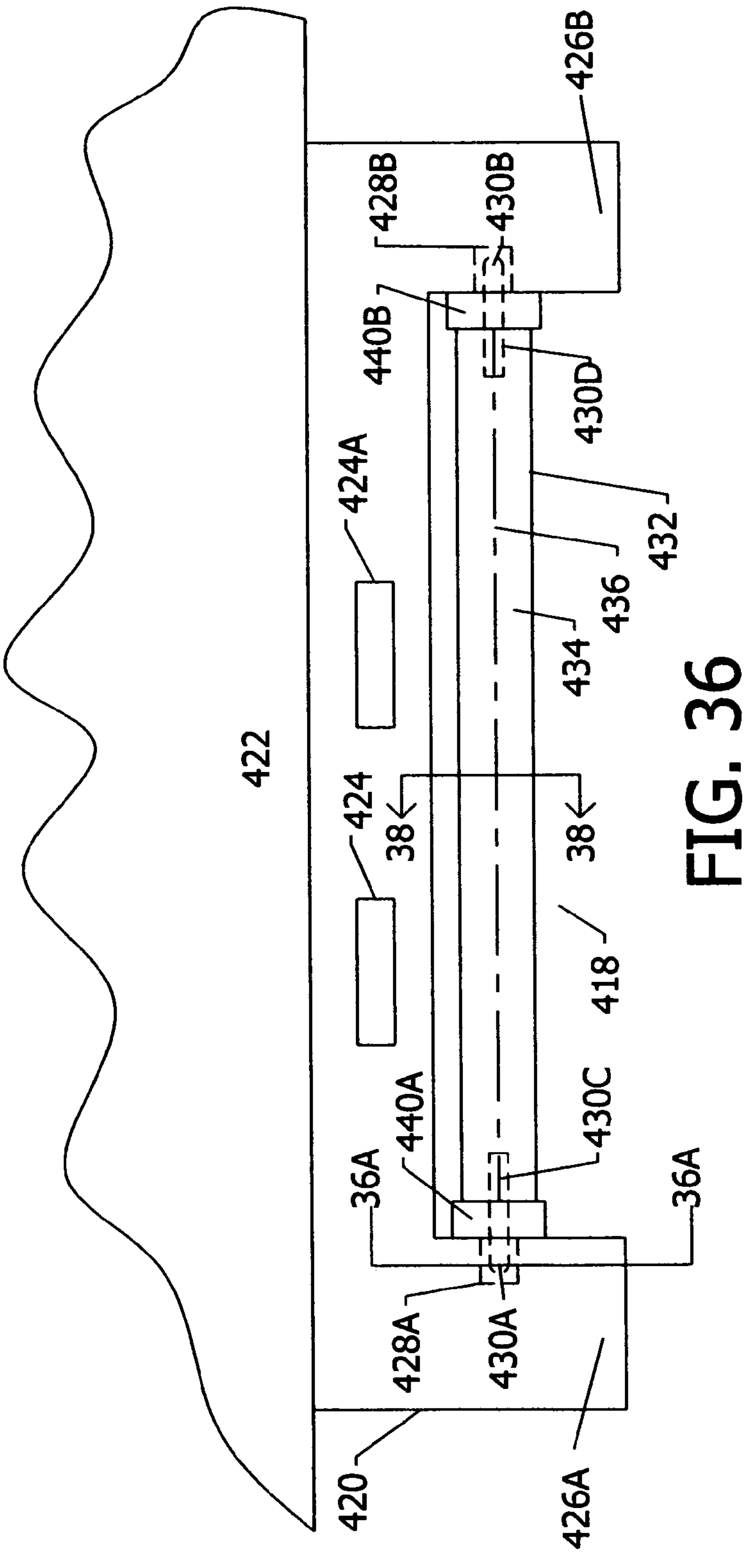
FIG. 36 is an elevational side view of another embodiment of a retrofitted bi-pin LED lamp mounted to an existing fluorescent fixture.
Figure 36A:
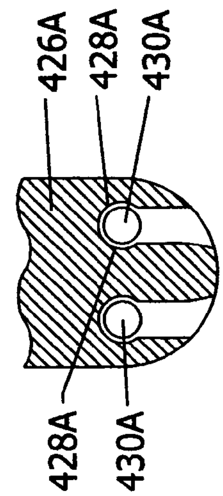
FIG. 36A is a view taken through line 36A-36A of FIG. 36 showing a bi-pin type LED retrofit lamp wherein the existing fluorescent fixture has an electronic rapid start, hybrid, or magnetic ballast having a pair of double contact electrical sockets.

FIGS. 36-45A show another embodiment of the present invention, in particular an LED lamp 418 seen in FIG. 36 retrofitted to an existing fluorescent fixture 420 mounted to a ceiling 422. An electronic instant start type ballast assembly 424, which can also be a hybrid or a magnetic ballast assembly, is positioned within the upper portion of fixture 420. Fixture 420 further includes a pair of fixture mounting portions 426A and 426B extending downwardly from the ends of fixture 420 that include ballast electrical contacts shown as ballast end sockets 428A and 428B that are in electrical contact with ballast assembly 424. Fixture sockets 428A and 428B are each double contact sockets in accordance with the electrical operational requirement of an electronic instant start, hybrid, or magnetic ballast. As also seen in FIG. 36A, LED lamp 418 includes opposed bi-pin electrical contacts 430A and 430B that are positioned in ballast sockets 428A and 428B, respectively, so that LED lamp 418 is in electrical contact with ballast assembly 424.

Figures 37, 38:
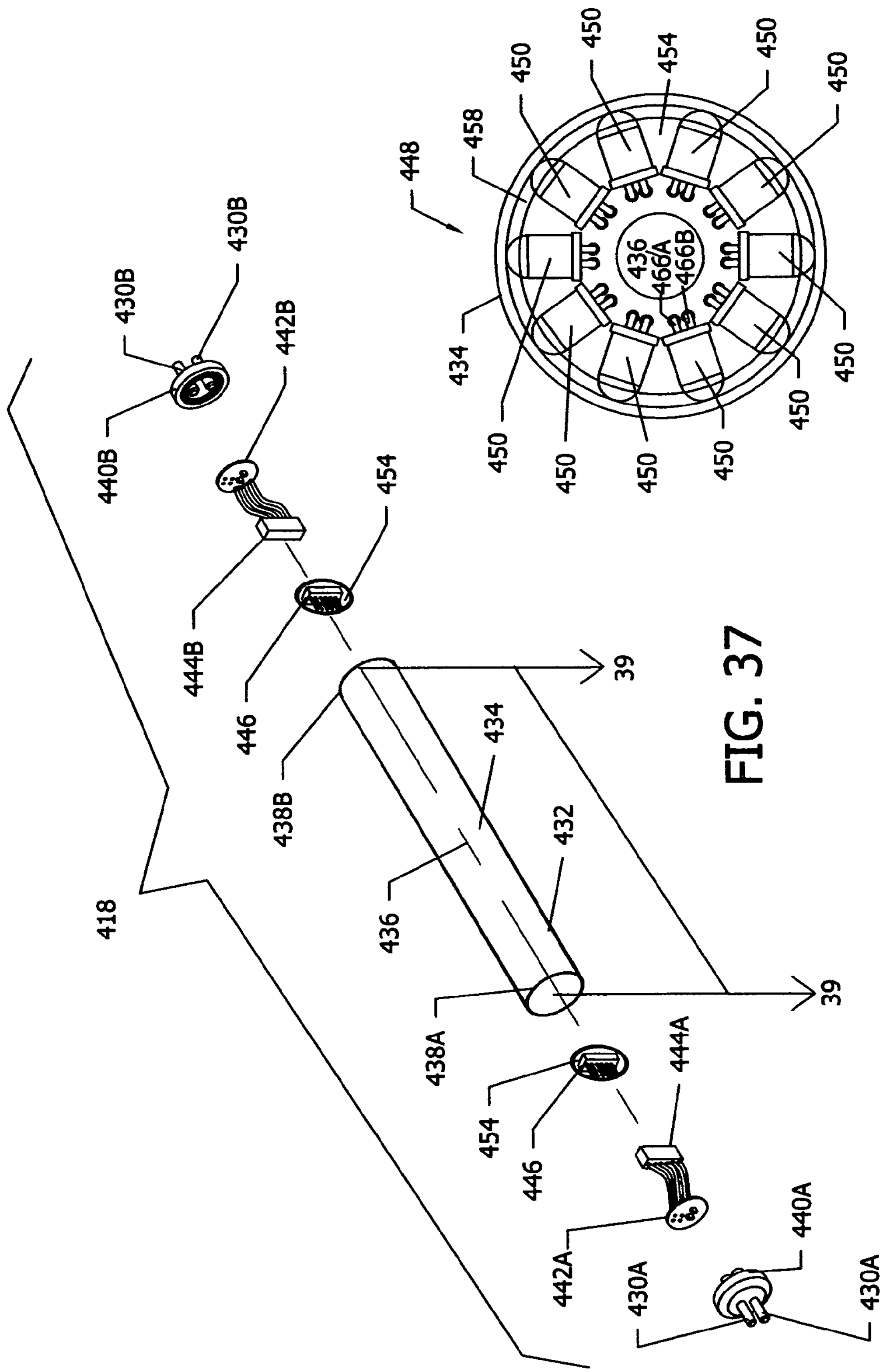
FIG. 37 is an exploded perspective view of the LED retrofit lamp shown in FIG. 36 including the integral electronics taken in isolation.
FIG. 38 is a sectional top view of the tubular wall taken through line 38-38 in FIG. 36 of a single row of LEDs.

As shown in the disassembled mode of FIG. 37, LED lamp 418 includes an elongated housing 432 particularly configured as a linear tubular wall 434 circular in cross-section taken transverse to a center line 436 that is made of a translucent material such as plastic or glass and preferably having a diffused coating. Tubular wall 434 has opposed tubular wall ends 438A and 438B. LED lamp 418 further includes a pair of opposed lamp base end caps 440A and 440B mounted to bi-pin electrical contacts 430A and 430B, respectively for insertion in ballast electrical socket contacts 428A and 428B in electrical power connection to ballast assembly 424 so as to provide power to LED lamp 418. Tubular wall 434 is mounted to opposed base end caps 440A and 440B at tubular wall ends 438A and 438B in the assembled mode as shown in FIG. 36. An integral electronics circuit board 442A is positioned between base end cap 440A and tubular wall end 438A and an integral electronics circuit board 442B is positioned between base end cap 440B and tubular wall end 438B.

As seen in FIGS. 37 and 38, LED lamp 418 also includes a 6-pin connector 444A connected to integral electronics circuit board 442A and to a 6-pin header 446 on first disk 454. LED lamp 418 also includes a 6-pin connector 444B connected to integral electronics circuit board 442B and to a 6-pin header 446 on last disk 454.

Figure 39:
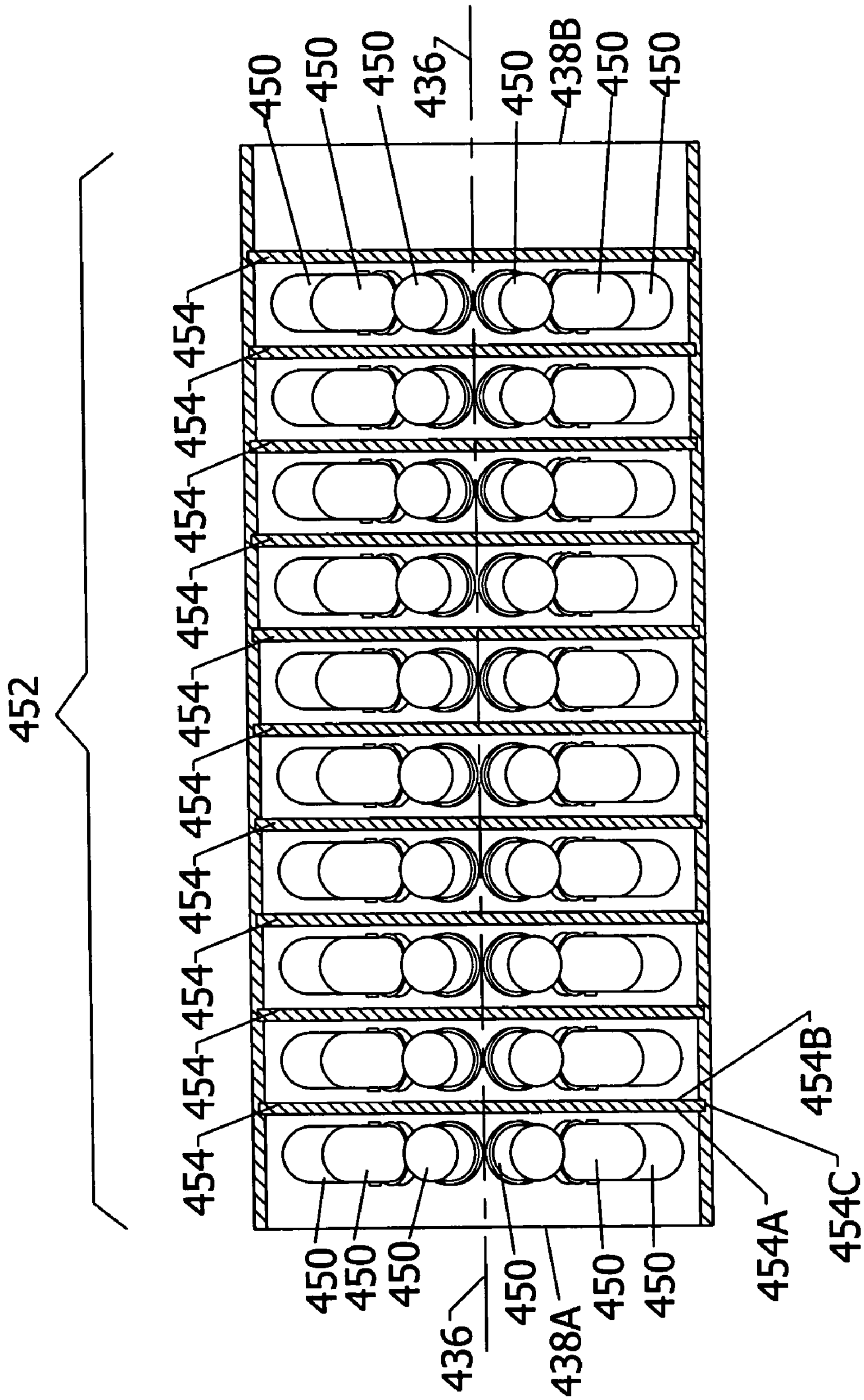
FIG. 39 is an elongated sectional view of the LED retrofit lamp shown in FIG. 37 taken through plane 39-39 bisecting the cylindrical tube and the disks therein with LEDs mounted thereto.

For the purposes of exposition, only ten of the original fifteen parallel electrical strings are displayed and described herein. In particular, a sectional view taken through FIG. 37 is shown in FIG. 38 showing a typical single LED row 448 that include ten individual LEDs 450. LED lamp 418 includes ten LED rows 448 that comprise an LED array 452. FIG. 39 shows a partial view that includes each of the ten LED rows 448. LED row 448 includes ten LEDs 450 and is circular in configuration, which is representative of each of the ten LED rows 448 of LED array 452 with all LED rows 448 being aligned in parallel relationship.

Figure 40:
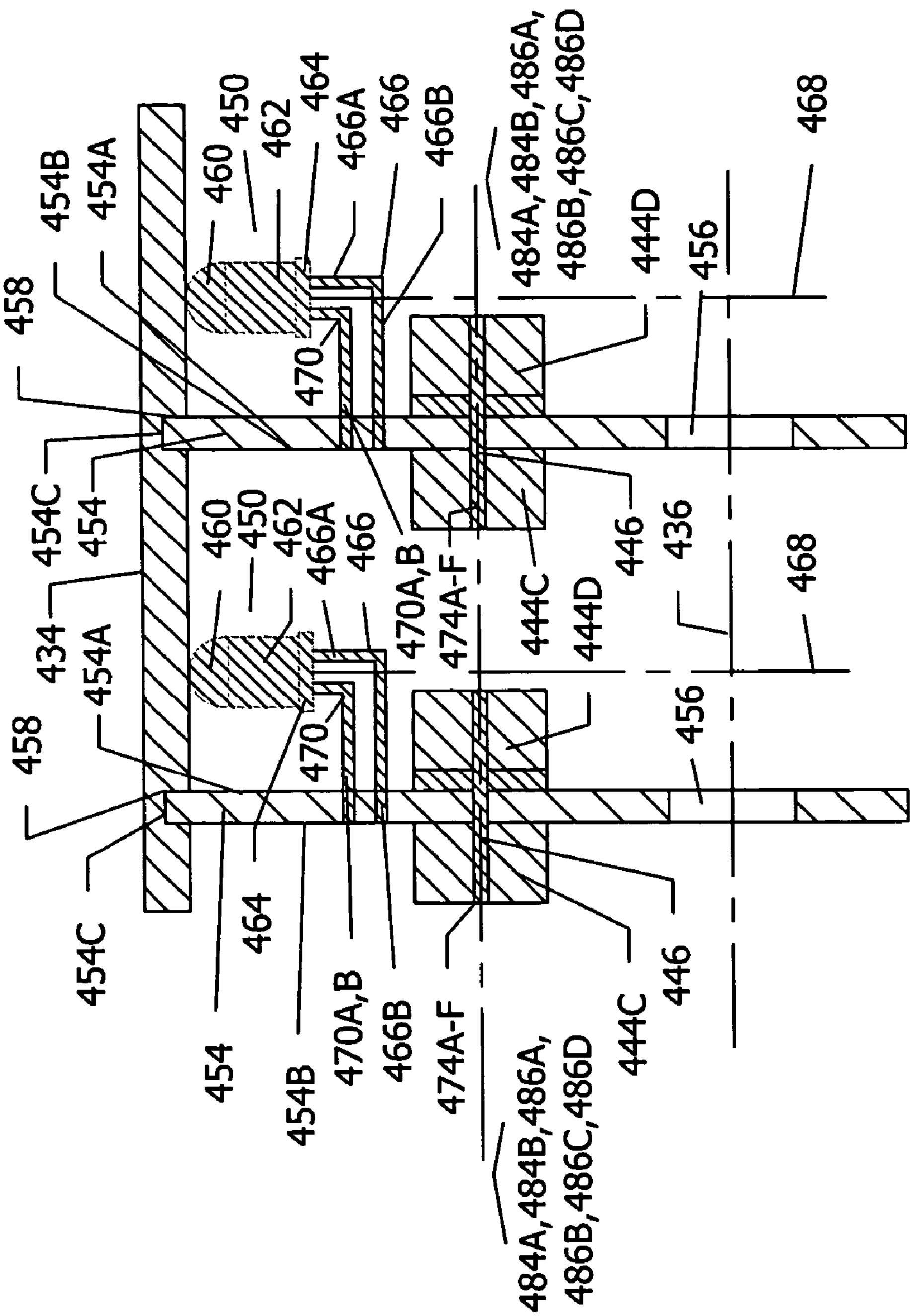
FIG. 40 shows a fragmented sectional side view of a portion of two cylindrical support disks and of two LEDs taken from adjoining LED rows as indicated in FIG. 39, and further showing electrical connections between the LEDs as related to the LED retrofit lamp of FIG. 36.

In FIGS. 39 and 40, ten circular disks 454 having opposed flat disk walls 454A and 454B and disk circular rims 454C are positioned and held in tubular wall 434 between tubular end walls 438A and 438B. Each disk 454 that is centrally aligned with center line 436 of tubular wall 434 defines a central circular aperture 456. Apertures 456 are provided for the passage of heat out of tubular wall 434 generated by LED array 452. Disks 454 are spaced apart at equal distances and are in parallel alignment. The inner side of tubular wall 434 defines ten equally spaced circular grooves 458 defining parallel circular configurations in which are positioned and held disk rims 454C.

Figure 39A:
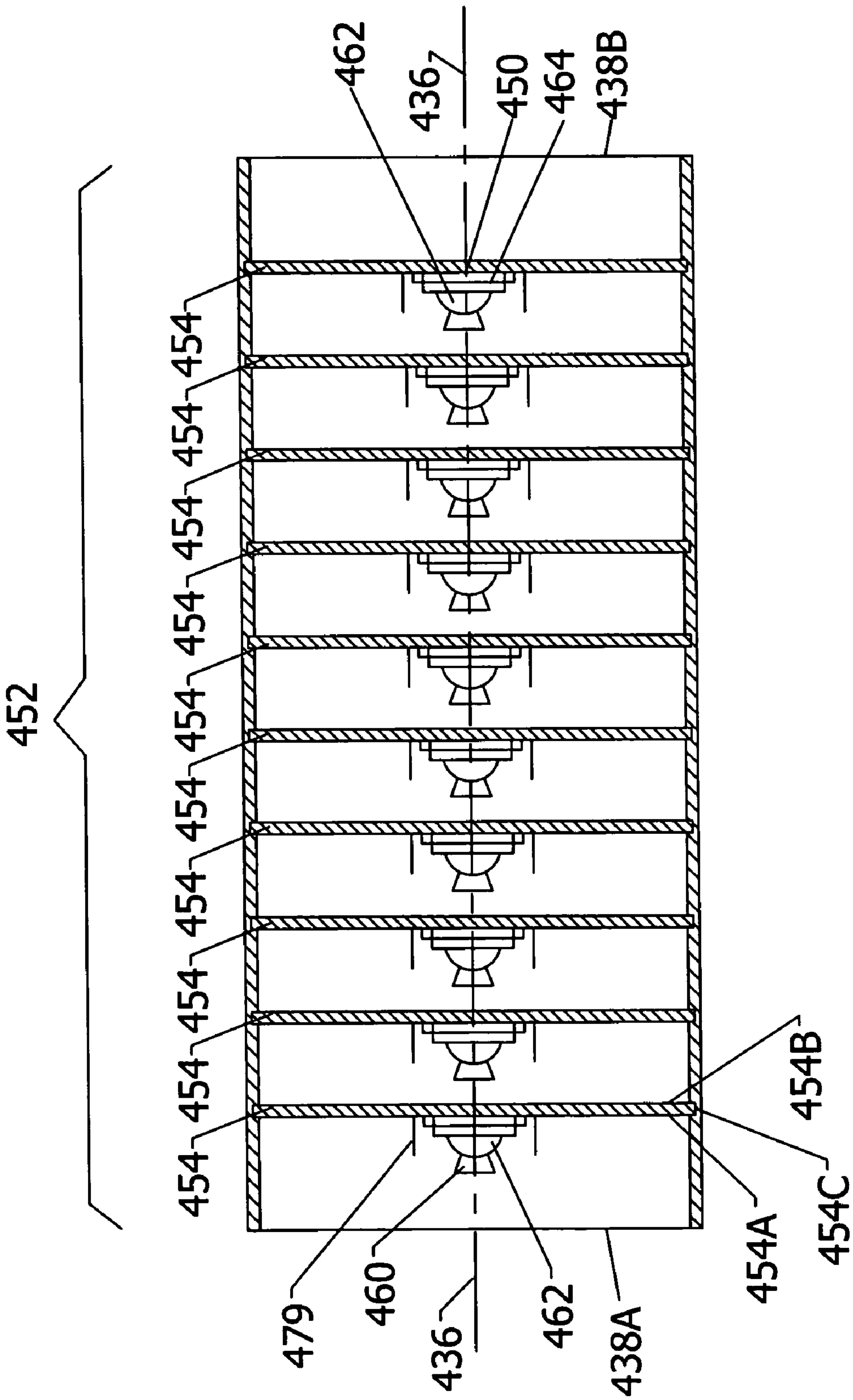
FIG. 39A is an alternate elongated sectional view of that shown in FIG. 37 taken through plane 39-39 bisecting the cylindrical tube and the disks therein with a single LED mounted in the center thereto.

Similar to FIG. 39, FIG. 39A now shows a single LED row 448 that includes one individual LED 450. LED lamp 418 includes ten LED rows 448 that can comprise LED array 452. FIG. 39A shows a single LED 450 of each of the ten LED rows 448 mounted in the center of each disk 454. A heat sink 479 is attached to each LED 450 to extract heat away from LED 450. Ten circular disks 454 each having opposed flat disk walls 454A and 454B and disk circular rims 454C are positioned and held in tubular wall 434 between tubular end walls 438A and 438B. Apertures 457 are provided for the passage of heat out of tubular wall 434 generated by LED array 452. Disks 454 are spaced apart at equal distances and are in parallel alignment. The inner side of tubular wall 434 defines ten equally spaced circular grooves 458 defining parallel circular configurations in which are positioned and held disk rims 454C.

Figure 39B:
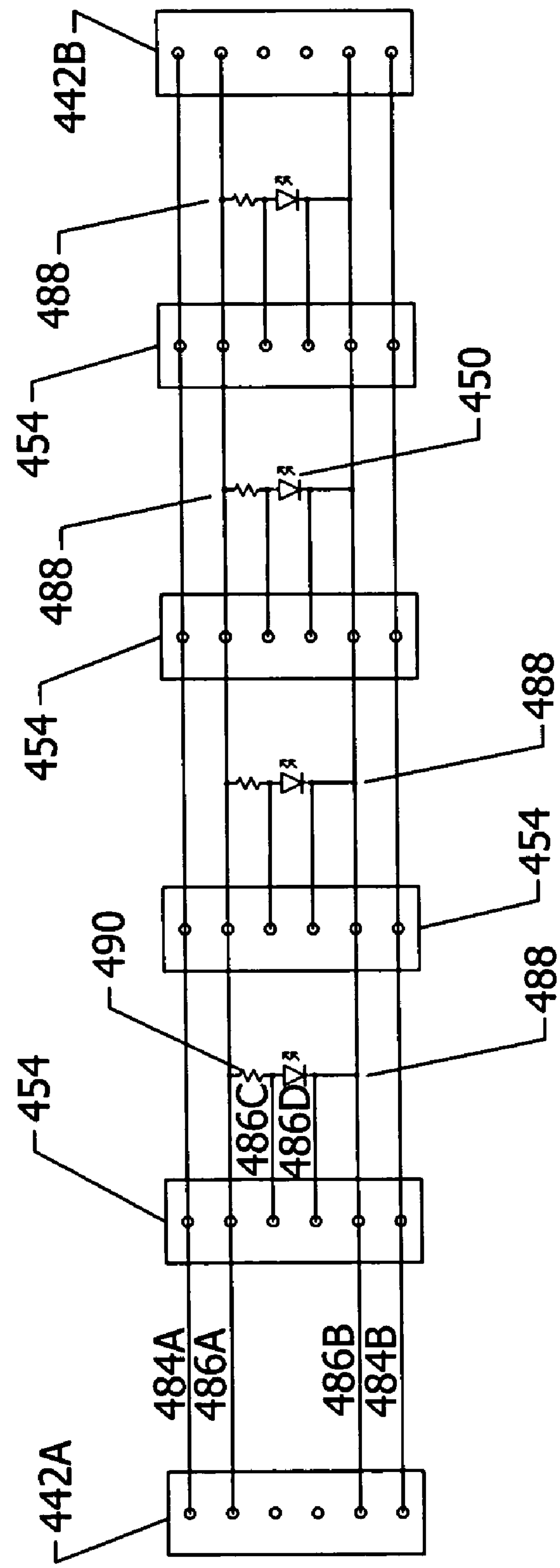
FIG. 39B is a simplified arrangement of the array of LEDs shown for purposes of exposition in a flat compressed position for the overall electrical circuit shown in FIG. 39 including lead lines and pin headers for the LED retrofit lamp.
Figure 39C:
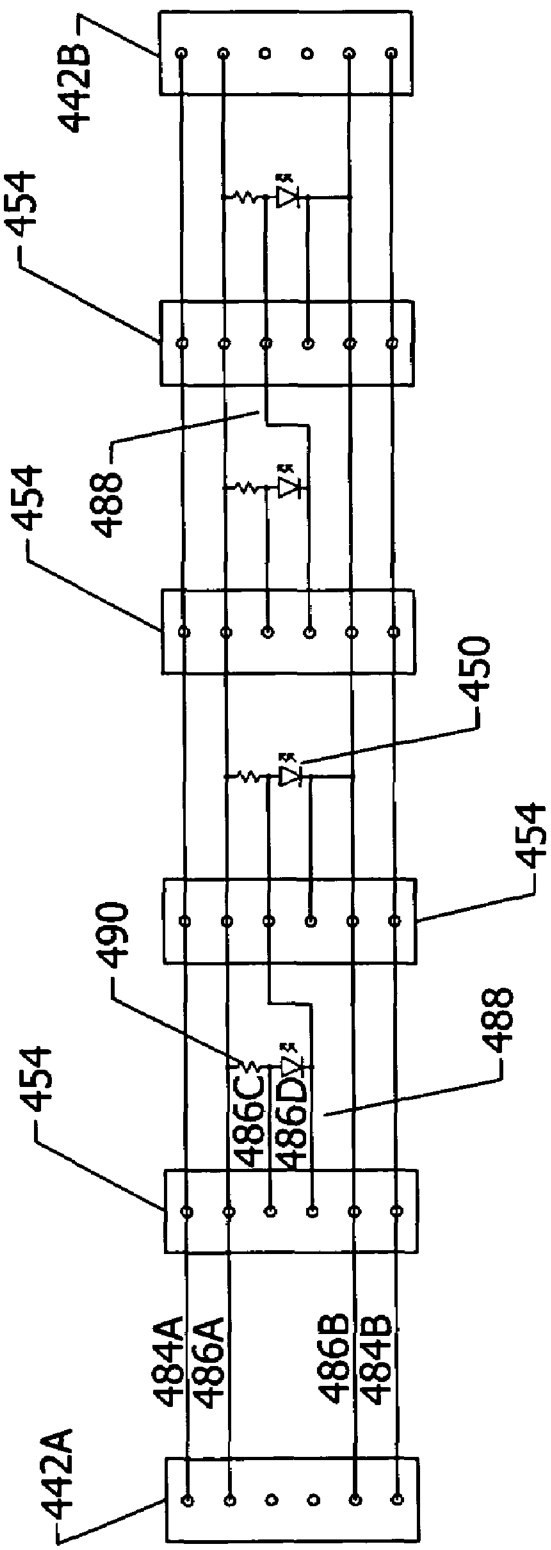
FIG. 39C is a simplified arrangement of the array of LEDs shown for purposes of exposition in a flat compressed position for the overall electrical circuit shown in FIG. 39 including lead lines and pin headers for the LED retrofit lamp.
Figure 39D:
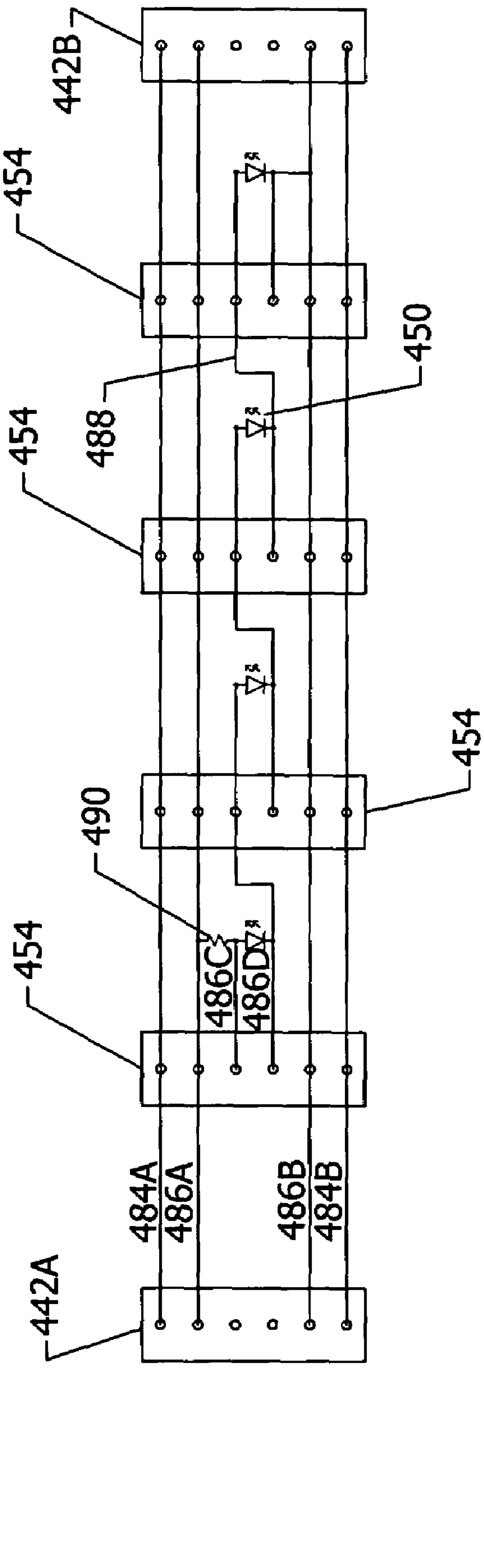
FIG. 39D is a simplified arrangement of the array of LEDs shown for purposes of exposition in a flat compressed position for the overall electrical circuit shown in FIG. 39A including lead lines and pin headers for the LED retrofit lamp.

Although FIGS. 39, 39A, and 40 show round circuit board disks 454, it can be appreciated by someone skilled in the art to use circuit boards 454 made in shapes other than a circle. Likewise the shape of the tubular housing 432 holding the individual circuit boards 454 can be made in a similar shape to match the shape of the circuit boards 454. FIGS. 39B, 39C, and 39D show simplified electrical arrangements of the array of LEDs shown with at least one LED in a series parallel configuration. Each LED string has an optional resistor in series with the LED.

In FIG. 40, each LED 450 includes lens portion 460, body portion 462, and base portion 464. Each lens portion 460 is in juxtaposition with the inner surface of tubular wall 434. LED leads 466 and 470 extend out from the base portion 464 of LED 450. LED lead 466 is bent at a 90-degree angle to form LED lead portions 466A and 466B. Likewise, LED lead 470 is also bent at a 90-degree right angle to form LED lead portions 470A and 470B. In FIG. 40, a detailed isolated view of two typically spaced single LEDs shows each LED 450 mounted to disk 454 with LED lead portions 466A and 470A lateral to disk 454 and LED lead portions 466B and 470B transverse to disk 454. Disks 454 are preferably made of rigid G10 epoxy fiberglass circuit board material, but can be made of other circuit board material known in the art. LED lead portions 466B and 470B extend through disk wall 454A of disk 454 to disk wall 454B of disk 454 by means known in the art as plated through hole pads. The LED leads 466 and 470 are secured to disk 454 with solder or other means known in the art. The LED leads 466 and 470 support LED 450 so that the center line 468 of each LED 450 is perpendicular to center line 436 of tubular wall 434. The pair of LED leads 466 and 470 connected to each LED 450 of LED array 452 extend through each disk 454 from disk wall 454A to disk wall 454B and then to DC positive lead line 486A, or to DC negative lead line 486B, or to another LED 450 (not shown) in the same LED string 488 by means known in the art as electrical tracks or traces located on the surface of disk wall 454A and/or disk wall 454B of disk 454.

Figure 40A:
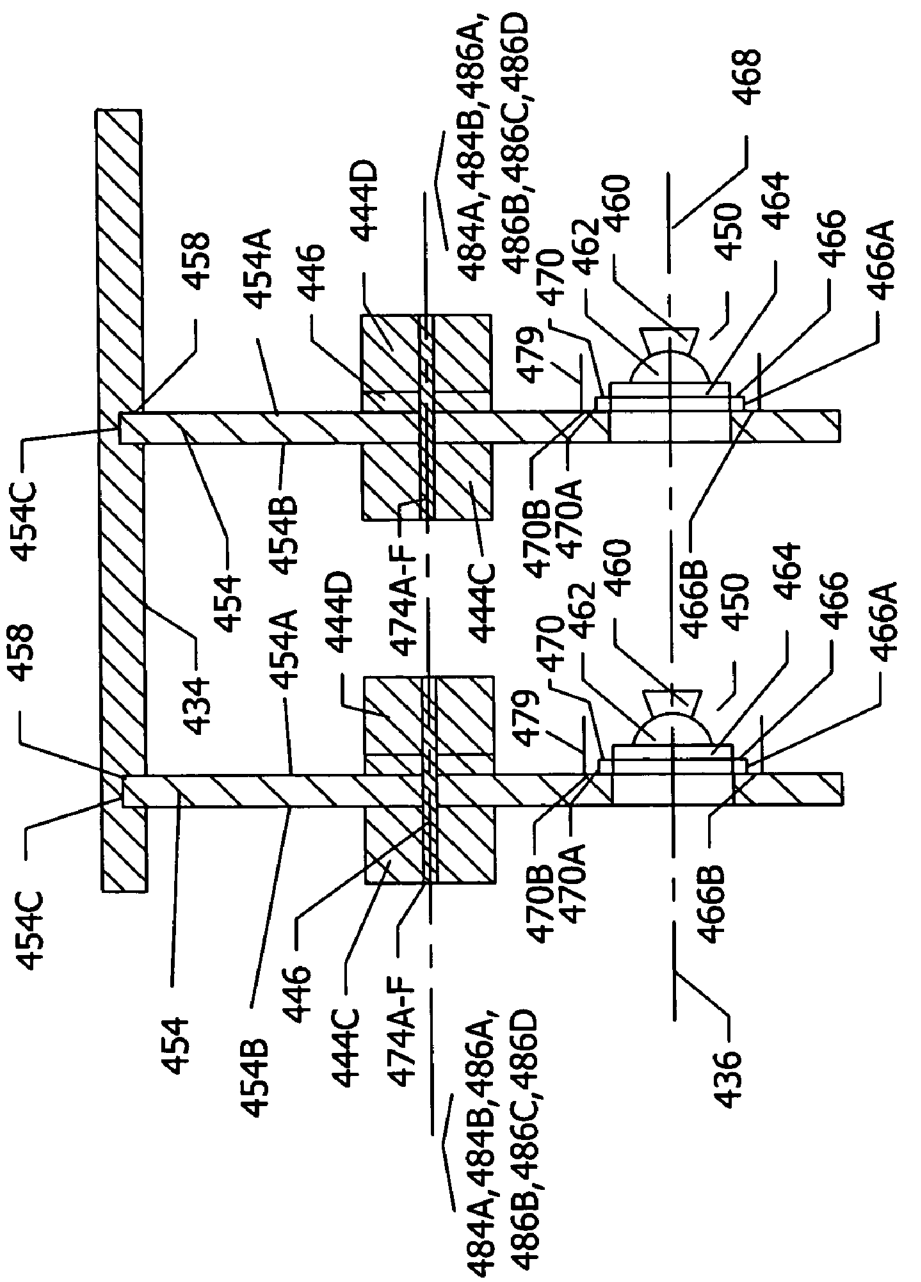
FIG. 40A shows an alternate fragmented sectional side view of a portion of two cylindrical support disks and of a single LED centrally mounted to each cylindrical support disks taken from adjoining LED rows as indicated in FIG. 39, and further showing electrical connections between the LEDs as related to the LED retrofit lamp of FIG. 36.

In FIG. 40A, a special single SMD LED 450 is mounted to the center of disk 454. Each LED 450 includes lens portion 460, body portion 462, and base portion 464. Lens portion 460 allows the light from LED 450 to be emitted in a direction perpendicular to center line 468 of LED 450 and center line 436 of tubular wall 434 with the majority of light from LED 450 passing straight through tubular wall 434. LED leads 466 and 470 extend out from the base portion 464 of LED 450. LED lead 466 is bent at a 90-degree angle to form LED lead portions 466A and 466B. Likewise, LED lead 470 is also bent at a 90-degree right angle to form LED lead portions 470A and 470B. In FIG. 40A, a detailed isolated view of two typically spaced single LEDs 450 shows each LED 450 mounted to disk 454 with LED lead portions 466A and 470A transverse to disk 454 and LED lead portions 466B and 470B lateral to disk 454. Disks 454 are preferably made of rigid G10 epoxy fiberglass circuit board material, but can be made of other circuit board material known in the art. LED lead portions 466B and 470B rest on and are attached to disk wall 454A of disk 454 with solder to means known in the art as plated through hole pads. The LED leads 466 and 470 support LED 450 so that the center line 468 of each LED 450 is parallel to center line 436 of tubular wall 434. The pair of LED leads 466 and 470 connected to each LED 450 of LED array 452 is then connected to DC positive lead line 486A, or to DC negative lead line 486B, or to another LED 450 (not shown) in the same LED string 488 by means known in the art as electrical tracks or traces located on the surface of disk wall 454A and/or disk wall 454B of disk 454. A heat sink 479 is attached to the base portion 464 of each LED 450 to sufficiently extract the heat generated by each LED 450.

Figure 40B:
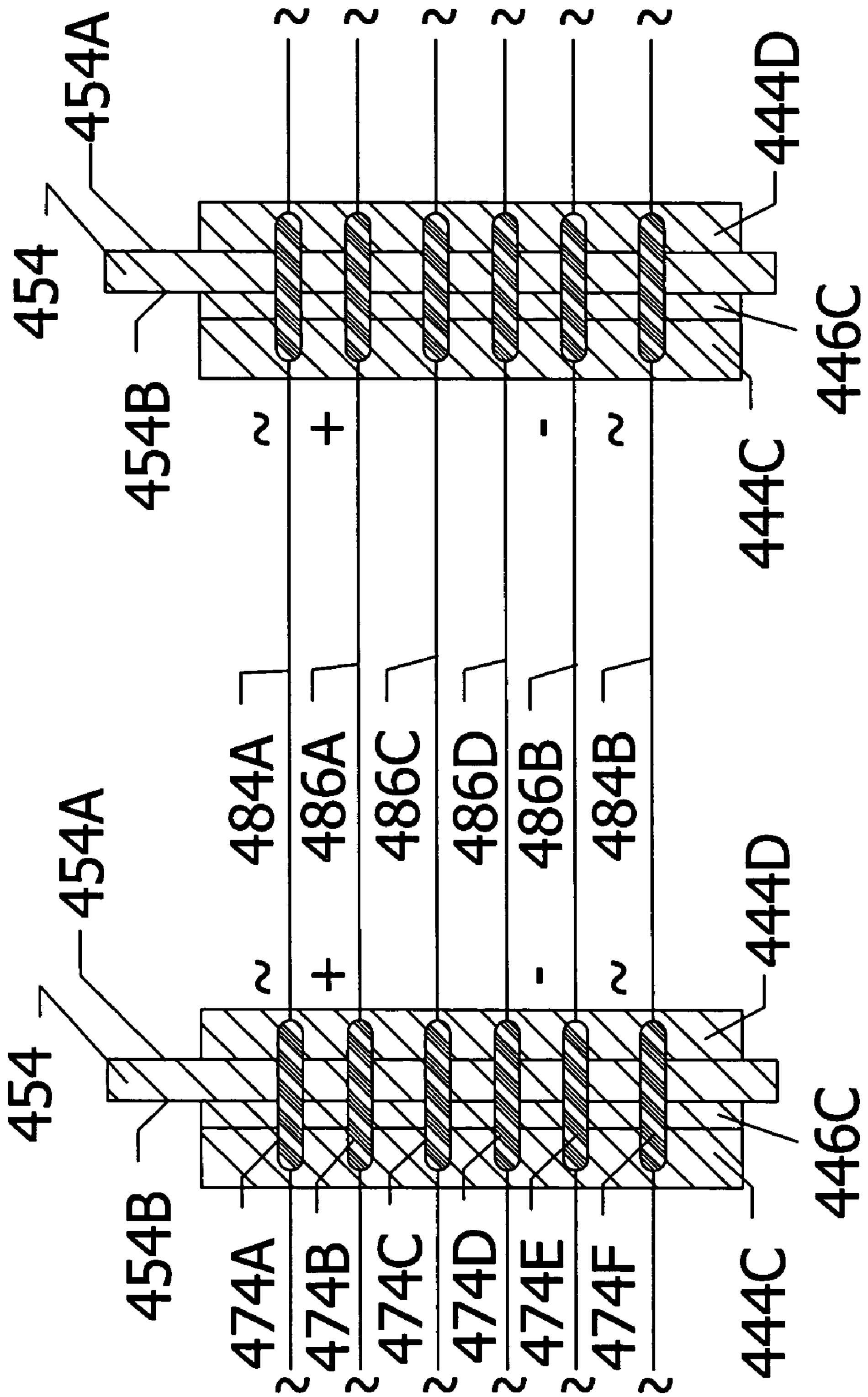
FIG. 40B is an isolated top view of the 6-wire electrical connectors and headers shown in side view in FIG. 40.
Figure 44:
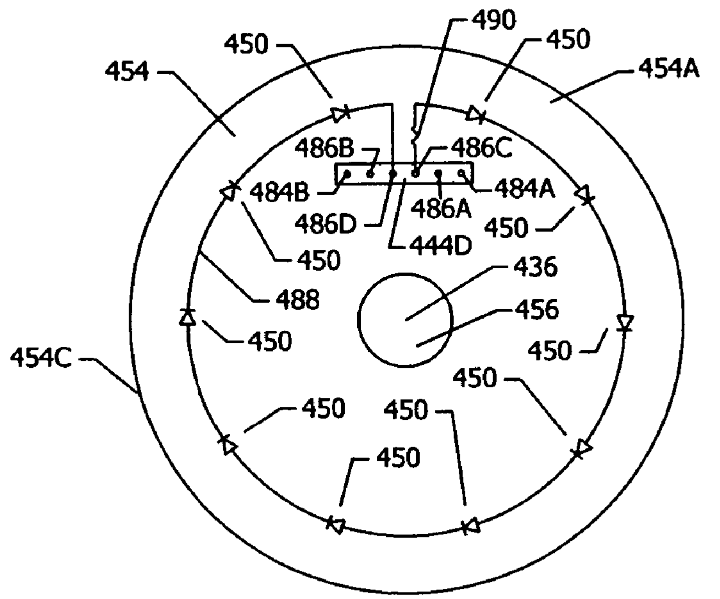
FIG. 44 shows a full frontal view of a single support disk as related to the LED retrofit lamp shown in FIG. 36 taken in isolation with an electrical schematic rendering showing a single row of ten LEDs connected in series within an electrical string as a part of the total parallel electrical structure for the LEDs.

As further indicated in FIGS. 40, 40A, and 40B, six electrical lead lines comprising AC lead line 484A, AC lead line 484B, DC positive lead line 486A, DC negative lead line 486B, LED positive lead line 486C, and LED negative lead line 486D are representative of lead lines that extend the entire length of tubular wall 434, in particular extending between and joined to each of the ten disks 454 so as to connect electrically each LED string 488 of each disk 454 as shown in FIG. 44. Each of the lead lines 484A, 484B, 486A, 486B, 486C, and 486D are held in position at each of disks 454 by six pins 474A, 474B, 474C, 474D, 474E, and 474F that extend through disks 454 and are in turn held in position by 6-pin headers 446 mounted to disks 454 shown as disk wall 454B for purposes of exposition. A 6-pin connector 444C is mounted to each 6-pin header 446 and another 6-pin connector 444D is mounted to disk wall 454A.

Figure 41:
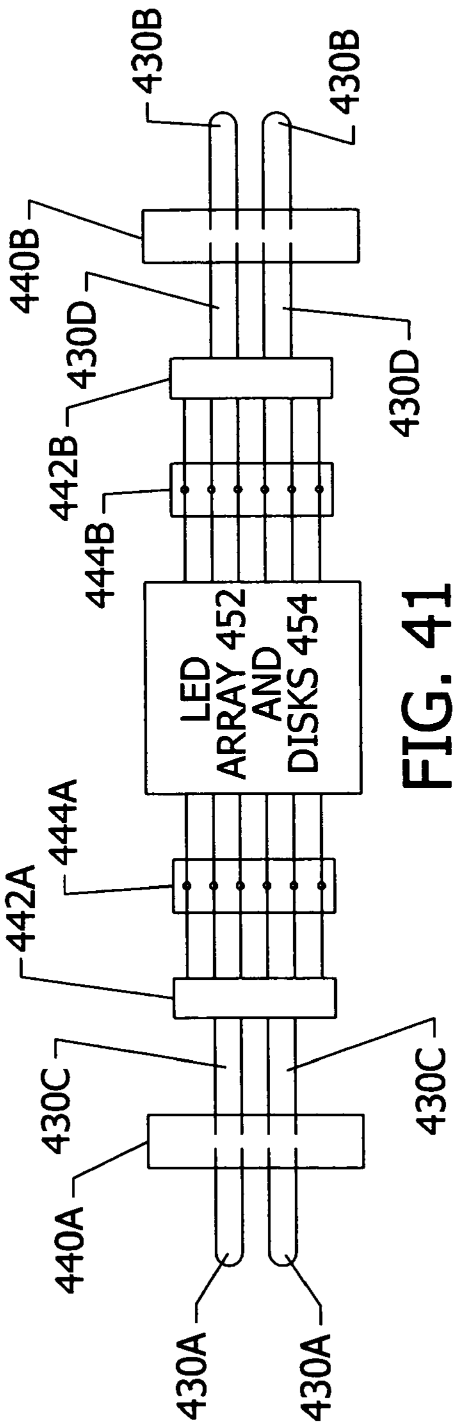
FIG. 41 is a schematic view showing the LED array in FIGS. 36 and 37 electrically connected by pin connectors to two opposed integral electronics circuit boards that are electrically connected to base end caps each having a bi-pin connections.

As shown in the schematic electrical and structural representations of FIG. 41, disks 454 and LED array 452 are positioned between integral electronics circuit boards 442A and 442B that in turn are electrically connected to ballast assembly 424 by bi-pin contacts 430A and 430B, respectively. Bi-pin contacts 430A and 430B are mounted to and protrude out from base end caps 440A and 440B, respectively, for electrical connection to ballast assembly 424. Bi-pin contacts 430A and 430B are soldered directly to integral electronics circuit boards 442A and 442B, respectively. In particular, bi-pin inner extensions 430C of bi-pin contacts being soldered directly to the integral electronics circuit board 442A electrically connects 430A. Also, being soldered directly to integral electronics circuit board 442B electrically connects bi-pin inner extensions 430D of bi-pins 430B. 6-pin connector 444A is shown positioned between and in electrical connection with integral electronics circuit board 442A and LED array 452 and disks 454. 6-pin connector 444B is shown positioned between and in electrical connection with integral electronics circuit board 442B and LED array 452 and disks 454.

Figure 42:
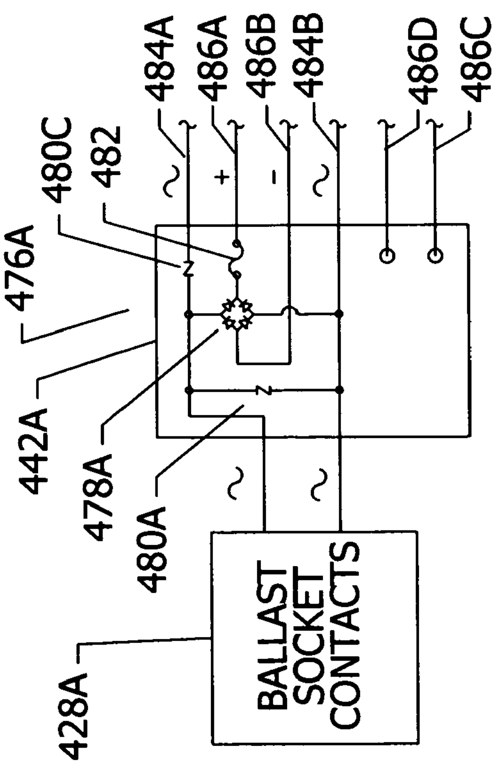
FIG. 42 is a schematic circuit of one of the two integral electronics circuit boards shown in FIG. 41 positioned at one side of the alternating current voltage emanating from the ballast for the LED array shown in FIG. 41.

FIG. 42 shows a schematic of integral electronics circuit 476A mounted on integral electronics circuit board 442A. Integral electronics circuit 476A is also indicated in part in FIG. 41 as connected to LED array 452. Integral electronics circuit 476A is in electrical contact with bi-pin contacts 430A, which are shown as providing either AC or DC voltage. Integral electronics circuit 476A includes a bridge rectifier 478A, voltage surge absorbers 480A and 480B, and a resettable fuse 482. Integral electronic circuit 476A leads to or from LED array 452. FIG. 42 indicates the presence of possible AC voltage (rather than possible DC voltage) by an AC wave symbol ~. The AC voltage could be DC voltage supplied by certain ballast assemblies 424 as mentioned earlier herein. In such a case DC voltage would be supplied to LED array 452 even in the presence of bridge rectifier 478A. It is particularly noted that in such a case, voltage surge absorbers 480A and 480B would remain operative. AC lead lines 484A and 484B are in a power connection with ballast assembly 424. DC lead lines 486A and 486B are in positive and negative, respectively, direct current voltage relationship with LED array 452. Bridge rectifier 478A is in electrical connection with four lead lines 484A, 484B, 486A and 486B. Voltage surge absorber 480B is in electrical contact with AC lead line 484A. DC lead lines 486A and 486B are in electrical contact with bridge rectifier 478A and in power connection with LED array 452. Fuse 482 is positioned on DC lead line 486A between bridge rectifier 478A and LED array 452.

Figure 43:
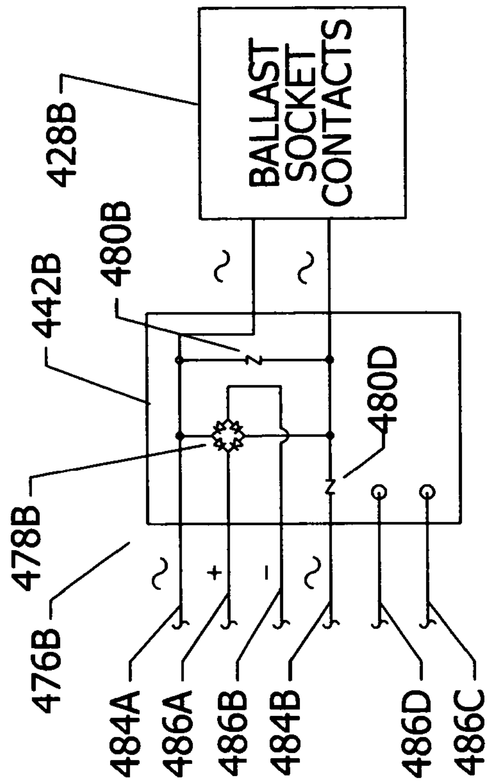
FIG. 43 is a schematic circuit of the other of the two integral electronics circuit boards shown in FIG. 41 positioned at the other side of the alternating current voltage emanating from the ballast for the LED array shown in FIG. 41.

FIG. 43 shows a schematic of integral electronics circuit 476B mounted on integral electronics circuit board 442B. Integral electronics circuit 476B is also indicated in part in FIG. 41 as connected to LED array 452. Integral electronics circuit 476B is a close mirror image of electronics circuit 476A mutatis mutandis. Integral electronics circuit 476B is in electrical contact with bi-pin contacts 430B, which provide either AC or DC voltage. Integral electronics circuit 476B includes bridge rectifier 478B and voltage surge absorbers 480C and 480D. Integral electronic circuit 476B leads to or from LED array 452. FIG. 43 indicates the presence of possible AC voltage (rather than possible DC voltage) by an AC wave symbol ~. The AC voltage could be DC voltage supplied by certain ballast assemblies 424 as mentioned earlier herein. In such a case DC voltage would be supplied to LED array 452 even in the presence of bridge rectifier 478B. It is particularly noted that in such a case, voltage surge absorbers 480C and 480D would remain operative. AC lead lines 484A and 484B are in a power connection with ballast assembly 424. DC lead lines 486A and 486B are in positive and negative direct current voltage relationship with LED array 452. Bridge rectifier 478B is in electrical connection with the four lead lines 484A, 484B, 486A and 486B. Lead lines 484A, 484B, 486A, and 486B are in electrical contact with bridge rectifier 478B and in power connection with LED array 452.

Circuitry for LED array 452 with integral electronics circuits 442A and 442B as connected to the ballast circuitry of ballast assembly 424 is analogous to that shown previously herein in FIG. 4. As seen therein and as indicated in FIG. 39, the circuitry for LED array 452 includes ten electrical strings in electrical parallel relationship. The ten electrical strings are typified and represented in FIG. 44 by LED electrical string 488 mounted to disk 454 at one of the disk walls 454A or 454B, shown as disk wall 454A in FIG. 40 for purposes of exposition only. A single LED row 448 comprises ten LEDs 450 that are electrically connected at equal intervals along each string 488 that is configured in a circular pattern spaced from and concentric with disk rim 454C. A typical LED string 488 is shown in FIG. 44 as including an LED row 448 comprising ten LEDs 450A, 450B, 450C, 450D, 450E, 450F, 450G, 450H, 450I, and 450J. First and last LEDs 450A and 450J, respectively, of LED string 488 generally terminate at the 6-pin connectors shown in FIG. 40 as typical 6-pin connectors 444C and 444D and in FIG. 44 as typical 6-pin connector 444D. In particular, the anode side of typical LED 450A is connected to DC positive lead line 486A by way of LED positive lead line 486C with optional resistor 490 connected in series between the anode side of LED 450A connected to LED positive lead line 486C and DC positive lead line 486A. The cathode side of typical LED 450J is connected to DC negative lead line 486B by way of LED negative lead line 486D. Both AC lead line 484A and AC lead line 484B are shown in FIGS. 42-44. FIG. 40B shows an isolated top view of AC leads 484A and 484B, of positive and negative DC leads 486A and 486B, and of positive and negative LED leads 486C and 486D, respectively, extending between disks 454.

Analogous to the circuit shown previously herein in FIG. 4A, for more than ten LEDs 450 connected in series within each LED electrical string 488, the LEDs 450 from one disk 454 will extend to the adjacent disk 454, etc. until all twenty LEDs 450 in LED electrical string 488 spread over two disks 454 are electrically connected into one single series connection. Circuitry for LED array 452 with integral electronics circuits 442A and 442B as connected to the ballast circuitry of ballast assembly 424 is also analogous to that shown previously herein in FIG. 4. As seen therein and as indicated in FIG. 39, the circuitry for LED array 452 includes ten electrical strings in electrical parallel relationship. The ten electrical strings are typified and represented in FIG. 44 by LED electrical string 488 mounted to disk 454 at one of the disk walls 454A or 454B, shown as disk wall 454A in FIG. 40 for purposes of exposition only. Each LED row 448 comprises ten LEDs 450 that are electrically connected at equal intervals along each string 488 that is configured in a circular pattern spaced from and concentric with disk rim 454C. A typical LED string 488 is shown in FIG. 44 as including an LED row 448 comprising ten LEDs 450A, 450B, 450C, 450D, 450E, 450F, 450G, 450H, 450I, and 450J. First and last LEDs 450A and 450J, respectively, of LED string 488 generally terminate at the 6-pin connectors shown in Figure 40 as typical 6-pin connectors 444C and 444D and in FIG. 44 as typical 6-pin connector 444D. In particular, the anode side of typical LED 450A is connected to DC positive lead line 486A by way of LED positive lead line 486C with an optional resistor 490 connected in series between the anode side of LED 450A connected to LED positive lead line 486C and DC positive lead line 486A. The cathode side of typical LED 450J is now connected to anode side of typical LED 450A of the adjacent LED string 488 of the adjacent disk 454. The cathode side of typical LED 450J of the adjacent LED string 488 of the adjacent disk 454 is connected to DC negative lead line 486B by way of LED negative lead line 486D. This completes the connection of the first twenty LEDs 450 in LED array 452. The next twenty LEDs 450 and so forth, continue to be connected in a similar manner as described. Both AC lead line 484A and AC lead line 484B are shown in FIGS. 42-44. FIG. 40B shows an isolated top view of AC leads 484A and 484B, of positive and negative DC leads 486A and 486B, and of positive and negative LED leads 486C and 486D, respectively, extending between disks 454.

Figure 44A:
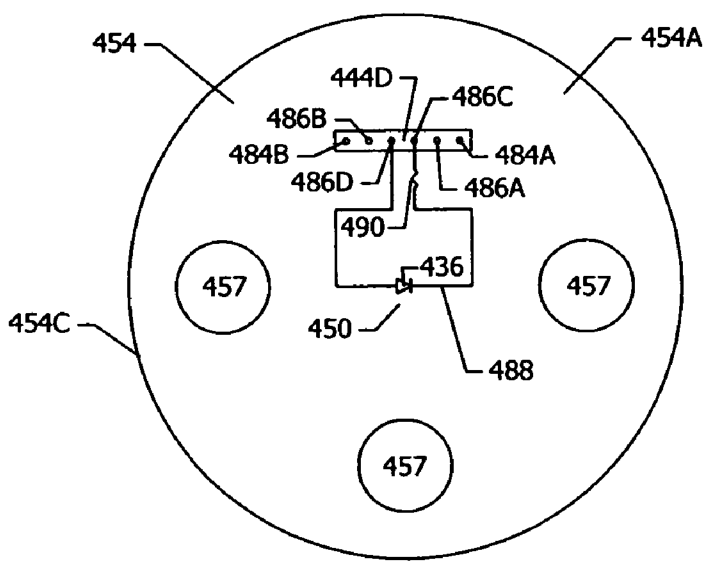
FIG. 44A shows a full frontal view of a single support disk as related to the LED retrofit lamp shown in FIG. 36 taken in isolation with an electrical schematic rendering showing a single LED to be connected in series within an electrical string as a part of the total parallel electrical structure for the LEDs.

Now analogous to the circuit shown previously herein in FIG. 4B, for forty LEDs 450 all connected in series within one LED electrical string 488, a single LED 450 from one disk 454 will extend to the adjacent single LED 450 in adjacent disk 454, etc. until all forty LEDs 450 in LED electrical string 488 are electrically connected to form one single series connection. Circuitry for LED array 452 with integral electronics circuits 442A and 442B as connected to the ballast circuitry of ballast assembly 424 is also analogous to that shown previously herein in FIG. 4. As seen therein and as indicated in FIG. 39A, the circuitry for LED array 452 includes forty electrical strings in electrical parallel relationship. The forty electrical strings are typified and represented in FIG. 44A by LED electrical string 488 mounted to disk 454 at one of the disk walls 454A or 454B, shown as disk wall 454A in FIG. 40A for purposes of exposition only. Each LED row 448 comprises a single LED 450 that is centrally mounted and concentric with disk rim 454C. Central circular aperture 456 is no longer needed. Instead, vent holes 457 are provided around the periphery of disk 454 for proper cooling of entire LED array 452 and LED retrofit lamp 418. A typical LED string 488 is shown in FIG. 44A as including a single LED row 448 comprising single LED 450A. Each LED 450A of LED string 488 in each disk 454, generally terminate at the 6-pin connectors shown in FIG. 40 as typical 6-pin connectors 444C and 444D and in FIG. 44A as typical 6-pin connector 444D. In particular, the anode side of typical LED 450A is connected to DC positive lead line 486A by way of LED positive lead line 486C with an optional resistor 490 connected in series between the anode side of LED 450A connected to LED positive lead line 486C and DC positive lead line 486A. The cathode side of typical LED 450A, which is connected to LED negative lead line 486D, is now connected to the anode side of typical LED 450A of the adjacent LED string 488 of the adjacent disk 454. The cathode side of typical LED 450A of the adjacent LED string 488 of the adjacent disk 454 is likewise connected to LED negative lead line 486D of the adjacent disk 454 and to the anode side of the next typical LED 450A of the adjacent LED string 488 of the adjacent disk 454 and so forth. The next thirty-eight LEDs 450A continue to be connected in a similar manner as described with the cathode of the last and fortieth LED 450A connected to DC negative lead line 486B by way of LED negative lead line 486D. This completes the connection of all forty LEDs 450 in LED array 452. Both AC lead line 484A and AC lead line 484B are shown in FIGS. 42-44. FIG. 40B shows an isolated top view of AC leads 484A and 484B, of positive and negative DC leads 486A and 486B, and of positive and negative LED leads 486C and 486D, respectively, extending between disks 454.

The single series string 488 of LEDs 450 as described works ideally with the high-brightness high flux white LEDs available from Lumileds and Nichia in the SMD packages.

Since these new devices require more current to drive them and run on low voltages, the high current available from existing fluorescent ballast outputs with current outputs of 300 mA and higher, along with their characteristically higher voltage outputs provide the perfect match for the present invention. The LEDs 450 have to be connected in series, so that each LED 450 within the same single string 488 will see the same current and therefore output the same brightness. The total voltage required by all the LEDs 450 within the same single string 488 is equal to the sum of all the individual voltage drops across each LED 450 and should be less than the maximum voltage output of ballast assembly 424.

Figure 45:
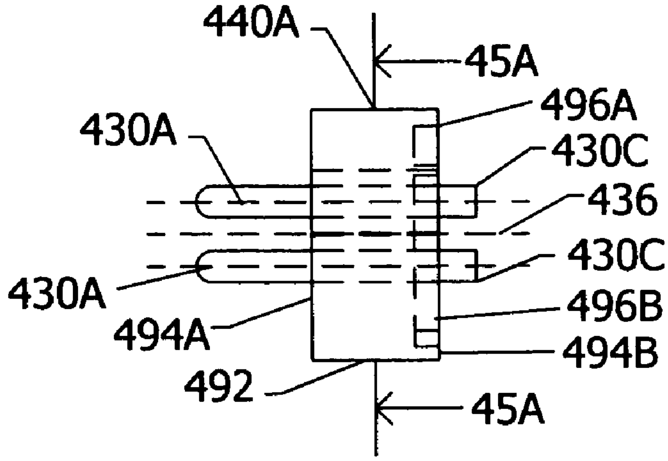
FIG. 45 is a side view of an isolated bi-pin end cap shown in FIGS. 36 and 37.
Figure 45A:
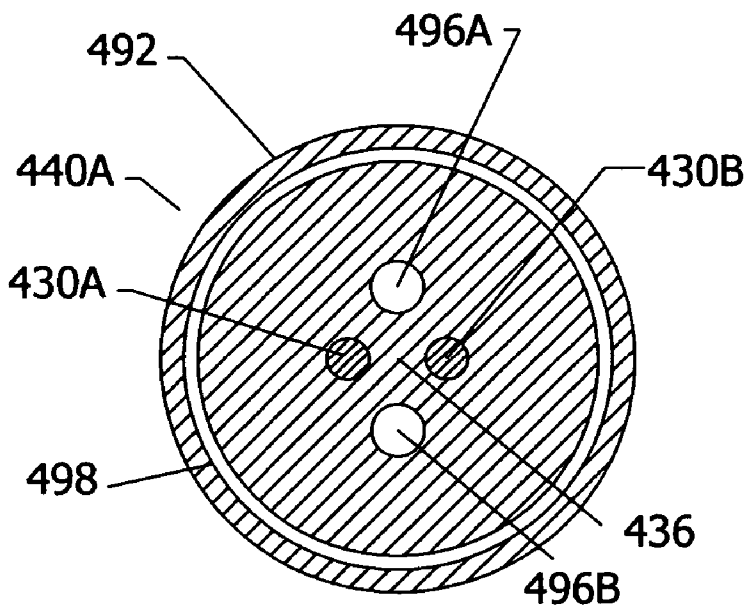
FIG. 45A is a sectional view taken through line 45A-45A of the end cap shown in FIG. 45.

FIG. 45 shows an isolated top view of one of the base end caps, namely, base end cap 440A, which is analogous to base end cap 440B, mutatis mutandis. Bi-pin electrical contacts 430A extend directly through base end cap 440A in the longitudinal direction in alignment with center line 436 of tubular wall 434 with bi-pin internal extensions 430C shown. Base end cap 440A is a solid cylinder in configuration as seen in FIGS. 45 and 45A and forms an outer cylindrical wall 492 that is concentric with center line 436 of tubular wall 434 and has opposed flat end walls 494A and 494B that are perpendicular to center line 436. Two cylindrical vent holes 496A and 496B are defined between end walls 494A and 494B in vertical alignment with center line 436.

As also seen in FIG. 45A, base end cap 440A defines a circular slot 498 that is concentric with center line 436 of tubular wall 434 and concentric with and aligned proximate to circular wall 492. Outer circular slot 498 is of such a width and circular end 438A of tubular wall 434 is of such a thickness and diameter that outer circular slot 498 accepts circular end 438A into a fitting relationship and circular end 438A is thus supported by circular slot 498. In this similar manner tubular wall 434 is mounted to both end caps 440A and 440B. Circular ends 438A and 438B of tubular wall 434 are optionally glued to circular slot 498 of base end cap 440A and the analogous circular slot of base end cap 440B.

Figure 46:
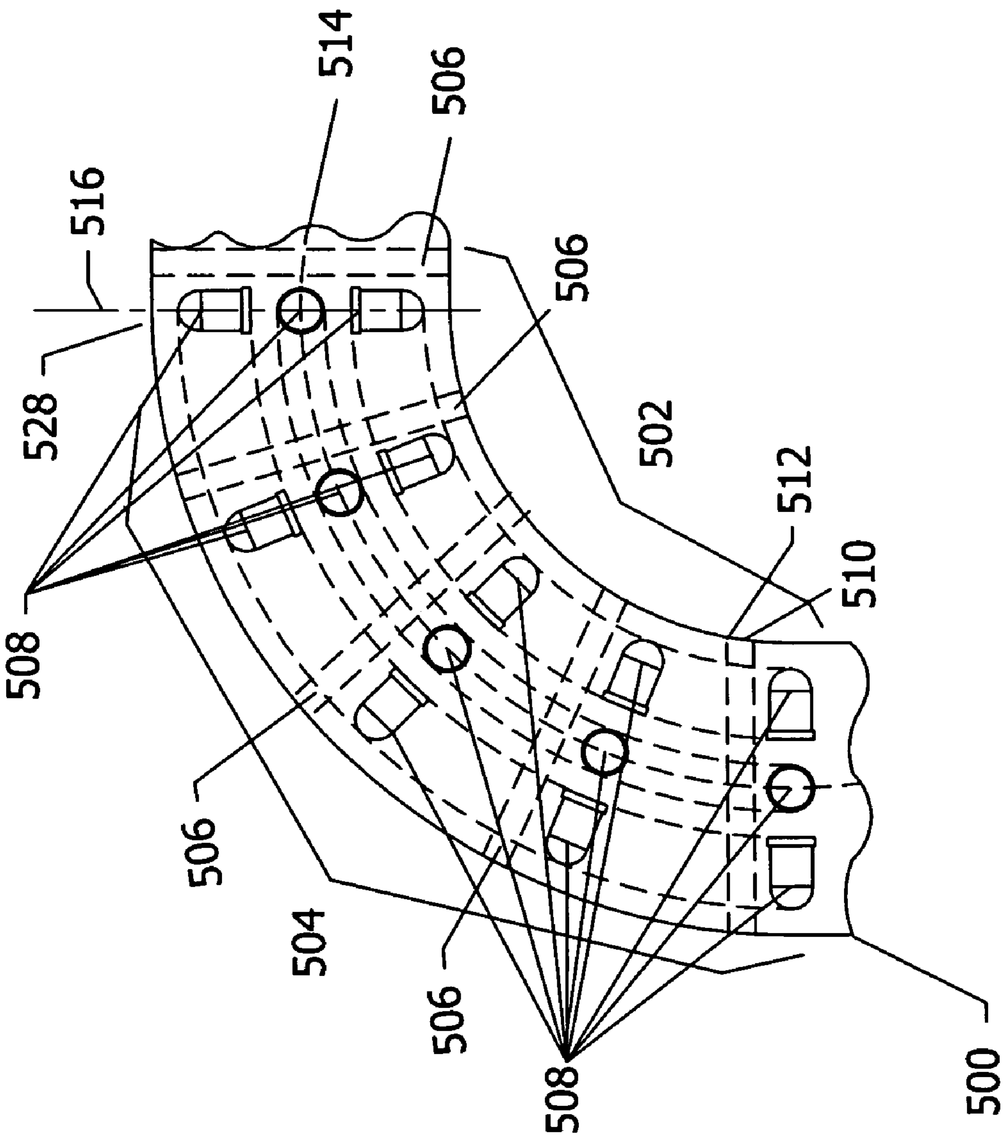
FIG. 46 is a fragment of a curved portion of an LED retrofit lamp showing disks in the curved portion.

A portion of a curved tubular wall 500 shown in FIG. 46 includes an inner curved portion 502 and an outer curved portion 504. Disks 506 are shown as six in number for purposes of exposition only and each having six LEDs 508 mounted thereto having rims 510 mounted in slots 512 defined by tubular wall 500. Disks 506 are positioned and held in tubular wall 500 at curved inner portion 502 at first equal intervals and at curved outer portion 504 at second equal intervals with the second equal intervals being greater than the first equal intervals. Curved tubular wall 500 has a curved center line 514. Each LED 508 has an LED center line 516 (seen from top view) such as LED center line 468 seen in FIG. 40 that is aligned with curved center line 514 of curved tubular wall 500 relative to a plane defined by any LED row 528 indicated by arrows in FIG. 46, or relative to a parallel plane defined by disks 506.

Figure 47:
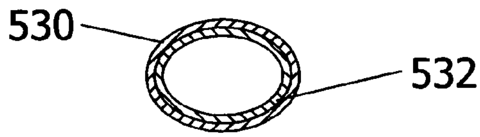
FIG. 47 is a simplified cross-section of a tubular housing as related to FIG. 1 devoid of light emitting diodes with a self-biased circuit board mounted therein with both the tubular housing and circuit board being oval in cross-section.

FIG. 47 shows a simplified cross-section of an oval tubular housing 530 as related to FIG. 1 with a self-biased oval circuit board 532 mounted therein.

Figure 47A:
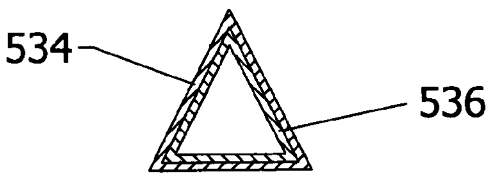
FIG. 47A is a simplified cross-section of a tubular housing as related to FIG. 1 devoid of light emitting diodes with a self-biased circuit board mounted therein with both the tubular housing and circuit board being triangular in cross-section.

FIG. 47A shows a simplified cross-section of a triangular tubular housing 534 as related to FIG. 1 with a self-biased triangular circuit board 536 mounted therein.

Figure 47B:
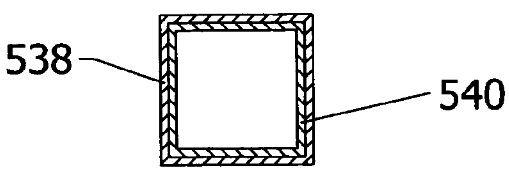
FIG. 47B is a simplified cross-section of a tubular housing as related to FIG. 1 devoid of light emitting diodes with a self-biased circuit board mounted therein with both the tubular housing and circuit board being rectangular in cross-section.

FIG. 47B shows a simplified cross-section of a rectangular tubular housing 538 as related to FIG. 1 with a self-biased rectangular circuit board 540 mounted therein.

Figure 47C:
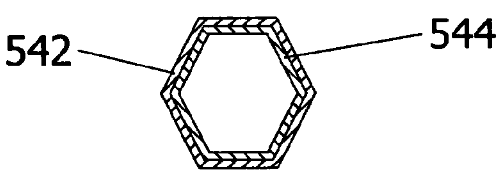
FIG. 47C is a simplified cross-section of a tubular housing as related to FIG. 1 devoid of light emitting diodes with a self-biased circuit board mounted therein with both the tubular housing and circuit board being hexagonal in cross-section.

FIG. 47C shows a simplified cross-section of a hexagonal tubular housing 542 as related to FIG. 1 with a self-biased hexagonal circuit board 544 mounted therein.

Figure 47D:
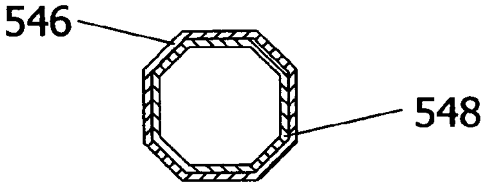
FIG. 47D is a simplified cross-section of a tubular housing as related to FIG. 1 devoid of light emitting diodes with a self-biased circuit board mounted therein with both the tubular housing and circuit board being octagonal in cross-section.

FIG. 47D shows a simplified cross-section of an octagonal tubular housing 546 as related to FIG. 1 with a self-biased octagonal circuit board 548 mounted therein.

Figure 48:
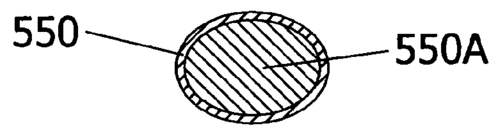
FIG. 48 is a simplified cross-section of a tubular housing as related to FIG. 26 devoid of light emitting diodes with a support structure mounted therein with both the tubular housing and support structure being oval in cross-section.

FIG. 48 shows a simplified cross-section of an oval tubular housing 550 as related to FIG. 26 with an oval support structure 550A mounted therein.

Figure 48A:
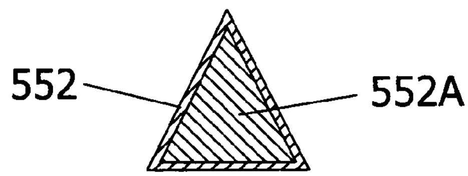
FIG. 48A is a simplified cross-section of a tubular housing as related to FIG. 26 devoid of light emitting diodes with a support structure mounted therein with both the tubular housing and support structure being triangular in cross-section.

FIG. 48A shows a simplified cross-section of a triangular tubular housing 552 as related to FIG. 26 with a triangular support structure 552A mounted therein.

Figure 48B:
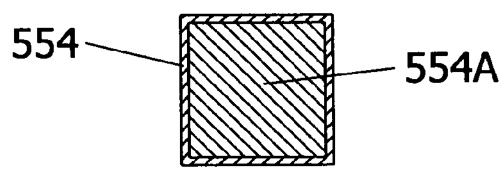
FIG. 48B is a simplified cross-section of a tubular housing as related to FIG. 26 devoid of light emitting diodes with a support structure mounted therein with both the tubular housing and support structure being rectangular in cross-section.

FIG. 48B shows a simplified cross-section of a rectangular tubular housing 554 as related to FIG. 26 with a rectangular support structure 554A mounted therein.

Figure 48C:
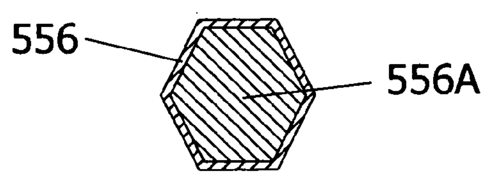
FIG. 48C is a simplified cross-section of a tubular housing as related to FIG. 26 devoid of light emitting diodes with a support structure mounted therein with both the tubular housing and support structure being hexagonal in cross-section.

FIG. 48C shows a simplified cross-section of a hexagonal tubular housing 556 as related to FIG. 26 with a hexagonal support structure 556A mounted therein.

Figure 48D:
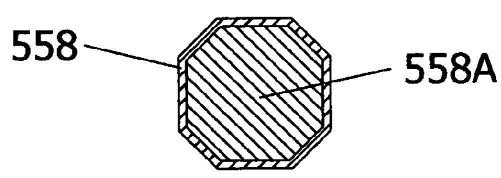
FIG. 48D is a simplified cross-section of a tubular housing as related to FIG. 26 devoid of light emitting diodes with a support structure mounted therein with both the tubular housing and support structure being octagonal in cross-section.

FIG. 48D shows a simplified cross-section of an octagonal tubular housing 558 as related to FIG. 26 with an octagonal support structure 558A mounted therein.

Figure 49:
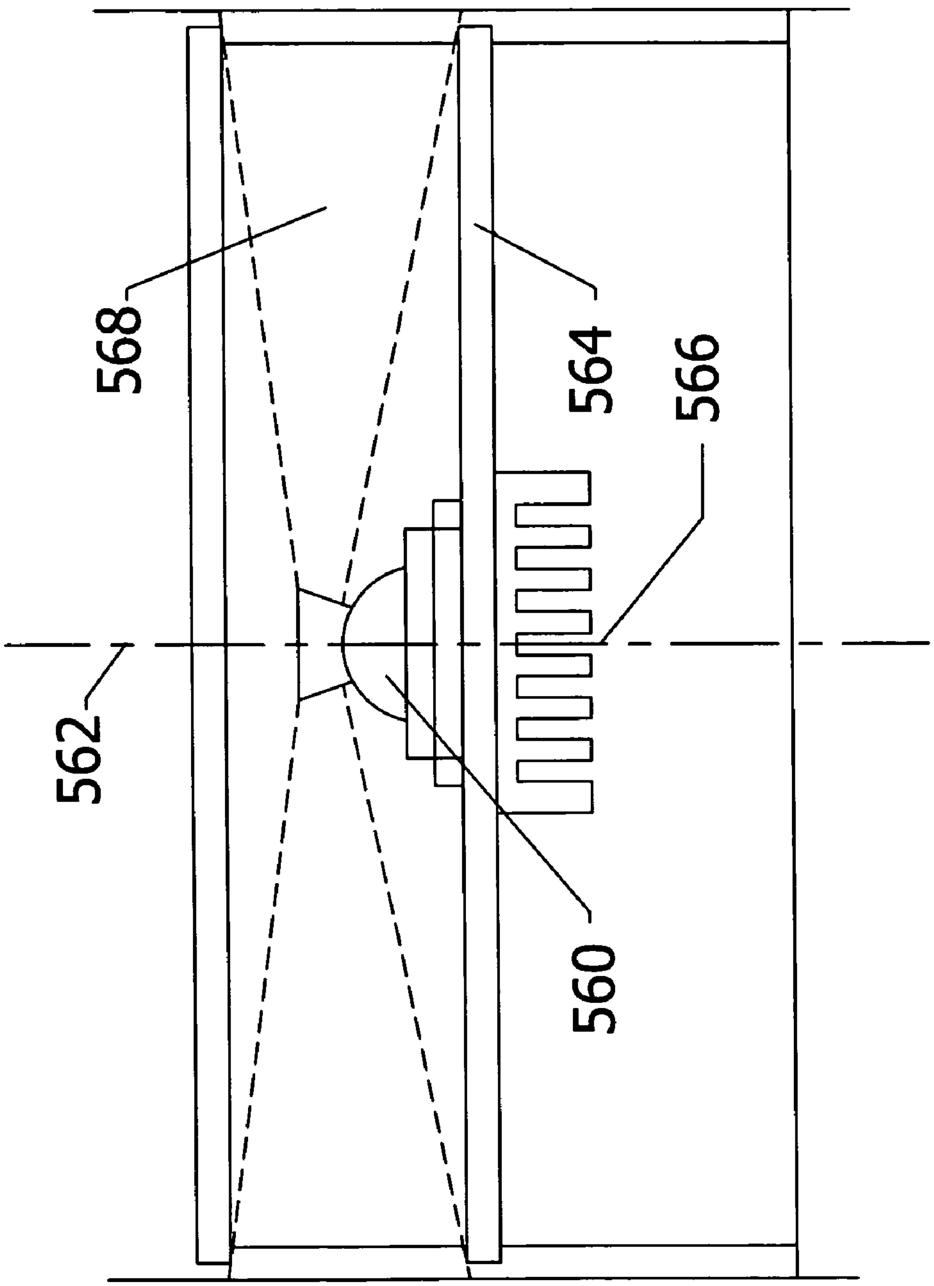
FIG. 49 is a simplified cross-view of a support structure positioned in a tubular housing with a single high-brightness SMD LED mounted to the center of the support.

FIG. 49 shows a high-brightness SMD LED 560 having an SMD LED center line 562 mounted to a typical support structure 564 mounted within a tubular housing (not shown) such as tubular housings 550, 552, 554, 556, and 558 and in addition analogous to disks 368 mounted in tubular housing 342 and disks 454 mounted in tubular housing 432. Typical support structure 564 and the tubular housing in which it is mounted have a tubular housing center line 566 that is in alignment with SMD LED center line 562. A light beam 568 shown in phantom line is emitted from high-brightness SMD LED 560 perpendicular to SMD LED center line 562 and tubular housing center line 566 at a 360-degree angle. Light beam 568 is generated in a radial light beam plane that is lateral to and slightly spaced from support structure 564, which is generally flat in configuration in side view. Thus, light beam 568 passes through the particular tubular wall to which support structure 564 is mounted in a 360-degree coverage. High-brightness SMD LED 560 shown can be, for example, a Luxeon Emitter high-brightness LED, but other analogous high-brightness side-emitting radial beam SMD LEDs that emit high flux side-emitting radial light beams can be used.

Figures 50, 50A:
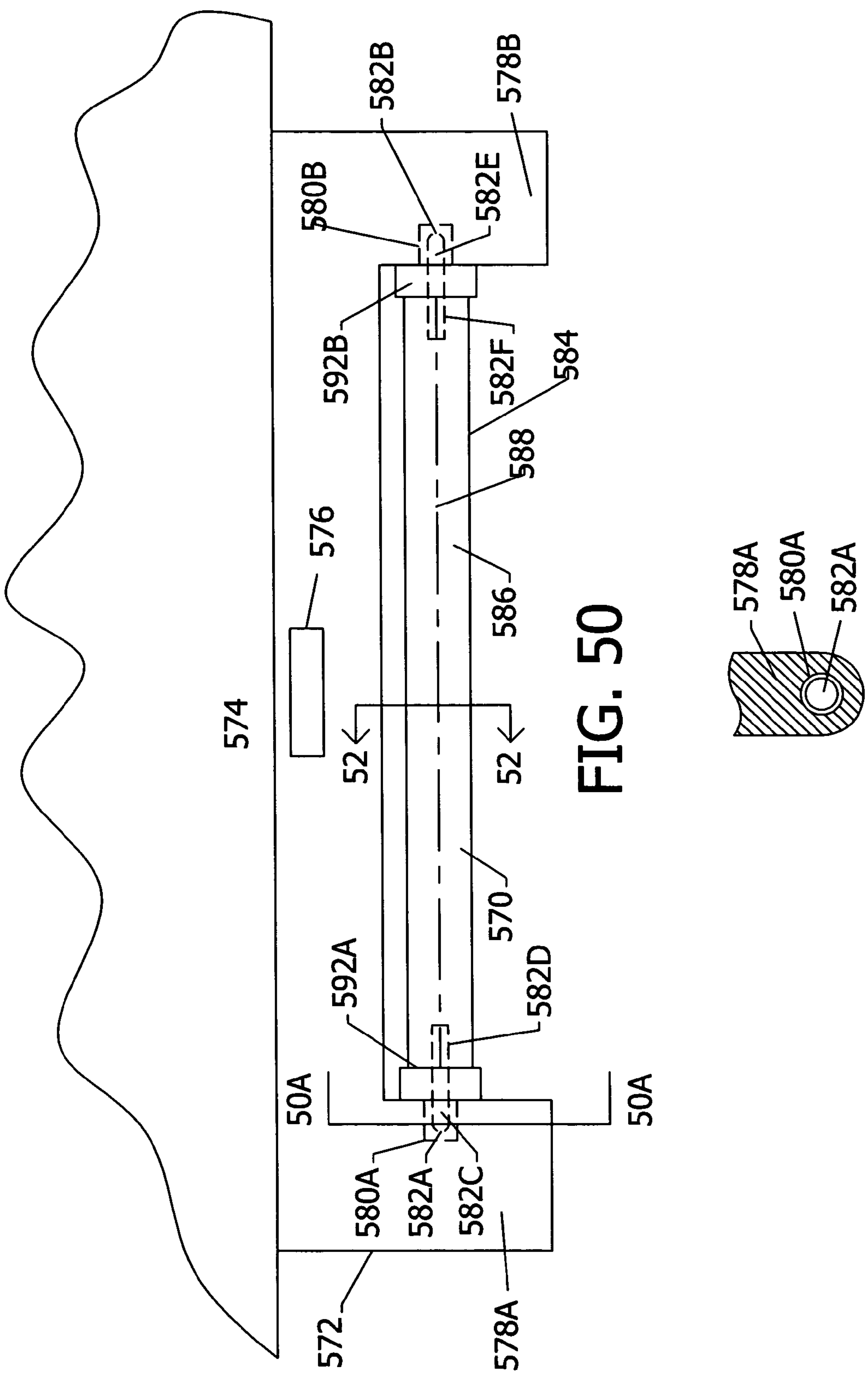
FIG. 50 is a side view of the alternate retrofitted single-pin LED lamp mounted to an existing fluorescent fixture having an electronic instant start, hybrid, or magnetic ballast having a pair of single contact electrical socket connectors.
FIG. 50A is a detailed end view of the alternate LED retrofit lamp taken through line 50A-50A of FIG. 50 showing a single-pin.

Reference is now made to the drawings and in particular to FIGS. 1-10 in which identical of similar parts are designated by the same reference numerals throughout. An LED lamp 570 shown in FIGS. 50-59 is seen in FIG. 50 retrofitted to an existing elongated fluorescent fixture 572 mounted to a ceiling 574. An instant start type ballast assembly 576 is positioned within the upper portion of fixture 572. Fixture 572 further includes a pair of fixture mounting portions 578A and 578B extending downwardly from the ends of fixture 572 that include ballast electrical contacts shown as ballast sockets 580A and 580B that are in electrical contact with ballast assembly 576. Fixture sockets 580A and 580B are each single contact sockets in accordance with the electrical operational requirement of an instant start type ballast. As also seen in FIG. 50A, LED lamp 570 includes opposed single-pin electrical contacts 582A and 582B that are positioned in ballast sockets 580A and 580B respectively, so that LED lamp 570 is in electrical contact with ballast assembly 576.

Figure 51:
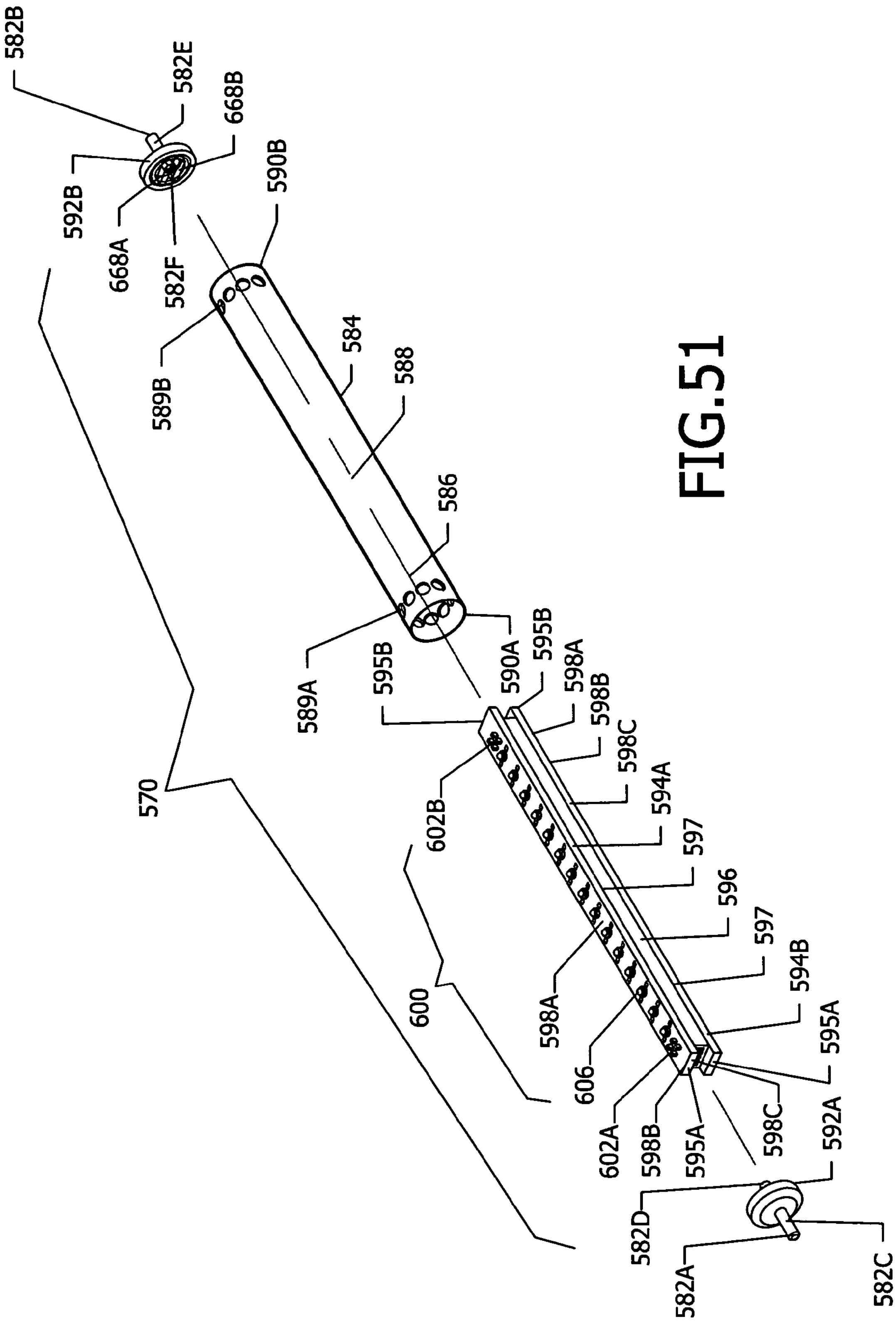
FIG. 51 is an exploded perspective view of the alternate LED retrofit lamp shown in FIG. 50 taken in isolation.
Figure 53:
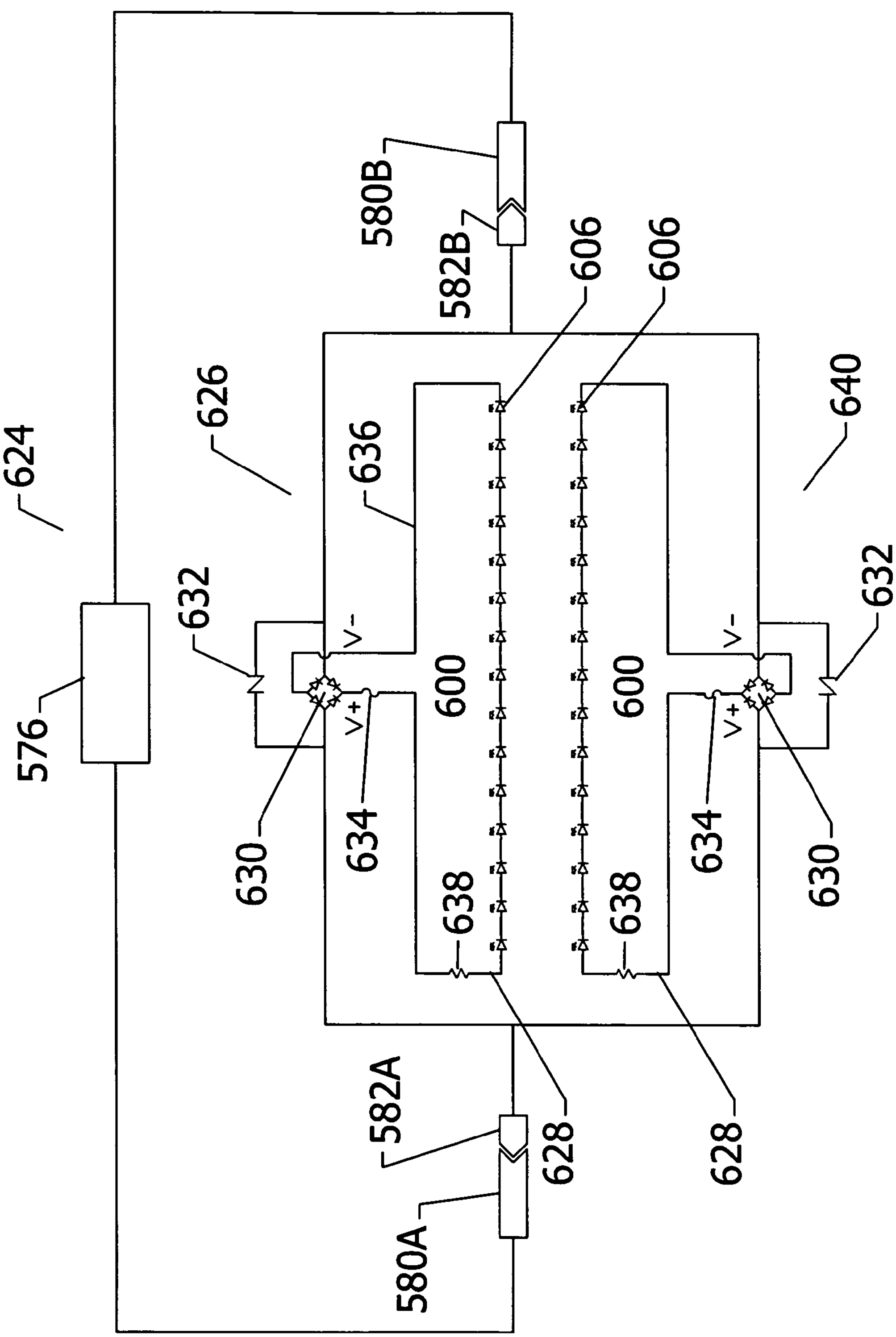
FIG. 53 is an overall electrical circuit for the alternate retrofitted LED lamp shown in FIG. 50 wherein the array of LEDs are arranged in an electrical parallel relationship.

As shown in the disassembled mode of FIG. 51 and also indicated schematically in FIG. 53, LED lamp 570 includes an elongated housing 584 particularly configured as a tubular wall 586 circular in cross-section taken transverse to a center line 588 that is made of a translucent material such as plastic or glass and preferably having a diffused coating. Tubular wall 586 has opposed tubular wall ends 590A and 590B with cooling vent holes 589A and 589B juxtaposed to tubular wall ends 590A and 590B. Optional electric micro fans (not shown) can be used to provide forced air-cooling across the electronic components contained within elongated housing 584. The optional cooling micro fans can be arranged in a push or pull configuration. LED lamp 570 further includes a pair of opposed lamp base end caps 592A and 592B mounted to single electrical contact pins 582A and 582B, respectively for insertion in ballast electrical sockets 580A and 580B in electrical power connection to ballast assembly 576 so as to provide power to LED lamp 570. Tubular wall 586 is mounted to opposed base end caps 592A and 592B at tubular wall ends 590A and 590B in the assembled mode as shown in FIG. 50. LED lamp 570 also includes electrical LED array circuit boards 594A and 594B that are rectangular in configuration. Circuit board 594A is preferably manufactured from a Metal Core Printed Circuit Board (MCPCB) consisting of a circuit layer 598A, a dielectric layer 598B, and a metal base layer 598C. Likewise, circuit board 594B comprises a circuit layer 598A, a dielectric layer 598B, and metal base layer 598C. Each dielectric layer 598B is an electrically non-conductive, but is a thermally conductive dielectric layer separating the top conductive circuit layer 598A and metal base layer 598C. Each circuit layer 598A contains the electronic components including the LEDs, traces, vias, holes, etc. while the metal base layer 598C is attached to heat sink 596. Metal core printed circuit boards are designed for attachment to heat sinks using thermal epoxy, Sil-pads, or heat conductive grease 597 used between metal base layer 598C and heat sink 596. The metal substrate LED array circuit boards 594A and 594B are each screwed down to heat sink 596 with screws (not shown) or other mounting hardware.

Circuit layer 598A is the actual printed circuit foil containing the electrical connections including pads, traces, vias, etc. Electronic integrated circuit components get mounted to circuit layer 598A. Dielectric layer 598B offers electrical isolation with minimum thermal resistance and bonds the circuit metal layer 598A to the metal base layer 598C. Metal base layer 598C is often aluminum, but other metals such as copper may also be used. The most widely used base material thickness is 0.04" (1.0 mm) in aluminum, although other thicknesses are available. The metal base layer 598C is further attached to heat sink 596 with thermally conductive grease 597 or other material to extract heat away from the LEDs mounted to circuit layer 598A. The Berquist Company markets their version of a MCPCB called Thermal Clad (T-Clad). Although this embodiment describes a generally rectangular configuration for circuit boards 594A and 594B, it can be appreciated by someone skilled in the art to form circuit boards 594A and 594B into curved shapes or combinations of rectangular and curved portions.

LED array circuit boards 594A and 594B are positioned within tubular wall 586 and supported by opposed lamp base end caps 592A and 592B. In particular, LED array circuit boards 594A and 594B each have opposed circuit board short edge ends 595A and 595B that are positioned in association with tubular wall ends 590A and 590B, respectively. As mentioned earlier, LED array circuit boards 594A and 594B each have a circuit layer 598A, a dielectric layer 598B, and a metal base layer 598C respectively with heat sink 596 sandwiched between metal base layers 598C between tubular wall circular ends 590A and 590B, and circuit layers 598A being spaced away from tubular wall 586. LED array circuit boards 594A and 594B are shown in FIGS. 51 and 52, and indicated schematically in FIG. 54.

Figure 54:
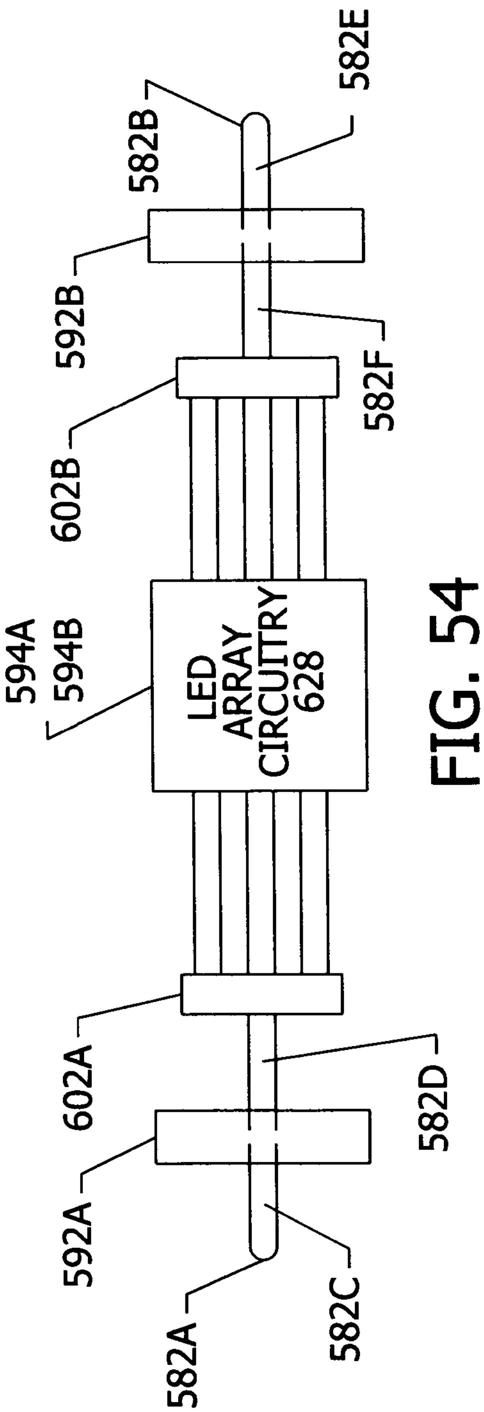
FIG. 54 is a schematic view showing the LED arrays in FIGS. 53 and 53A electrically connected to two opposed integral electronics circuitry that are electrically connected to base end caps each having a single-pin connection.

LED lamp 570 further includes an LED array 600 comprising a total of thirty Lumileds Luxeon surface mounted device (SMD) LED emitters 606 mounted to LED array circuit boards 594A and 594B. Integral electronics 602A is positioned on one end of LED array circuit boards 594A and 594B in close proximity to base end cap 592A, and integral electronics 602B is positioned on the opposite end of LED array circuit boards 594A and 594B in close proximity to base end cap 592B. As seen in FIGS. 51 and 54, integral electronics 602A is connected to LED array circuit boards 594A and 594B and also to integral electronics 602B. Integral electronics 602A and 602B are identical in both LED array circuit boards 594A and 594B.

Figure 52:
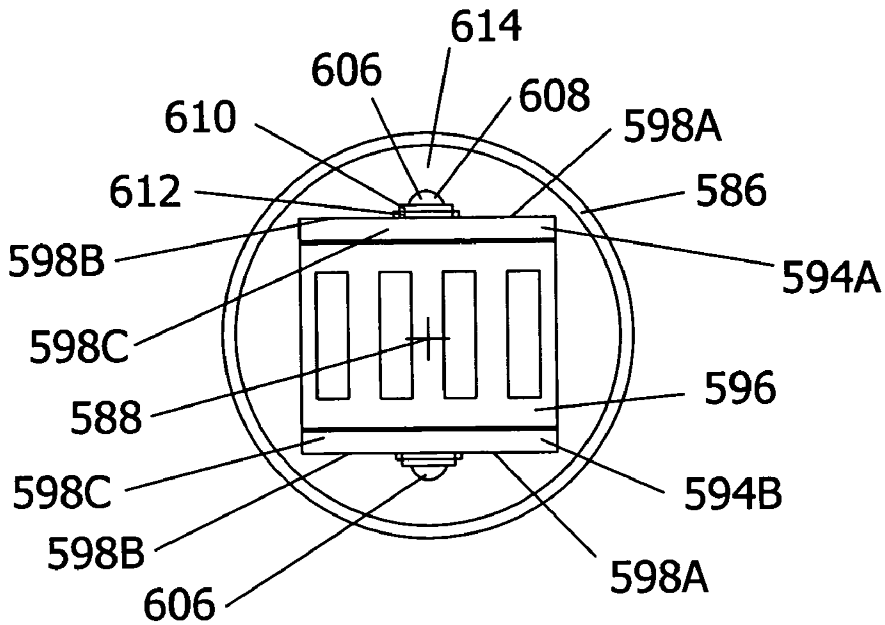
FIG. 52 is a cross-sectional view of the alternate LED retrofit lamp through a single row of LEDs taken through line 52-52 of FIG. 50.
Figure 52A:
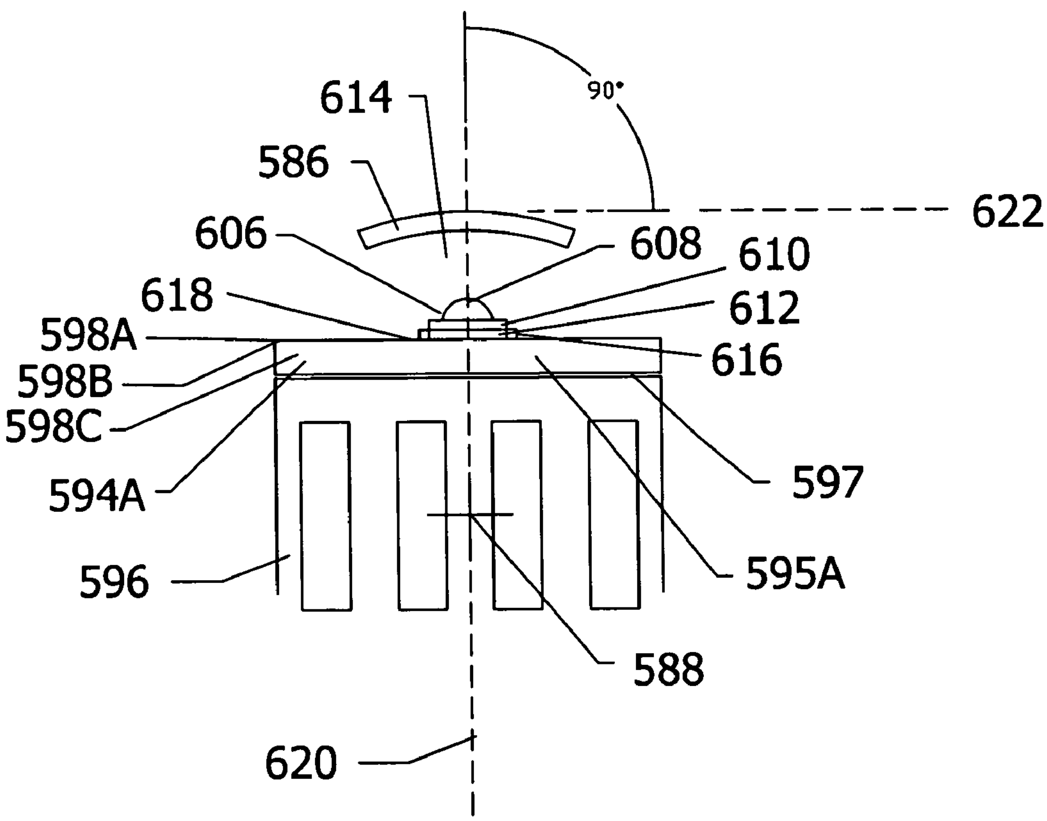
FIG. 52A is a detailed mid-sectional cross-sectional view of a single LED of the LEDs shown in FIG. 52 with portions of the tubular wall and LED circuit board.

The sectional view of FIG. 52 includes a single typical SMD LED 606 from each LED array 600 in LED array circuit boards 594A and 594B shown in FIG. 53. LED 606 is representative of one of the fifteen LEDs 606 connected in series in each LED array 600 as shown in FIG. 53. Each LED 606 includes a light emitting lens portion 608, a body portion 610, and a base portion 612. A cylindrical space 614 is defined between circuit layer 598A of each LED array circuit board 594A and 594B and cylindrical tubular wall 586. Each LED 606 is positioned in space 614 as seen in the detailed view of FIG. 52A. Lens portion 608 is in juxtaposition with the inner surface of tubular wall 586 and base portion 612 is mounted to metal base layer 598C of LED array circuit boards 594A and 594B. A detailed view of a single LED 606 in FIG. 52A shows a rigid LED electrical lead 616 extending from LED base portion 612 to LED array circuit boards 594A and 594B for electrical connection therewith. Lead 616 is secured to LED circuit boards 594A and 594B by solder 618. An LED center line 620 is aligned transverse to center line 588 of tubular wall 586. As shown in the sectional view of FIG. 52, light is emitted through tubular wall 586 by the two SMD LEDs 606 in substantially equal strength about the entire circumference of tubular wall 586. Projection of this arrangement is such that all fifteen LEDs 606 are likewise arranged to emit light rays in substantially equal strength the entire length of tubular wall 586 and in substantially equal strength about the entire 360-degree circumference of tubular wall 586. The distance between LED center line 620 and LED array circuit boards 594A and 594B is the shortest that is geometrically possible with heat sink 596 sandwiched between LED array circuit boards 594A and 594B. In FIG. 52A, LED center line 620 is perpendicular to tubular wall center line 588. FIG. 52A indicates a tangential plane 622 relative to the cylindrical inner surface of linear wall 586 in phantom line at the apex of LED lens portion 608 that is perpendicular to LED center line 620 so that all LEDs 606 emit light through tubular wall 586 in a direction perpendicular to tangential plane 622, so that maximum illumination is obtained from all SMD LEDs 606.

FIG. 53 shows the total LED electrical circuitry for LED lamp 570. The LED electrical circuitry for both LED array circuit boards 594A and 594B are identically described herein, mutatis mutandis. The total LED circuitry comprises two circuit assemblies, namely, existing ballast assembly circuitry 624 and LED circuitry 626, the latter including LED array circuitry 628 and integral electronics circuitry 640. LED circuitry 626 provides electrical circuits for LED lighting element array 600. When electrical power, normally 120 VAC or 240 VAC at 50 or 60 Hz, is applied, ballast circuitry 624 as is known in the art of instant start ballasts provides either an AC or DC voltage with a fixed current limit across ballast electrical sockets 580A and 580B, which is conducted through LED circuitry 626 by way of single contact pins 582A and 582B to a voltage input at a bridge rectifier 630. Bridge rectifier 630 converts AC voltage to DC voltage if ballast circuitry 624 supplies AC voltage. In such a situation wherein ballast circuitry 624 supplies DC voltage, the voltage remains DC voltage even in the presence of bridge rectifier 630.

LEDs 606 have an LED voltage design capacity, and a voltage suppressor 632 is used to protect LED lighting element array 600 and other electronic components primarily including LEDs 606 by limiting the initial high voltage generated by ballast circuitry 624 to a safe and workable voltage.

Bridge rectifier 630 provides a positive voltage V+ to an optional resettable fuse 634 connected to the anode end and also provides current protection to LED array circuitry 628. Fuse 634 is normally closed and will open and de-energize LED array circuitry 628 only if the current exceeds the allowable current through LED array 600. The value for resettable fuse 634 should be equal to or be lower than the maximum current limit of ballast assembly 576. Fuse 634 will reset automatically after a cool-down period.

Ballast circuitry 624 limits the current going into LED circuitry 626. This limitation is ideal for the use of LEDs in general and of LED lamp 570 in particular because LEDs are basically current devices regardless of the driving voltage. The actual number of LEDs will vary in accordance with the actual ballast assembly 576 used. In the example of the embodiment herein, ballast assembly 576 provides a maximum current limit of 300 mA, but higher current ratings are also available.

LED array circuitry 628 includes a single LED string 636 with all SMD LEDs 606 within LED string 636 being electrically wired in series. Each SMD LED 606 is preferably positioned and arranged equidistant from one another in LED string 636. Each LED array circuitry 628 includes fifteen SMD LEDs 606 electrically mounted in series within LED string 636 for a total of fifteen SMD LEDs 606 that constitute each LED array 600 in LED array circuit boards 594A and 594B. SMD LEDs 606 are positioned in equidistant relationship with one another and extend generally the length of tubular wall 586, that is, generally between tubular wall ends 590A and 590B. As shown in FIG. 53, LED string 636 includes an optional resistor 638 in respective series alignment with LED string 636 at the current input. The current limiting resistor 638 is purely optional, because the existing fluorescent ballast used here is already a current limiting device. The resistor 638 then serves as a secondary protection device. A higher number of individual SMD LEDs 606 can be connected in series within each LED string 636. The maximum number of SMD LEDs 606 being configured around the circumference of the 1.5-inch diameter of tubular wall 586 in the particular example herein of LED lamp 570 is two. Each LED 606 is configured with the anode towards the positive voltage V+ and the cathode towards the negative voltage V−. When LED array circuitry 628 is energized, the positive voltage that is applied through resistor 638 to the anode end of LED string 636, and the negative voltage that is applied to the cathode end of LED string 636 will forward bias LEDs 604 connected within LED string 636 and cause SMD LEDs 606 to turn on and emit light.

Ballast assembly 576 regulates the electrical current through SMD LEDs 606 to the correct value of 300 mA for each SMD LED 606. Each LED string 636 sees the total current applied to LED array circuitry 628. Those skilled in the art will appreciate that different ballasts provide different current outputs to drive LEDs that require higher operating currents. To provide additional current to drive the newer high-flux LEDs that require higher currents to operate, the electronic ballast outputs can be tied together in parallel to "overdrive" the LED retrofit lamp of the present invention.

The total number of LEDs in series within each LED string 636 is arbitrary since each SMD LED 606 in each LED string 636 will see the same current. The maximum number of LEDs is dependent on the maximum power capacity of the ballast. Again in this example, fifteen SMD LEDs 606 are shown connected in series within each LED string 636. Each of the fifteen SM1 LEDs 606 connected in series within each LED string 636 sees this 300 mA. In accordance with the type of ballast assembly 576 used, when ballast assembly 576 is first energized, a high voltage may be applied momentarily across ballast socket contacts 580A and 580B, which conduct to pin contacts 582A and 582B. Such high voltage is normally used to help ignite a fluorescent tube and establish conductive phosphor gas, but high voltage is unnecessary for LED array circuitry 628 and voltage surge absorber 632 absorbs the voltage applied by ballast circuitry 624, so that the initial high voltage supplied is limited to an acceptable level for the circuit. Optional resettable fuse 634 is also shown to provide current protection to LED array circuitry 628.

Figure 53A:
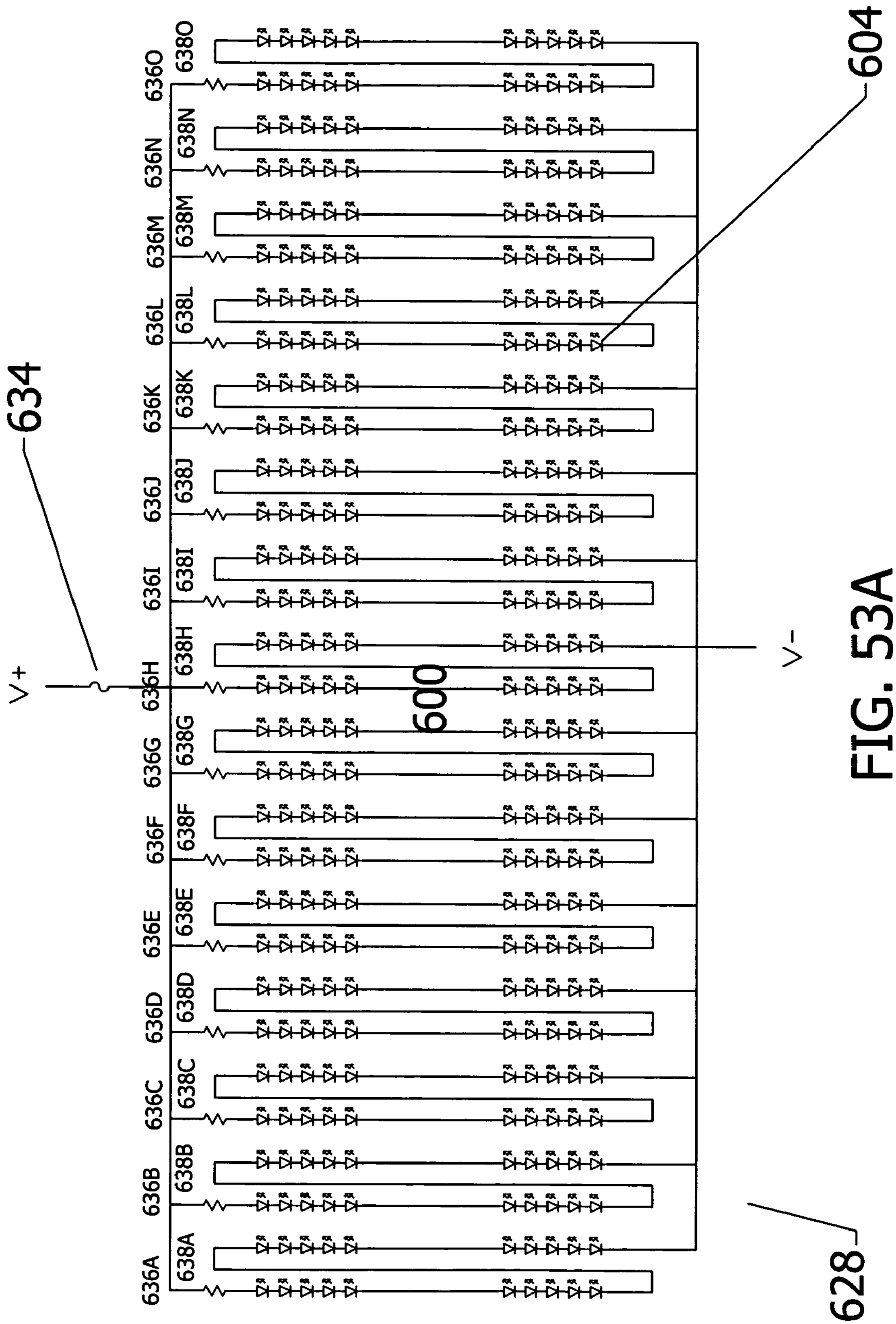
FIG. 53A is an alternate arrangement of the array of LEDs arranged in an electrical parallel relationship for the overall electrical circuit analogous to the overall electrical circuit shown in FIG. 53 for the alternate LED retrofit lamp.

As can be seen from FIG. 53A, there can be more than fifteen 5 mm LEDs 604 connected in series within each string 636A-636O. There are twenty 5 mm LEDs 604 in this example, but there can be more 5 mm LEDs 604 connected in series within each string 636A-636O. LED array circuitry 628 includes fifteen electrical LED strings 636 individually designated as strings 636A, 636B, 636C, 636D, 636E, 636F, 636G, 636H, 636I, 636J, 636K, 636L, 636M, 636N and 636O all in parallel relationship with all 5 mm LEDs 604 within each string 636A-636O being electrically wired in series. Parallel strings 636A-636O are so positioned and arranged that each of the fifteen strings 636 is equidistant from one another. LED array circuitry 628 includes twenty 5 mm LEDs 604 electrically mounted in series within each of the fifteen parallel strings 636A-636O for a total of three-hundred 5 mm LEDs 604 that constitute each LED array 600. 5 mm LEDs 604 are positioned in equidistant relationship with one another and extend generally the length of tubular wall 586, that is, generally between tubular wall ends 590A and 590B. As shown in FIG. 53A, each of strings 636A-636O includes an optional resistor 638 designated individually as resistors 638A, 638B, 638C, 638D, 638E, 638F, 638G, 638H, 638I, 638J, 638K, 638L, 638M, 638N, and 638O in respective series alignment with strings 636A-636O at the current input for a total of fifteen resistors 638. Again, a higher number of individual 5 mm LEDs 604 can be connected in series within each LED string 636. Each 5 mm LED 604 is configured with the anode towards the positive voltage V+ and the cathode towards the negative voltage V−. When LED array circuitry 628 is energized, the positive voltage that is applied through resistors 638A-638O to the anode end of LED strings 636A-636O, and the negative voltage that is applied to the cathode end of LED strings 636A-636O will forward bias 5 mm LEDs 604 connected to LED strings 636A-636O and cause 5 mm LEDs 604 to turn on and emit light.

Ballast assembly 576 regulates the electrical current through 5 mm LEDs 604 to the correct value of 20 mA for each 5 mm LED 604. The fifteen LED strings 636A-636O equally divide the total current applied to LED array circuitry 628. Those skilled in the art will appreciate that different ballasts provide different current outputs.

If the forward drive current for each 5 mm LEDs 604 is known, then the output current of ballast assembly 576 divided by the forward drive current gives the exact number of parallel strings of 5 mm LEDs 604 in the each particular LED array, here LED array 600. The total number of 5 mm LEDs 604 in series within each LED string 636 is arbitrary since each 5 mm LED 604 in each LED string 636 will see the same current. Again in this example, twenty 5 mm LEDs 604 are shown connected in series within each LED string 636. Ballast assembly 576 provides 300 mA of current, which when divided by the fifteen LED strings 636 of twenty 5 mm LEDs 604 per LED string 636 gives 20 mA per LED string 636. Each of the twenty 5 mm LEDs 604 connected in series within each LED string 636 sees this 20 mA. In accordance with the type of ballast assembly 576 used, when ballast assembly 576 is first energized, a high voltage may be applied momentarily across ballast socket contacts 580A and 580B, which conduct to pin contacts 582A and 582B. Such high voltage is normally used to help ignite a fluorescent tube and establish conductive phosphor gas, but high voltage is unnecessary for LED array circuitry 628 and voltage surge absorber 632 absorbs the voltage applied by ballast circuitry 624, so that the initial high voltage supplied is limited to an acceptable level for the circuit.

Figure 53B:
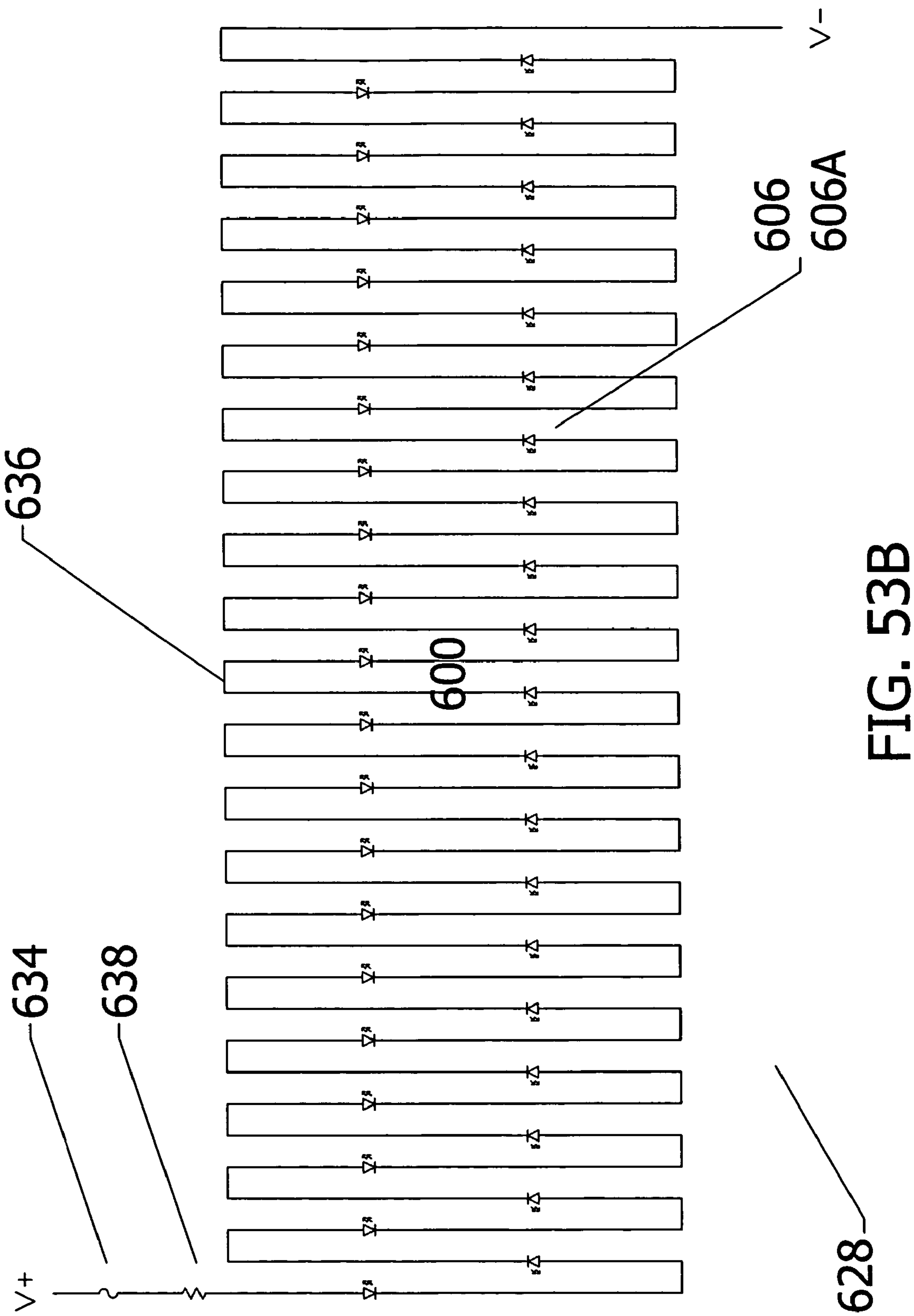
FIG. 53B is another alternate arrangement of an array of LEDs arranged in an electrical series relationship for an overall electrical circuit analogous to the electrical circuit shown in FIG. 53 for the alternate LED retrofit lamp.

FIG. 53B shows another alternate arrangement of LED array circuitry 628. LED array circuitry 628 consists of a single LED string 636 of SMD LEDs 606 arranged in series relationship including for exposition purposes only forty SMD LEDs 606 all electrically connected in series. Positive voltage V+ is connected to optional resettable fuse 634, which in turn is connected to one side of current limiting resistor 638. The anode of the first LED in the series string is then connected to the other end of resistor 638. A number other than forty SMD LEDs 606 can be connected within the series LED string 636 to fill up the entire length of the tubular wall of the present invention. The cathode of the first SMD LED 606 in the series LED string 636 is connected to the anode of the second SMD LED 606, the cathode of the second SMD LED 606 in the series LED string 636 is then connected to the anode of the third SMD LED 606, and so forth. The cathode of the last SMD LED 606 in the series LED string 636 is likewise connected to ground or the negative potential V−. The individual SMD LEDs 606 in the single series LED string 636 are so positioned and arranged such that each of the forty LEDs is spaced equidistant from one another substantially filling the entire length of tubular wall 586. SMD LEDs 606 are positioned in equidistant relationship with one another and extend substantially the length of tubular wall 586, that is, generally between tubular wall ends 590A and 590B. As shown in FIG. 53B, the single series LED string 636 includes an optional resistor 638 in respective series alignment with single series LED string 636 at the current input. Each SMD LED 606 is configured with the anode towards the positive voltage V+ and the cathode towards the negative voltage V−. When LED array circuitry 628 is energized, the positive voltage that is applied through resistor 638 to the anode end of single series LED string 636 and the negative voltage that is applied to the cathode end of single series LED string 636 will forward bias SMD LEDs 606 connected in series within single series LED string 636, and cause SMD LEDs 606 to turn on and emit light.

The single series LED string 636 of SMD LEDs 606 as described above works ideally with the high-brightness or brighter high flux white SMD LEDs 606A available from Lumileds and Nichia in the SMD packages as discussed earlier herein. Since these new devices require more current to drive them and run on low voltages, the high current available from existing fluorescent ballast outputs with current outputs of 300 mA and higher, along with their characteristically higher voltage outputs provide the perfect match for the present invention. The high-brightness SMD LEDs 606A have to be connected in series, so that each high-brightness SMD LED 606A within the same single LED string 636 will see the same current and therefore output the same brightness. The total voltage required by all the high-brightness SMD LEDs 606A within the same single LED string 636 is equal to the sum of all the individual voltage drops across each high-brightness SMD LED 606A and should be less than the maximum voltage output of ballast assembly 576.

Figure 53C:
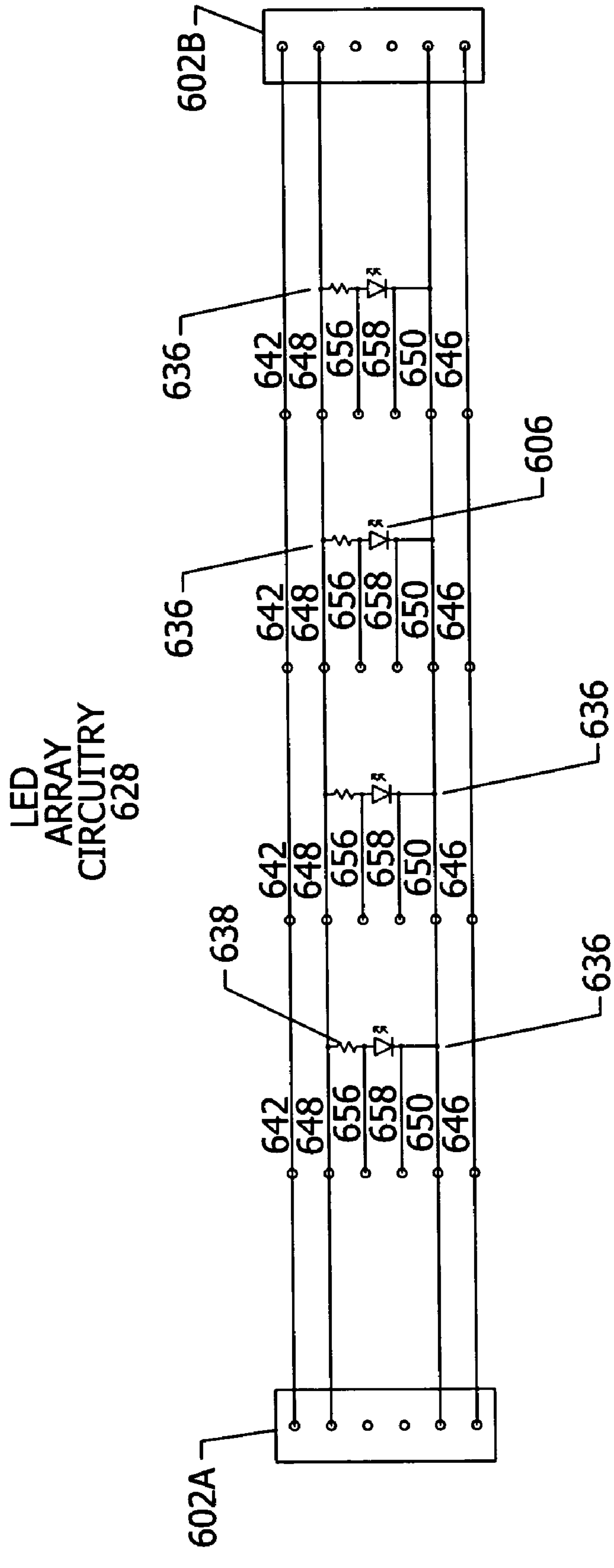
FIG. 53C is a simplified arrangement of the array of LEDs for the overall electrical circuit shown in FIG. 53 for the alternate LED retrofit lamp.

FIG. 53C shows a simplified arrangement of the LED array circuitry 628 of SMD LEDs 606 for the overall electrical circuit shown in FIG. 53. AC lead lines 642 and 646 and DC positive lead line 648 and DC negative lead line 650 are connected to integral electronics 602A and 602B. Four parallel LED strings 636 each including a resistor 638 are each connected to DC positive lead line 648 on one side, and to LED positive lead line 656 or the anode side of each LED 604 and on the other side. The cathode side of each LED 604 is then connected to LED negative lead line 658 and to DC negative lead line 650 directly. AC lead lines 642 and 646 simply pass through LED array circuitry 628.

Figure 53D:
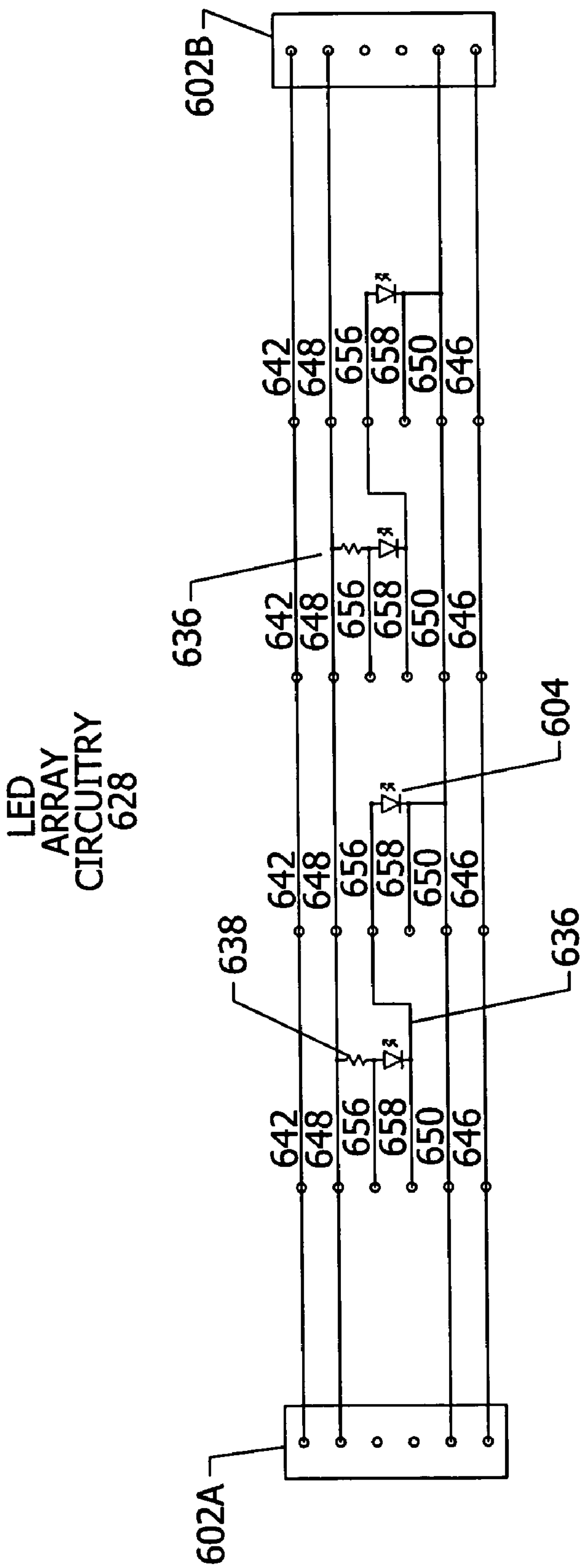
FIG. 53D is a simplified arrangement of the array of LEDs for the overall electrical circuit shown in FIG. 53A for the alternate LED retrofit lamp.
Figure 53E:
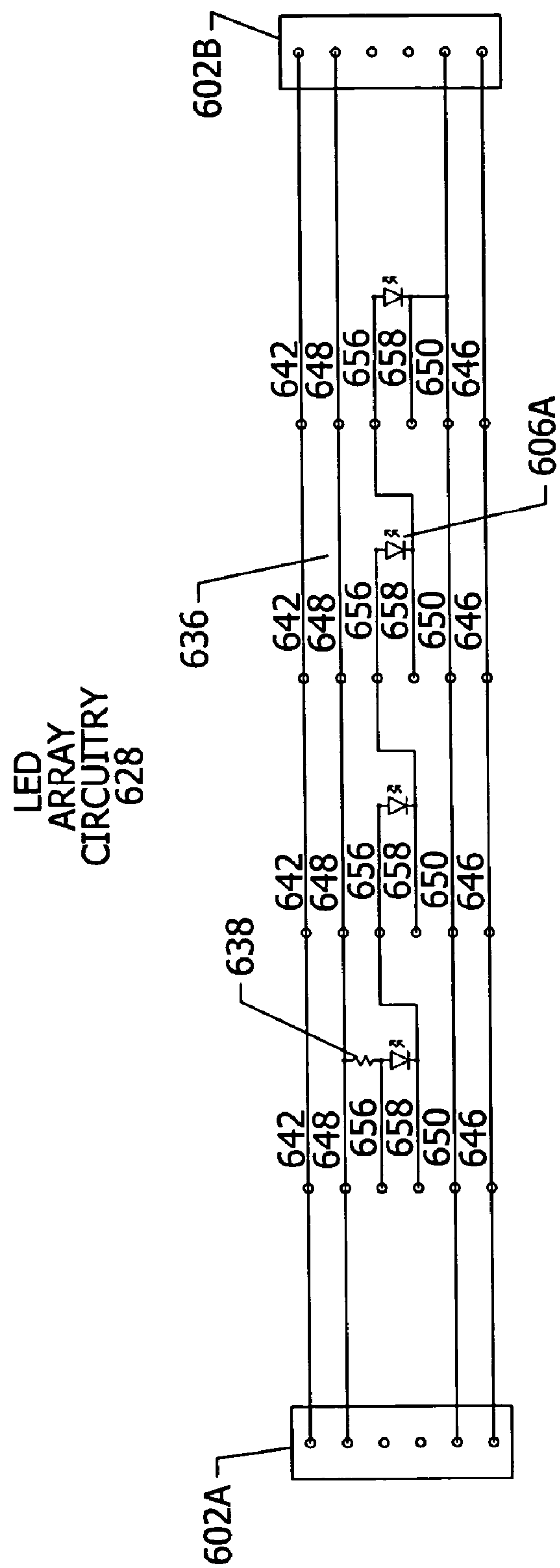
FIG. 53E is a simplified arrangement of the array of LEDs for the overall electrical circuit shown in FIG. 53B for the alternate LED retrofit lamp.

FIG. 53D shows a simplified arrangement of the LED array circuitry 628 of 5 mm LEDs 604 for the overall electrical circuit shown in FIG. 53A. AC lead lines 642 and 646 and DC positive lead line 648 and DC negative lead line 650 are connected to integral electronics 602A and 602B. Two parallel LED strings 636 each including a single resistor 638 are each connected to DC positive lead line 648 on one side, and to LED positive lead line 656 or the anode side of the first 5 mm LED 604 in each LED string 636 on the other side. The cathode side of the first 5 mm LED 604 is connected to LED negative lead line 658 and to adjacent LED positive lead line 656 or the anode side of the second 5 mm LED 604 in the same LED string 636. The cathode side of the second 5 mm LED 604 is then connected to LED negative lead line 658 and to DC negative lead line 650 directly in the same LED string 636. AC lead lines 642 and 646 simply pass through LED array circuitry 628. FIG. 53E shows a simplified arrangement of the LED array circuitry 628 of LEDs for the overall electrical circuit shown in FIG. 53B. AC lead lines 642 and 646 and DC positive lead line 648 and DC negative lead line 650 are connected to integral electronics 602A and 602B. Single parallel LED string 636 including a single resistor 638 is connected to DC positive lead line 648 on one side, and to LED positive lead line 656 or the anode side of the first high-brightness SMD LED 606A in the LED string 636 on the other side. The cathode side of the first high-brightness SMD LED 606A is connected to LED negative lead line 658 and to adjacent LED positive lead line 656 or the anode side of the second LED 606A. The cathode side of the second LED 606A is connected to LED negative lead line 658 and to adjacent LED positive lead line 656 or the anode side of the third high-brightness SMD LED 606A. The cathode side of the third high-brightness SMD LED 606A is connected to LED negative lead line 658 and to adjacent LED positive lead line 656 or the anode side of the fourth high-brightness SMD LED 606A. The cathode side of the fourth high-brightness SMD LED 606A is then connected to LED negative lead line 658 and to DC negative lead line 650 directly. AC lead lines 642 and 646 simply pass through LED array circuitry 628.

The term high-brightness as describing LEDs herein is a relative term. In general, for the purposes of the present application, high-brightness LEDs refer to LEDs that offer the highest luminous flux outputs. Luminous flux is defined as lumens per watt. For example, Lumileds Luxeon high-brightness LEDs produce the highest luminous flux outputs at the present time. Luxeon 5-watt high-brightness LEDs offer extreme luminous density with lumens per package that is four times the output of an earlier Luxeon 1-watt LED and up to 50 times the output of earlier discrete 5 mm LED packages. Gelcore is soon to offer an equivalent and competitive product.

Figure 53F:
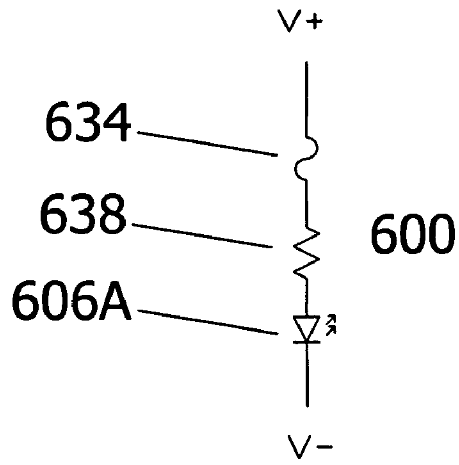
FIG. 53F shows a single high-brightness LED positioned on a single string in electrical series arrangement for the overall electrical circuit shown in FIG. 53 for the alternate retrofit lamp.

With the new high-brightness LEDs in mind, FIG. 53F shows a single high-brightness LED 606A positioned on an electrical string in what is defined herein as an electrical series arrangement with single a high-brightness LED 606A for the overall electrical circuit shown in FIG. 53. The single high-brightness LED 606A fulfills a particular lighting requirement formerly fulfilled by a fluorescent lamp.

Figure 53G:
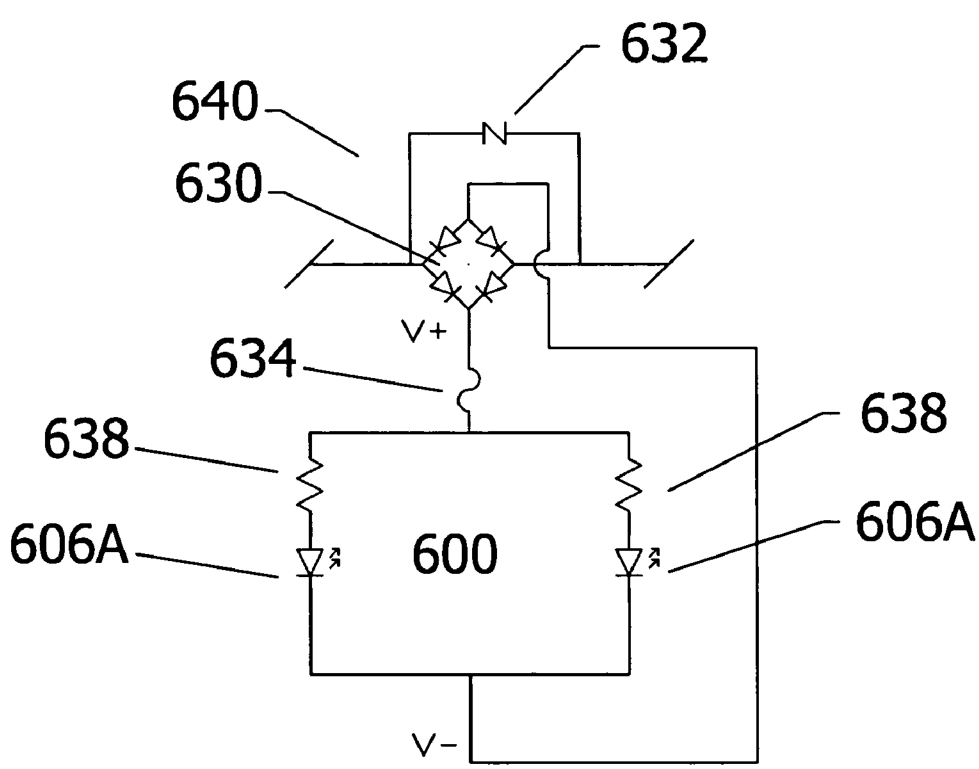
FIG. 53G shows two high-brightness LEDs in an electrical parallel arrangement of two parallel strings with one high-brightness LED positioned on each of the two parallel strings for the overall electrical circuit shown in FIG. 53 for the alternate retrofit lamp.

Likewise, FIG. 53G shows two high-brightness LEDs 606A in electrical parallel arrangement with one high-brightness LED 606A positioned on each of the two parallel strings for the overall electrical circuit shown in FIG. 53. The two high-brightness LEDs 606A fulfill a particular lighting requirement formerly fulfilled by a fluorescent lamp.

As shown in the schematic electrical and structural representations of FIG. 54, LED array circuit boards 594A and 594B of LED array 600 is positioned between integral electronics 602A and 602B that in turn are electrically connected to ballast circuitry 624 by single contact pins 582A and 582B, respectively. Single contact pins 582A and 582B are mounted to and protrude out from base end caps 592A and 592B, respectively, for electrical connection to integral electronics 602A and 602B. Contact pins 582A and 582B are soldered directly to integral electronics 602A and 602B, respectively mounted onto LED array circuit boards 594A and 594B. In particular, pin inner extension 582D of connecting pin 582A is electrically connected by being soldered directly to the integral electronics 602A. Similarly, being soldered directly to integral electronics 602B electrically connects pin inner extension 582F of connecting pin 582B. It should be noted that someone skilled in the art could use other means of electrically connecting the contact pins 582A and 582B to LED array circuit boards 594A and 594B. These techniques include the use of connectors and headers, plugs and sockets, receptacles, etc. among many others. Integral electronics 602A is in electrical connection with LED array circuit boards 594A and 594B and LED circuitry 626 mounted thereon as shown in FIG. 53. Likewise, integral electronics 602B is in electrical connection with LED array circuit boards 594A and 594B and LED circuitry 626 mounted thereon.

Figure 55:
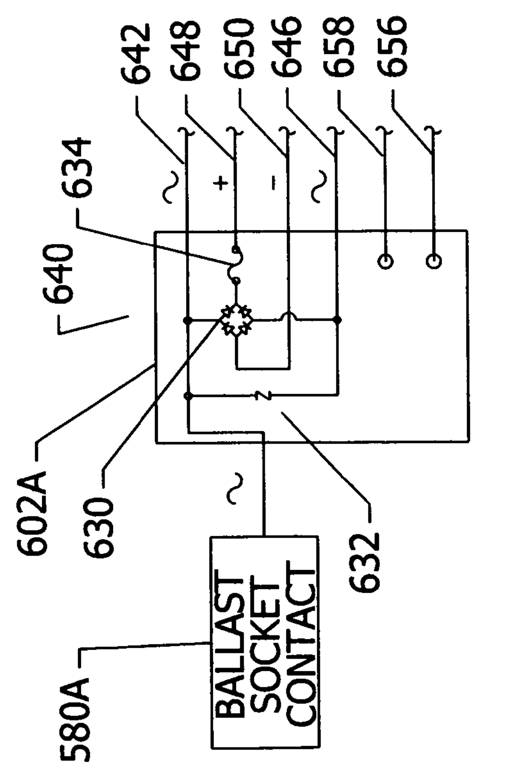
FIG. 55 is a schematic circuit of one of the two integral electronics circuitry shown in FIG. 54 positioned at one side of the alternating current voltage emanating from the ballast for the LED array shown in FIGS. 53 and 53A.

As seen in FIG. 55, a schematic of integral electronics circuitry 640 is mounted on integral electronics 602A. Integral electronics circuit 640 is also shown in FIG. 53 as part of the schematically shown LED circuitry 626. Integral electronics circuitry 640 is in electrical contact with ballast socket contact 580A, which is shown as providing AC voltage. Integral electronics circuitry 640 includes bridge rectifier 630, voltage surge absorber 632, and fuse 634. Bridge rectifier 630 converts AC voltage to DC voltage. Voltage surge absorber 632 limits the high voltage to a workable voltage within the design voltage capacity of 5 mm LEDs 604 or SMD LEDs 606. The DC voltage circuits indicated as plus (+) and minus (−) and indicated as DC leads 648 and 650 lead to and from LED array 600 (not shown). It is noted that FIG. 55 indicates the presence of AC voltage by an AC wave symbol ~. Each AC voltage could be DC voltage supplied by certain ballast assemblies 576 as mentioned earlier herein. In such a case DC voltage would be supplied to LED lighting element array 600 even in the presence of bridge rectifier 630. It is particularly noted that in such a case, voltage surge absorber 632 would remain operative.

Figure 56:
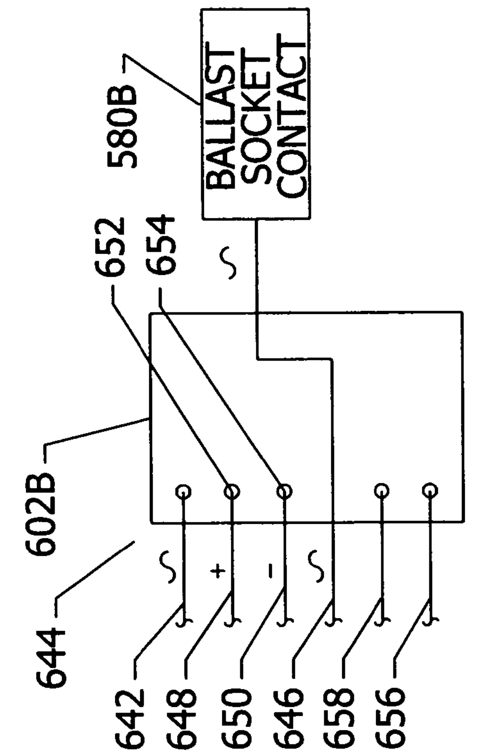
FIG. 56 is a schematic circuit of the other of the two integral electronics circuitry shown in FIG. 54 positioned at the other side of the alternating current voltage emanating from the ballast for the LED array shown in FIGS. 53 and 53A.

FIG. 56 shows a further schematic of integral electronics 602B that includes integral electronics circuitry 644 mounted on integral electronics 602B with voltage protected AC lead line 646 extending from LED array 600 (not shown) and by extension from integral electronics circuitry 640. The AC lead line 646 having passed through voltage surge absorber 632 is a voltage protected circuit and is in electrical contact with ballast socket contact 580B. Integral circuitry 644 includes DC positive and DC negative lead lines 648 and 650, respectively, from LED array circuitry 628 to positive and negative DC terminals 652 and 654, respectively, mounted on integral electronics 602B. Integral circuitry 644 further includes AC lead line 646 from LED array circuitry 628 to ballast socket contact 580B.

FIGS. 55 and 56 show the lead lines going into and out of LED circuitry 626 respectively. The lead lines include AC lead lines 642 and 646, positive DC voltage 648, DC negative voltage 650, LED positive lead line 656, and LED negative lead line 658. The AC lead lines 642 and 646 are basically feeding through LED circuitry 626, while the positive DC voltage lead line 648 and negative DC voltage lead line 650 are used primarily to power the LED array 600. DC positive lead line 648 is the same as LED positive lead line 656 and DC negative lead line 650 is the same as LED negative lead line 658. LED array circuitry 628 therefore consists of all electrical components and internal wiring and connections required to provide proper operating voltages and currents to 5 mm LEDs 604 or to SMD LEDs 606 connected in parallel, series, or any combinations of the two.

Figure 57:
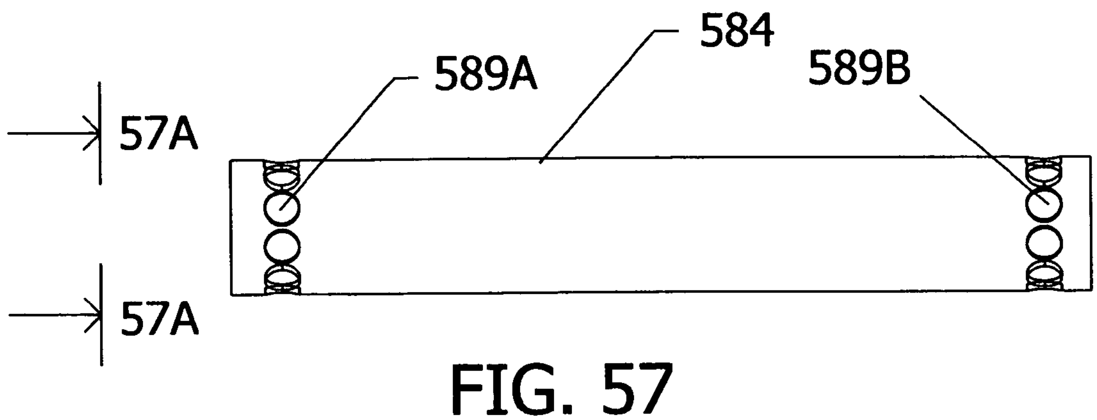
FIG. 57 is an isolated side view of the elongated cylindrical housing shown in FIGS. 50 and 51 detailing the cooling vent holes located at opposite ends.
Figure 57A:
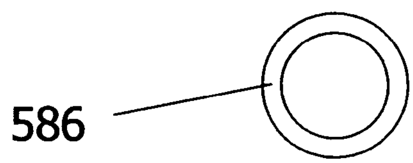
FIG. 57A is an end view taken through line 57A-57A in FIG. 57.

FIGS. 57 and 57A show a close-up of elongated linear housing 584 with details of cooling vent holes 589A and 589B located on opposite ends of elongated linear housing 584 in both side and cross-sectional views respectively.

Figure 58:
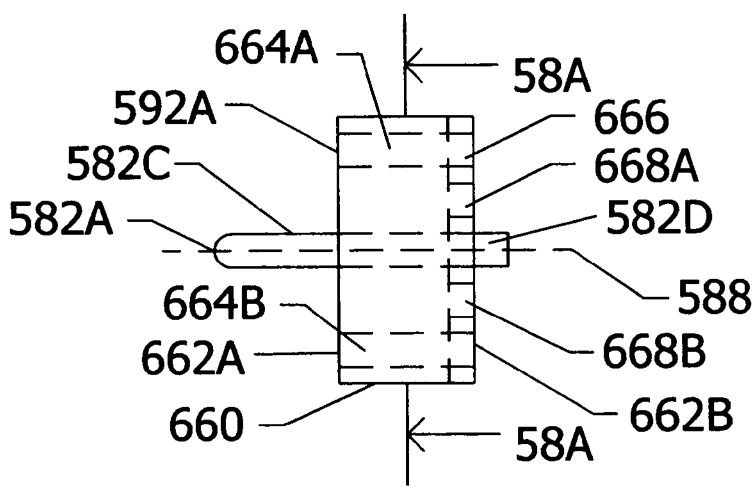
FIG. 58 is a side view of an isolated single-pin end cap shown in FIGS. 50 and 54.
Figure 58A:
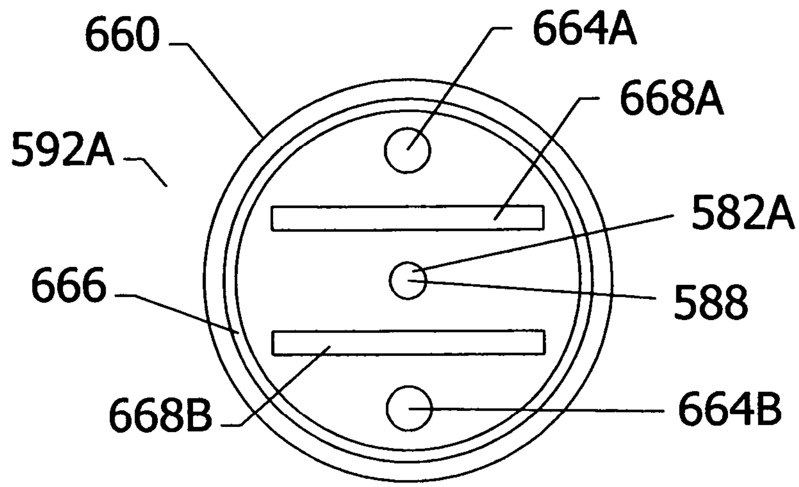
FIG. 58A is a sectional view taken through line 58A-58A of the end cap shown in FIG. 58.

FIG. 58 shows an isolated view of one of the base end caps, namely, base end cap 592A, which is the same as base end cap 592B, mutatis mutandis. Single-pin contact 582A extends directly through the center of base end cap 592A in the longitudinal direction in alignment with center line 588 of tubular wall 586. Single-pin 582A is also shown in FIG. 50 where single-pin contact 582A is mounted into ballast socket contact 580A. Single-pin contact 582A also includes pin extension 582D that is outwardly positioned from base end cap 592A in the direction towards tubular wall 586. Base end cap 592A is a solid cylinder in configuration as seen in FIGS. 58 and 58A and forms an outer cylindrical wall 660 that is concentric with center line 588 of tubular wall 586 and has opposed flat end walls 662A and 662B that are perpendicular to center line 588. Two cylindrical parallel vent holes 664A and 664B are defined between flat end walls 662A and 662B spaced directly above and below and lateral to single-pin contact 582A. Single-pin contact 582A includes external side pin extension 582C and internal side pin extension 582D that each extend outwardly positioned from opposed flat end walls 662A and 662B, respectively, for electrical connection with ballast socket contact 580A and with integral electronics 602A. Analogous external and internal pin extensions for contact pin 582B likewise exist for electrical connections with ballast socket contact 580B and with integral electronics 602B.

As also seen in FIG. 58A, base end cap 592A defines an outer circular slot 666 that is concentric with center line 588 of tubular wall 586 and concentric with and aligned proximate to circular wall 660. Circular slot 666 is spaced from cylindrical wall 660 at a convenient distance. Circular slot 666 is of such a width and circular end 590A of tubular wall 586 is of such a thickness that circular end 590A is fitted into circular slot 666 and is thus supported by circular slot 666. Base end cap 592B (not shown in detail) defines another circular slot (not shown) analogous to circular slot 666 that is likewise concentric with center line 588 of tubular wall 586 so that circular end 590B of tubular wall 586 can be fitted into the analogous circular slot of base end cap 592B wherein circular end 590B is also supported. In this manner tubular wall 586 is mounted to base end caps 592A and 592B.

As also seen in FIG. 58A, base end cap 592A defines inner rectangular slots 668A and 668B that are parallel to each other, but perpendicular with center line 588 of tubular wall 586 and spaced inward from circular slot 666. Rectangular slots 668A and 668B are spaced from circular slot 666 at such a distance that would be occupied by SMD LEDs 606 mounted to LED array circuit boards 594A and 594B within tubular wall 586. Rectangular slots 668A and 668B are of such a width and both circuit board short rectangular edge ends 595A of LED array circuit boards 594A and 594B are of such a thickness that both circuit board short rectangular edge ends 595A are fitted into rectangular slots 668A and 668B, and are thus supported by rectangular slots 668A and 668B. Base end cap 592B (not shown) defines another two rectangular slots analogous to rectangular slots 668A and 668B that are likewise parallel to each other, and also are perpendicular with center line 588 of tubular wall 586 so that both circuit board short rectangular edge ends 595B of LED array circuit boards 594A and 594B can be fitted into the analogous rectangular slots 668A and 668B of base end cap 592B wherein both circuit board short rectangular edge ends 595B are also supported. In this manner LED array circuit boards 594A and 594B are mounted to base end caps 592A and 592B.

Circular ends 590A and 590B of tubular wall 586 and also both circuit board short rectangular edge ends 595A and 595B of LED array circuit boards 594A and 594B can be further secured to base end caps 592A and 592B preferably by gluing in a manner known in the art. Other securing methods known in the art of attaching such as cross-pins or snaps can be used. Circular ends 590A and 590B of tubular wall 586 are optionally press fitted to circular slot 666 of base end cap 592A and the analogous circular slot 666 of base end cap 592B.

Figure 59:
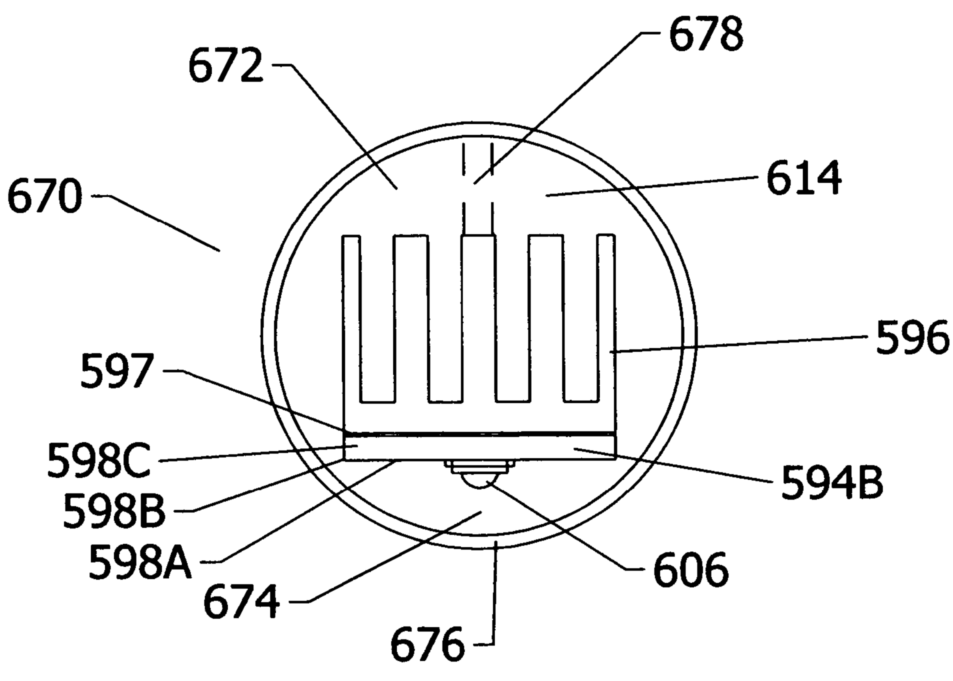
FIG. 59 is an alternate sectional view to the sectional view of the alternate LED retrofit lamp taken through a single row of LEDs shown in FIG. 52.

FIG. 59 is a sectional view of an alternate LED lamp 670 mounted in tubular wall 676 that is a version of LED lamp 570 as shown in FIG. 52. The sectional view of LED lamp 670 now shows a single SMD LED 606 of LED lamp 670 being positioned at the bottom area 674 of tubular wall 676. LED array circuitry 628 previously described with reference to LED lamp 570 would be the same for LED lamp 670. That is, all thirty SMD LEDs 606 of LED strings 636 of both of the LED arrays 600 of LED lamp 570 would be the same for LED lamp 670, except that now a total of only fifteen SMD LEDs 606 would comprise LED lamp 670 with the fifteen SMD LEDs 606 positioned at the bottom area 674 of tubular wall 676. SMD LEDs 606 are mounted onto the circuit layer 598A, which is separated from metal base layer 598C by dielectric layer 598B of either LED array circuit boards 594A or 594B. Metal base layer 598C is attached to a heat sink 596 separated by thermally conductive grease 597 positioned at the top area 672 of tubular wall 676. Only one of the two LED array circuit boards 594A or 594B is used here to provide illumination on a downward projection only. The reduction to fifteen SMD LEDs 606 of LED lamp 670 from the combined total of thirty SMD LEDs 606 of LED lamp 570 from the two LED array circuit boards 594A and 594B would result in a fifty percent reduction of power demand with an illumination result that would be satisfactory under certain circumstances. Stiffening of LED array circuit boards 594A and 594B for LED lamp 670 is accomplished by single rectangular slots 668A and 668B for both circuit board short edge ends 595A and 595B located in base end caps 592A and 592B, or optionally a vertical stiffening member 678 shown in phantom line that is positioned at the upper area of space 672 between heat sink 596 and the inner side of tubular wall 676 that can extend the length of tubular wall 676 and LED array circuit boards 594A and 594B.

LED lamp 670 as described above will work for both AC and DC voltage outputs from an existing fluorescent ballast assembly 576. In summary, LED array 600 will ultimately be powered by DC voltage. If existing fluorescent ballast 576 operates with an AC output, bridge rectifier 630 converts the AC voltage to DC voltage. Likewise, if existing fluorescent ballast 576 operates with a DC voltage, the DC voltage remains a DC voltage even after passing through bridge rectifier 630.

Figure 60A:
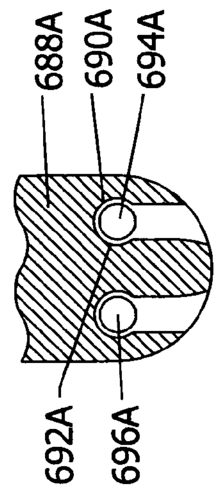

Another embodiment of a retrofitted LED lamp is shown in FIGS. 60-69. FIG. 60 shows an LED lamp 680 retrofitted to an existing elongated fluorescent fixture 682 mounted to a ceiling 684. A rapid start type ballast assembly 686 including a starter 686A is positioned within the upper portion of fixture 682. Fixture 682 further includes a pair of fixture mounting portions 688A and 688B extending downwardly from the ends of fixture 682 that include ballast electrical contacts shown in FIG. 60A as ballast double contact sockets 690A and 692A and ballast opposed double contact sockets 690B and 692B that are in electrical contact with rapid start ballast assembly 686. Ballast double contact sockets 690A, 692A and 690B, 692B are each double contact sockets in accordance with the electrical operational requirement of a rapid start type ballast. As also seen in FIG. 60A, LED lamp 680 includes bi-pin electrical contacts 694A and 696A that are positioned in ballast double contact sockets 690A and 692A, respectively. LED lamp 680 likewise includes opposed bi-pin electrical contacts 694B and 696B that are positioned in ballast double contact sockets 690B and 692B, respectively. In this manner, LED lamp 680 is in electrical contact with rapid start ballast assembly 686.

As shown in the disassembled mode of FIG. 61 and also indicated schematically in FIG. 63, LED lamp 680 includes an elongated tubular housing 698 particularly configured as a tubular wall 700 circular in cross-section taken transverse to a center line 702. Tubular wall 700 is made of a translucent material such as plastic or glass and preferably has a diffused coating. Tubular wall 700 has opposed tubular wall circular ends 704A and 704B with cooling vent holes 703A and 703B juxtaposed to tubular wall circular ends 704A and 704B. Optional electric micro fans (not shown) can be used to provide forced air-cooling across the electronic components contained within elongated tubular housing 698. The optional cooling micro fans can be arranged in a push or pull configuration. LED lamp 680 further includes a pair of opposed lamp base end caps 706A and 706B mounted to bi-pin electrical contacts 694A, 696A and 694B, 696B, respectively, for insertion in ballast electrical socket contacts 690A, 692A and 690B, 692B, respectively, in electrical power connection to rapid start ballast assembly 686 so as to provide power to LED lamp 680. Tubular wall 700 is mounted to opposed base end caps 706A and 706B at tubular wall circular ends 704A and 704B, respectively, in the assembled mode as shown in FIG. 60. LED lamp 680 also includes electrical LED array circuit boards 708A and 708B that are rectangular in configuration and each has opposed circuit board short edge ends 710A and 710B, respectively.

As seen in FIG. 62, circuit boards 708A and 708B are preferably manufactured each from a Metal Core Printed Circuit Boards (MCPCB) consisting of a circuit layer 716A, a dielectric layer 716B, and a metal base layer 716C. Circuit layer 716A is the actual printed circuit foil containing the electrical connections including pads, traces, vias, etc. Electronic integrated circuit components get mounted to circuit layer 716A. Dielectric layer 716B offers electrical isolation with minimum thermal resistance and bonds the circuit metal layer 716A to the metal base layer 716C. Metal base layer 716C is often aluminum, but other metals such as copper may also be used. The most widely used base material thickness is 0.04" (1.0 mm) in aluminum, although other thicknesses are available. The metal base layer 716C is further attached to heat sink 712 with thermally conductive grease 714 or other material to extract heat away from the LEDs mounted to circuit layer 716A. MCPCBs are designed for attachment to heat sinks using thermal epoxy, Sil-pads, or heat conductive grease 714 between metal base layer 716C and heat sink 712. The metal substrate LED array circuit boards 708A and 708B are each screwed down to heat sink 712 using screws (not shown) or other mounting hardware. The Berquist Company markets their version of a MCPCB called Thermal Clad (T-Clad). Although this embodiment describes a generally rectangular configuration for circuit boards 708A and 708B, it can be appreciated by someone skilled in the art to form circuit boards 708A and 708B into curved shapes or combinations of rectangular and curved portions.

LED array circuit boards 708A and 708B are positioned within tubular wall 700 and supported by opposed lamp base end caps 706A and 706B. In particular, LED array circuit boards 708A and 708B each have opposed circuit board short edge ends 710A and 710B that are positioned from tubular wall ends 704A and 704B, respectively. As mentioned earlier, LED array circuit boards 708A and 708B each have a circuit layer 716A, a dielectric layer 716B, and a metal base layer 716C respectively with heat sink 712 sandwiched between metal base layers 716C between tubular wall circular ends 704A and 704B, and circuit layers 716A being spaced away from tubular wall 700. LED array circuit boards 708A and 708B are shown in FIG. 61 and indicated schematically in FIG. 64. LED lamp 680 further includes an LED array 718 comprising a total of thirty Lumileds Luxeon SMD LED emitters 724 mounted to both LED array circuit boards 708A and 708B. Integral electronics 602A is positioned on one end of LED array circuit boards 708A and 708B in close proximity to base end cap 706A, and integral electronics 602B is positioned on the opposite end of LED array circuit boards 708A and 708B in close proximity to base end cap 706B. As seen in FIG. 61 and FIG. 64, integral electronics 602A is connected to LED array circuit boards 708A and 708B and also to integral electronics 602B. Integral electronics 602A and 602B are identical in both LED array circuit boards 708A and 708B.

Integral electronics 720A and 720B can each be located on a separate circuit board (not shown) that is physically detached from the main LED array circuit boards 708A and 708B, but is electrically connected together by means known in the art including headers and connectors, plug and socket receptacles, hard wiring, etc. The fluorescent retrofit LED lamp of the present invention will work with existing and new fluorescent lighting fixtures that contain ballasts that allow for the dimming of conventional fluorescent lamp tubes. For the majority of cases where the ballast cannot dim, special electronics added to integral electronics circuitry 746A and 746B can make existing and new non-dimming fluorescent lighting fixtures now dimmable. Control data can be applied from a remote control center via Radio Frequency (RF) or Infra Red (1R) wireless carrier communications or by Power Line Carrier (PLC) wired communication means. Optional motion control sensors and related control electronic circuitry can also be supplied where now groups of fluorescent lighting fixtures using the fluorescent retrofit LED lamps of the present invention can be dimmed and/or turned off completely at random or programmed intervals at certain times of the day to conserve electrical energy use.

Figure 62A:
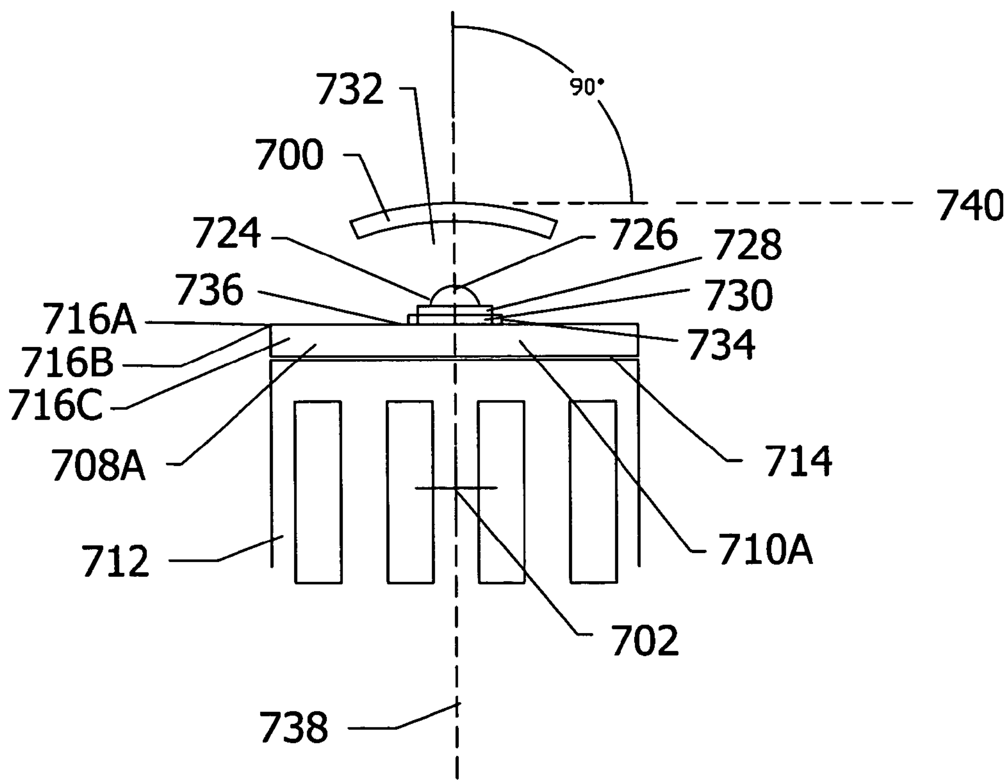

The sectional view of FIG. 62 comprises a single SMD LED 724 from each LED array 718 in LED array circuit boards 708A and 708B shown in FIG. 63. SMD LED 724 is representative of one of the fifteen SMD LEDs 724 connected in series in each LED array 718 as shown in FIG. 63. Each SMD LED 724 includes an LED light emitting lens portion 726, an LED body portion 728, and an LED base portion 730. A cylindrical space 732 is defined between circuit layer 716A of each LED array circuit board 708A and 708B and cylindrical tubular wall 700. Each SMD LED 724 is positioned in space 732 as seen in the detailed view of FIG. 62A. LED lens portion 726 is in juxtaposition with the inner surface of tubular wall 700, and LED base portion 730 is mounted to metal base layer 716C of LED array circuit boards 708A and 708B. A detailed view of a single SMD LED 724 shows a rigid LED electrical lead 734 extending from LED base portion 730 to LED array circuit boards 708A and 708B for electrical connection therewith. Lead 734 is secured to LED array circuit boards 708A and 708B by solder 736. An LED center line 738 is aligned transverse to center line 702 of tubular wall 700. As shown in the sectional view of FIG. 62, light is emitted through tubular wall 700 by the two SMD LEDs 724 in substantially equal strength about the entire circumference of tubular wall 700. Projection of this arrangement is such that all fifteen SMD LEDs 724 are likewise arranged to emit light rays in substantially equal strength the entire length of tubular wall 700 in substantially equal strength about the entire 360-degree circumference of tubular wall 700. The distance between LED center line 738 and LED circuit boards 708A and 708B is the shortest that is geometrically possible with heat sink 712 sandwiched between LED array circuit boards 708A and 708B. In FIG. 62A, LED center line 738 is perpendicular to tubular wall center line 702. FIG. 62A indicates a tangential plane 740 relative to the cylindrical inner surface of tubular wall 700 in phantom line at the apex of LED lens portion 726 that is perpendicular to LED center line 738 so that all SMD LEDs 724 emit light through tubular wall 700 in a direction perpendicular to tangential plane 740, so that maximum illumination is obtained from all SMD LEDs 724.

FIG. 63 shows the total LED electrical circuitry for LED lamp 680. The LED electrical circuitry for both LED array circuit boards 708A and 708B are identically described herein, mutatis mutandis. The total LED circuitry comprises two major circuit assemblies, namely, existing ballast circuitry 742, which includes starter circuit 742A, and LED circuitry 744. LED circuitry 744 includes integral electronics circuitry 746A and 746B, which are associated with integral electronics 720A and 720B. LED circuitry 744 also includes an LED array circuitry 744A and an LED array voltage protection circuit 744B.

When electrical power, normally 120 volt VAC or 240 VAC at 50 or 60 Hz is applied to rapid start ballast assembly 686, existing ballast circuitry 742 provides an AC or DC voltage with a fixed current limit across ballast socket electrical contacts 692A and 692B, which is conducted through LED circuitry 744 by way of LED circuit bi-pin electrical contacts 696A and 696B, respectively, (or in the event of the contacts being reversed, by way of LED circuit bi-pin contacts 694A and 694B) to the input of bridge rectifiers 748A and 748B, respectively.

Rapid start ballast assembly 686 limits the current going into LED lamp 680. Such limitation is ideal for the present embodiment of the inventive LED lamp 680 because LEDs in general are current driven devices and are independent of the driving voltage, that is, the driving voltage does not affect LEDs. The actual number of SMD LEDs 724 will vary in accordance with the actual rapid start ballast assembly 686 used. In the example of the embodiment of LED lamp 680, rapid start ballast assembly 686 provides a maximum current limit of 300 mA, but higher current ratings are also available.

Voltage surge absorbers 750A, 750B, 750C and 750D are positioned on LED voltage protection circuit 744B for LED array circuitry 744A in electrical association with integral electronics control circuitry 746A and 746B. Bridge rectifiers 748A and 748B are connected to the anode and cathode end buses, respective of LED circuitry 744 and provide a positive voltage V+ and a negative voltage V−, respectively as is also shown in FIGS. 65 and 66. FIGS. 65 and 66 also show schematic details of integral electronics circuitry 746A and 746B. As seen in FIGS. 65 an optional resettable fuse 752 is integrated with integral electronics circuitry 746A. Resettable fuse 752 provides current protection for LED array circuitry 744A. Resettable fuse 752 is normally closed and will open and de-energize LED array circuitry 744A in the event the current exceeds the current allowed. The value for resettable fuse 752 is equal to or is lower than the maximum current limit of rapid start ballast assembly 686. Resettable fuse 752 will reset automatically after a cool down period. When rapid start ballast assembly 686 is first energized, starter 686A may close creating a low impedance path from bi-pin electrical contact 694A to bi-pin electrical contact 694B, which is normally used to briefly heat the filaments in a fluorescent lamp in order to help the establishment of conductive phosphor gas. Such electrical action is unnecessary for LED lamp 680, and for that reason such electrical connection is disconnected from LED circuitry 744 by way of the biasing of bridge rectifiers 748A and 748B.

LED array circuitry 744A includes a single LED string 754 with all SMD LEDs 724 within LED string 754 being electrically wired in series. Each SMD LED 724 is preferably positioned and arranged equidistant from one another in LED string 754. Each LED array circuitry 744A includes fifteen SMD LEDs 724 electrically mounted in series within LED string 754 for a total of fifteen SMD LEDs 724 that constitute each LED array 718 in LED array circuit boards 708A and 708B. SMD LEDs 724 are positioned in equidistant relationship with one another and extend substantially the length of tubular wall 700, that is, generally between tubular wall ends 704A and 704B. As shown in FIG. 63, LED string 754 includes a resistor 756 in respective series alignment with LED string 754 at the current anode input. The current limiting resistor 756 is purely optional, because the existing fluorescent ballast used here is already a current limiting device. The resistor 756 then serves as secondary protection devices. A higher number of individual SMD LEDs 724 can be connected in series at each LED string 754. The maximum number of SMD LEDs 724 being configured around the circumference of the 1.5-inch diameter of tubular wall 700 in the particular example herein of LED lamp 680 is two. Each SMD LED 724 is configured with the anode towards the positive voltage V+ and the cathode towards the negative voltage V−. When rapid start ballast 686 is energized, positive voltage that is applied through resistor 756 to the anode end of LED string 754, and the negative voltage that is applied to the cathode end of LED string 754 will forward bias SMD LEDs 724 connected within LED string 754 and cause SMD LEDs 724 to turn on and emit light.

Rapid start ballast assembly 686 regulates the electrical current through SMD LEDs 724 to the correct value of 300 mA for each SMD LED 724. Each LED string 754 sees the total current applied to LED array circuitry 744A. Those skilled in the art will appreciate that different ballasts provide different current outputs to drive LEDs that require higher operating currents. To provide additional current to drive the newer high-flux LEDs that require higher currents to operate, the electronic ballast outputs can be tied together in parallel to "overdrive" the LED retrofit lamp of the present invention.

The total number of LEDs in series within each LED string 754 is arbitrary since each SMD LED 724 in each LED string 754 will see the same current. The maximum number of LEDs is dependent on the maximum power capacity of the ballast. Again in this example, fifteen SMD LEDs 724 are shown connected in each series within each LED string 754. Each of the fifteen SMD LEDs 724 connected in series within each LED string 754 sees this 300 mA. In accordance with the type of ballast assembly 686 used, when rapid start ballast assembly 686 is first energized, a high voltage may be applied momentarily across ballast socket contacts 692A and 692B, which conducts to bi-pin contacts 696A and 696B (or 694A and 694B). This is normally used to help ignite a fluorescent tube and establish conductive phosphor gas, but is unnecessary for this circuit and is absorbed by voltage surge absorbers 750A, 750B, 750C, and 750D to limit the high voltage to an acceptable level for the circuit.

As can be seen from FIG. 63A, there can be more than fifteen 5 mm LEDs 722 connected in series within each string 754A-754O. There are twenty 5 mm LEDs 722 in this example, but there can be more 5 mm LEDs 722 connected in series within each string 754A-754O. LED array circuitry 744A includes fifteen electrical strings 754 individually designated as strings 754A, 754B, 754C, 754D, 754E, 754F, 754G, 754H, 754I, 754J, 754K, 754L, 754M, 754N and 754O all in parallel relationship with all 5 mm LEDs 722 within each string 754A-754O being electrically wired in series. Parallel strings 754 are so positioned and arranged that each of the fifteen strings 754 is equidistant from one another. LED array circuitry 744A includes twenty 5 mm LEDs 722 electrically mounted in series within each of the fifteen parallel strings of 5 mm LED strings 754A-754O for a total of three-hundred 5 mm LEDs 722 that constitute LED array 718. 5 mm LEDs 722 are positioned in equidistant relationship with one another and extend generally the length of tubular wall 700, that is, generally between tubular wall ends 704A and 704B. As shown in FIG. 63A, each of strings 754A-754O includes an optional resistor 756 designated individually as resistors 756A, 756B, 756C, 756D, 756E, 756F, 756G, 756H, 756I, 756J, 756K, 756L, 756M, 756N, and 756O in respective series alignment with strings 754A-754O at the current input for a total of fifteen resistors 756. Again, a higher number of individual 5 mm LEDs 722 can be connected in series within each LED string 754A-754O. Each 5 mm LED 722 is configured with the anode towards the positive voltage V+ and the cathode towards the negative voltage V−. When LED array circuitry 744A is energized, the positive voltage that is applied through resistors 756A-756O to the anode end of 5 mm LED strings 754A-754O and the negative voltage that is applied to the cathode end of 5 mm LED strings 754A-754O will forward bias 5 mm LEDs 722 connected to LED strings 754A-754O and cause 5 mm LEDs 722 to turn on and emit light.

Rapid start ballast assembly 686 regulates the electrical current through 5 mm LEDs 722 to the correct value of 20 mA for each 5 mm LED 722. The fifteen 5 mm LED strings 754A-754O equally divide the total current applied to LED array circuitry 744A. Those skilled in the art will appreciate that different ballasts provide different current outputs.

If the forward drive current for each 5 mm LEDs 722 is known, then the output current of rapid start ballast assembly 686 divided by the forward drive current gives the exact number of parallel strings of 5 mm LEDs 722 in the particular LED array, here LED array 718. The total number of 5 mm LEDs 722 in series within each LED string 754A-754O is arbitrary since each 5 mm LED 722 in each LED string 754A-754O will see the same current. Again in this example, twenty 5 mm LEDs 722 are shown connected in series within each LED string 754. Rapid start ballast assembly 686 provides 300 mA of current, which when divided by the fifteen strings 754 of twenty 5 mm LEDs 722 per LED string 754 gives 20 mA per LED string 754. Each of the twenty 5 mm LEDs 722 connected in series within each LED string 754 sees this 20 mA. In accordance with the type of ballast assembly 686 used, when rapid start ballast assembly 686 is first energized, a high voltage may be applied momentarily across ballast socket contacts 690A, 692A and 690B, 692B, which conduct to pin contacts 694A, 696A and 694B, 696B. Such high voltage is normally used to help ignite a fluorescent tube and establish conductive phosphor gas, but high voltage is unnecessary for LED array circuitry 744A and voltage surge absorbers 750A, 750B, 750C, and 750D suppress the voltage applied by ballast circuitry 742, so that the initial high voltage supplied is limited to an acceptable level for the circuit.

FIG. 63B shows another alternate arrangement of LED array circuitry 744A. LED array circuitry 744A consists of a single LED string 754 of SMD LEDs 724 including for exposition purposes only, forty SMD LEDs 724 all electrically connected in series. Positive voltage V+ is connected to optional resettable fuse 752, which in turn is connected to one side of current limiting resistor 756. The anode of the first SMD LED in the series string is then connected to the other end of resistor 756. A number other than forty SMD LEDs 724 can be connected within the series LED string 754 to fill up the entire length of the tubular wall of the present invention. The cathode of the first SMD LED 724 in the series LED string 754 is connected to the anode of the second SMD LED 724, the cathode of the second SMD LED 724 in the series LED string 754 is then connected to the anode of the third SMD LED 724, and so forth. The cathode of the last SMD LED 724 in the series LED string 754 is likewise connected to ground or the negative potential V−. The individual SMD LEDs 724 in the single series LED string 754 are so positioned and arranged such that each of the forty LEDs is spaced equidistant from one another substantially filling the entire length of the tubular wall 700. SMD LEDs 724 are positioned in equidistant relationship with one another and extend substantially the length of tubular wall 700, that is, generally between tubular wall ends 704A and 704B. As shown in FIG. 63B, the single series LED string 754 includes an optional resistor 756 in respective series alignment with single series LED string 754 at the current input. Each SMD LED 724 is configured with the anode towards the positive voltage V+ and the cathode towards the negative voltage V−. When LED array circuitry 744A is energized, the positive voltage that is applied through resistor 756 to the anode end of single series LED string 754 and the negative voltage that is applied to the cathode end of single series LED string 754 will forward bias SMD LEDs 724 connected in series within single series LED string 754, and cause SMD LEDs 724 to turn on and emit light.

The present invention works ideally with the brighter high flux white LEDs available from Lumileds and Nichia in the SMD packages. Since these new devices require more current to drive them and run on low voltages, the high current available from existing fluorescent ballast outputs with current outputs of 300 mA and higher, along with their characteristically higher voltage outputs provide the perfect match for the present invention. The high-brightness SMD LEDs 724A have to be connected in series, so that each high-brightness SMD LED 724A within the same single LED string 754 will see the same current and therefore output the same brightness. The total voltage required by all the high-brightness SMD LEDs 724A within the same single LED string 754 is equal to the sum of all the individual voltage drops across each high-brightness SMD LED 724A and should be less than the maximum voltage output of rapid start ballast assembly 686.

FIG. 63C shows a simplified arrangement of the LED array circuitry 744A of SMD LEDs 724 for the overall electrical circuit shown in FIG. 63. AC lead lines 766A, 766B and 768A, 768B and DC positive lead lines 770A, 770B and DC negative lead lines 772A, 772B are connected to integral electronics 720A and 720B. Four parallel LED strings 754 each including a resistor 756 are each connected to DC positive lead lines 770A, 770B on one side, and to LED positive lead line 770 or the anode side of each SMD LED 724 and on the other side. The cathode side of each SMD LED 724 is then connected to LED negative lead line 772 and to DC negative lead lines 772A, 772B directly. AC lead lines 766A, 766B and 768A, 768B simply pass through LED array circuitry 744A.

FIG. 63D shows a simplified arrangement of the LED array circuitry 744A of 5 mm LEDs 722 for the overall electrical circuit shown in FIG. 63A. AC lead lines 766A, 766B and 768A, 768B and DC positive lead lines 770A, 770B and DC negative lead lines 772A, 772B are connected to integral electronics boards 720A and 720B. Two parallel LED strings 754 each including a single resistor 756 are each connected to DC positive lead lines 770A, 770B on one side, and to LED positive lead line 770 or the anode side of the first 5 mm LED 722 in each LED string 754 on the other side. The cathode side of the first 5 mm LED 722 is connected to LED negative lead line 772 and to adjacent LED positive lead line 770 or the anode side of the second 5 mm LED 722 in the same LED string 754. The cathode side of the second 5 mm LED 722 is then connected to LED negative lead line 772 and to DC negative lead lines 772A, 772B directly in the same LED string 754. AC lead lines 766A, 766B and 768A, 768B simply pass through LED array circuitry 744A.

FIG. 63E shows a simplified arrangement of the LED array circuitry 744A of SMD LEDs 724 for the overall LED array electrical circuit shown in FIG. 63B. AC lead lines 766A, 766B and 768A, 768B and DC positive lead lines 770A, 770B and DC negative lead lines 772A, 772B are connected to integral electronics boards 720A and 720B. Single parallel LED string 754 including a single resistor 756 is connected to DC positive lead lines 770A, 770B on one side, and to LED positive lead line 770 on the anode side of the first SMD LED 724 in the LED string 754 on the other side. The cathode side of the first SMD LED 724 is connected to LED negative lead line 772 and to adjacent LED positive lead line 770 or the anode side of the second SMD LED 724. The cathode side of the second SMD LED 724 is connected to LED negative lead line 772 and to adjacent LED positive lead line 770 or the anode side of the third SMD LED 724. The cathode side of the third SMD LED 724 is connected to LED negative lead line 772 and to adjacent LED positive lead line 770 or the anode side of the fourth SMD LED 724. The cathode side of the fourth SMD LED 724 is then connected to LED negative lead line 772 and to DC negative lead lines 772A, 772B directly. AC lead lines 766A, 766B and 768A, 768B simply pass through LED array circuitry 744A.

The term high-brightness as describing LEDs herein is a relative term. In general, for the purposes of the present application, high-brightness LEDs refer to LEDs that offer the highest luminous flux outputs. Luminous flux is defined as lumens per watt. For example, Lumileds Luxeon high-brightness LEDs produce the highest luminous flux outputs at the present time. Luxeon 5-watt high-brightness LEDs offer extreme luminous density with lumens per package that is four times the output of an earlier Luxeon 1-watt LED and up to 50 times the output of earlier discrete 5 mm LED packages. Luxeon LED emitters are also available in 3-watt packages with Gelcore soon to offer equivalent and competitive products. With the new high-brightness SMD LEDs 724A in mind, FIG. 63F shows a single high-brightness SMD LED 724A positioned on an electrical string in what is defined herein as an electrical series arrangement for the overall electrical circuit shown in FIG. 63 and also analogous to FIG. 63B. The single high-brightness SMD LED 724A fulfills a particular lighting requirement formerly fulfilled by a fluorescent lamp.

Likewise, FIG. 63G shows two high-brightness SMD LEDs 724A in electrical parallel arrangement with one high-brightness SMD LED 724A positioned on each of the two parallel strings for the overall electrical circuit shown in FIG. 63 and also analogous to the electrical circuit shown in FIG. 63A. The two high-brightness SMD LEDs 724A fulfill a particular lighting requirement formerly fulfilled by a fluorescent lamp.

As shown in the schematic electrical and structural representations of FIG. 64, LED array circuit boards 708A and 708B for LED array 718, which have mounted thereon LED array circuitry 744A is positioned between integral electronics 720A and 720B that in turn are electrically connected to ballast assembly circuitry 742 by bi-pin electrical contacts 694A, 696A and 694B, 696B, respectively, which are then mounted to base end caps 706A and 706B, respectively. Bi-pin contact 694A includes an external extension 758A that protrudes externally outwardly from base end cap 706A for electrical connection with ballast socket contact 690A and an internal extension 758B that protrudes inwardly from base respect 706A for electrical connection to integral electronics circuit boards 720A. Bi-pin contact 696A includes an external extension 760A that protrudes externally outwardly from base end cap 706A for electrical connection with ballast socket contact 692A and an internal extension 760B that protrudes inwardly from base end cap 706A for electrical connection to integral electronics circuit boards 720A. Bi-pin contact 694B includes an external extension 762A that protrudes externally outwardly from base end cap 706B for electrical connection with ballast socket contact 690B and an internal extension 762B that protrudes inwardly from base end cap 706B for electrical connection to integral electronics circuit board 720B. Bi-pin contact 696B includes an external extension 764A that protrudes externally outwardly from base end cap 706B for electrical connection with ballast socket contact 692B and an internal extension 764B that protrudes inwardly from base end cap 706B for electrical connection to integral electronics circuit board 720B. Bi-pin contacts 694A, 696A, 694B, and 696B are soldered directly to integral electronics 720A and 720B, respectively mounted onto LED array circuit boards 708A and 708B. In particular, bin-pin contact extensions 758A and 760A are associated with bi-pin contacts 694A and 696A, respectively, and bi-pin contact extensions 762A and 764A are associated with bi-pin contacts 694B and 696B, respectively. Being soldered directly to integral electronics circuit board 720A electrically connects bi-pin contact extensions 758B and 760B. Similarly, being soldered directly to integral electronics circuit board 720B electrically connects bi-pin contact extensions 762B and 764B. It should be noted that someone skilled in the art could use other means of electrically connecting the contact pins 694A, 696A and 694B, 696B to LED array circuit boards 708A and 708B. These techniques include the use of connectors and headers, plugs and connectors, receptacles, etc. among may others.

FIG. 65 shows a schematic of integral electronics circuit 746A mounted on integral electronics 720A. Integral electronics circuit 746A is also indicated in part in FIG. 63 as connected to LED array circuitry 744A. Integral electronics circuit 746A is in electrical contact with bi-pin contacts 694A, 696A, which are shown as providing either AC or DC voltage. Integral electronics circuit 746A includes bridge rectifier 748A, voltage surge absorbers 750A and 750C, and resettable fuse 752. Integral electronic circuit 746A leads to or from LED array circuitry 744A. It is noted that FIG. 65 indicates the presence of possible AC voltage (rather than possible DC voltage) by an AC wave symbol ~. Each AC voltage could be DC voltage supplied by certain ballast assemblies 686 as mentioned earlier herein. In such a case DC voltage would be supplied to LED array 718 even in the presence of bridge rectifier 748A. It is particularly noted that in such a case, voltage surge absorbers 750A and 750C would remain operative. AC lead lines 766A and 768A are in a power connection with ballast assembly 686. DC lead lines 770A and 772A are in positive and negative direct current relationship with LED array circuitry 744A. Bridge rectifier 748A is in electrical connection with four lead lines 766A, 768A, 770A and 772A. A voltage surge absorber 750A is in electrical contact with lead lines 766A and 768A and voltage surge absorber 750C is positioned on lead line 766A. Lead lines 770A and 772A are in electrical contact with bridge rectifier 748A and in power connection with LED array circuitry 744A. Fuse 752 is positioned on lead line 770A between bridge rectifier 748A and LED array circuitry 744A.

FIG. 66 shows a schematic of integral electronics circuit 746B mounted on integral electronics 720B. Integral electronics circuit 746B is also indicated in part in FIG. 63 as connected to LED array circuitry 744A. Integral electronics circuit 746B is a close mirror image or electronics circuit 746A mutatis mutandis. Integral electronics circuit 746B is in electrical contact with bi-pin contacts 694B, 696B, which are shown as providing either AC or DC voltage. Integral electronics circuit 746B includes bridge rectifier 748B, voltage surge absorbers 750B and 750D. Integral electronic circuit 746B leads to or from LED array circuitry 744A. It is noted that FIG. 66 indicates the presence of possible AC voltage (rather than possible DC voltage) by an AC wave symbol ~. Each AC voltage could be DC voltage supplied by certain ballast assemblies 686 as mentioned earlier herein. In such a case DC voltage would be supplied to LED array 718 even in the presence of bridge rectifier 748B. It is particularly noted that in such a case, voltage surge absorbers 750B and 750D would remain operative. AC lead lines 766B and 768B are in a power connection with ballast assembly 686. DC lead lines 770B and 772B are in positive and negative direct current relationship with LED array circuitry 744A. Bridge rectifier 748B is in electrical connection with four lead lines 766B, 768B, 770B and 772B. A voltage surge absorber 750B is in electrical contact with lead lines 766B and 768B and voltage surge absorber 750D is positioned on lead line 768B. Lead lines 770B and 772B are in electrical contact with bridge rectifier 748B and in power connection with LED array circuitry 744A.

FIGS. 65 and 66 show the lead lines going into and out of LED circuitry 744 respectively. The lead lines include AC lead lines 766B and 768B, positive DC voltage 770B, and DC negative voltage 772B. The AC lead lines 766B and 768B are basically feeding through LED circuitry 744, while the positive DC voltage lead line 770B and negative DC voltage lead line 772B are used primarily to power the LED array 718. DC positive lead lines 770A and 770B are the same as LED positive lead line 770 and DC negative lead lines 772A and 772B are the same as LED negative lead line 772. LED array circuitry 744A therefore consists of all electrical components and internal wiring and connections required to provide proper operating voltages and currents to 5 mm LEDs 722 or to SMD LEDs 724 connected in parallel, series, or any combinations of the two.

FIGS. 67 and 67A show a close-up of elongated tubular housing 698 with details of cooling vent holes 703A and 703A located on opposite ends of elongated tubular housing 698 in both side and cross-sectional views respectively.

FIG. 68 shows an isolated view of one of the base end caps, namely, base end cap 706A, which is analogous to base end cap 706B, mutatis mutandis. Bi-pin electrical contacts 694A, 696A extend directly through base end cap 706A in the longitudinal direction in alignment with center line 702 of tubular wall 700 with bi-pin external extensions 758A, 760A and internal extensions 758B, 760B shown. Base end cap 706A is a solid cylinder in configuration as seen in FIGS. 68 and 68A and forms an outer cylindrical wall 774 that is concentric with center line 702 of tubular wall 700 and has opposed flat end walls 776A and 776B that are perpendicular to center line 702. Two cylindrical parallel vent holes 778A and 778B are defined between end walls 776A and 776B in vertical alignment with center line 702.

As also seen in FIG. 68A, base end cap 706A defines an outer circular slot 780 that is concentric with center line 702 of tubular wall 700 and concentric with and aligned proximate to circular wall 774. Outer circular slot 780 is of such a width and circular end 704A of tubular wall 700 is of such a thickness and diameter that outer circular slot 780 accepts circular end 704A into a fitting relationship and circular end 704A is thus supported by circular slot 780. Base end cap 706B defines another outer circular slot (not shown) analogous to outer circular slot 780 that is likewise concentric with center line 702 of tubular wall 700 so that circular end 704B of tubular wall 700 can be fitted into the analogous circular slot of base end cap 706B wherein circular end 704B of tubular wall 700 is also supported. In this manner tubular wall 700 is mounted to end caps 706A and 706B.

As also seen in FIG. 68A, base end cap 706A defines inner rectangular slots 782A and 782B that are parallel to each other, but perpendicular with center line 702 of tubular wall 700 and spaced inward from outer circular slot 780. Rectangular slots 782A and 782B are spaced from outer circular slot 780 at such a distance that would be occupied by SMD LEDs 724 mounted to LED array circuit boards 708A and 708B within tubular wall 700. Rectangular slots 782A and 782B are of such a width and circuit board short rectangular edge ends 710A of LED array circuit boards 708A and 708B is of such a thickness that circuit board short rectangular edge ends 710A are fitted into rectangular slots 782A and 782B, and are thus supported by rectangular slots 782A and 782B. Base end cap 706B (not shown) defines another two rectangular slots analogous to rectangular slots 782A and 782B that are likewise parallel to each other, but perpendicular with center line 702 of tubular wall 700 so that circuit board short rectangular edge ends 710B of LED array circuit boards 708A and 708B can be fitted into the analogous rectangular slots 782A and 782B of base end cap 706B wherein circuit board short rectangular edge ends 710B are also supported. In this manner LED array circuit boards 708A and 708B are mounted to end caps 706A and 706B.

Circular ends 704A and 704B of tubular wall 700 and also circuit board short rectangular edge ends 710A and 710B of LED array circuit boards 708A and 708B are secured to base end caps 706A and 706B preferably by gluing in a manner known in the art. Other securing methods known in the art of attaching such as cross-pins or snaps can be used. Circular ends 704A and 704B of tubular wall 700 are optionally press fitted to circular slot 780 of base end cap 706A and the analogous circular slot 780 of base end cap 706B.

FIG. 69 is a sectional view of an alternate LED lamp 784 mounted in tubular wall 790 that is a version of LED lamp 680 as shown in FIG. 62. The sectional view of LED lamp 784 now shows a single SMD LED 724 of LED lamp 784 being positioned at the bottom area 788 of tubular wall 790. LED array circuitry 744 previously described with reference to LED lamp 680 would be the same for LED lamp 784. That is, all thirty SMD LEDs 724 of LED strings 754 of both of the LED arrays 718 of LED lamp 680 would be the same for LED lamp 784, except that now a total of only fifteen SMD LEDs 724 would comprise LED lamp 784 with the fifteen SMD LEDs 724 positioned at the bottom area 788 of tubular wall 790. SMD LEDs 724 are mounted onto the circuit layer 716A, which is separated from metal base layer 716C by dielectric layer 716B of either LED array circuit boards 708A or 708B. Metal base layer 716C is attached to a heat sink 712 separated by thermally conductive grease 714 positioned at the top area 786 of tubular wall 790. Only one of the two LED array circuit boards 708A or 708B is used here to provide illumination on a downward projection only. The reduction to fifteen SMD LEDs 724 of LED lamp 784 from the combined total of thirty SMD LEDs 724 of LED lamp 680 from the two LED array circuit boards 708A and 708B would result in a fifty percent reduction of power demand with an illumination result that would be satisfactory under certain circumstances. Stiffening of LED array circuit boards 708A and 708B for LED lamp 784 is accomplished by single rectangular slots 782A and 782B for circuit board short edge ends 710A and 710B located in base end caps 706A and 706B, or optionally a vertical stiffening member 792 shown in phantom line that is positioned at the upper area of space 786 between heat sink 712 and the inner side of tubular wall 790 that can extend the length of tubular wall 790 and LED array circuit boards 708A and 708B.

LED lamp 784 as described above will work for both AC and DC voltage outputs from an existing fluorescent rapid start ballast assembly 686. In summary, LED array 718 will ultimately be powered by DC voltage. If existing fluorescent rapid start ballast assembly 686 operates with an AC output, bridge rectifiers 748A and 748B convert the AC voltage to DC voltage. Likewise, if existing fluorescent rapid start ballast 686 operates with a DC voltage, the DC voltage remains a DC voltage even after passing through bridge rectifiers 748A and 748B.

Another embodiment of a retrofitted LED lamp is shown in FIGS. 70 and 71 that show an LED lamp 794 retrofitted to an existing elongated fluorescent fixture 796 mounted to a wall 798. A rapid start type ballast assembly 800 is positioned within fixture 796. Fluorescent fixture 796 further includes a pair of ballast double electrical socket contacts 802A and 802B that are in electrical contact with bi-pin electrical contacts 804A and 804B of LED 794. In a manner analogous to the structure of LED lamp 680 relative to rapid start ballast assembly 686 described earlier, LED lamp 794 is in electrical contact with rapid start ballast assembly 800.

LED lamp 794 includes an elongated tubular housing 806 particularly configured as a tubular wall 808 circular in cross-section. Tubular wall 808 includes an apex portion 812 and a pair of pier portions 814A and 814B. Tubular wall 808 is made of a translucent material such as plastic or glass and preferably has a diffused coating. Tubular wall 808 has opposed tubular wall circular ends 816A and 816B. LED lamp 794 also includes electrical LED array upper and lower circuit boards 818 and 820, respectively, that are positioned within tubular housing 806, and that are configured to conform with apex portion 812 and pier portions 814A and 814B. The electric circuitry for LED lamp 794 is analogous to the electric circuitry as described relative to LED lamp 680. Circuit boards 818 and 82O are preferably manufactured each from a Metal Core Printed Circuit Boards (MCPCB) and comprise circuit layers 818A and 820A, respectively, dielectric layers 818B and 820B, respectively, and metal base layers 818C and 820C, respectively. A heat sink 822 is mounted to metal base layers 818C and 820C. A plurality of upper LEDs 826 and a plurality of lower LEDs 828 are mounted to and electrically connected to circuit boards 818 and 820, respectively, and in particular to circuit layers 818A and 820A, respectively. LEDs 826 and 828 can selectively be typical 5 mm LEDs, 10 mm LEDs, SMD LEDs, and optionally can be high-brightness LEDs.

FIG. 72 is a section view of an LED lamp 828A that is for mounting to an instant start ballast assembly (not shown) with opposed single pin contacts generally analogous to LED lamp 570 discussed previously. FIG. 72 also represents a section view of an LED lamp 828B with opposed bi-pin contacts generally analogous to LED lamp 680 discussed previously. FIG. 72A is an interior view of one circular single pin base end cap 830A taken in isolation representing both opposed base end caps of LED lamp 828A. FIG. 72B is an interior view of one circular bi-pin base end cap 830B taken in isolation representing both opposed base end caps of LED lamp 828B.

LED lamp 828A and LED lamp 828B both include a lamp tubular housing 832 having a tubular wall 834 circular in configuration. Three elongated rectangular metal substrate circuit boards 836, 838, and 840 mounted in lamp housing 832 spaced from tubular wall 834 are connected at their long edges so as to form a triangle in cross-section. Other configurations including squares, hexagons, etc. can be used. Circuit boards 836, 838, and 840 include circuit layers 836A, 838A, and 840A respectively; dielectric layers 836B, 838B, and 840B respectively, and metal base layers 836C, 838C, and 840C respectively. Specially extruded heat sink 842 is mounted to metal base layers 836C, 838C, and 840C respectively. Metal base layers 836C, 838C, and 840C are connected at their rectangular edges to the single pin base end caps such as single pin base end cap 830A to secure circuit boards 836, 838, and 840 in the triangular cross-sectional shape. Heat sink 842 is mounted to the inner surfaces of metal base layers 836C, 838C, and 840C. LEDs 844A, 844B, and 844C each represent a plurality of LEDs mounted in linear alignment on each metal substrate boards 836, 838, and 840 respectively, in particular to circuit layers 836A, 838A, and 840A respectively. The electrical connections are analogous to those described in relation to LED lamp 570 previously described herein. Metal substrate circuit boards 836, 838, and 840 as are LEDs 844A, 844B, and 844C are spaced from tubular wall 834.

Circular single pin base end cap 830A shown in FIG. 72A is one of the two base end caps for triangular LED lamp 828A, and is analogous to base end caps 592A and 592B of LED lamp 570 shown in FIGS. 50 and 51. Triangularly arranged rectangular mounting slots 846A, 846B, and 846C formed in base end cap 830A are aligned to receive the tenon ends of metal substrate circuit boards 836, 838, and 840, which are rectangular in shape and are analogous to circuit board short end edges 595A and 595B of LED array circuit boards 594A and 594B shown in FIG. 51. An outer circular mounting slot 848 formed in base end cap 830A is aligned to receive the circular end of tubular wall 834, and the opposed base end cap likewise forms a circular end slot that receives the opposed end of tubular wall 834, so that both slots mount both ends of tubular wall 834 of triangular LED lamp 828A. A single pin contact 850 is located at the center of circular single pin base end cap 830A. Single pin base end cap 830A also defines three base end cap venting holes 852A, 852B, and 852C located between circular slot 848 and each rectangular slot 846A, 846B, and 846C. Locations for venting holes 852A, 852B, and 852C can be positioned anywhere within base end cap 830A. Circular bi-pin base end cap 830B shown in FIG. 72B is one of the two base end caps for triangular LED lamp 828B and is analogous to base end caps 706A and 706B of LED lamp 680 shown in FIGS. 60 and 61. Triangular arranged rectangular mounting slots 852A, 852B, and 852C formed in bi-pin base end cap 830B are aligned to receive the tenon ends of metal substrate circuit boards 836, 838 and 840, which are rectangular in shape and are analogous to circuit board short end edges 710A and 710B of LED array circuit boards 708A and 708B shown in FIG. 61. An outer circular mounting slot 854 formed in base end cap 830B is aligned to receive the circular end of tubular wall 834, and the opposed base end cap likewise forms a circular end slot that receives the other end of tubular wall 834, so that both slots mount both ends of tubular wall 834 of triangular LED lamp 828B. Bi-pin contacts 856A and 856B are located at the center area of circular bi-pin base end cap 830B. Bi-pin base end cap 830B also defines three base end cap venting holes 858A, 858B, and 858C located between circular slot 854 and each rectangular slot 852A, 852B, and 852C. Locations for venting holes 858A, 858B, and 858C can be positioned anywhere within base end cap 830B.

Although the invention thus far set forth has been described in some detail by way of illustration and example for purposes of clarity and understanding, it will of course, be understood that various changes and modifications may be made in the form, details, and arrangements of the parts without departing from the scope of the invention. For example, more than three metal substrate circuit boards can be mounted in any of LED lamps 570, 670, 680, 784, 794, and 828.

FIGS. 73, 73A, 74, 74A, 74B, 75, 75A, 75B, 75C, 76, 76A, 77, 78, 78A, 79A, and 79B show various embodiments and details of the present invention that is directed to the control of the delivery of electrical power from a ballast assembly to an LED array positioned in a tube as described herein.

In certain conditions and locations, direct hard-wire connections and wireless transmissions may not be possible, or may not offer the best performance. The use of existing power lines as a data information carrier serves as an alternate method of getting data input control to the on-board computer. X10 protocol and other PLC methods can be used. Thus, the data control signal can also be a direct hard-wire connection including DMX512, RS232, Ethernet, DALI, Lonworks, RDM, TCPIP, CEBus Standard EIA-600, X10, and other Power Line Carrier Communication (PLC) protocols.

FIG. 73 shows an embodiment of the present invention, in particular shown as a schematic block diagram of an LED lamp 860 that includes an LED array 862 comprising a plurality of LEDs positioned in an elongated translucent tube 864. LED array 862 is connected to a power supply comprising a source of VAC power 866 electrically connected to a ballast 868, which is external to tube 864. An electrical connection 870A positioned in tube 864 is powered from ballast 868 and transmits AC power to AC-DC power converter 869, which in turn transmits DC power to an on-off switch 872 also positioned in tube 864 by way of electrical connection 870B. Power from ballast 868 can be either AC or DC voltage. In the case of DC power going into AC-DC power converter 869, DC power will continue to be sent to on-off switch 872. Switch 872 is electrically connected to LED array 862 by electrical connection 874. LED array 862 contains the necessary electrical components to further reduce the power transmitted by switch 972 by way of electrical connection 874 to properly drive the plurality of LEDs in LED array 862.

A manual control unit 876 positioned external to LED lamp 860 is operationally connected to on-off switch 872 by any of three optional signal paths 878A, 878B, or 878C. Signal path 878A is an electrical signal line wire extending directly from manual control unit 876 to switch 872. Signal path 878B is a wireless signal line shown in dash line extending directly to switch 872. Signal path 878C is a signal line wire that is connected to a PLC line 880 that extends from VAC 866 through tube 860 to switch 872. Switch 872 also contains the necessary electronics to decode the data information imposed on PLC line 880 via signal path 878C. Manual control unit 876 may be powered from an external VAC power source 866 or directly from switch 872.

In operation, manual activation of manual control unit 876 sends a signal by whichever signal line is being used of signal lines 878A, 878B, or 878C with the result that switch 872 is operated to turn either on or off, depending on the prior setting. If, for example, LED array is in an illumination mode with power coming from ballast 868 through switch 872, operation of switch 872 from the on mode to the off mode will cause termination of electrical power from ballast 868 to LED array 862, so that LED array will cease to illuminate. If, on the other hand, LED array 862 is in a non-illumination mode, with no power passing form ballast 868 through switch 872, operation of switch 872 from the off mode to the on mode will cause passage of electrical power from ballast 868 to LED array 862, so that LED array 862 will be in an illumination mode.

FIG. 73A shows another embodiment of the present invention, in particular shown as a schematic block diagram of an LED lamp 882 that includes an LED array 884 comprising a plurality of LEDs positioned in a translucent tube 886. LED array 884 is connected to a power supply comprising a source of VAC power 888 electrically connected to a ballast 890, which is external to tube 886. An electrical connection 892A positioned in tube 886 is powered from ballast 890 and transmits AC power to AC-DC power converter 891, which in turn transmits DC power to a computer 894 by way of electrical connection 892B and to dimmer 898 by way of a similar electrical connection (not shown). Both computer 894 and dimmer 898 are also positioned in tube 886. Power from ballast 890 can be either AC or DC voltage. In the case of DC power going into AC-DC power converter 891, DC power will continue to be sent to computer 894 and dimmer 898. Computer 894 is electrically and operatively connected by an electrical control connection 896 to dimmer 898. An electrical connection 900 connects dimmer 898 to LED array 884. Dimmer 898 will contain the necessary electronics needed to decode the data control signals sent by computer 894, and will provide the proper current drive power required to operate LED array 884. Single LED array 884 controlled by dimmer 898 can represent multiple LED arrays 884 each correspondingly controlled by one of a plurality of dimmers 898 (not shown), wherein the plurality of dimmers 898 are each independently controlled by computer 894. Computer 894 includes a microprocessor, a program installed therein, memory, input/output means, and addressing means.

A manual control unit 902 positioned external to LED lamp 882 is operationally connected to computer 894 by any of three optional alternative signal paths 904A, 904B, or 904C connected to a PLC line 906 extending from VAC 888 through tube 886 to computer 894. Signal path 904A is an electrical signal line wire extending directly from manual control unit 902 to computer 894. Signal path 904B is a wireless signal path shown in dash line extending directly to computer 894. Signal path 904C is a signal line wire that is connected to a PLC line 906 that extends from VAC 888 through tube 886 to computer 894. Computer 894 also contains the necessary electronics to decode the data information imposed on PLC line 906 via signal path 904C. Manual control unit 902 may be powered from an external VAC power source 888 or directly from computer 894.

Activation of manual control unit 902 activates computer 894 to signal dimmer 898 to increase or decrease delivery of electrical power to LED array 884 by a power factor that is preset in computer 894. The delivery power factor can be preset to range anywhere from a theoretical reduced power deliver of zero percent from dimmer 898 to LED array 884 to any reduction of power of 100 percent delivery of power, but as a practical matter the actual setting would be in a middle range of power delivery to LED array 884 depending on circumstances. Computer 894 includes a computer signal input port and a computer signal output port. Manual control unit 902 is manually operable between an first activation mode wherein a control signal is sent to the computer signal input port by way of signal paths 904A, 904B, or 904C to activate computer 894 to send from the computer signal output port, a computer output signal to dimmer 898 to operate at the preset power less than full power, and a second activation mode wherein a control signal is sent to the computer input signal port by way of signal paths 904A, 904B, or 904C to activate computer 894 to send from the computer signal output port, a computer output signal to dimmer 898 to operate LED array 884 at full power.

FIG. 74 shows another embodiment of the present invention, in particular shown as a schematic block diagram of an LED lamp 908 that includes an LED array 910 comprising a plurality of LEDs positioned in a translucent tube 912. LED array 910 is connected to a power supply comprising a source of VAC power 914 electrically connected to a ballast 916, which is external to tube 912. An electrical connection 918A positioned in tube 912 is powered from ballast 916 and transmits AC power to AC-DC power converter 917, which in turn transmits DC power to a timer 920 by way of electrical connection 918B and to an on-off switch 924 by way of a similar electrical connection (not shown). Both timer 920 and switch 924 are also positioned in tube 912. Power from ballast 916 can be either AC or DC voltage. In the case of DC power going into AC-DC power converter 917, DC power will continue to be sent to timer 920 and switch 924. Timer 920 is electrically and operatively connected by an electrical control connection 922 to switch 924. An electrical connection 926 connects switch 924 to LED array 910. LED array 910 contains the necessary electrical components to further reduce the power transmitted by switch 924 by way of electrical connection 926 to properly drive the plurality of LEDs in LED array 910.

A manual timer control unit 928 positioned external to LED lamp 908 is operationally connected to timer 920 by any of three optional alternative signal paths 930A, 930B, or 930C. Signal path 930A is an electrical signal line wire extending directly from manual control unit 928 to timer 920. Signal path 930B is a wireless signal path shown in dash line extending directly to timer 920. Signal path 930C is a signal line wire that is connected to a PLC line 932 that extends from VAC 914 through tube 912 to timer 920. Timer 920 also contains the necessary electronics to decode the data information imposed on PLC line 932 via signal path 930C. Manual control unit 928 may be powered from an external VAC power source 914 or directly from timer 920.

In operation, manual timer control unit 928 is manually set to activate timer 920 at a particular on mode time to close switch 924, and in addition at a particular off mode time to open switch 924. In the on mode, power is passed from ballast 916, to power converter 917, to switch 924, and then to LED array 910. In the off mode, switch 924 terminates the transmission of power from ballast 916, to power converter 917, to switch 924, and then to LED array 910.

Referring now to FIGS. 73A and 74, computer 894 can be replaced with timer 920 in operational control of dimmer 898 in FIG. 73A, and timer 20 can be replaced with computer 894 in operational control of switch 924 in FIG. 74 to achieve the similar functionality and illumination results.

FIG. 74A shows another embodiment of the present invention, in particular shown is a schematic block diagram of an LED lamp 938 that includes an LED array 940 comprising a plurality of LEDs positioned in a translucent tube 942. LED array 940 is connected to a power supply comprising a source of VAC power 944 electrically connected to a ballast 946, which is external to tube 942. An electrical connection 948A positioned in tube 942 is powered from ballast 946 and transmits AC power to AC-DC power converter 947, which in turn transmits DC power to a computer 950 by way of electrical connection 948B and to dimmer 954 by way of a similar electrical connection (not shown). Both computer 950 and dimmer 954 are also positioned in tube 942. Power from ballast 946 can be either AC or DC voltage. In the case of DC power going into AC-DC power converter 947, DC power will continue to be sent to computer 950 and dimmer 954. Computer 950 is electrically and operatively connected by an electrical control connection 952 to dimmer 954. An electrical connection 956 connects dimmer 954 to LED array 940. Dimmer 954 will contain the necessary electronics needed to decode the data control signals sent by computer 950, and will provide the proper current drive power required to operate LED array 940. Single LED array 940 controlled by dimmer 954 can represent multiple LED arrays 940 each correspondingly controlled by one of a plurality of dimmers 954 (not shown), wherein the plurality of dimmers 954 are each independently controlled by computer 950. Computer 950 includes a microprocessor, a program installed therein, memory, input/output means, and addressing means.

An on-off switch 958 external to tube 942 is operationally connected to computer 950. A timer 960 also external to tube 942 is positioned adjacent to or integral with switch 958, is operationally connected to switch 958 by an electrical connection 962. Timer 960 can be manually set to automatically activate switch 958 to an on mode or an off mode at preset times wherein computer 950 is activated by switch 958 to signal dimmer 954 to increase or decrease delivery of electrical power to LED array 940 by a power factor that is preset in either dimmer 954 or in computer 950. The reduced delivery power factor can be preset to range anywhere from a theoretical zero percent delivery of power from dimmer 954 to LED array 940 to approaching a theoretical 100 percent delivery of power, but as a practical matter the actual reduced power setting would be in a middle range of power delivery to LED array 940 depending on the circumstances.

Switch 958 is operationally connected to computer 950 by any of three optional alternative signal paths 964A, 964B, or 964C. Signal path 964A is an electrical signal line wire extending directly from switch 958 to computer 950. Signal path 964B is a wireless signal path shown in dash line extending directly to computer 950. Signal path 964C is a signal line wire that is connected to a PLC line 966 that extends from VAC 944 through tube 942 to computer 950. Computer 950 also contains the necessary electronics to decode the data information imposed on PLC line 966 via signal path 964C. Timer 960 and switch 958 may be individually or mutually powered from an external VAC power source 944 or directly from computer 950.

Computer 950 includes a computer signal input port and a computer signal output port. Switch 958 is operable between an first activation mode wherein a control signal is sent by switch 958 to the computer signal input port by way of signal paths 964A, 964B, or 964C to activate computer 950 to send from the computer signal output port, a computer output signal to dimmer 954 to operate at the preset power less than full power, and a second activation mode wherein a control signal is sent by switch 958 to the computer input signal port by way of signal paths 964A, 964B, or 964C to activate computer 950 to send from the computer signal output port, a computer output signal to dimmer 954 to operate LED array 940 at full power.

FIG. 74B shows another embodiment of the present invention. It is similar to FIG. 74A with the timer and switch now inside the LED lamp. In particular is shown a schematic block diagram of an LED lamp 968 that includes an LED array 970 comprising a plurality of LEDs positioned in a translucent tube 972. LED array 970 is connected to a power supply comprising a source of VAC power 974 electrically connected to a ballast 976, which is external to tube 972. An electrical connection 978A positioned in tube 972 is powered from ballast 976 and transmits AC power to AC-DC power converter 977, which in turn transmits DC power to a timer 980 by way of electrical connection 978B, to on-off switch 984, to computer 986, and to dimmer 990 by way of similar electrical power connections (not shown). Timer 980, switch 984, computer 986, and dimmer 990 are all positioned in tube 972. Power from ballast 976 can be either AC or DC voltage. In the case of DC power going into AC-DC power converter 977, DC power will continue to be sent to timer 980, switch 984, computer 986, and dimmer 990. Computer 986 is electrically and operatively connected by an electrical control connection 988 to dimmer 990. An electrical connection 992 connects dimmer 990 to LED array 970. Dimmer 990 will contain the necessary electronics needed to decode the data control signals sent by computer 986, and will provide the proper current drive power required to operate LED array 970. Single LED array 970 controlled by dimmer 990 can represent multiple LED arrays 970 each correspondingly controlled by one of a plurality of dimmers 990 (not shown), wherein the plurality of dimmers 990 are each independently controlled by computer 986. Computer 986 includes a microprocessor, a program installed therein, memory, input/output means, and addressing means.

Timer 980 is activated at preset times that in turn activate or deactivate switch 984 by electrical connection 982. Such time presetting can be done, for example, at the assembly site or programmable by the customer. The activation of switch 984 by timer 980 signals the activation of computer 986 to emit a signal from the computer output signal port relating to dimmer 990 to control the power input to LED array 970 in accordance with the computer command. Thus, the degree of illumination emitted by LED array 970 can be increased or decreased at set times.

FIG. 75 shows another embodiment of the present invention. In particular shown is a schematic block diagram of an LED lamp 994 that includes an LED array 996 comprising a plurality of LEDs positioned in a translucent tube 998. LED array 996 is connected to a power supply comprising a source of VAC power 1000 electrically connected to a ballast 1002, which is external to tube 998. An electrical connection 1004A positioned in tube 998 is powered from ballast 1002 and transmits AC power to AC-DC power converter 1003, which in turn transmits DC power to an on-off switch 1006 also positioned in tube 998 by way of electrical connection 1004B. An occupancy motion sensor 1010 also positioned in tube 998 transmits control signals to switch 1006 by way of signal line 1012. Electrical power is transmitted to sensor 1010 also by electrical connection 1004B connected to power converter 1003. Sensor 1010 may be powered by AC or DC voltage depending on the model and type of design. Occupancy motion sensor control in response to the movement or presence of a person in the illumination area of LED array 996 are set at the place of manufacture or assembly in accordance with methods known in the art. Power from ballast 1002 can be either AC or DC voltage. In the case of DC power going into AC-DC power converter 1003, DC power will continue to be sent to on-off switch 1006 and occupancy motion sensor 1010. Switch 1006 is electrically connected to LED array 996 by electrical connection 1008. LED array 996 contains the necessary electrical components to further reduce the power transmitted by switch 1006 by way of electrical connection 1008 to properly drive the plurality of LEDs in LED array 996.

When sensor 1010 detects movement or the presence of a person in the illumination area of LED array 996, an instant on-mode output signal is transmitted from sensor 1010 to switch 1006 wherein power is transmitted through switch 1006 to LED array 996. When sensor 1010 ceases to detects movement or the presence of a person in the illumination area of LED array 996, a delayed off-mode signal is transmitted from sensor 1010 to switch 1006 wherein switch 1006 is turned to the off-mode and power from ballast 1002 to power converter 1003 through switch 1006 and to LED array 996 is terminated. At such time sensor 1010 again senses motion or the presence of a person in the illumination area of LED array 996, an instant on-mode signal is again transmitted from sensor 1010 to switch 1006 wherein switch 1006 is turned to the on-mode and power from ballast 1002 to power converter 1003 through switch 1006 and to LED array 996 is activated, so that LED array 996 illuminates the area. The time delay designed into the off mode prevents intermittent illumination cycling in the area around LED array 996 and can be preset at the factory or can be set in the field.

FIG. 75A shows another embodiment of the present invention. In particular shown is a schematic block diagram of an LED lamp 1014 that includes an LED array 1016 comprising a plurality of LEDs positioned in a translucent tube 1018. LED array 1016 is connected to a power supply comprising a source of VAC power 1020 electrically connected to a ballast 1022, which is external to tube 1018. An electrical connection 1024A positioned in tube 1018 is powered from ballast 1022 and transmits AC power to AC-DC power converter 1023, which in turn transmits DC power to a computer 1026 by way of electrical connection 1024B and to dimmer 1030 by way of a similar electrical connection (not shown). Both computer 1026 and dimmer 1030 are also positioned in tube 1018. Computer 1026 has a computer input signal port and a computer output signal port. An occupancy motion sensor 1034 also positioned in tube 1018 transmits control signals to computer 1026 by way of input control signal line 1036 to the computer input signal port of computer 1026. Electrical power is transmitted to sensor 1034 also by electrical connection 1024B connected to power converter 1023. Sensor 1034 may be powered by AC or DC voltage depending on the model and type of design. Occupancy motion sensor control in response to the movement or presence of a person in the illumination area of LED array 1016 are set at the place of manufacture or assembly in accordance with methods known in the art. Power from ballast 1022 can be either AC or DC voltage. In the case of DC power going into AC-DC power converter 1023, DC power will continue to be sent to computer 1026, occupancy motion sensor 1034, and dimmer 1030. Computer 1026 is electrically and operatively connected by an electrical control connection 1028 to dimmer 1030. An electrical connection 1032 connects dimmer 1030 to LED array 1016. Dimmer 1030 will contain the necessary electronics needed to decode the data control signals sent by the computer output signal port of computer 1026, and will provide the proper current drive power required to operate LED array 1016. Single LED array 1016 controlled by dimmer 1030 can represent multiple LED arrays 1016 each correspondingly controlled by one of a plurality of dimmers 1030 (not shown), wherein the plurality of dimmers 1030 are each independently controlled by computer 1026. Computer 1026 includes a microprocessor, a program installed therein, memory, input/output means, and addressing means.

When sensor 1034 detects motion or the presence of a person in the illumination area of LED array 1016, sensor 1034 sends a signal to the computer signal input port of computer 1026 by way of signal line 1036 wherein computer 1026 then sends a signal from the computer signal output port to dimmer 1030 to provide full power to LED array 1016 for full illumination. When sensor 1034 ceases to detect motion or the presence of a person in the illumination area of LED array 1016 after a set time period, a sensor signal to computer 1026 by way of signal line 1036 causes computer 1026 to send a computer output signal to dimmer 1024 to decrease the power to LED array 1016 by a preset amount, so that LED array 1016 reduces full illumination of the area, that is, illumination is continued, but reduced to a preset illumination output.

Sensor 1034, computer 1026, and dimmer 1030 can be optionally organized into an integral circuit module. This system is used primarily for energy conservation and savings for residential, commercial, and industrial buildings and facilities. Sensor 1034 can be one of many varieties of space occupancy motion sensors. Such sensors can include, for example, optical incremental encoders, interrupters, photoreflective sensors, proximity and Hall Effect sensors, laser interferometers, triangulation sensors, magnetostrictive sensors, ultrasonic sensors, cable extension sensors, LVDT sensors, and tachometer sensors. Occupancy motion sensor 1034 gets its power from the main power supply VAC 1020 or internally from LED lamp 1014. On-board computer 1026 constantly runs a monitoring program that looks at the output of occupancy motion sensor 1034. Power to LED array 1016 is normally on and will dim between a fully off zero percent to a preset intensity of less than 100 percent depending on the output of occupancy motion sensor 1034. When occupancy motion sensor 1034 no longer detects the motion of presence of a person within its operating range, it flags an input to computer 1026, which signals dimmer 1030 to dim the power to LED array 1016. LED array 1016 can be programmed to dim instantaneously or after some pre-programmed time delay.

FIG. 75B shows an embodiment of the present invention, in particular shown as a schematic block diagram of an LED lamp 1038 that includes an LED array 1040 comprising a plurality of LEDs positioned in an elongated translucent tube 1042. LED array 1040 is connected to a power supply comprising a source of VAC power 1044 electrically connected to a ballast 1046, which is external to tube 1042. An electrical connection 1048A positioned in tube 1042 is powered from ballast 1046 and transmits AC power to AC-DC power converter 1047, which in turn transmits DC power to an on-off switch 1050 also positioned in tube 1042 by way of electrical connection 1048B. Power from ballast 1046 can be either AC or DC voltage. In the case of DC power going into AC-DC power converter 1047, DC power will continue to be sent to on-off switch 1050. Switch 1050 is electrically connected to LED array 1040 by electrical connection 1052. LED array 1040 contains the necessary electrical components to further reduce the power transmitted by switch 1050 by way of electrical connection 1052 to properly drive the plurality of LEDs in LED array 1040.

An external motion sensor 1054 positioned external to LED lamp 1038 is operationally connected to on-off switch 1050 by any of three optional alternative signal paths 1056A, 1056B, or 1056C. Signal path 1056A is an electrical signal line wire extending directly from sensor 1054 to switch 1050. Signal path 1056B is a wireless signal path shown in dash line extending directly to switch 1050. Signal path 1056C is a signal line wire that is connected to a PLC line 1058 that extends from VAC 1044 through tube 1042 to switch 1050. Switch 1050 also contains the necessary electronics to decode the data information imposed on PLC line 1058 via signal path 1056C. When sensor 1054 detects motion in the illumination area of LED array 1040, sensor 1054 sends a signal to switch 1050 by way of signal path 1056A or signal path 1546B or signal path 1056C, whatever the case may be, wherein switch 1050 is activated from the off mode to the on mode, so that power is transmitted through switch 1050 to LED array 1040 and LED array 1040 illuminates the area. At such time sensor 1054 no longer detects motion in the illumination area of LED array 1040, sensor 1054 sends a signal to switch 1050 wherein switch 1050 is activated from the on mode to the off mode, so that power to LED array 1040 is terminated and LED array 1040 no longer illuminates the area.

FIG. 75C shows another embodiment of the present invention, in particular shown as a schematic block diagram of an LED lamp 1060 that includes an LED array 1062 comprising a plurality of LEDs positioned in a translucent tube 1064. LED array 1062 is connected to a power supply comprising a source of VAC power 1066 electrically connected to a ballast 1068, which is external to tube 1064. An electrical connection 1070A positioned in tube 1064 is powered from ballast 1068 and transmits AC power to AC-DC power converter 1069, which in turn transmits DC power to a computer 1072 by way of electrical connection 1070B and to dimmer 1076 by way of a similar electrical connection (not shown). Both computer 1072 and dimmer 1076 are also positioned in tube 1064. Power from ballast 1068 can be either AC or DC voltage. In the case of DC power going into AC-DC power converter 1069, DC power will continue to be sent to computer 1072 and dimmer 1076. Computer 1072 is electrically and operatively connected by an electrical control connection 1074 to dimmer 1076. An electrical connection 1078 connects dimmer 1076 to LED array 1062. Dimmer 1076 will contain the necessary electronics needed to decode the data control signals sent by computer 1072, and will provide the proper current drive power required to operate LED array 1062. Single LED array 1062 controlled by dimmer 1076 can represent multiple LED arrays 1062 each correspondingly controlled by one of a plurality of dimmers 1076 (not shown), wherein the plurality of dimmers 1076 are each independently controlled by computer 1072. Computer 1072 includes a microprocessor, a program installed therein, memory, input/output means, and addressing means.

An external motion sensor 1080 positioned external to LED lamp 1060 is operationally connected to computer 1072 by any of three optional alternative signal paths 1082A, 1082B, or 1082C. Signal path 1082A is an electrical signal line wire extending directly from sensor 1080 to computer 1072. Signal path 1082B is a wireless signal path shown in dash line extending directly to computer 1072. Signal path 1082C is a signal line wire that is connected to a PLC line 1084 that extends from VAC 1066 through tube 1064 to computer 1072. Computer 1072 also contains the necessary electronics to decode the data information imposed on PLC line 1084 via signal path 1082C.

When sensor 1080 detects motion or the presence of a person in the illumination area of LED array 1062, sensor 1080 sends a signal to the input port of computer 1072 by way of signal path 1082A, or signal path 1082B, or signal path 1082C, whichever the case may be. Computer 1072 is activated to send or to continue to send a signal from the output port of computer 1072 by electrical line 1074 to dimmer 1076, so that full power is transmitted through electrical line 1078 to LED array 1062 wherein LED array 1062 provides full illumination of the area.

When sensor 1080 ceases to detect motion or the presence of a person after a preset time period in the illumination area of LED array 1062, sensor 1080 sends a signal to the signal input port of computer 1072 by way of one of signal paths 1082A, 1082B, or 1082C, whichever the case might be, whereby computer 1072 sends a signal from the computer signal output port to dimmer 1076 by electrical line 1074 wherein dimmer 1076 reduces power being sent by electrical line 1078 to LED array 1062 by a preset amount, so that LED array 1062 reduces full illumination of the area, that is, illumination is continued, but reduced to a lower illumination output level preset in dimmer 1076 or computer 1072.

FIG. 76 shows another embodiment of the present invention in particular a schematic block diagram of a network 1086 of two LED lamps 1086A and 1086B in general proximity. LED lamp 1086A includes an LED array 1088A positioned in a translucent tube 1090A that is connected to a power supply comprising a source of VAC power 1092A electrically connected to a ballast 1094A, which is external to tube 1090A. An electrical connection 1096A connects ballast 1094A to an AC-DC power converter 1095A, which in turn provides DC power to occupancy motion sensor 1098A and dimmer 1102A both positioned in LED lamp 1086A, that is, in tube 1090A by way of electrical connections 1096B and 1100A respectively. Dimmer 1102A is connected to LED array 1088A by an electrical connection 1104A. LED lamp 1086B includes an LED array 1088B positioned in a translucent tube 1090B that is connected to a power supply comprising a source of VAC power 1092B electrically connected to a ballast 1094B, which is external to tube 1090B. An electrical connection 1096C connects ballast 1094B to an AC-DC power converter 1095B, which in turn provides DC power to occupancy motion sensor 1098B and dimmer 1102B both positioned in LED lamp 1086B, that is, in tube 1090B by way of electrical connections 1096D and 1100B respectively. Dimmer 1102B is connected to LED array 1088B by an electrical connection 1104B. LED arrays 1088A and 1088B can each include either a plurality of LEDs or a single LED. The number of individual LEDs in each LED array 1088A and 1088B can differ. Likewise, dimmers 1102A and 1102B can represent a plurality of dimmers 1102A and 1102B, each controlling individual LEDs arrays 1088A and 1088B respectively.

An external central computer 1106 shown positioned between LED lamps 1086A and 1086B is in network signal communication with sensors 1098A and 1098B, and ultimately with dimmers 1102A and 1102B, respectively. Sensor 1098A sends a sensor data output signal by wire signal path 1108X or alternative wireless signal path 1108Y as shown by dash line to computer 1106; and sensor 1098B sends a sensor data output signal by wire signal path 1110X or alternative wireless signal path 1110Y as shown by dash line to computer 1106. In programmed response to the sensor signals, computer 1106 sends a computer data output signal by wire signal path 1112X or alternative wireless signal path 1112Y as shown by dash line to control dimmer 1102A; and computer 1106 also sends a computer data output signal by wire signal path 1114X or alternative wireless signal path 1114Y as shown by dash line to control dimmer 1102B. Dimmers 1102A and 1102B both contain the electronics needed to decode the data control signals sent by computer 1106, and will provide the proper current drive power required to operate LED arrays 1088A and 1088B respectively. Computer 1106 includes a microprocessor, a program installed therein, memory, input/output means, and addressing means.

Computer 1106 continuously compares the sensor data signals received in accordance with a computer monitoring program and transmits computer signals to dimmers 1102A and 1102B in accordance with a computer program, so as to control the current output of dimmers 1102A and 1102B, so as to prevent flickering of LED lamps 1086A and 1086B. Thus signaling dimmers 1102A and 1102B either to maintain full power to LED arrays 1088A and 1088B in accordance with preset power reductions, so that LED arrays 1088A and 1088B emit full capacity light, or on the other hand to reduce power after a set time delay to LED arrays 1088A and 1088B with the result that as a person walks about the illumination areas of LED lamps 1086A and 1086B, both lamps emit the same less than full capacity illumination with the result that continuous flickering caused by different power controls at dimmers 1102A and 1102B is avoided. In summary, the operational networking of LED lamp network 1086 prevents flickering from occurring.

As indicated in FIGS. 76 and 76A, four combinations of signals from both sensors 1098A and 1098B to computer 1106 are possible. For purposes of elucidation herein, when motion is detected by sensors 1098A and 1098B, signals from the sensors are indicated by YES, and when no motion is detected by sensors 1098A and 1098B, negative signals from the sensors are indicated by NO. Computer 1106 is programmed to send computer control signals to dimmers 1102A and 1102B as a result of the received sensor signals. Full power at dimmers 1102A and 1102B is indicated by a plus sign (+) and reduced power to dimmers 1102A and 1102B is indicated by a minus sign (−).

The four combinations of sensor signals as received by computer 1106 are shown in FIG. 76A as follows:

1. Sensor 1098A does detect motion and sensor 1098B also does detect motion wherein computer 1106 sends a computer signal (+) to both dimmers 1102A and 1102B to maintain full power to LED arrays 1088A and 1088B respectively.

2. Sensor 1098A does not detect motion and sensor 1098B does detect motion wherein computer 1106 sends a computer signal (−) to dimmer 1102A to reduce full power to LED array 1088A, and a computer signal (+) to dimmer 1102B to maintain full power to LED array 1088B.

3. Sensor 1098A does detect motion and sensor 1098B does not detect motion wherein computer 1106 sends a computer signal (+) to dimmer 1102A to maintain full power to LED array 1088A, and a computer signal (−) to dimmer 1102B to reduce full power to LED array 1088B.

4. Sensor 1098A does not detect motion and sensor 1098B does not detect motion wherein computer 1106 sends a computer signal (−) to both dimmers 1102A and 1102B to reduce full power to LED arrays 1088A and 1088B respectively in accordance with preset power reduction settings.

FIG. 77 shows another embodiment of the present invention in particular schematic block diagram of a network 1116 of two LED lamps including first and second LED lamps, namely, LED lamp 1116A and LED lamp 1116B, respectively, in general proximity. First LED lamp 1116A includes an LED array 1118A positioned in a translucent tube 1120A that is connected to a power supply comprising a source of VAC power 1122A electrically connected to a ballast 1124A, which is external to tube 1120A. An electrical connection 1126A connects ballast 1124A to an AC-DC power converter 1125A, which in turn provides DC power by way of electrical connection 1126B to a computer 1128A, an occupancy motion sensor 1130A, a timer 1134A, and dimmer 1138A all positioned within tube 1120A, that is, LED lamp 1116A. Occupancy motion sensor 1130A sends signals to computer 1128A by a signal path 1132A. Optional timer 1134A sends signals to computer 1128A by signal path 1136A. Computer 1128A sends programmed activation signals to dimmer 1138A by electrical connection 1140A. Dimmer 1138A contains the electronics needed to decode the data control signals sent by computer 1128A, and will provide the proper current drive power required to operate LED array 1118A. Dimmer 1138A transmits power to LED array 1118A by an electrical connection 1141A. Computer 1128A includes a microprocessor, a program installed therein, memory, input/output means, and addressing means. Second LED lamp 116B includes an LED array 1118B positioned in a translucent tube 1120B that is connected to a power supply comprising a source of VAC power 1122B electrically connected to a ballast 1124B, which is external to tube 1120B. An electrical connection 1126C connects ballast 1124B to an AC-DC power converter 1125B, which in turn provides DC power by way of electrical connection 1126D to a computer 1128B, an occupancy motion sensor 1130B, a timer 1134B, and dimmer 1138B all positioned within tube 1120B, that is, LED lamp 1116B. Occupancy motion sensor 1130B sends signals to computer 1128B by a signal path 1132B. Optional timer 1134B sends signals to computer 1128B by signal path 1136B. Computer 1128B sends programmed activation signals to dimmer 1138B by electrical connection 1140B. Dimmer 1138B contains the electronics needed to decode the data control signals sent by computer 1128B, and will provide the proper current drive power required to operate LED array 1118B. Dimmer 1138B transmits power to LED array 1118B by an electrical connection 1141B. Computer 1128B includes a microprocessor, a program installed therein, memory, input/output means, and addressing means.

Computers 1128A and 1128B are in network signal communication with sensors 1130A and 1133B, respectively, and ultimately with dimmers 1138A and 1138B, respectively. Sensor 1130A sends data output signals to computer 1128A by signal path 1132A, and sensor 1130B sends data output signals to computer 1128B by signal path 1132B. In programmed response to the signals from sensor 1130A, computer 1128A sends computer data out communication signals 1142 by wire signal path 1144X or alternative wireless signal path 1144Y as shown by dash line or by PLC signal path 1144Z, any one signal path by itself or in combination with any other input communication signal path to the data in 1146 of computer 1128B. Simultaneously in programmed response to the signals from sensor 1130B, computer 1128B sends computer data out communication signals 1148 by wire signal path 1150X or alternative wireless signal path 1150Y as shown by dash line or by PLC signal path 1150Z, any one signal path by itself or in combination with any other input communication signal path to the data in 1152 of computer 1128A.

Computers 1128A and 1128B continuously process the sensor data signals from both sensors 1130A and 1130B received in accordance with a computer monitoring program and transmit resultant computer signals to dimmers 1138A and 11381B in accordance with the computer program, so as to control the current output of dimmers 1138A and 11381B, so as to prevent flickering of LED lamps 1116A and 1116B by 1) simultaneously signaling both dimmers 1138A and 1138B either to maintain full power and emit maximum light output, or 2) simultaneously signaling both dimmers 1138A and 1138B to reduce power by a preset amount and emit less than maximum light by a preset amount with the result that as a person walks about the combined illumination area of LED lamps 1116A and 1116B, both lamps emit the same illumination with the result that continuous flickering between the lamps caused by different power controls at dimmers 1138A and 1138B is avoided. In summary, the operational networking of LED lamp network 1116 creates a continuous identical illumination, so that flickering is prevented.

Four combinations of signals from both sensors 1030A and 1030B to computers 1128A and 1128B are possible. The four combinations of sensor signals as received by computers 1128A and 1128B, which are analogous to those shown in FIG. 76A, are as follows:

1. Sensor 1030A does detect motion and sensor 1030B also does detect motion wherein computers 1128A and 1128B both send a computer signal (+) to both dimmers 1138A and 1138B to maintain full power to LED arrays 1118A and 1118B respectively.
2. Sensor 1030A does not detect motion and sensor 1030B does detect motion wherein computer 1128A sends a computer signal (−) to dimmer 1138A to reduce full power to LED array 1118A, and computer 1128B sends a computer signal (+) to dimmer 1138B to maintain full power to LED array 1118B.
3. Sensor 1030A does detect motion and sensor 1030B does not detect motion wherein computer 1128A sends a computer signal (+) to dimmer 1138A to maintain full power to LED array 1118A, and computer 1128B sends a computer signal (−) to dimmer 1138B to reduce full power to LED array 1118B.
4. Sensor 1098A does not detect motion and sensor 1098B does not detect motion wherein computers 1128A and 1128B both send a computer signal (−) to both dimmers 1138A and 1138B to reduce full power to LED arrays 1118A and 1118B respectively in accordance with preset power reduction settings.

LED arrays 1118A and 1118B can each include either a plurality of LEDs or a single LED. The number of individual LEDs in each LED array 1118A and 1118B can differ. Likewise, dimmers 1138A and 1138B can represent a plurality of dimmers 1138A and 1138B, each controlling individual LED arrays 1118A and 1118B respectively.

Optional timer 1134A can be preset to self-activate in various modes. Timer 1134A can be preset to send a signal to computer 1128A to reduce or increase power to dimmer 1138A to a preset amount at a preset time by sending a timer signal by signal path 1136A to computer 1128A. For example, timer 1134A can be preset to activate a power reduction signal to computer 1128A at 10 PM. Timer 1134A can also be preset to activate a normal power turn on signal to computer 1128A at 8 AM. Likewise optional timer 1134B can be preset to self-activate in various modes. Timer 1134B can be preset to send a signal to computer 1128B to reduce or increase power to dimmer 1138B to a preset amount at a preset time by sending a timer signal by signal path 1136B to computer 1128B. For example, timer 1134B can be preset to activate a power reduction signal to computer 1128B at 10 PM. Timer 1134B can also be preset to activate a normal power turn on signal to computer 1128B at 8 AM.

It is possible to preset timers 1134A and 1134B at the same preset power reduction and normal power on modes and at the same preset time modes. It is also possible to preset timers 1134A and 1134B at different preset power reduction modes and different preset time modes. For example, timer 1134A could be set to send a 50 percent power reduction signal to computer 1128A at 10 PM and set to send a full power on mode signal to computer 1128A at 8 AM. At the same time, timer 1134B could be set to send a 50 percent power reduction signal to computer 1128B at 8 PM and set to send a full power on mode signal to computer 1128B at 7 AM.

FIG. 78 shows another embodiment of the present invention in particular a schematic block diagram of a network 1154 of two LED lamps including first and second LED lamps, namely, LED lamp 1156A and LED lamp 1156B, respectively, in general proximity. LED lamp 1156A includes an LED array 1158A positioned in a translucent tube 1160A that is connected to a power supply comprising a source of VAC power 1162A electrically connected to a ballast 1164A, which is external to tube 1160A. An electrical connection 1166A connects ballast 1164A to an AC-DC power converter 1165A, which in turn provides DC power to occupancy motion sensor 1168A and on-off switch 1172A both positioned in LED lamp 1156A, that is, in tube 1160A by way of electrical connections 1166B and 1170A respectively. Switch 1172A is connected to LED array 1158A by an electrical connection 1174A. LED lamp 1156B includes an LED array 1158B positioned in a translucent tube 1160B that is connected to a power supply comprising a source of VAC power 1162B electrically connected to a ballast 1164B, which is external to tube 1160B. An electrical connection 1166C connects ballast 1164B to an AC-DC power converter 1165B, which in turn provides DC power to occupancy motion sensor 1168B and on-off switch 1172B both positioned in LED lamp 1156B, that is, in tube 1160B by way of electrical connections 1166D and 1170B respectively. Switch 1172B is connected to LED array 1158B by an electrical connection 1174B.

A logic array 1176 is positioned between LED lamp 1156A and LED lamp 1156B. Logic array 1176 is an arrangement of electronically controlled switches, but can be constructed from relays, diodes, transistors, and optical elements that outputs a signal when specified input conditions are met.

When sensor 1168A detects motion in the illumination area of LED lamp 1156A, sensor 1168A sends a sensor output signal to logic array 1176 by a wire signal path 1180AX or alternatively by a wireless signal path 1180AY. In the same manner, when sensor 1168B detects motion in the illumination area of LED lamp 1156B, sensor 1168B sends a sensor output signal to logic array 1176 by a wire signal path 1180BX or alternatively by a wireless signal path 1180BY.

The logic circuit of logic array 1176 continuously processes output signals received from sensors 1168A and 1168B with the result that logic array 1176 sends a logic input signal to switch 1172A by a logic wire signal path 1184AX or by a logic wireless signal path 1184AY. Likewise, the logic circuit of logic array 1176 continuously processes output signals received from sensors 1168A and 1168B with the result that logic array 1176 also sends a logic input signal to switch 1172B by a logic wire signal path 1184BX or by an alternative logic wireless signal path 1184BY.

Four combinations of signals from both sensors 1168A and 1168B to logic array 1176 are possible. The four combinations of sensor signals as received by logic array 1176, which are analogous to those shown in FIG. 76A, are as follows:

1. Sensor 1168A does detect motion and sensor 1168B also does detect motion wherein logic array 1176 sends a logic signal (+) to both switches 1172A and 1172B to maintain full power to LED arrays 1158A and 1158B respectively.
2. Sensor 1168A does not detect motion and sensor 1168B does detect motion wherein logic array 1176 sends a logic signal (−) to switch 1172A to reduce full power to LED array 1158A, and a logic signal (+) to switch 1172B to maintain full power to LED array 1158B.
3. Sensor 1168A does detect motion and sensor 1168B does not detect motion wherein logic array 1176 sends a logic signal (+) to switch 1172A to maintain full power to LED array 1158A, and a logic signal (−) to switch 1172B to reduce full power to LED array 1158B.
4. Sensor 1168A does not detect motion and sensor 1168B does not detect motion wherein logic array 1176 sends a logic signal (−) to both switches 1172A and 1172B to reduce full power to LED arrays 1158A and 1158B respectively in accordance with preset power reduction settings.

FIG. 78A shows another embodiment of the present invention in particular schematic block diagram of a network 1186 of two LED lamps including first and second LED lamps, namely, LED lamp 1186A and LED lamp 1186B, respectively, in general proximity. First LED lamp 1186A includes an LED array 1188A positioned in a translucent tube 1190A that is connected to a power supply comprising a source of VAC power 1192A electrically connected to a ballast 1194A, which is external to tube 1190A. An electrical connection 1196A connects ballast 1194A to an AC-DC power converter 1195A, which in turn provides DC power by way of electrical connection 1196B to a logic array 1198A, an occupancy motion sensor 1200A, a timer 1204A, and dimmer 1208A all positioned within tube 1190A, that is, LED lamp 1186A. Occupancy motion sensor 1200A sends signals to logic array 1198A by a signal path 1202A. Optional timer 1204A sends signals to logic array 1198A by signal path 1206A. Logic array 1198A sends activation signals to dimmer 1208A by electrical connection 1210A. Dimmer 1208A contains the electronics needed to decode the data control signals sent by logic array 1198A, and will provide the proper current drive power required to operate LED array 1188A. Dimmer 1208A transmits power to LED array 1188A by an electrical connection 1211A. Logic array 1198A is an arrangement of electronically controlled switches, but can be constructed from relays, diodes, transistors, and optical elements that outputs a signal when specified input conditions are met. Second LED lamp 1186B includes an LED array 1188B positioned in a translucent tube 1190B that is connected to a power supply comprising a source of VAC power 1192B electrically connected to a ballast 1194B, which is external to tube 1190B. An electrical connection 1196C connects ballast 1194B to an AC-DC power converter 1195B, which in turn provides DC power by way of electrical connection 1196D to a logic array 1198B, an occupancy motion sensor 1200B, a timer 1204B, and dimmer 1208B all positioned within tube 1190B, that is, LED lamp 1186B. Occupancy motion sensor 1200B sends signals to logic array 1198B by a signal path 1202B. Optional timer 1204B sends signals to logic array 1198B by signal path 1206B. Logic array 1198B sends activation signals to dimmer 1208B by electrical connection 12101B. Dimmer 1208B contains the electronics needed to decode the data control signals sent by logic array 1198B, and will provide the proper current drive power required to operate LED array 1188B. Dimmer 1208B transmits power to LED array 1188B by an electrical connection 1211B. Logic array 1198B is an arrangement of electronically controlled switches, but can be constructed from relays, diodes, transistors, and optical elements that outputs a signal when specified input conditions are met.

Logic arrays 1198A and 1198B are in network signal communication with sensors 1200A and 1200B, respectively, and ultimately with dimmers 1208A and 1208B, respectively. Sensor 1200A sends data output signals to logic array 1198A by signal path 1202A, and sensor 1200B sends data output signals to logic array 1198B by signal path 1202B. In response to the signals from sensor 1200A, logic array 1198A sends data out communication signals 1212 by wire signal path 1214X or alternative wireless signal path 1214Y as shown by dash line or by PLC signal path 1214Z, any one signal path by itself or in combination with any other input communication signal path to the data in 1216 of logic array 1198B. Simultaneously in response to the signals from sensor 1200B, logic array 1198B sends data out communication signals 1218 by wire signal path 1220X or alternative wireless signal path 1220Y as shown by dash line or by PLC signal path 1220Z, any one signal path by itself or in combination with any other input communication signal path to the data in 1222 of logic array 1198A.

Logic array 1198A and 1198B continuously process the sensor data signals from both sensors 1200A and 1200B received in accordance with a logic monitoring program and transmit resultant signals to dimmers 1208A and 1208B in accordance with the logic program, so as to control the current output of dimmers 1208A and 1208B, so as to prevent flickering of LED lamps 1186A and 1186B by 1) simultaneously signaling both dimmers 1208A and 1208B either to maintain full power and emit maximum light output, or 2) simultaneously signaling both dimmers 1208A and 1208B to reduce power by a preset amount and emit less than maximum light by a preset amount with the result that as a person walks about the combined illumination area of LED lamps 1186A and 1186B, both lamps emit the same illumination with the result that continuous flickering between the lamps caused by different power controls at dimmers 1208A and 1208B is avoided. In summary, the operational networking of LED lamp network 1186 creates a continuous identical illumination, so that flickering is prevented.

Four combinations of signals from both sensors 1200A and 1200B to logic arrays 1198A and 1198B are possible. The four combinations of sensor signals as received by logic arrays 1198A and 1198B, which are analogous to those shown in FIG. 76A, are as follows:

1. Sensor 1200A does detect motion and sensor 1200B also does detect motion wherein logic arrays 1198A and 1198B both send a logic signal (+) to both dimmers 1208A and 1208B to maintain full power to LED arrays 1188A and 1188B respectively.
2. Sensor 1200A does not detect motion and sensor 1200B does detect motion wherein logic array 1198A sends a logic signal (−) to dimmer 1208A to reduce full power to LED array 1188A, and logic array 1198B sends a logic signal (+) to dimmer 1208B to maintain full power to LED array 1188B.

3. Sensor 1200A does detect motion and sensor 1200B does not detect motion wherein logic array 1198A sends a logic signal (+) to dimmer 1208A to maintain full power to LED array 1188A, and logic array 1198B sends a logic signal (−) to dimmer 1208B to reduce full power to LED array 1188B.
4. Sensor 1200A does not detect motion and sensor 1200B does not detect motion wherein logic arrays 1198A and 1198B both send a logic signal (−) to both dimmers 1208A and 1208B to reduce full power to LED arrays 1188A and 1188B respectively in accordance with preset power reduction settings.

LED arrays 1188A and 1188B can each include either a plurality of LEDs or a single LED. The number of individual LEDs in each LED array 1188A and 1188B can differ. Likewise, dimmers 1208A and 1208B can represent a plurality of dimmers 1208A and 1208B, each controlling individual LED arrays 1188A and 1188B respectively.

Optional timer 1204A can be preset to self-activate in various modes. Timer 1204A can be preset to send a signal to logic array 1198A to reduce or increase power to dimmer 1208A to a preset amount at a preset time by sending a timer signal by signal path 1206A to logic array 1198A. For example, timer 1204A can be preset to activate a power reduction signal to logic array 1198A at 10 PM. Timer 1204A can also be preset to activate a normal power turn on signal to logic array 1198A at 8 AM. Likewise optional timer 1204B can be preset to self-activate in various modes. Timer 1204B can be preset to send a signal to logic array 1198B to reduce or increase power to dimmer 1208B to a preset amount at a preset time by sending a timer signal by signal path 1206B to logic array 1198B. For example, timer 1204B can be preset to activate a power reduction signal to logic array 1198B at 10 PM. Timer 1204B can also be preset to activate a normal power turn on signal to logic array 1198B at 8 AM.

It is possible to preset timers 1204A and 1204B at the same preset power reduction and normal power on modes and at the same preset time modes. It is also possible to preset timers 1204A and 1204B at different preset power reduction modes and different preset time modes. For example, timer 1204A could be set to send a 50 percent power reduction signal to logic array 1198A at 10 PM and set to send a full power on mode signal to logic array 1198A at 8 AM. At the same time, timer 1204B could be set to send a 50 percent power reduction signal to logic array 1198B at 8 PM and set to send a full power on mode signal to logic array 1198B at 7 AM.

FIG. 79A shows an electrical circuit 1256 for providing power to four LED arrays 1258 that is essentially the same as the electrical circuits shown in FIGS. 4, 14, 53, and 63 described hereinbefore. The circuit module shown is a by-pass or feed-thru circuit that simply passes the voltage to LED arrays 1258. The hardware for the by-pass or feed-thru circuit module can consist of straight electrical conductors or headers with jumpers installed. The combination of the by-pass or feed-thru circuit module and LED array 1258 represents the LED lamp. AC voltage inputs of 200-300 volts and 0-4 volts are typical outputs from a rapid start fluorescent ballast (not shown). But the input can be any AC voltage including 120 volts, 240 volts, or 277 volts as present in line power voltages. A voltage reducer or voltage suppressor 1262 is connected across the two input AC voltages. A reduced AC voltage is tied to a full bridge rectifier 1260 as a result of voltage suppressor 1262. Bridge rectifier 1260 and voltage suppressor 1262 represent the AC to DC power converters as described herein as 869, 891, 917, 947, 977, 1003, 1023, 1047, 1069, 1095A, 1095B, 1125A, 1125B, 1165A, 1165B, 1195A, and 1195B. The positive DC voltage output of bridge rectifier 1260 is connected to optional current limiting resistors R2, R3, R4, and R5. The other side of current limiting resistors R2, R3, R4, and R5 are connected to the anode side of first LEDs D1, D3, D5, and D7 respectively. The cathode side of first LEDs D1, D3, D5, and D7 are in turn connected to the anode side of second LEDs D2, D4, D6, and D8 respectively. The cathode side of second LEDs D2, D4, D6, and D8 are in turn connected to the anode side of third LEDs in series (not shown). The cathode side of the last LED in each LED string is in turn connected to the negative DC voltage or ground output of bridge rectifier 1260.

FIG. 79B shows an alternative electrical circuit 1264 for four parallel LED arrays 1266 analogous to that shown in FIG. 79A for providing power to a plurality of LEDs. The AC voltage inputs of 200-300 volts and 0-4 volts are typical outputs from a rapid start fluorescent ballast, but the input can be any AC voltage including 120 volts, 240 volts, or 277 volts as present in line power voltages. A capacitor 1268 is used to drop the line input voltage and a small resistor R1 is used to limit the inrush current to the circuit. A larger capacitor C will increase the current into the circuit and a smaller one will reduce it. Capacitor 1268 must be a non-polarized type with a voltage rating of 200 volts or more. The value of capacitor 1268 can range from 1 uF to 4 uF for adequate current to drive LED arrays 1266. A voltage absorber (ZNR), movistor (MOV), varistor (V), or transformer can be used to suppress or reduce the voltage on the other side of capacitor 1268 to within a lower workable AC voltage, and is interchangeable with voltage suppressor 1262 described in FIG. 79A. Since the capacitor 1268 must pass current in both directions, a diode and in particular, a zener diode Z is connected in parallel with voltage suppressor V to provide a path for the negative half cycle. The zener diode Z serves as a regulator and provides a path for the negative half cycle current when it conducts in the forward direction. A power rated diode or similar rectifier can be used in place of zener diode Z to produce similar results. A voltage suppressor V is connected across the two input AC voltages. The reduced AC voltage is tied to full bridge rectifier 1270. Bridge rectifier 1270 and voltage suppressor V represent the AC to DC power converters as described herein as 869, 891, 917, 947, 977, 1003, 1023, 1047, 1069, 1095A, 1095B, 1125A, 1125B, 1165A, 1165B, 1195A, and 1195B. The positive DC voltage output of bridge rectifier 1270 is connected to optional current limiting resistors R2, R3, R4, and R5. There can be more LED strings in parallel (not shown). The other side of current limiting resistors R2-R5 are each connected to the anode side of first LEDs D1, D3, D5, and D7 of LED arrays 1266, respectively. The cathode side of first LEDs D1, D3, D5, and D7 are connected to the anode side of second LEDs D2, D4, D6, and D8, of LED arrays 1266, respectively. The cathode side of second LEDs D2, D4, D6, and D8 are connected to the anode side of third LEDs in series (not shown). The cathode side of the last LED in each LED string is connected to the negative DC voltage or ground output of bridge rectifier 1270. An optional filter capacitor 1272 can be used in parallel with the LED strings across the DC voltage leads to absorb the surge that passes through the capacitor 1268. Most LEDs will operate more efficiently with filter capacitor 1272 installed.

It should be noted that even though one electronic component consisting of a capacitor, a voltage suppressor, a diode, a bridge rectifier, etc. is shown in either one or both FIGS. 79A and 79B, more than one electronic component of each type herein described can be used in the final design of the present LED lamp.

In addition, in standalone LED lamps of the present invention using computers, a self-contained program stored in the computer operates the current driver outputs of each dimmer controlling each LED array depending on the condition of the sensor and timer outputs. In the network systems of FIGS. 77 and 78A, there are shown three optional alternative methods of providing external data communications to the individual computers or logic arrays contained in each LED lamp of the present invention. An external and remote data control signal can be imposed on the power line to provide instructions to computer to operate the current driver outputs of dimmer to control the LED arrays. The data input can be connected to one of many varieties of external control consoles including a PC, wall mounted keypad, PDA, etc. An on-board computer constantly runs a monitoring program that looks at the PLC data input line or wireless data communications input line or direct hard-wired data line. Power to the LED array is normally on and will go off or dim to a certain intensity depending on the data input control instructions. The data input control instructions can tell the on-board computer to turn the LED arrays on or off or set the output of the LED arrays at various dimming levels as desired by the user.

It should be noted that a network of similarly configured plurality of LED lamps of the present invention as described in FIGS. 73 through 78A can be combined to form a complete intelligent system. Any one LED lamp can be set as a master and all other LED lamps in the network can be set up as slaves. For example, the sensor input of all LED lamps can be monitored as a whole and as long as one occupancy motion detector senses the presence of a person, all LED lamps will remain on. Only after all occupancy motion detectors acknowledge that no one is in the occupied space will all or some of the LED lamps go off or go dim to a certain preset level. The use of an on-board computer offers the flexibility to perform various operational tasks, although logic gate arrays will work as well.

FIGS. 80A, 80B, 80C, 80D, 81, 82, 83, 84, 85, and 86 show embodiments of the present invention that include at least one light level photosensor by itself or in combination with at least one occupancy sensor for increasing energy conservation and savings.

FIG. 80A shows an embodiment of the present invention. In particular shown is a schematic block diagram of an LED lamp 1274 that includes an LED array 1276 comprising a plurality of LEDs positioned in a translucent tube 1278. LED array 1276 is connected to a power supply comprising a source of VAC power 1280 electrically connected to a ballast 1282, which is external to tube 1278. An electrical connection 1284A positioned in tube 1278 is powered from ballast 1282 and transmits AC power to AC-DC power converter 1283, which in turn transmits DC power to an on-off switch 1286 also positioned in tube 1278 by way of electrical connection 1284B. A light level photosensor 1290 also positioned in tube 1278 transmits control signals to switch 1286 by way of signal line 1292. Electrical power is transmitted to photosensor 1290 also by electrical connection 1284B connected to AC-DC power converter 1283. Photosensor 1290 may be powered by AC or DC voltage depending on the model and type of design. For DC voltage power to photosensor 1290, an optional voltage regulator or DC-DC converter may be used. Photosensor control in response to the light level amounts of daylight around the illumination area of LED array 1276 are set at the place of manufacture or assembly in accordance with methods known in the art. Power from ballast 1282 can be either AC or DC voltage. In the case of DC power going into AC-DC power converter 1283, DC power will continue to be sent to on-off switch 1286 and photosensor 1290. Switch 1286 is electrically connected to LED array 1276 by electrical connection 1288. LED array 1276 contains the necessary electrical components to further reduce the power transmitted by switch 1286 by way of electrical connection 1288 to properly drive the plurality of LEDs in LED array 1276.

When photosensor 1290 detects a lower level of daylight around the illumination area of LED array 1276, an instant on-mode output signal is transmitted from photosensor 1290 to switch 1286, wherein power is transmitted through switch 1286 to LED array 1276. When photosensor 1290 detects a higher level of daylight around the illumination area of LED array 1276, a delayed off-mode signal is transmitted from photosensor 1290 to switch 1286, wherein switch 1286 is turned to the off-mode and power from ballast 1282 to AC-DC power converter 1283 through switch 1286 and to LED array 1276 is terminated. At such time when photosensor 1290 again detects a lower level of daylight around the illumination area of LED array 1276, an instant on-mode signal is again transmitted from photosensor 1290 to switch 1286, wherein switch 1286 is turned to the on-mode and power from ballast 1282 to AC-DC power converter 1283 through switch 1286 and to LED array 1276 is activated, so that LED array 1276 illuminates the area. The time delay designed into the off-mode prevents intermittent illumination cycling in the area around LED array 1276 and can be preset at the factory or can be set in the field. A delayed on-mode can also be set as well.

FIG. 80B shows another embodiment of the present invention. In particular, shown is a schematic block diagram of an LED lamp 1294 that includes an LED array 1296 comprising a plurality of LEDs positioned in a translucent tube 1298. LED array 1296 is connected to a power supply comprising a source of VAC power 1300 electrically connected to a ballast 1302, which is external to tube 1298. An electrical connection 1304A positioned in tube 1298 is powered from ballast 1302 and transmits AC power to AC-DC power converter 1303, which in turn transmits DC power to a computer or logic gate array 1306 by way of electrical connection 1304B and to dimmer 1310 by way of a similar electrical connection (not shown). Both computer or logic gate array 1306 and dimmer 1310 are also positioned in tube 1298. Computer or logic gate array 1306 has an input signal port and an output signal port. A light level photosensor 1314 also positioned in tube 1298, transmits control signals to computer or logic gate array 1306 by way of input control signal line 1316 to the input signal port of computer or logic gate array 1306. Electrical power is transmitted to photosensor 1314 also by electrical connection 1304B connected to AC-DC power converter 1303. Photosensor 1314 may be powered by AC or DC voltage depending on the model and type of design. For DC voltage power to photosensor 1314, an optional voltage regulator or DC-DC converter may be used. Photosensor control in response to the light level amounts of daylight around the illumination area of LED array 1296 are set at the place of manufacture or assembly in accordance with methods known in the art. Power from ballast 1302 can be either AC or DC voltage. In the case of DC power going into AC-DC power converter 1303, DC power will continue to be sent to computer or logic gate array 1306, photosensor 1314, and dimmer 1310. Computer or logic gate array 1306 is electrically and operatively connected by an electrical control connection 1308 to dimmer 1310. An electrical connection 1312 connects dimmer 1310 to LED array 1296. Dimmer 1310 will contain the necessary electronics needed to decode the data control signals sent by the output signal port of computer or logic gate array 1306, and will provide the proper current drive power required to operate LED array 1296. Single LED array 1296 controlled by dimmer 1310 can represent multiple LED arrays (not shown), each correspondingly controlled by one of a plurality of dimmers 1310 (not shown), wherein the plurality of dimmers 1310 are each independently controlled by computer or logic gate array 1306. A computer, when used, includes a microprocessor, a program installed therein, memory, input/output means, and addressing means.

When photosensor 1314 detects a lower level of daylight around the illumination area of LED array 1296, photosensor 1314 sends a signal to the signal input port of computer or logic gate array 1306 by way of signal line 1316, wherein computer or logic gate array 1306 then sends a signal from the signal output port to dimmer 1310 to provide full power to LED array 1296 for full illumination. When photosensor 1314 detects a higher level of daylight around the illumination area of LED array 1296 after a set time period, a photosensor signal to computer or logic gate array 1306 by way of signal line 1316 causes computer or logic gate array 1306 to send an output signal to dimmer 1310 to decrease the power to LED array 1296 by a preset amount, so that LED array 1296 reduces full illumination of the area, that is, illumination is continued, but reduced to a preset illumination output.

Photosensor 1314, computer or logic gate array 1306, and dimmer 1310 can be optionally organized into an integral circuit module. This system is used primarily for energy conservation and savings for residential, commercial, and industrial buildings and facilities. Photosensor 1314 can be one of many varieties of photosensors. Such sensors can include photodiodes, bipolar phototransistors, and the photoFET (photosensitive field-effect transistor). Light level photosensor 1314 gets its power from the main power supply VAC 1300 or internally from LED lamp 1294. On-board computer or logic gate array 1306 constantly runs a monitoring program that looks at the output of photosensor 1314. Power to LED array 1296 is normally on and will dim between a fully off zero percent to a preset intensity of less than 100 percent depending on the output of photosensor 1314. When photosensor 1314 detects a higher level of daylight within its operating range, it flags an input to computer or logic gate array 1306, which signals dimmer 1310 to dim the power to LED array 1296. LED array 1296 can be programmed to dim instantaneously or after some pre-programmed time delay.

FIG. 80C shows yet another embodiment of the present invention, in particular, shown as a schematic block diagram of an LED lamp 1318 that includes an LED array 1320 comprising a plurality of LEDs positioned in an elongated translucent tube 1322. LED array 1320 is connected to a power supply comprising a source of VAC power 1324 electrically connected to a ballast 1326, which is external to tube 1322. An electrical connection 1328A positioned in tube 1322 is powered from ballast 1326 and transmits AC power to AC-DC power converter 1327, which in turn transmits DC power to an on-off switch 1330 also positioned in tube 1322 by way of electrical connection 1328B. Power from ballast 1326 can be either AC or DC voltage. In the case of DC power going into AC-DC power converter 1327, DC power will continue to be sent to on-off switch 1330. Switch 1330 is electrically connected to LED array 1320 by electrical connection 1332. LED array 1320 contains the necessary electrical components to further reduce the power transmitted by switch 1330 by way of electrical connection 1332 to properly drive the plurality of LEDs in LED array 1320.

An external light level photosensor 1334 positioned external to LED lamp 1318 is operationally connected to on-off switch 1330 by any of three optional alternative signal paths 1336A, 1336B, or 1336C. Signal path 1336A is an electrical signal line wire extending directly from photosensor 1334 to switch 1330. Signal path 1336B is a wireless signal path shown in dash line extending directly to switch 1330. Signal path 1336C is a signal line wire that is connected to a PLC line 1338 that extends from VAC 1324 through tube 1322 to switch 1330. Switch 1330 also contains the necessary electronics to decode the data information imposed on PLC line 1338 via signal path 1336C. When photosensor 1334 detects a lower level of daylight around the illumination area of LED array 1320, photosensor 1334 sends a signal to switch 1330 by way of signal path 1336A or signal path 1336B or signal path 1336C, whatever the case may be, wherein switch 1330 is activated from the off-mode to the on-mode, so that power is transmitted through switch 1330 to LED array 1320 and LED array 1320 illuminates the area. At such time photosensor 1334 detects a higher level of daylight around the illumination area of LED array 1320, photosensor 1334 sends a signal to switch 1330, wherein switch 1330 is activated from the on-mode to the off-mode, so that power to LED array 1320 is terminated and LED array 1320 no longer illuminates the area.

FIG. 80D shows as a schematic block diagram of an LED lamp 1340 that includes an LED array 1342 comprising a plurality of LEDs positioned in a translucent tube 1344. LED array 1342 is connected to a power supply comprising a source of VAC power 1346 electrically connected to a ballast 1348, which is external to tube 1344. An electrical connection 1350A positioned in tube 1344 is powered from ballast 1348 and transmits AC power to an AC-DC power converter 1349, which in turn transmits DC power to a computer or logic gate array 1352 by way of electrical connection 1350B and to a current driver dimmer 1356 by way of a similar electrical connection (not shown). Both computer or logic gate array 1352 and dimmer 1356 are also positioned in tube 1344. Power from ballast 1348 can be either AC or DC voltage. In the case of DC power going into AC-DC power converter 1349, DC power will continue to be sent to computer or logic gate array 1352 and dimmer 1356. Computer or logic gate array 1352 is electrically and operatively connected by an electrical control connection 1354 to dimmer 1356. An electrical connection 1358 connects dimmer 1356 to LED array 1342. Dimmer 1356 will contain the necessary electronics needed to decode the data control signals sent by computer or logic gate array 1352, and will provide the proper current drive power required to operate LED array 1342. A single LED array 1342 controlled by dimmer 1356 can represent multiple LED arrays (not shown), each correspondingly controlled by one of a plurality of dimmers (not shown), wherein the plurality of dimmers are each independently controlled by computer or logic gate array 1352. A computer, when used, includes a microprocessor, a program installed therein, memory, input/output means, and addressing means.

As shown in FIG. 80D, a light level photosensor 1360 positioned external to LED lamp 1340 is operationally connected to computer or logic gate array 1352 by any of three optional alternative signal paths 1362A, 1362B, or 1362C. Signal path 1362A is an electrical signal line wire extending directly from photosensor 1360 to computer or logic gate array 1352. Signal path 1362B is a wireless signal path shown in dash line extending directly to computer or logic gate array 1352. Signal path 1362C is a signal line wire that is connected to a PLC line 1364 that extends from VAC 1346 through tube 1344 to computer or logic gate array 1352. Computer or logic gate array 1352 also contains the necessary electronics to decode the data information imposed on PLC line 1364 via signal path 1362C.

When photosensor 1360 detects a higher level of daylight after a preset time period around the illumination area of LED array 1342, photosensor 1360 sends a signal to the input port of computer or logic gate array 1352 by way of signal path 1362A, signal path 1362B, or signal path 1362C, whichever the case may be. Computer or logic gate array 1352 is activated to send or to continue to send a signal from the output port of computer or logic gate array 1352 by electrical line 1354 to dimmer 1356, so that reduced power is transmitted through electrical line 1358 to LED array 1342 by a preset amount, and LED array 1342 reduces illumination from the prior full illumination of the area to a reduced lower illumination output level preset in dimmer 1356, or computer or logic gate array 1352, thus accomplishing a power savings.

When photosensor 1360 detects a lower level of daylight present around the illumination area of LED array 1342, photosensor 1360 sends a signal to the input port of computer or logic gate array 1352 by way of one of signal paths 1362A, 1362B, or 1362C, whichever the case might be. Computer or logic gate array 1352 then sends or continues to send a signal from the signal output port to dimmer 1356 by electrical line 1354, wherein dimmer 1356 increases power being sent by electrical line 1358 to LED array 1342, and LED array 1342 increases to full illumination by an output level preset in dimmer 1356, or computer or logic gate array 1352.

FIG. 81 shows another embodiment of the present invention. In particular, shown is a schematic block diagram of an LED lamp 1366 that includes an LED array 1368 comprising a plurality of LEDs positioned in a translucent tube 1370. LED array 1368 is connected to a power supply comprising a source of VAC power 1372 electrically connected to a ballast 1374, which is external to tube 1370. An electrical connection 1376A positioned in tube 1370 is powered from ballast 1374 and transmits AC or DC power to AC-DC power converter 1378, which in turn transmits DC power to an on-off switch 1380 also positioned in tube 1370 by way of electrical connection 1376B. Power is sent from power on-off switch 1380 to LED array 1368 by electrical connection 1382. A light level photosensor 1384 and an occupancy sensor 1386 are also positioned in tube 1370. Photosensor 1384 can include photodiodes, bipolar phototransistors, and the photoFET (photosensitive field-effect transistor). Occupancy sensor 1386 can be an infrared temperature occupancy sensor, an ultrasonic motion occupancy sensor, or a hybrid of both types being known in the art. Both photosensor 1384 and occupancy sensor 1386 transmit control signals to power switch 1380 by way of a signal line 1388. Electrical power is transmitted to photosensor 1384 and occupancy sensor 1386 by electrical connection 1390 connected to AC-DC power converter 1378. Photosensor 1384 and occupancy sensor 1386 can be powered by AC or DC voltage depending on the model and type of design. For DC voltage power to photosensor 1384 and occupancy sensor 1386, an optional voltage regulator or DC-DC converter may be used. Light level photosensor 1384 controls are set at the place of manufacture or assembly in response to the light level of daylight present around the illumination area of LED array 1368 in accordance with methods known in the art. Power from ballast 1374 can be either AC or DC voltage. In the case of DC power going into AC-DC power converter 1378, DC power will continue to be sent to on-off power switch 1380, photosensor 1384, and occupancy sensor 1386. LED array 1368 contains the necessary electrical components to further reduce or increase the power transmitted by power switch 1380 by way of electrical connection 1382 to properly drive the plurality of LEDs in LED array 1368.

When photosensor 1384 detects a lower light level of daylight present around the illumination area of LED array 1368 and occupancy sensor 1386 detects a person in the illumination area of LED array 1368, an instant on-mode output signal is transmitted from photosensor 1384 and occupancy sensor 1386 to power switch 1380, wherein power is transmitted through power switch 1380 to LED array 1368 for full illumination. When photosensor 1384 detects a higher light level of daylight present around the illumination area of LED array 1368 and occupancy sensor 1386 ceases to detect movement or the presence of a person, a delayed off-mode signal is transmitted from photosensor 1384 and occupancy sensor 1386 to power switch 1380, wherein power switch 1380 is turned to the off-mode, and power from ballast 1374 to AC-DC power converter 1378 through power switch 1380 and to LED array 1368 is terminated. At such time photosensor 1384 again senses a lower light level of daylight present around the illumination area of LED array 1368 and occupancy sensor 1386 detects the presence of a person, an instant on-mode signal is transmitted from photosensor 1384 and occupancy sensor 1386 to power switch 1380, wherein power switch 1380 is turned to the on-mode and power from ballast 1374 to AC-DC power converter 1378 through power switch 1380 and to LED array 1368 is activated, so that LED array 1368 illuminates the area. A time delay designed into the on-mode and off-mode that prevents intermittent illumination cycling in the area around LED array 1368 can be preset at the factory or can be set in the field.

FIG. 82 shows another embodiment of the present invention and is analogous to FIG. 80B, but is now shown with at least two sensors. In particular, shown is a schematic block diagram of an LED lamp 1392 that includes an LED array 1394 comprising a plurality of LEDs positioned in a translucent tube 1396. LED array 1394 is connected to a power supply comprising a source of VAC power 1398 electrically connected to a ballast 1400, which is external to tube 1396. An electrical connection 1402A positioned in tube 1396 is powered from ballast 1400 and transmits AC power to AC-DC power converter 1404, which in turn transmits DC power to a computer or logic gate array 1406 by way of electrical connection 1402B and to a current driver dimmer 1408 by way of an electrical connection (not shown). Both computer or logic gate array 1406 and dimmer 1408 are also positioned in tube 1396. Computer or logic gate array 1406 has an input signal port and an output signal port (not shown). A light level photosensor 1410 and an occupancy sensor 1412 are also positioned in tube 1396. Occupancy sensor 1412 can be an infrared temperature occupancy sensor, or an ultrasonic motion occupancy sensor, or a hybrid of both types being known in the art. Dimmer 1408 is electrically connected to computer or logic gate array 1406 by electrical connection 1414, and LED array 1394 is electrically connected to dimmer 1408 by electrical connection 1416.

Both photosensor 1410 and occupancy sensor 1412 transmit control signals to computer or logic gate array 1406 by way of input control signal line 1418 to the input signal port of computer or logic gate array 1406. Electrical power is transmitted to photosensor 1410 and occupancy sensor 1412 by electrical connection 1402C connected to AC-DC power converter 1404. Photosensor 1410 and occupancy sensor 1412 may be powered by AC or DC voltage depending on the model and type of design. For DC voltage power to photosensor 1410 and occupancy sensor 1412, an optional voltage regulator or DC-DC converter may be used. Occupancy sensor controls responding to the movement or presence of a person and photosensor controls responding to the light level of daylight present around the illumination area of LED array 1394 are set at the place of manufacture or assembly in accordance with methods known in the art. Power from ballast 1400 can be either AC or DC voltage. In the case of DC power going into AC-DC power converter 1404, DC power will continue to be sent to computer or logic gate array 1406, photosensor 1410, occupancy sensor 1412, and dimmer 1408. Dimmer 1408 will contain the necessary electronics needed to decode the control signals sent by the output signal port of computer or logic gate array 1406, and will provide the proper current drive power required to operate LED array 1394. Single LED array 1394 controlled by dimmer 1408 can represent multiple LED arrays 1394A each correspondingly controlled by one of a plurality of dimmers 1408A and each independently controlled by computer or logic gate array 1406. A computer, when used, includes a microprocessor, a program installed therein, memory, input/output means, and addressing means.

When photosensor 1410 detects a lower light level of daylight around the illumination area of LED array 1394 and occupancy sensor 1412 detects motion or the presence of a person, photosensor 1410 and occupancy sensor 1412 send a signal to the signal input port of computer or logic gate array 1406 by way of a signal line 1418, wherein computer or logic gate array 1406 then sends a signal from the signal output port to dimmer 1408 by control line electrical connection 1414 to provide full power to LED array 1394 for full illumination. When photosensor 1410 detects a higher light level of daylight present around the illumination area of LED array 1394 after a set time period and occupancy sensor 1412 does not detect motion or the presence of a person in the illumination area of LED array 1394 after a set time period, a sensor signal to computer or logic gate array 1406 by way of signal line 1418 activates computer or logic gate array 1406 to send an output signal to dimmer 1408 to decrease the power to LED array 1394 by a preset amount, so that LED array 1394 decreases illumination of the area. When either of the opposite situations occur relative to the increase of light level of daylight or the lack of motion or presence of a person around the illumination area of LED array 1394, light level photosensor 1410 and occupancy sensor 1412 signal dimmer 1408 to reduce the light from LED array 1394 to a preset illumination output.

Photosensor 1410, occupancy sensor 1412, computer or logic gate array 1406, and dimmer 1408 can be optionally organized into an integral circuit module. This system is used primarily for energy conservation and savings for residential, commercial, and industrial buildings and facilities. Photosensor 1410 can be one of many varieties of light level detecting photosensors, and occupancy sensor 1412 can be one of many varieties of space occupancy sensors. Light level photosensor 1410 and occupancy sensor 1412 can get their power from the main power supply VAC 1398 or internally from LED lamp 1392. An optional command system for the on-board computer when used, could constantly runs a monitoring program that looks at the output of light level photosensor 1410 and occupancy sensor 1412. Both photosensor 1410 and occupancy sensor 1412 would have the same activation output in order to trigger computer or logic gate array 1406 to command dimmer 1408 to turn on LED array 1394. Likewise, both photosensor 1410 and occupancy sensor 1412 would have the same deactivation output in order to trigger computer or logic gate array 1406 to command dimmer 1408 to turn off or to dim LED array 1394. The latter would occur when photosensor 1410 detects a higher light level of daylight present and occupancy sensor 1412 does not detect motion or a person in the area. In certain instances, LED array 1394 will remain off or at a preset dimmed light level to best conserve energy. Power to LED array 1394 is normally on and will dim between a fully off zero percent to a preset intensity of less than 100 percent depending on the output of light level photosensor 1410 and occupancy sensor 1412. When light level photosensor 1410 detects a higher light level of daylight present within its operating range and occupancy sensor 1412 no longer detects the motion or presence of a person, such sensors activate an input to computer or logic gate array 1406, which signals dimmer 1408 to dim the power to LED array 1394. LED array 1394 can be programmed to dim instantaneously or after some pre-programmed time delay.

FIG. 83 shows another embodiment of the present invention that includes a schematic block diagram of an LED lamp 1420 that includes an LED array 1422 comprising a plurality of LEDs positioned in an elongated translucent tube 1424. LED array 1422 is connected to a power supply comprising a source of VAC power 1426 electrically connected to a ballast 1428, which is external to tube 1424. An electrical connection 1430A positioned in tube 1424 is powered from ballast 1428 and transmits AC power to AC-DC power converter 1432, which in turn transmits DC power to an on-off switch 1434 also positioned in tube 1424 by way of electrical connection 1430B. Power from ballast 1428 can be either AC or DC voltage. In the case of DC power going into AC-DC power converter 1432, DC power will continue to be sent to on-off switch 1434. Switch 1434 is electrically connected to LED array 1422 by electrical connection 1436. LED array 1422 contains the necessary electrical components to further reduce the power transmitted by switch 1434 by way of electrical connection 1436 to properly drive the plurality of LEDs in LED array 1422.

A light level photosensor 1438 and an occupancy sensor 1440 are both positioned external to LED lamp 1420, and are operationally connected to on-off switch 1434 by any of three optional alternative signal paths 1442A, 1442B, or 1442C. Signal path 1442A is an electrical signal line wire extending directly from photosensor 1438 and occupancy sensor 1440 to switch 1434. Signal path 1442B is a wireless signal path shown in dash line extending directly to switch 1434 from photosensor 1438 and occupancy sensor 1440. A PLC line 1444 extends from VAC 1426 through tube 1424 to switch 1434 by way of signal path 1442C. Signal path 1442C is a PLC electrical signal line extending from photosensor 1438 and occupancy sensor 1440 to switch 1434. Switch 1434 also contains the necessary electronics to decode the data information imposed on PLC line 1444 via signal path 1442C.

When photosensor 1438 detects a lower light level of daylight present around the illumination area of LED array 1422 and occupancy sensor 1440 detects motion or a person in the area of LED array 1422, photosensor 1438 and occupancy sensor 1440, send a signal to switch 1434 by way of signal path 1442A or signal path 1442B or signal path 1442C, whatever the case may be, whereby switch 1434 is activated from the off-mode to the on-mode, so that power is transmitted through switch 1434 to LED array 1422 and illuminates the area. At such time when either photosensor 1438 detects a higher light level of daylight present around the illumination area of LED array 1422 and occupancy sensor 1440 no longer detects motion or a person, photosensor 1438 and occupancy sensor 1440 both send a signal to switch 1434, wherein switch 1434 is activated from the on-mode to a delayed off-mode, so that power to LED array 1422 is terminated, and LED array 1422 no longer illuminates the area.

FIG. 84 shows another embodiment of the present invention and is analogous to FIG. 80D, but is now shown with at least two sensors and in particular, shown as a schematic block diagram of an LED lamp 1446 that includes an LED array 1448 comprising a plurality of LEDs positioned in a translucent tube 1450. LED array 1448 is connected to a power supply comprising a source of VAC power 1452 electrically connected to a ballast 1454, which is external to tube

1450. An electrical connection 1456A positioned in tube 1450 is powered from ballast 1454 and transmits AC power to an AC-DC power converter 1458, which in turn transmits DC power to a computer or logic gate array 1460 by way of an electrical connection 1456B and to a current driver dimmer 1462 by way of a similar electrical connection (not shown). Both computer or logic gate array 1460 and dimmer 1462 are also positioned in tube 1450. Power from ballast 1454 can be either AC or DC voltage. In the case of DC power going into AC-DC power converter 1458, DC power will continue to be sent to computer or logic gate array 1460 and dimmer 1462. An electrical connection 1466 connects dimmer 1462 to LED array 1448. Dimmer 1462 will contain the necessary electronics needed to decode the data control signals sent by computer or logic gate array 1460, and will provide the proper current drive power required to operate LED array 1448. Single LED array 1448 controlled by dimmer 1462 can represent multiple LED arrays 1448A each correspondingly controlled by one of a plurality of dimmers 1462A, wherein the plurality of dimmers 1462A are each independently controlled by computer or logic gate array 1460. A computer, when used, includes a microprocessor, a program installed therein, memory, input/output means, and addressing means.

A light level photosensor 1468 and an occupancy sensor 1470 are both positioned external to LED lamp 1446, and are operationally connected to computer or logic gate array 1460 by any of three optional alternative signal paths 1472A, 1472B, or 1472C. Signal path 1472A is an electrical signal line wire extending directly from photosensor 1468 and occupancy sensor 1470 to computer or logic gate array 1460. Signal path 1472B is a wireless signal path shown in dash line extending directly to computer or logic gate array 1460. Signal path 1472C is a signal line wire that is connected to a PLC line 1474 that extends from VAC 1452 through tube 1450 to computer or logic gate array 1460. Computer or logic gate array 1460 also contains the necessary electronics to decode the data information imposed on PLC line 1474 via signal path 1472C.

When photosensor 1468 detects a lower light level of daylight present around the illumination area of LED array 1448 and occupancy sensor 1470 detects the presence of a person, photosensor 1468 and occupancy sensor 1470 send a signal to the input port of computer or logic gate array 1460 by way of signal path 1472A, or signal path 1472B, or signal path 1472C, whichever the case might be. Computer or logic gate array 1460 is activated to send or to continue to send a signal from the output port of computer or logic gate array 1460 by electrical line 1464 to dimmer 1462, so that full power is transmitted through electrical line 1466 to LED array 1448, wherein LED array 1448 provides full illumination of the area.

When photosensor 1468 detects a higher level of daylight present after a preset time period around the illumination area of LED array 1448 and occupancy sensor 1470 ceases to detect the presence of a person, photosensor 1468 and occupancy sensor 1470 send a signal to the signal input port of computer or logic gate array 1460 by way of one of signal paths 1472A, 1472B, or 1472C, whichever the case might be, whereby computer or logic gate array 1460 sends a signal from the signal output port to dimmer 1462 by electrical line 1464, wherein dimmer 1462 reduces power being sent by electrical line 1466 to LED array 1448 by a preset amount, so that LED array 1448 reduces full illumination of the area, that is, illumination is either reduced to a lower illumination output level as preset in dimmer 1462, or computer or logic gate array 1460, and illumination is terminated.

FIG. 85 is a logic diagram 1476 related to the schematic block diagram shown in FIG. 84 that sets forth the four operational possibilities between the two types of sensors indicated as light level photosensor 1478 and occupancy sensor 1480. In FIG. 84, and similarly for FIGS. 82 and 83 that show both a photosensor and an occupancy sensor, four combinations of signals from photosensor 1478 and occupancy sensor 1480 provide data to a computer or logic gate array 1482 as follows:

1. When a LOW light level of daylight is detected by photosensor 1478, a positive YES signal is transmitted to computer or logic gate array 1482 by any of the signal paths 1472A, 1472B, or 1472C as shown in FIG. 84; and when motion or the presence of a person ON is detected by occupancy sensor 1480, a positive YES signal is sent to computer or logic gate array 1482 by any of the signal paths 1472A, 1472B, or 1472C.
2. When a HIGH light level of daylight is detected by photosensor 1478, a negative NO signal is transmitted to computer or logic gate array 1482 by any of signal paths such as signal paths 1472A, 1472B, or 1472C shown in FIG. 84; and when motion or the presence of a person ON is detected by occupancy sensor 1480, a positive YES signal is sent to computer or logic gate array 1482 by any of the signal paths 1472A, 1472B, or 1472C.
3. When a LOW light level of daylight is detected by photosensor 1478, a positive YES signal is transmitted to computer or logic gate array 1482 by any of the signal paths 1472A, 1472B, or 1472C; and when no motion or no presence of a person indicated by OFF is detected by occupancy sensor 1480, a negative NO signal is sent to computer or logic gate array 1482 by any of the signal paths 1472A, 1472B, or 1472C.
4. When a HIGH light level of daylight is detected by photosensor 1478, a negative NO signal is transmitted to computer or logic gate array 1482 by any of the signal paths 1472A, 1472B, or 1472C; and when no motion or no presence of a person indicated by OFF is detected by occupancy sensor 1480, a negative NO signal is sent to computer or logic gate array 1482 by any of the signal paths 1472A, 1472B, or 1472C.

Computer or logic gate array 1482 is programmed to send control signals to dimmer 1484 as a result of the received sensor signals. A signal to increase current output from dimmer 1484 to the LED array (not shown) is indicated by a plus sign (+). A signal to decrease current output from dimmer 1484 to the LED array is indicated by a minus sign (−).

The net results of the above four combinations of sensor signals as received by computer or logic gate array 1482 as shown in FIG. 85 are as follows for maximum energy savings:

1. Photosensor 1478 detects a LOW light level of daylight present and occupancy sensor 1480 detects motion or the presence of a person, whereby computer or logic gate array 1482 sends a signal (+) to dimmer 1484 to increase current output to the LED array from OFF to a HIGH dimmer level setting up to a full power ON.
2. Photosensor 1478 detects a HIGH light level of daylight present and occupancy sensor 1480 detects motion or the presence of a person, whereby computer or logic gate array 1482 sends a signal (+) to dimmer 1484 to increase current output to the LED array from OFF to a LOW dimmer level setting.
3. Photosensor 1478 detects a LOW light level of daylight present and occupancy sensor 1480 detects no motion or no presence of a person, whereby computer or logic gate array 1482 sends a signal (−) to dimmer 1484 to decrease current output to the LED array from ON to a LOW dimmer level setting down to a full power OFF.

4. Photosensor 1478 detects a HIGH light level of daylight present and occupancy sensor 1480 detects no motion or no presence of a person, whereby computer or logic gate array 1482 sends a signal (−) to dimmer 1484 to decrease current output to the LED array from ON to a LOW dimmer level setting down to a full power OFF.

FIG. 86 shows another embodiment of the present invention in particular a schematic block diagram of a network 1486 of two LED lamps including first and second LED lamps, namely, LED lamp 1488A and LED lamp 1488B, respectively, in general proximity.

LED lamp 1488A includes an LED array 1490A positioned in a translucent tube 1492A that is connected to a power supply comprising a source of VAC power 1494A electrically connected to a ballast 1496A, which is external to tube 1492A. An electrical connection 1498A connects ballast 1496A to an AC-DC power converter 1500A, which in turn provides DC power by way of electrical connection 1498B to a computer or logic gate array 1502A. An occupancy sensor 1504A, a light level photosensor 1506A, and a dimmer 1508A are all positioned within tube 1492A, that is, LED lamp 1488A. Computer or logic gate array 1502A send programmed activation signals to a current driver dimmer 1508A by electrical connection 1510A. An electrical connection 1510A provides data control signals from computer or logic gate array 1502A to dimmer 1508A, and an electrical connection 1512A provides power from dimmer 1508A to LED array 1490A. An optional timer (not shown) can also be used in LED lamp 1488A as previously shown in FIGS. 77 and 78A. Occupancy sensor 1504A sends signals to computer or logic gate array 1502A by a signal path 1514A. Photosensor 1506A sends signals to computer or logic gate array 1502A by signal path 1516A.

Dimmer 1508A contains the electronics needed to decode the data control signals sent by computer or logic gate array 1502A, and will provide the proper current drive power required to operate LED array 1490A. A computer, when used, includes a microprocessor, a program installed therein, memory, input/output means, and addressing means.

LED lamp 1488B includes an LED array 1490B positioned in a translucent tube 1492B that is connected to a power supply comprising a source of VAC power 1494B electrically connected to a ballast 1496B, which is external to tube 1492B. An electrical connection 1498C connects ballast 1496B to an AC-DC power converter 1500B, which in turn provides DC power by way of electrical connection 1498D to a computer or logic gate array 1502B. An occupancy sensor 1504B, a light level photosensor 1506B, and a current driver dimmer 1508B are all positioned within tube 1492B, that is, LED lamp 1488B. Computer or logic gate array 1502B sends programmed activation signals to dimmer 1508B by electrical connection 1510B. An electrical connection 1510B provides data control signals from computer or logic gate array 1502B to dimmer 1508B, and an electrical connection 1512B provides power from dimmer 1508B to LED array 1490B. An optional timer (not shown) can also be used in LED lamp 1488B as previously shown in FIGS. 77 and 78A. Occupancy sensor 1504B sends signals to computer or logic gate array 1502B by a signal path 1514B. Photosensor 1506B sends signals to computer or logic gate array 1502B by signal path 1516B.

Dimmer 1508B contains the electronics needed to decode the data control signals sent by computer or logic gate array 1502B, and will provide the proper current drive power required to operate LED array 1490B. A computer, when used, includes a microprocessor, a program installed therein, memory, input/output means, and addressing means.

Computers or logic gate arrays 1502A and 1502B are in network signal communication with occupancy sensors 1504A and 1504B, respectively and also with photosensors 1506A and 1506B, respectively, and ultimately with dimmers 1508A and 1508B, respectively.

In programmed response to the signals from occupancy sensor 1504A and photosensor 1506A, computer or logic gate array 1502A sends data out communication signals 1518 by wire signal path 1520A, or alternative wireless signal path 1520B as shown by dash line, or by PLC signal path 1520C. Any one signal path by itself or in combination with any other input communication signal path to data in communication signals 1522 are directed to computer or logic gate array 1502B.

In programmed response to the signals from occupancy sensor 1504B and photosensor 1506B, computer or logic gate array 1502B send data out communication signals 1524 by wire signal path 1526A, or alternative wireless signal path 1526B as shown by dash line, or by PLC signal path 1526C. Any one signal path by itself or in combination with any other input communication signal path to data in communication signals 1528 are directed to computer or logic gate array 1502A.

Computers or logic gate arrays 1502A and 1502B continuously process the sensor data signals from occupancy sensors 1504A and 1504B, and photosensors 1506A and 1506B received in accordance with a monitoring program and transmit resultant control signals to dimmers 1508A and 1508B in accordance with a program, so as to control the current output of dimmers 1508A and 1508B, and to prevent flickering of LED lamps 1488A and 1488B by 1) simultaneously signaling both dimmers 1508A and 1508B either to maintain full power and emit maximum light output, or 2) simultaneously signaling both dimmers 1508A and 1508B to reduce power by a preset amount and emit less than maximum light from LED arrays 1490A and 1490B by a preset amount with the result that as a person walks about the combined illumination area, and if there is a change in light levels of daylight present in the illumination areas of LED lamps 1488A and 1488B, both lamps emit the same illumination with the result that continuous flickering between the lamps caused by different power controls at dimmers 1508A and 1508B is avoided. In summary, the operational networking of LED lamp network 1486 creates a continuous identical illumination without flicker.

As an alternative, depending on the amount of ambient light or daylight present around the illumination areas of LED lamps 1488A and 1488B, and as detected by photosensors 1506A or 1506B, the two lamps may emit different levels of illumination, but with the same result also that continuous flickering between both lamps is avoided.

LED arrays 1490A and 1490B can each include either a plurality of LEDs or a single LED. The number of individual LEDs in each LED array 1490A and 1490B can differ. Likewise, dimmers 1508A and 1508B can represent a plurality of dimmers.

Photosensor 1384 can include, for example, photodiodes, bipolar phototransistors, and the photoFET (photosensitive field-effect transistor).

Occupancy sensors can include, for example, optical incremental encoders, interrupters, photo-reflective sensors, proximity and Hall Effect sensors, laser interferometers, triangulation sensors, magnetostrictive sensors, infrared temperature sensors, ultrasonic sensors, hybrid infrared and ultrasonic type sensors, cable extension sensors, LVDT sensors, and tachometer sensors.

Other embodiments or modifications may be suggested to those having the benefit of the teachings therein, and such other embodiments or modifications are intended to be reserved especially as they fall within the scope and spirit of the subjoined claims.

What is claimed is:

1. A light emitting diode (LED) lamp for mounting to an existing fixture for a fluorescent lamp having a ballast assembly including ballast opposed electrical contacts, comprising:

a tube having tube ends, at least one LED positioned within said tube between said tube ends, electrical circuit means for providing electrical power from the ballast assembly to said at least one LED, means for electrically connecting said electrical circuit means with the ballast opposed electrical contacts, said electrical circuit means including an LED electrical circuit including at least one electrical string positioned within said tube and generally extending between said tube ends, said at least one LED being in electrical connection with said at least one electrical string, said at least one LED being positioned to emit light through said tube, means for supporting and holding said at least one LED and said LED electrical circuit, means for controlling the delivery of said electrical power to said at least one LED, means for detecting the level of daylight around the illumination area of said at least one LED, a signal relating to the detected level of daylight emanating from said means for detecting, means for transmitting said signal to said means for controlling, and a voltage surge suppressor device that both reduces excess voltage from the ballast assembly during the start-up mode of the electrical system and suppresses transient voltage surge during the operating mode of the electrical system.

2. The LED lamp in accordance with claim 1, wherein said means for controlling includes an on-off switch positioned in said LED lamp on said electrical circuit in operative association with said at least one LED, said switch being operable between an on mode wherein electrical power is delivered to said at least one LED in accordance with said signal, and an off mode wherein said electrical power is not delivered to said at least one LED in accordance with said signal.

3. The LED lamp in accordance with claim 2, wherein said means for detecting is at least one photosensor in operative signal association with said switch, wherein said at least one photosensor sends a signal to said switch to operate said switch to a closed mode when a lower level of daylight is detected around the illumination area of said at least one LED, wherein power is transmitted to said at least one LED to illuminate, and further wherein said at least one photosensor sends a signal to said switch to operate said switch to an open mode when a higher level of daylight is detected around the illumination area of said at least one LED, and wherein power is not transmitted to said at least one LED and illumination ceases.

4. The LED lamp in accordance with claim 3, wherein said means for transmitting to said signal to said means for controlling includes a signal path comprising a signal line connection from said at least one photosensor to said switch.

5. The LED lamp in accordance with claim 3, wherein said means for transmitting to said signal to said means for controlling includes a signal path comprising a wireless signal from said at least one photosensor to said switch.

6. The LED lamp in accordance with claim 3, further including an external source of AC power and a PLC line connecting said source of AC power with said switch, and wherein said means for transmitting to said signal to said means for controlling includes a signal path comprising a signal line path connected to said PLC line from said at least one photosensor to said switch.

7. The LED lamp in accordance with claim 3, wherein said at least one photosensor is positioned within said LED lamp.

8. The LED lamp in accordance with claim 3, wherein said at least one photosensor is positioned external to said LED lamp.

9. The LED lamp in accordance with claim 3, further including at least one occupancy sensor in operative signal association with said switch, wherein said at least one occupancy sensor sends a signal to said switch to operate said switch to a closed mode when a person is detected around the illumination area of said at least one LED, wherein power is transmitted to said at least one LED to illuminate, and further wherein said at least one occupancy sensor sends a signal to said switch to operate said switch to an open mode when a person is not detected around the illumination area of said at least one LED, wherein power is not transmitted to said at least one LED and illumination from said at least one LED ceases.

10. The LED lamp in accordance with claim 9, wherein said at least one occupancy sensor is positioned internal to said LED lamp.

11. The LED lamp in accordance with claim 9, wherein said at least one occupancy sensor is positioned external to said LED lamp.

12. The LED lamp in accordance with claim 9, wherein said means for transmitting said signal to said means for controlling includes a signal path from said at least one occupancy sensor to said switch.

13. The LED lamp in accordance with claim 12, wherein said signal path from said at least one occupancy sensor comprises a control signal line connection to said switch.

14. The LED lamp in accordance with claim 12, wherein said signal path from said at least one occupancy sensor comprises a wireless signal to said switch.

15. The LED lamp in accordance with claim 12, further including an external source of AC power and a PLC line connecting said source of AC power with said switch, and wherein said signal path from said occupancy sensor comprises a signal line wire connected to said PLC line to said switch.

16. The LED lamp in accordance with claim 1, wherein said means for controlling includes at least one current driver dimmer positioned in said LED lamp and in operative signal and power association with said at least one LED, said at least one dimmer being for regulating the amount of power provided by said electrical power to said at least one LED.

17. The LED lamp in accordance with claim 16, wherein said means for controlling further includes a computer positioned in said lamp in operative power and signal association with said at least one dimmer, wherein said computer includes computer controls for signaling said at least one dimmer to regulate the degree of power input to said at least one LED to control the degree of illumination by said at least one LED, said means for transmitting said signal to said means for controlling relating to the detected level of daylight from said means for detecting being directed to said computer.

18. The LED lamp in accordance with claim 17, further including at least one photosensor in operative signal association with said computer, wherein said at least one photosensor sends a signal to said computer to operate said computer depending on the level of daylight present around the illumination area of said at least one LED, to regulate power transmitted from said at least one dimmer to said at least one LED.

19. The LED lamp in accordance with claim 18, wherein said means for transmitting said signal to said means for controlling includes a signal path comprising a signal line connection from said at least one photosensor to said computer.

20. The LED lamp in accordance with claim 18, wherein said means for transmitting said signal to said means for controlling includes a signal path from said at least one photosensor comprising a wireless signal to said computer.

21. The LED lamp in accordance with claim 18, further including an external source of AC power and a PLC line connecting said source of AC power with said computer, and wherein said means for transmitting said signal to said means for controlling includes a signal path comprising a signal line path from said at least one photosensor connected to said PLC line to said computer.

22. The LED lamp in accordance with claim 17, further including at least one occupancy sensor in operative signal association with said computer, wherein said at least one occupancy sensor sends a signal to said computer to operate said computer depending on the presence or lack of presence of a person around the illumination area of said at least one LED, to regulate power transmitted from said at least one dimmer to said at least one LED.

23. The LED lamp in accordance with claim 22, wherein said means for transmitting said signal to said means for controlling includes a signal path from said at least one occupancy sensor comprising a signal line connection to said computer.

24. The LED lamp in accordance with claim 22, wherein said means for transmitting said signal to said means for controlling includes a signal path from said at least one occupancy sensor comprising a wireless signal to said computer.

25. The LED lamp in accordance with claim 22, further including an external source of AC power and a PLC line connecting said source of AC power with said computer, and wherein said means for transmitting said signal to said means for transmitting includes a signal path comprising a signal line path from said at least one occupancy sensor connected to said PLC line to said computer.

26. The LED lamp in accordance with claim 22, further including another LED lamp having another at least one LED positioned in another tube including other electrical power and another ballast assembly and other means for controlling the delivery of said other electrical power from said another ballast assembly to said another LED lamp, said another LED lamp further including at least one another photosensor in operative signal and power association with said at least one LED, said at least one another photosensor being positioned in said another tube, said at least one another photosensor being for detecting the level of daylight around the illumination area of said at least one another LED.

27. The LED lamp in accordance with claim 26, further including another current driver dimmer in operative signal and power association with said another at least one LED, said another dimmer being positioned in said another tube, said another dimmer being for regulating the amount of power provided by said other electrical power to said another at least one LED, said at least one another photosensor being in operative signal and power association with said another at least one LED.

28. The LED lamp in accordance with claim 27, wherein said means for controlling further includes another computer positioned in said another lamp in operative power and signal association with said another dimmer, wherein said another computer includes computer controls for signaling said another dimmer to regulate the degree of power input to said another at least one LED to control the degree of illumination by said another at least one LED, said means for transmitting said signal to said means for controlling relating to the detected level of daylight from said means for detecting being directed from said at least one another photosensor to said another computer.

29. The LED lamp in accordance with claim 28, wherein said computer and said at least one photosensor are in network signal communication with said at least one another photosensor and with said another computer, wherein first photosensor data signals from said at least one photosensor and second photosensor data from said at least one another photosensor received by said computer and by said another computer are continuously compared in accordance with a computer program, wherein said computer signals said dimmer and said at least one another computer signals said another dimmer, and wherein the regulation of power outputs of said dimmer and said another dimmer to said at least one LED and said another at least one LED are equal.

30. The LED lamp in accordance with claim 28, wherein said computer and said at least one photosensor are in network signal communication with said at least one another photosensor and with said another computer, wherein first photosensor data signals from said at least one photosensor and second photosensor data from said at least one another photosensor received by said computer and by said another computer are continuously compared in accordance with a computer program, wherein said computer signals said dimmer and said at least one another computer signals said another dimmer, and wherein the regulation of power outputs of said dimmer and said another dimmer to said at least one LED and said another at least one LED are not equal.

31. The LED lamp in accordance with claim 29, further including another at least one occupancy sensor positioned in said another tube in operative signal and power association with said at least one LED, said another at least one occupancy sensor being for detecting the presence or lack of presence of a person around the illumination area of said another at least one LED, said means for transmitting said signal to said means for controlling relating to the presence or lack of presence of a person from said means for detecting being directed from said another at least one occupancy sensor to said another computer.

32. The LED lamp in accordance with claim 31, wherein said at least one photosensor, said another at least one photosensor, said at least one occupancy sensor, and said another at least one occupancy sensor are in mutual network communication in relation to said dimmer and said another dimmer.

33. The LED lamp in accordance with claim 1 wherein said at least one LED is a plurality of LEDs.

34. The LED lamp in accordance with claim 1, wherein said at least one LED is at least one OLED.

35. The LED lamp in accordance with claim 1, wherein said current driver dimmer is a plurality of current driver dimmers.

36. The LED lamp in accordance with claim 1, wherein said means for controlling includes a logic gate array.

37. The LED lamp in accordance with claim 1, wherein said means for controlling includes a timer.

38. The LED lamp in accordance with claim 1, wherein said voltage surge suppressor device includes at least one voltage surge absorber (ZNR).

39. The LED lamp in accordance with claim 1, wherein said voltage surge suppressor device includes at least one movistor (MOV).

40. The LED lamp in accordance with claim 1, wherein said voltage surge suppressor device voltage includes at least one varistor (VAR).

41. The LED lamp in accordance with claim 3, wherein said at least one photosensor is a plurality of photosensors.

42. The LED lamp in accordance with claim 9, wherein said at least one occupancy sensor is a plurality of occupancy sensors.

43. The LED lamp in accordance with claim 17, wherein said computer is a logic gate array.

* * * * *